US010124322B2

(12) United States Patent
Biberger et al.

(10) Patent No.: US 10,124,322 B2
(45) Date of Patent: Nov. 13, 2018

(54) LEAN $NO_x$ TRAPS, TRAPPING MATERIALS, WASHCOATS, AND METHODS OF MAKING AND USING THE SAME

(71) Applicant: Umicore AG & Co. KG, Hanau-Wolfgang (DE)

(72) Inventors: Maximilian A. Biberger, Scottsdale, AZ (US); Bryant Kearl, Phoenix, AZ (US); Qinghua Yin, Tempe, AZ (US); Xiwang Qi, Scottsdale, AZ (US); David Leamon, Gilbert, AZ (US)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 15/019,828

(22) Filed: Feb. 9, 2016

(65) Prior Publication Data

US 2016/0228852 A1 Aug. 11, 2016

Related U.S. Application Data

(60) Provisional application No. 62/115,106, filed on Feb. 11, 2015, provisional application No. 62/115,112, filed on Feb. 11, 2015.

(51) Int. Cl.
*B01J 23/63* (2006.01)
*B01J 37/02* (2006.01)
*B01D 53/94* (2006.01)
*B01J 37/34* (2006.01)
*B01J 37/08* (2006.01)
*B01J 35/00* (2006.01)
*B01J 37/00* (2006.01)

(52) U.S. Cl.
CPC .......... *B01J 23/63* (2013.01); *B01D 53/9422* (2013.01); *B01J 37/0211* (2013.01);
(Continued)

(58) Field of Classification Search
CPC .... B01J 2229/186; B01J 23/38; B01J 23/462; B01J 29/072; B01J 31/068; B01J 35/0073;
(Continued)

(56) References Cited

U.S. PATENT DOCUMENTS 7,678,419 B2  3/2010  Kevwitch et al.
7,717,001 B2  5/2010  Pesiri
(Continued)

FOREIGN PATENT DOCUMENTS

WO  WO-2013/093597 A2  6/2013
WO  WO-2013/151557 A1  10/2013
(Continued)

OTHER PUBLICATIONS

U.S. Appl. No. 12/151,810, filed May 8, 2008, for Layman et al.
(Continued)

*Primary Examiner* — Amber R Orlando
*Assistant Examiner* — Syed T Iqbal
(74) *Attorney, Agent, or Firm* — Suzannah K. Sundby, Esq.; Canady + Lortz LLP

(57) ABSTRACT

The present disclosure relates to micron-sized particle used for catalyzing and storing $NO_x$ gases, such as those found in vehicle exhaust emissions, washcoats employing micron-sized particle used for catalyzing and storing $NO_x$ gases, washcoat coated substrates, lean $NO_x$ trap (LNT) systems, and vehicles using such systems. Also provided are methods of preparing micron-sized particle used for catalyzing and storing $NO_x$ gases, as well as preparation of washcoats and coated substrates. More specifically, the present disclosure relates to a lean $NO_x$ trapping materials, wherein the materials include a $NO_x$ catalytic component attached to a micron-sized carrier particle and a $NO_x$ storage component, as well as washcoats and coated substrates useful in the treatment of exhaust gases. In some embodiments, a portion of the $NO_x$ storage component is attached to the micron-sized carrier particle.

22 Claims, 15 Drawing Sheets

(52) U.S. Cl.
CPC ........ *B01J 37/0215* (2013.01); *B01J 37/0244* (2013.01); *B01J 37/0248* (2013.01); *B01J 37/349* (2013.01); *B01D 2255/1021* (2013.01); *B01D 2255/1023* (2013.01); *B01D 2255/2042* (2013.01); *B01D 2255/2061* (2013.01); *B01D 2255/2063* (2013.01); *B01D 2255/2065* (2013.01); *B01D 2255/20715* (2013.01); *B01D 2255/908* (2013.01); *B01D 2255/9202* (2013.01); *B01J 35/0013* (2013.01); *B01J 37/0018* (2013.01); *B01J 37/0234* (2013.01); *B01J 37/08* (2013.01); *B01J 2523/00* (2013.01); *B01J 2523/25* (2013.01)

(58) Field of Classification Search
CPC ........ B01J 35/008; B01J 35/02; B01J 35/026; B01J 35/1019; B01J 35/1057; B01J 35/1066; B01J 37/0221; B01J 37/0238; B01J 37/0244; B01J 23/44; B01J 23/63; B01J 23/464; B01J 23/42; B01J 37/08; B01J 21/04; B01J 37/0045; B01J 37/349; B01J 35/0006; B01J 21/066; B01J 35/04; B01J 37/0228; F01N 3/101; F01N 3/0864; F01N 2510/068; F01N 3/0842; B01D 53/00; B01D 2255/9202; B01D 2255/91; B01D 2255/9022; B01D 2255/1023; B01D 2255/1025; B01D 2255/1021; B01D 2255/2042; B01D 2255/2065; B01D 2255/407; B01D 2255/20; Y10T 428/24149; Y10T 428/25; Y02T 10/22
See application file for complete search history.

(56) References Cited

U.S. PATENT DOCUMENTS

| | | |
|---|---|---|
| D627,900 S | 11/2010 | Layman |
| 7,897,127 B2 | 3/2011 | Layman et al. |
| 7,905,942 B1 | 3/2011 | Layman |
| 8,007,718 B1 | 8/2011 | Biberger |
| 8,051,724 B1 | 11/2011 | Layman et al. |
| 8,076,258 B1 | 12/2011 | Biberger |
| 8,142,619 B2 | 3/2012 | Layman et al. |
| 8,470,112 B1 | 6/2013 | Biberger |
| 8,481,449 B1 | 7/2013 | Biberger et al. |
| 8,507,401 B1 | 8/2013 | Biberger et al. |
| 8,507,402 B1 | 8/2013 | Biberger et al. |
| 8,524,631 B2 | 9/2013 | Biberger |
| 8,545,652 B1 | 10/2013 | Biberger |
| 8,557,727 B2 | 10/2013 | Yin et al. |
| 8,574,408 B2 | 11/2013 | Layman |
| 8,575,059 B1 | 11/2013 | Biberger et al. |
| 8,604,398 B1 | 12/2013 | Layman |
| 8,652,992 B2 | 2/2014 | Yin et al. |
| 8,663,571 B2 | 3/2014 | Biberger et al. |
| 8,668,803 B1 | 3/2014 | Biberger |
| 8,669,202 B2 | 3/2014 | van den Hoek et al. |
| 8,679,433 B2 | 3/2014 | Yin et al. |
| 8,759,248 B2 | 6/2014 | Biberger et al. |
| 8,803,025 B2 | 8/2014 | Layman et al. |
| 8,821,786 B1 | 9/2014 | Biberger |
| 8,828,328 B1 | 9/2014 | Leamon et al. |
| 8,859,035 B1 | 10/2014 | Leamon |
| 8,865,611 B2 | 10/2014 | Yin et al. |
| 8,877,357 B1 | 11/2014 | Biberger |
| 8,893,651 B1 | 11/2014 | Biberger et al. |
| 8,906,316 B2 | 12/2014 | Layman |
| 8,906,498 B1 | 12/2014 | Biberger |
| 8,932,514 B1 | 1/2015 | Yin et al. |
| 8,945,219 B1 | 2/2015 | Biberger |
| 8,956,574 B2 | 2/2015 | Layman |
| 8,969,237 B2 | 3/2015 | Yin et al. |
| 8,992,820 B1 | 3/2015 | Yin et al. |
| 9,023,754 B2 | 5/2015 | Biberger |
| 9,039,916 B1 | 5/2015 | Lehman, Jr. |
| 9,089,840 B2 | 7/2015 | Biberger et al. |
| 9,090,475 B1 | 7/2015 | Lehman, Jr. |
| 9,119,309 B1 | 8/2015 | Lehman, Jr. |
| 9,126,191 B2 | 9/2015 | Yin et al. |
| 9,132,404 B2 | 9/2015 | Layman |
| 9,149,797 B2 | 10/2015 | Leamon |
| 9,156,025 B2 | 10/2015 | Qi et al. |
| 9,173,967 B1 | 11/2015 | Biberger |
| 9,180,423 B2 | 11/2015 | Biberger et al. |
| 9,186,663 B2 | 11/2015 | Biberger et al. |
| 9,216,398 B2 | 12/2015 | Biberger et al. |
| 9,216,406 B2 | 12/2015 | van den Hoek et al. |
| 9,302,260 B2 | 4/2016 | Biberger et al. |
| 9,308,524 B2 | 4/2016 | Yin et al. |
| 9,332,636 B2 | 5/2016 | Biberger |
| 9,427,732 B2 | 8/2016 | Yin et al. |
| 9,433,938 B2 | 9/2016 | van den Hoek et al. |
| 9,498,751 B2 | 11/2016 | Yin et al. |
| 9,511,352 B2 | 12/2016 | Qi et al. |
| 9,517,448 B2 | 12/2016 | Kearl et al. |
| 9,522,388 B2 | 12/2016 | Yin et al. |
| 9,533,289 B2 | 1/2017 | Yin et al. |
| 9,533,299 B2 | 1/2017 | Qi et al. |
| 9,566,568 B2 | 2/2017 | Yin et al. |
| 9,586,179 B2 | 3/2017 | Yin et al. |
| 9,592,492 B2 | 3/2017 | Biberger et al. |
| 9,597,662 B2 | 3/2017 | Biberger et al. |
| 9,599,405 B2 | 3/2017 | Biberger et al. |
| 9,687,811 B2 | 6/2017 | Biberger et al. |
| 2005/0233380 A1 | 10/2005 | Pesiri et al. |
| 2008/0277092 A1 | 11/2008 | Layman et al. |
| 2009/0320449 A1 | 12/2009 | Beutel et al. |
| 2011/0030346 A1 | 2/2011 | Neubauer et al. |
| 2011/0143930 A1 | 6/2011 | Yin et al. |
| 2011/0144382 A1 | 6/2011 | Yin et al. |
| 2011/0305612 A1 | 12/2011 | Müller-Stach et al. |
| 2012/0045373 A1 | 2/2012 | Biberger |
| 2012/0285548 A1 | 11/2012 | Layman et al. |
| 2013/0189173 A1 | 7/2013 | Hilgendorff et al. |
| 2013/0213018 A1 | 8/2013 | Yin et al. |
| 2013/0280528 A1 | 10/2013 | Biberger |
| 2014/0120355 A1 | 5/2014 | Biberger |
| 2014/0128245 A1 | 5/2014 | Yin et al. |
| 2014/0140909 A1* | 5/2014 | Qi .................. B01J 37/0228 423/212 |
| 2014/0252270 A1 | 9/2014 | Lehman, Jr. |
| 2014/0263190 A1 | 9/2014 | Biberger et al. |
| 2014/0318318 A1 | 10/2014 | Layman et al. |
| 2014/0338519 A1 | 11/2014 | Biberger |
| 2015/0093312 A1 | 4/2015 | Yin et al. |
| 2015/0140317 A1 | 5/2015 | Biberger et al. |
| 2015/0165418 A1 | 6/2015 | Kearl et al. |
| 2015/0165434 A1 | 6/2015 | Yin et al. |
| 2015/0196884 A1 | 7/2015 | Layman |
| 2015/0217229 A1 | 8/2015 | Yin et al. |
| 2015/0266002 A1 | 9/2015 | Biberger et al. |
| 2015/0314260 A1 | 11/2015 | Biberger |
| 2015/0314581 A1 | 11/2015 | Biberger |
| 2015/0367331 A1 | 12/2015 | Biberger |
| 2016/0030910 A1 | 2/2016 | Biberger et al. |
| 2016/0038874 A1 | 2/2016 | Yin et al. |
| 2016/0045867 A1 | 2/2016 | Kearl et al. |
| 2016/0059216 A1 | 3/2016 | Qi |
| 2016/0067679 A1 | 3/2016 | Yin et al. |
| 2016/0074855 A1 | 3/2016 | Qi et al. |
| 2016/0138870 A1 | 5/2016 | Biberger et al. |
| 2016/0144346 A1 | 5/2016 | Biberger et al. |
| 2016/0144352 A1 | 5/2016 | van den Hoek et al. |
| 2016/0184802 A1 | 6/2016 | Biberger et al. |
| 2016/0236148 A1 | 8/2016 | Yin et al. |
| 2016/0310930 A1 | 10/2016 | Yin et al. |
| 2017/0028393 A1 | 2/2017 | Biberger et al. |
| 2017/0151552 A1 | 6/2017 | Kearl et al. |
| 2017/0165653 A1 | 6/2017 | Yin et al. |

(56) References Cited

U.S. PATENT DOCUMENTS

| | | |
|---|---|---|
| 2017/0167338 A1 | 6/2017 | Qi et al. |
| 2017/0189892 A1 | 7/2017 | Yin et al. |

FOREIGN PATENT DOCUMENTS

| | | |
|---|---|---|
| WO | WO-2016/033517 A1 | 3/2016 |
| WO | WO-2016/033526 A1 | 3/2016 |
| WO | WO-2016/144729 A1 | 9/2016 |
| WO | WO-2016/144811 A1 | 9/2016 |
| WO | WO-2016/149367 A1 | 9/2016 |
| WO | WO-2017/075504 A1 | 5/2017 |

OTHER PUBLICATIONS

U.S. Appl. No. 12/152,084, filed May 9, 2008, for Biberger.
U.S. Appl. No. 13/028,693, filed Feb. 16, 2011, for Biberger.
U.S. Appl. No. 12/151,809, filed May 8, 2008, for Biberger et al.
U.S. Appl. No. 12/152,111, filed May 9, 2008, for Biberger et al.
U.S. Appl. No. 12/151,804, filed May 8, 2008, for Biberger et al.
U.S. Appl. No. 12/968,239, filed Dec. 14, 2010, for Biberger.
U.S. Appl. No. 12/969,128, filed Dec. 15, 2010, for Biberger.
U.S. Appl. No. 12/969,306, filed Dec. 15, 2010, for Lehman et al.
U.S. Appl. No. 12/969,447, filed Dec. 15, 2010, for Biberger et al.
U.S. Appl. No. 14/491,876, filed Sep. 19, 2014, for Leamon.
U.S. Appl. No. 12/969,457, filed Nov. 15, 2010, for Leamon et al.
U.S. Appl. No. 12/954,813, filed Nov. 26, 2010, for Biberger.
U.S. Appl. No. 12/954,822, filed Nov. 26, 2010, for Biberger.
Chemwatch (Aug. 2010). "Barium Acetate," *Santa Cruz Biotechnology, Inc.*, located at http://datasheets.scbt.com/sc-202968.pdf; 12 pages.
Yu, S. (2007). *Mechanistic Investigation of Nitrogen Oxide Storage and Reduction Catalyst*. University of South Carolina, pp. 53.

\* cited by examiner

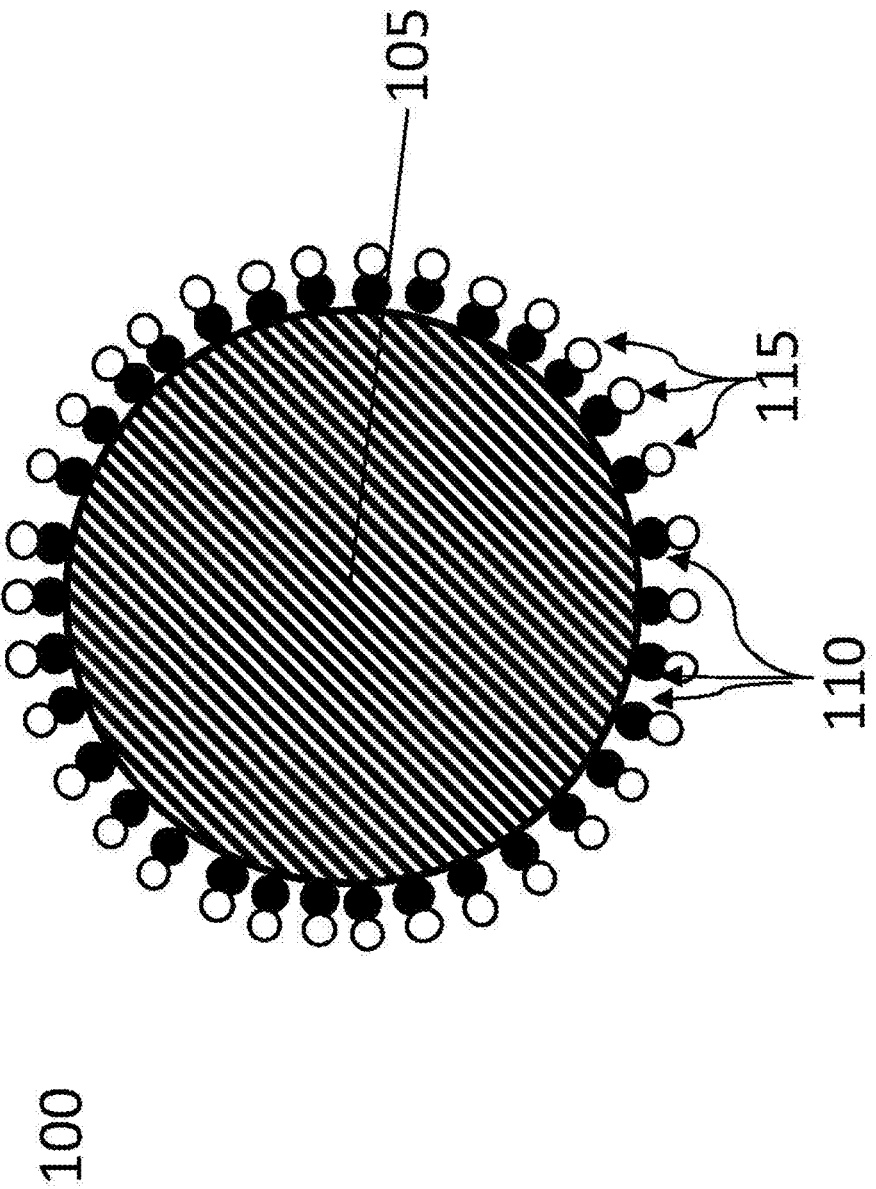

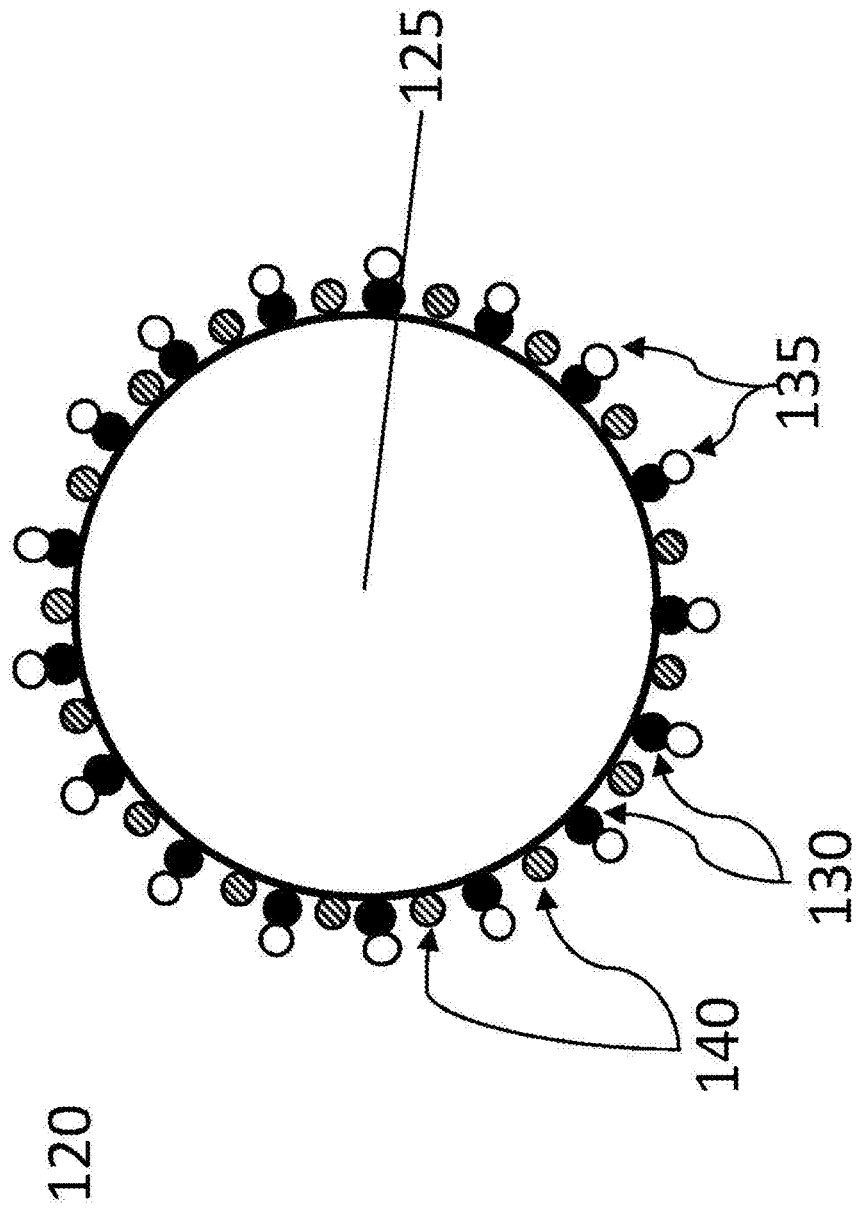

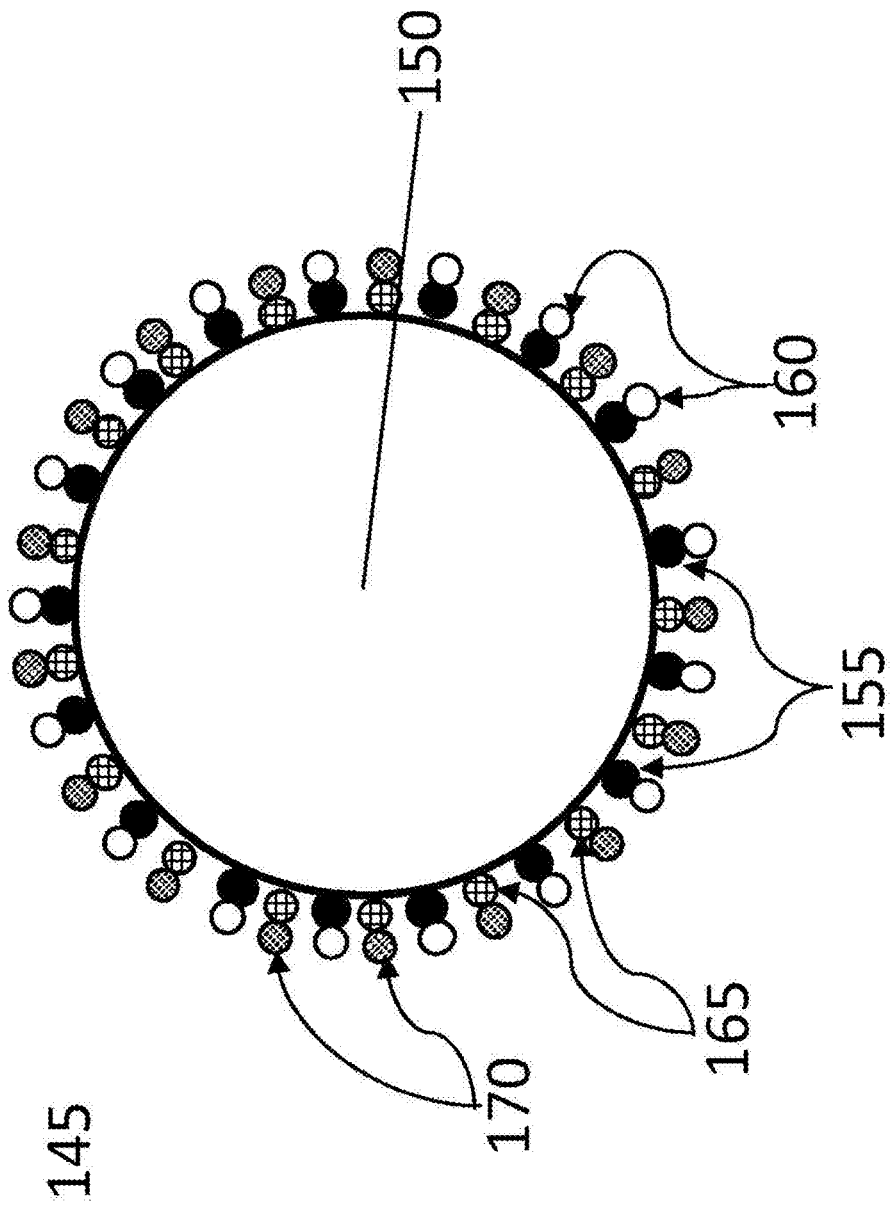

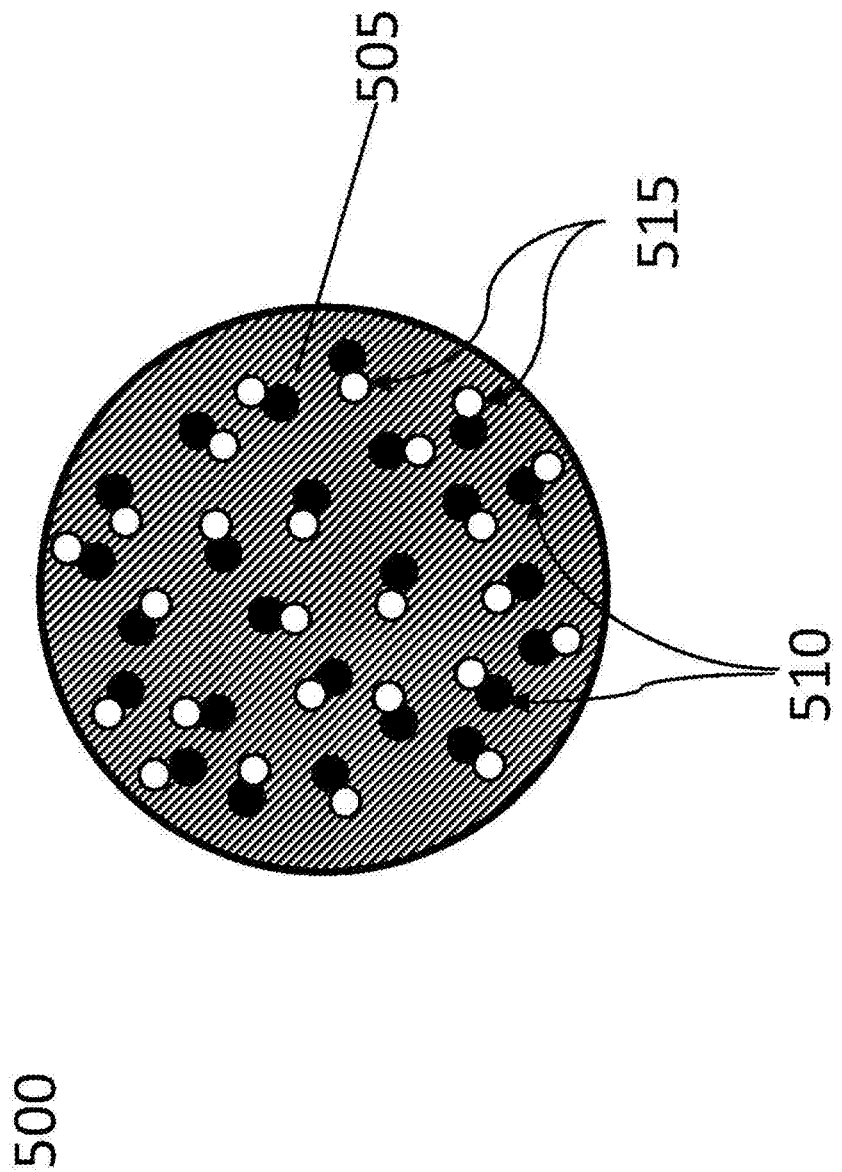

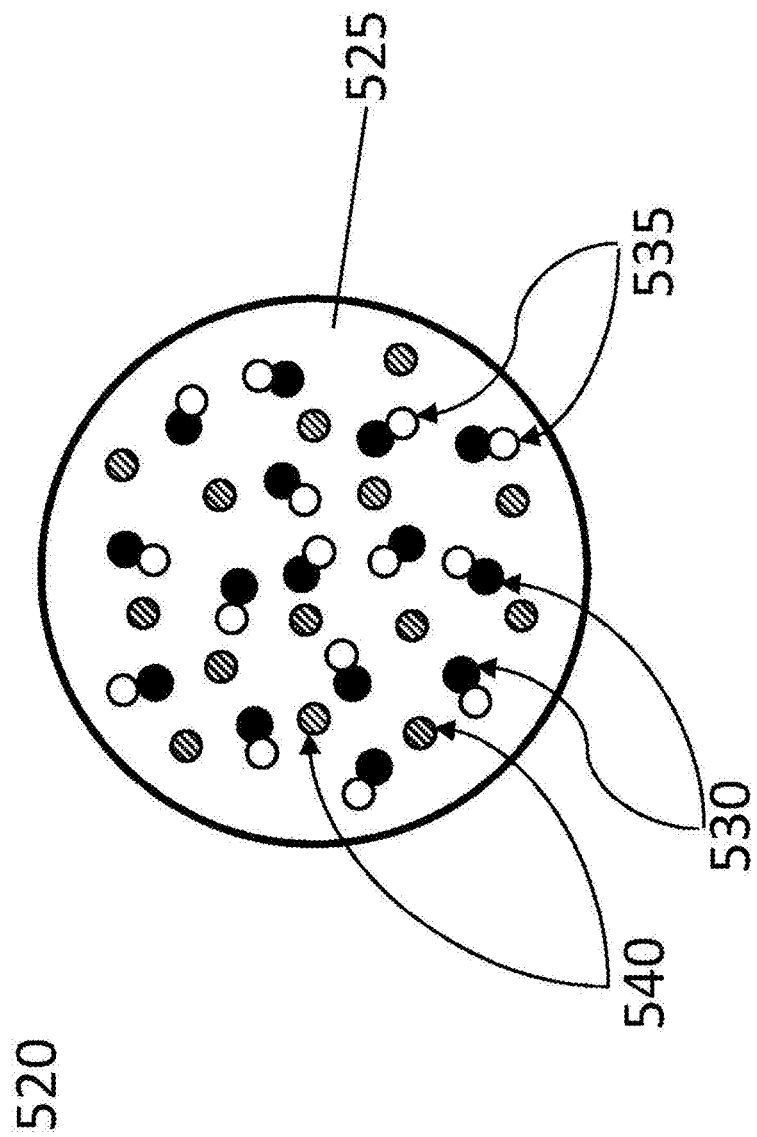

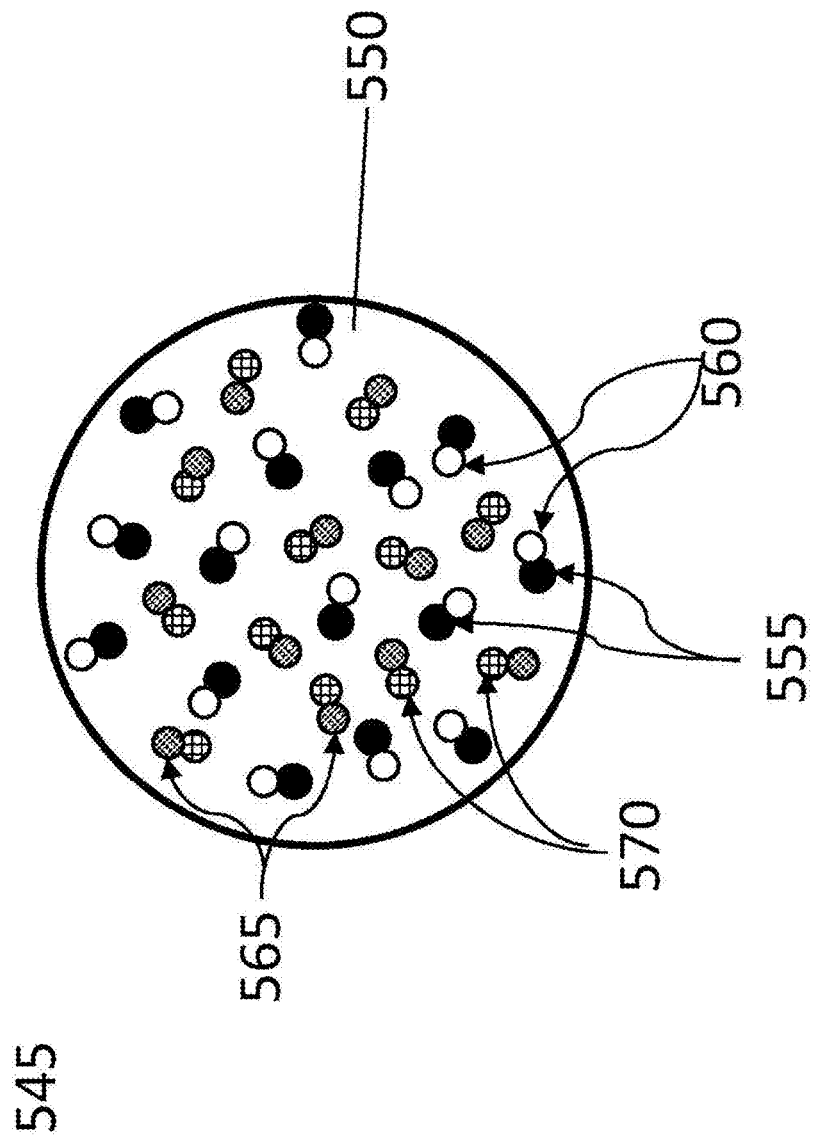

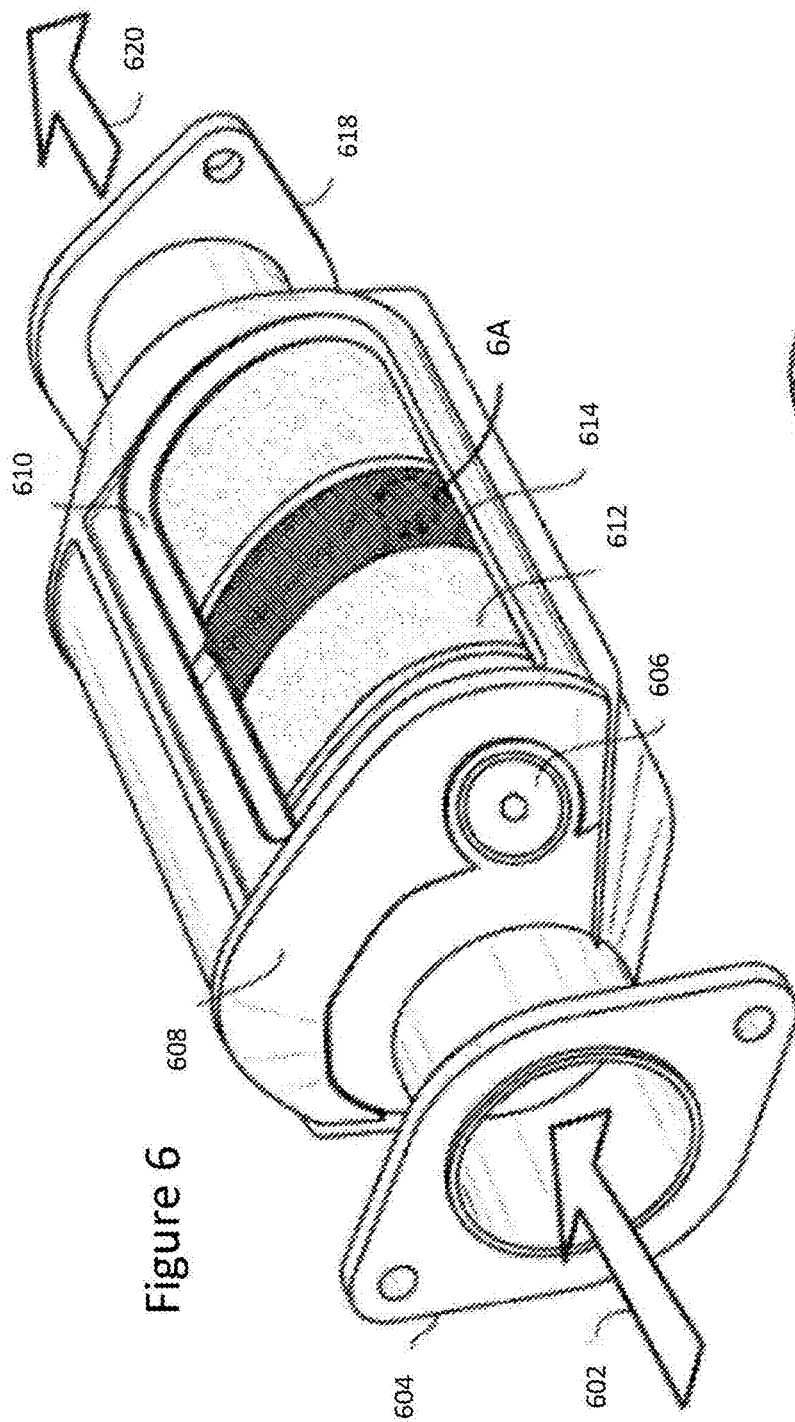
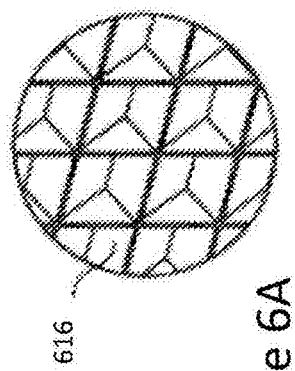
Figure 6
Figure 6A

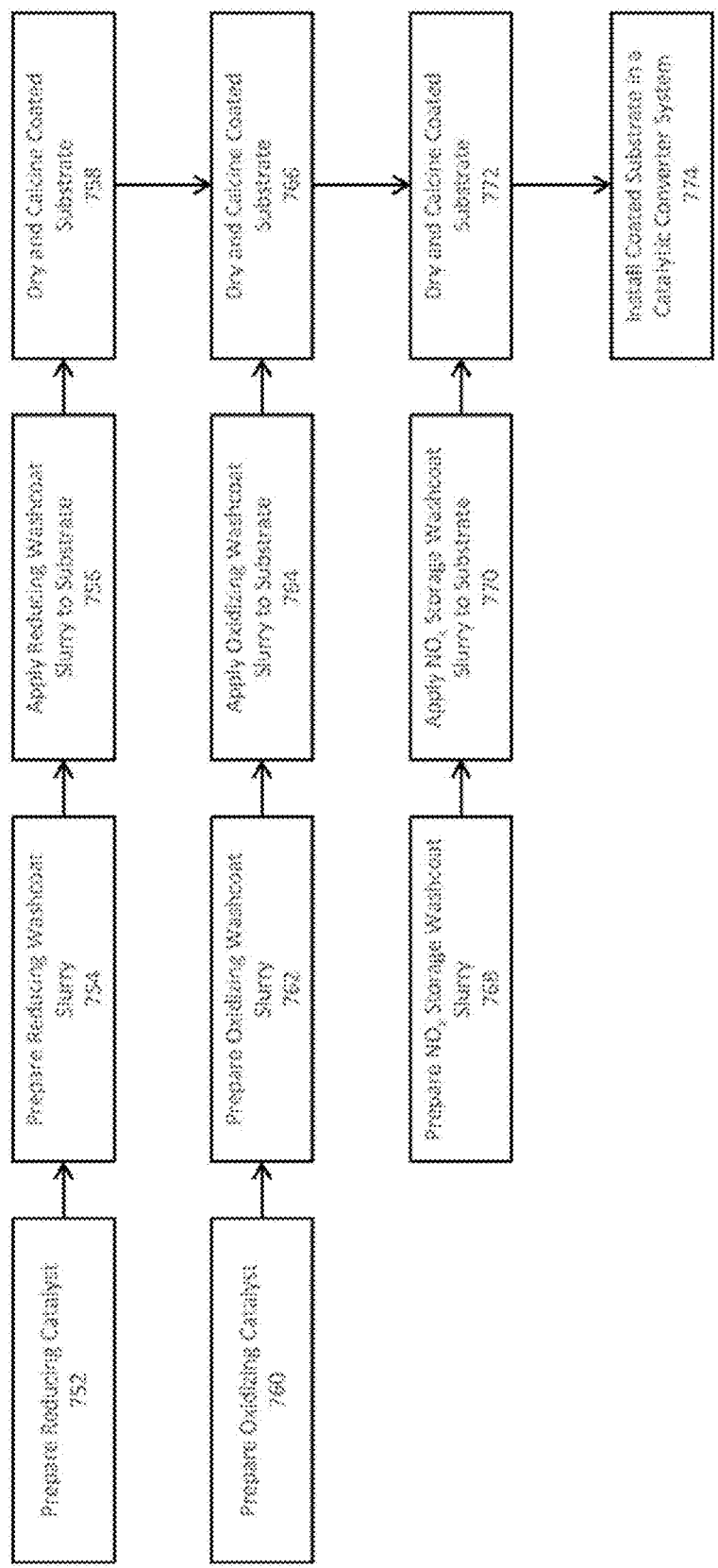

LEAN $NO_x$ TRAPS, TRAPPING MATERIALS, WASHCOATS, AND METHODS OF MAKING AND USING THE SAME

CROSS-REFERENCE TO RELATED APPLICATIONS

This application claims priority benefit of United States Provisional Patent Application Nos. 62/115,106, filed Feb. 11, 2015, and 62/115,112, filed Feb. 11, 2015. The entire contents of those applications are hereby incorporated by reference herein.

FIELD OF THE INVENTION

The present disclosure relates to the field of catalysts. More specifically, the present invention relates to nanoparticle catalysts and storage materials for nitrogen oxides as part of a $NO_x$ trap system.

BACKGROUND OF THE INVENTION

Car exhaust primarily contains harmful gases such as carbon monoxide (CO), nitrogen oxides ($NO_x$), and hydrocarbons (HC). Environmental concerns and government regulations have led efforts to remove these noxious combustion products from vehicle exhaust by conversion to more benign gases such as carbon dioxide ($CO_2$), nitrogen ($N_2$), and water ($H_2O$). In order to accomplish this conversion, the exhaust gases must pass through a treatment system that contains materials that can oxidize CO to $CO_2$, reduce $NO_x$ to $N_2$ and $H_2O$, and oxidize hydrocarbons to $CO_2$ and $H_2O$. Recently, lean-burn gasoline and diesel engines have increased in popularity due to their improved fuel economy. These engines, however, have high amounts of oxygen present in the exhaust gas, which leads to inhibition of the catalytic reduction of $NO_x$.

One solution to this problem has been the use of selective catalytic reduction (SCR). SCR injects an ammonia source, such as urea, into the fuel exhaust to reduce $NO_x$ emissions to less harmful $N_2$ gas. The utility of SCR is limited, however, by the frequent need to replace the consumable ammonia source.

An alternative solution has been the use of lean $NO_x$ traps (LNTs). LNTs adsorb, store, or trap nitrogen oxides during lean-burn engine operation (i.e., when excess oxygen is present) by contacting the $NO_x$ gases with a storage material. The LNT system can then switch to a rich-purge phase by reducing oxygen content and increasing the presence of hydrocarbons. During the rich-purge phase, the nitrous oxide is released from the storage material and, promoted by a reducing catalyst, reacts with hydrocarbons to yield nitrogen gas. Although these traps are effective at adsorbing $NO_2$ from the exhaust of lean-burn vehicles, adsorption of other nitrogen oxides ($NO_x$), also present in the fuel exhaust, is inefficient. LNTs may be composed of one or more platinum group metals (PGMs) such as platinum or palladium to catalyze the oxidation of NO for more efficient adsorption, however high loadings of expensive PGMs are required. As such, there is a significant cost associated with the use of these LNTs. Accordingly, there is a need for a more efficient lean $NO_x$ traps to minimize the amount of PGMs required by LNTs.

SUMMARY OF THE INVENTION

Described herein are coated substrates and washcoat compositions (including washcoat slurries and washcoat layers) employing lean $NO_x$ trapping materials, and methods of making the same. In some embodiments, lean $NO_x$ trapping materials include catalytic composite nanoparticles, oxygen storage materials, and $NO_x$ adsorption materials. Also disclosed are coated substrates, catalytic converters, LNT systems, exhaust systems, and vehicles using such catalytic nanoparticles, catalytic composite nanoparticles, oxygen storage materials, $NO_x$ adsorption materials, and $NO_x$ storage washcoat compositions. In some embodiments, lean $NO_x$ trapping materials are provided as "loose ingredients," wherein the catalytic composite nanoparticles, oxygen-storage particles, and $NO_x$ adsorption material (or precursors) are provided separately. In some embodiments, a portion of the catalytic composite nanoparticles are not attached to the oxygen-storage particles. In some embodiments, a portion of the catalytic composite nanoparticles not attached to the oxygen-storage particles. In some embodiments, a portion of the $NO_x$ adsorption materials are not attached to the oxygen-storage particles. In some embodiments, a portion of the $NO_x$ adsorption materials are attached to the oxygen-storage particles.

Disclosed herein are coated substrates, which comprise a substrate and a washcoat layer, the washcoat layer comprising micron-sized oxygen-storage particles; a plurality of composite nanoparticles, the composite nanoparticles comprising a support nanoparticle and a catalytic nanoparticle, the catalytic nanoparticle comprising one or more platinum group metals; and an alkaline earth metal oxide. In some embodiments, a portion of the composite nanoparticles are not attached to the micron-sized oxygen-storage particles. In some embodiments, a portion of the composite nanoparticles are attached to the micron-sized oxygen-storage particles. In some embodiments, a portion of the alkaline earth metal oxide is not attached to the micron-sized oxygen-storage particles. In some embodiments, a portion of the alkaline earth metal oxide is attached to the micron-sized oxygen-storage particles. In some embodiments, the washcoat layer may be formed by separately providing the oxygen-storage particles; separately providing the composite nanoparticles; separately providing an alkaline earth metal salt; mixing the oxygen-storage particles, composite nanoparticles, and alkaline earth metal salt to form a washcoat slurry; coating the washcoat slurry onto the substrate; and calcining the substrate, thereby converting the alkaline earth metal salt into the alkaline earth metal oxide and forming the washcoat layer.

In any embodiment disclosed herein, the oxygen-storage particles may be porous. In some embodiments, oxygen-storage particles comprise a metal oxide, such as cerium oxide, zirconium oxide, lanthanum oxide, or yttrium oxide. In some embodiments, the oxygen storage particles comprise cerium oxide; comprise zirconium oxide; comprise lanthanum oxide; or comprise yttrium oxide. In some embodiments, the oxygen-storage particles comprise cerium oxide and zirconium oxide; cerium oxide, zirconium oxide, and lanthanum oxide; cerium oxide, zirconium oxide, and yttrium oxide; or cerium oxide, zirconium oxide, lanthanum oxide, and yttrium oxide. In some embodiments, oxygen-storage particles comprise about 20% to about 100% cerium oxide; about 30% to about 90% cerium oxide; about 30% to about 50% cerium oxide; or about 70% to about 90% cerium oxide. In some embodiments, the oxygen-storage particles comprise about 0% to about 80% zirconium oxide; about 5% to about 15% zirconium oxide; about 15% to about 35% zirconium oxide; about 35% to about 55% zirconium oxide; or about 55% to about 65% zirconium oxide. In some embodiments, the oxygen-storage particles comprise about 0% to about 15% lanthanum oxide; about 2% to about 10% lanthanum oxide; about 2% to about 8% lanthanum oxide; about 3% to about 6% lanthanum oxide; or about 4% to about 5% lanthanum oxide. In some embodiments, the oxygen-storage particles comprise about 0% to about 15% yttrium oxide; about 2% to about 10% yttrium oxide; about 2% to about 8% yttrium oxide; about 3% to about 6% yttrium oxide; or about 4% to about 5% yttrium oxide. In some embodiments, the oxygen-storage particles comprise about 80% to about 90% cerium oxide and about 10% to about 20% zirconium oxide; about 80% to about 90% cerium oxide, about 5% to about 15% zirconium oxide, and about 3% to about 5% lanthanum oxide; about 80% to about 90% cerium oxide, about 5% to about 15% zirconium oxide, and about 3% to about 5% yttrium oxide; about 86% cerium oxide, about 10% zirconium oxide, and about 4% lanthanum oxide; or about 86% cerium oxide, about 10% zirconium oxide, and about 4% yttrium oxide.

In any embodiment disclosed herein, composite nanoparticles are plasma generated. In any embodiments, the composite nanoparticles may comprise a catalytic nanoparticle attached to a support nanoparticle. In some embodiments, the catalytic nanoparticle comprises one or more platinum group metals, such as platinum or palladium. In some embodiments, the catalytic nanoparticle comprises platinum and palladium, for example at a ratio of about 1:2 platinum:palladium to about 25:1 platinum:palladium, such as about 10:1 platinum:palladium. In some embodiments, the support nanoparticle comprises a metal oxide, such as cerium oxide. In some embodiments, the composite nanoparticles comprise about 0.01 wt % to about 60 wt % platinum group metal and about 40 wt % to about 99.99 wt % metal oxide, or about 0.5 wt % to about 2 wt % platinum group metal and about 98 wt % to about 99.5 wt % metal oxide.

In any embodiment disclosed herein, the alkaline earth metal oxide may be barium oxide. In some embodiments, a portion of the alkaline earth metal oxide is attached to the oxygen-storage particles by depositing an alkaline earth metal salt from onto the oxygen-storage particles and allowing the alkaline earth metal salt to convert into the alkaline earth metal oxide. In some embodiments, the alkaline earth metal salt is converted into an alkaline earth metal oxide by calcining the coated substrate. In any embodiment, the alkaline earth metal salt is a barium salt, for example barium acetate, barium bromide, barium carbonate, barium chloride, barium chromate, barium cyclohexanebutyrate, barium fluoride, barium hydroxide, barium iodide, barium manganite, or barium perchlorate. In some embodiments, the alkaline earth metal oxide is comprised in a plurality of alkaline earth metal oxide nanoparticles, and in some embodiments, may be plasma generated.

In some embodiments disclosed herein, lean $NO_x$ trapping materials, a washcoat layer, or coated substrate is configured to adsorb $NO_x$ gasses during a lean burn. In some embodiments disclosed herein, lean $NO_x$ trapping materials, a washcoat layer, or coated substrate is configured to desorb $NO_x$ gasses during a rich-purge cycle.

In some embodiments, the oxygen-storage particles are about 100 g/l to about 400 g/l of washcoat composition solids, or about 200 g/l to about 300 g/l of the washcoat composition solids. In some embodiments, the composite nanoparticles are about 20 g/l to about 100 g/l of the washcoat composition solids, or about 40 g/l to about 80 g/l of the washcoat composition solids. In some embodiments, the alkaline earth metal oxide is about 10 g/l to about 60 g/l of the washcoat composition solids, or about 25 g/l to about 45 g/l of the washcoat composition solids. In some embodiments, the platinum group metal is about 0.2 g/l to about 5 g/l of the washcoat composition solids, about 0.4 g/l to about 3 g/l of the washcoat composition solids, or about 0.5 g/l to about 1 g/l of the washcoat composition solids. In some embodiments, a washcoat composition further comprises aluminum oxide or boehmite. In some embodiments, the aluminum oxide is derived from boehmite. In some embodiment, a washcoat composition comprises about 1% to about 7% aluminum oxide or boehmite, by weight, of the washcoat layer solids, or about 3% to about 6% aluminum oxide or boehmite, by weight, the washcoat layer solids, or about 4% to about 5% aluminum oxide or boehmite, by weight, of the washcoat layer solids.

In some embodiments, a coated substrate comprises a $NO_x$ storage layer, a reducing washcoat layer, or an oxidizing washcoat layer. In some embodiments, a reducing washcoat layer comprises a plurality of reducing micron-sized catalytic particles, the reducing micron-sized catalytic particles comprising a plurality of reducing composite nanoparticles attached to a reducing catalyst carrier particle. In some embodiments, the reducing composite nanoparticles are bonded to the reducing catalyst carrier particle. In some embodiments, the reducing catalyst carrier particle comprises reducing composite nanoparticles embedded within the carrier. In some embodiments, the reducing composite nanoparticles comprise a reducing catalytic nanoparticle and a support nanoparticle, which, in some embodiments, may be plasma generated. In some embodiments, the reducing composite nanoparticles comprise rhodium. In some embodiments, the reducing catalytic nanoparticle comprises rhodium. In some embodiments, the support nanoparticle comprises cerium oxide. In some embodiments, the reducing catalyst carrier particle comprises a metal oxide, such as cerium oxide, zirconium oxide, lanthanum oxide, or yttrium oxide. In some embodiments, a reducing washcoat composition further comprises aluminum oxide particles or boehmite. In some embodiments, the aluminum oxide particles may be derived from boehmite.

In some embodiments, a coated substrate further comprises an oxidizing washcoat layer, which may comprise a plurality of micron-sized oxidizing catalytic particles, the micron-sized oxidizing catalytic particles comprising a plurality of oxidizing composite nanoparticles attached to an oxidizing catalyst carrier particle. In some embodiments, the oxidizing composite nanoparticles are bonded to the oxidizing catalyst carrier particle, and in some embodiments the oxidizing catalyst carrier particle oxidizing composite nanoparticles embedded within the carrier. In some embodiments, the oxidizing composite nanoparticles comprise an oxidizing catalytic nanoparticle and a support nanoparticle, which may be plasma generated. In some embodiments, the oxidizing composite nanoparticles comprise one or more platinum group metals, such as platinum or palladium. In some embodiments, the oxidizing catalytic nanoparticle comprises platinum or palladium. In some embodiments, the support nanoparticles comprise a metal oxide, for example aluminum oxide. In some embodiments, the oxidizing catalyst carrier particle comprises aluminum oxide. In some embodiments, the oxidizing washcoat composition further comprises porous aluminum oxide particles. In some embodiments, an alkaline earth metal oxide, such as barium oxide, is attached to the aluminum oxide particles. In some embodiments, the oxidizing washcoat composition may further comprise aluminum oxide derived from boehmite.

In some embodiments of a coated substrate described herein, the coated substrate demonstrates a $NO_x$ slip of 75 ppm or less when treated with exhaust gas comprising about 100 ppm $NO_x$ under lean-burn conditions for about 1000 seconds, a $NO_x$ slip of 50 ppm or less when treated with exhaust gas comprising about 100 ppm $NO_x$ under lean-burn conditions for about 1000 seconds, or a $NO_x$ slip of 50 ppm or less when treated with exhaust gas comprising about 100 ppm $NO_x$ under lean-burn conditions for about 500 seconds. In some embodiments, a coated substrate has a platinum group metal loading of about 2.0 g/l or less.

In some embodiments, a catalytic converter may comprise any coated substrate described herein. In some embodiments, an exhaust treatment system may comprise a conduit for exhaust gas and a catalytic converter described herein. In some embodiments, a vehicle may comprise a catalytic converter, as described herein. Further described herein is a method of treating exhaust gas, the method comprising contacted a coated substrate as described herein with the exhaust gas. In some embodiments, the coated substrate may be housed in a catalytic converter and configured to receive the exhaust gas.

Also described herein are $NO_x$ storage washcoat compositions, which may comprise micron-sized oxygen-storage particles; composite nanoparticles, the composite nanoparticle comprising a support nanoparticle and a catalytic nanoparticle, the catalytic nanoparticle comprising one or more platinum group metals; and an alkaline earth metal salt. In some embodiments a portion of the alkaline earth metal salt is deposited onto the micron size oxygen-storage particles. In some embodiments a portion of the alkaline earth metal salt is not deposited onto the micron size oxygen-storage particles. In some embodiments, a washcoat composition may be coated onto a substrate, and in some embodiments the substrate may be calcined, thereby converting the alkaline earth metal salt into an alkaline metal oxide.

Also disclosed herein is a $NO_x$ storage washcoat composition comprises micron-sized oxygen-storage particles; composite nanoparticles, the composite nanoparticle comprising a support nanoparticle and a catalytic nanoparticle, the catalytic nanoparticle comprising one or more platinum group metals; and an alkaline earth metal oxide. In some embodiments of a $NO_x$ storage washcoat composition, a portion of the alkaline earth metal oxide is attached to the micron-sized carrier particles. In some embodiments, a portion of the alkaline earth metal oxide is not attached to the micron-sized carrier particles. In some embodiments, a portion of the composite nanoparticles are attached to the micron-sized oxygen-storage particles. In some embodiments, a portion of the composite nanoparticles are not attached to the micron-sized oxygen-storage particles.

In some embodiments, a $NO_x$ storage washcoat composition may be a washcoat slurry. In some embodiments, a washcoat composition may further include a thickening agent. In some embodiments, oxygen-storage particles make up about 10% to about 90% of the washcoat composition solids, about 40% to about 80% of the washcoat composition solids, or about 60% to about 70% of the washcoat composition solids. In some embodiments, composite nanoparticles make up about 5% to about 25% of the washcoat composition solids, or about 10% to about 20% of the washcoat composition solids. In some embodiments, a washcoat composition further comprises boehmite, which may be about 1% to about 7% of the washcoat composition solids, about 3% to about 6% of the washcoat composition solids, or about 5% of the washcoat composition solids. In some embodiments, an alkaline earth metal oxide or an alkaline earth metal salt makes up about 5% to about 25% of the washcoat composition solids, about 10% to about 20% of the washcoat composition solids, or about 10% of the washcoat composition solids.

In some embodiments, a $NO_x$ storage washcoat composition may be coated onto a substrate. In some embodiments, a $NO_x$ storage washcoat composition may be a washcoat layer. In some embodiments, a $NO_x$ storage washcoat layer comprises about 100 g/l to about 400 g/l micron-sized oxygen-storage particles, or about 200 g/l to about 300 g/l micron-sized oxygen-storage particles. In some embodiments, a $NO_x$ storage washcoat layer comprises about 20 g/l to about 100 g/l composite nanoparticles, or about 40 g/l to about 80 g/l composite nanoparticles. In some embodiments, a $NO_x$ storage washcoat layer comprises about 10 g/l to about 60 g/l alkaline earth metal oxide, or about 25 g/l to about 45 g/l alkaline earth metal oxide. In some embodiments, a $NO_x$ storage washcoat layer comprises about 0.2 g/l to about 5 g/l platinum group metal, about 0.4 g/l to about 3 g/l platinum group metal, or about 0.5 g/l to about 1 g/l platinum group metal.

Further described herein is a vehicle comprising a coated substrate, the coated substrate comprising a substrate and a $NO_x$ storage washcoat composition, the washcoat composition comprising micron-sized oxygen-storage particles; composite nanoparticles, the composite nanoparticle comprising a support nanoparticle and a catalytic nanoparticle, the catalytic nanoparticle comprising one or more platinum group metals; and an alkaline earth metal oxide. In some embodiments, a portion of the alkaline earth metal oxide is attached to the micron-sized oxygen-storage particles. In some embodiments, a portion of the alkaline earth metal oxide is not attached to the micron-sized oxygen-storage particles. In some embodiments, a portion of the composite nanoparticles are attached to the micron-sized oxygen-storage particles. In some embodiments, a portion of the composite nanoparticles are not attached to the micron-sized oxygen-storage particles.

In some embodiments of a vehicle as described herein, the vehicle complies with the Euro 6 emissions requirements. In some embodiments, a vehicle displays $NO_x$ emissions of 180 mg/km or less, 80 mg/km or less, 60 mg/km or less, or 40 mg/km or less. In some embodiments, a vehicle complies with the Euro 6 emissions requirements during a lean-burn engine cycle. In some embodiments, a vehicle displays $NO_x$ emissions of 180 mg/km or less during a lean-burn engine cycle, 80 mg/km or less during a lean-burn engine cycle, 60 mg/km or less during a lean-burn engine cycle, or 40 mg/km or less during a lean-burn engine cycle. In some embodiments, a vehicle comprises a gasoline engine, and in some embodiments a vehicle comprises a diesel engine.

Further disclosed herein are methods of forming a washcoat composition, the method comprising providing a plurality of micron-sized oxygen-storage particles; providing a plurality of composite nanoparticle, the composite nanoparticle comprising a support nanoparticle and a catalytic nanoparticle, the catalytic nanoparticle comprising one or more platinum group metals; providing an alkaline earth metal salt; and mixing together the plurality of micron-sized oxygen-storage particles, the plurality of composite nanoparticles, and the alkaline earth metal salt. In some embodiments, the method may further comprise coating a substrate with the washcoat composition. In some embodiments, the method may further comprise calcining the washcoat composition to produce a washcoat layer. In some embodiments, calcining a substrate coated with a washcoat composition produces a washcoat layer coating the substrate.

Also disclosed herein are methods of forming coated substrates, the methods comprising providing a plurality of micron-sized oxygen-storage particles; providing a plurality of composite nanoparticle, the composite nanoparticle comprising a support nanoparticle and a catalytic nanoparticle, the catalytic nanoparticle comprising one or more platinum group metals; providing an alkaline earth metal salt; forming a $NO_x$ storage washcoat composition by mixing together the plurality of micron-sized oxygen-storage particles, the plurality of composite nanoparticles, and the alkaline earth metal salt; coating a substrate with the washcoat composition; and calcining the substrate, thereby forming a $NO_x$ storage washcoat layer coating the substrate.

In some embodiments of the methods disclosed herein, calcining the washcoat composition converts the alkaline earth metal salt into an alkaline earth metal oxide. In some embodiments, the alkaline earth metal salt is dissolved in a solution, for example an aqueous solution. In some embodiments, the mixing step occurs in a solution, for example an aqueous solution. In some embodiments of the methods disclosed herein, a portion of the alkaline earth metal salt is deposited onto the micron-sized oxygen-storage particles. In some embodiments of the methods disclosed herein, a portion of the alkaline earth metal salt is not deposited onto the micron-sized oxygen-storage particles. In some embodiments of the methods disclosed herein, a portion of the composite nanoparticles are deposited onto the micron-sized oxygen-storage particles. In some embodiments of the methods disclosed herein, a portion of the composite nanoparticles are not deposited onto the micron-sized oxygen-storage particles. In some embodiments, the pH of the washcoat composition is adjusted to between about 3 and about 5, for example, 4. In some embodiments, a thickening agent is mixed into the washcoat composition.

In some embodiments, oxygen-storage particles are provided such that the oxygen-storage particles make up about 10% to about 90% of the washcoat composition solids, about 40% to about 80% of the washcoat composition solids, or about 60% to about 70% of the washcoat composition solids. In some embodiments, composite nanoparticles are provided such that the composite nanoparticles make up about 5% to about 25% of the washcoat composition solids, or about 10% to about 20% of the washcoat composition solids. In some embodiments, boehmite is mixed into the washcoat composition. In some embodiments, boehmite is provided such that the washcoat composition comprises boehmite of about 1% to about 7% of the washcoat composition solids, about 3% to about 6% of the washcoat composition solids, or about 5% of the washcoat composition solids. In some embodiments, an alkaline earth metal salt is provided such that the alkaline earth metal salt makes up about 5% to about 25% of the washcoat composition solids, about 10% to about 20% of the washcoat composition solids, or about 10% of the washcoat composition solids.

In some embodiments, micron-sized oxygen-storage particles are provided such that the washcoat layer comprises about 100 g/l to about 400 g/l oxygen-storage particles, or about 200 g/L to about 300 g/l oxygen-storage particles. In some embodiments, composite nanoparticles are provided such that the washcoat layer comprises about 20 g/l to about 100 g/l of the composite nanoparticles, or about 40 g/l to about 80 g/l of the composite nanoparticles. In some embodiments, alkaline earth metal salt is provided such that the washcoat layer comprises about 10 g/l to about 60 g/l alkaline earth metal oxide, or about 25 g/l to about 45 g/l alkaline earth metal oxide. In some embodiments, the washcoat layer comprises about 0.2 g/l to about 5 g/l platinum group metal, about 0.4 g/l to about 3 g/l platinum group metal, or about 0.5 g/l to about 1 g/l platinum group metal.

In some embodiments of the methods disclosed herein, a substrate may be coated with a reducing washcoat slurry and the substrate may be calcined, thereby producing a reducing washcoat layer. In some embodiments, the reducing washcoat layer is produced prior to coating the substrate with the $NO_x$ storage washcoat composition. In some embodiments, the reducing washcoat slurry is made up of any of the reducing washcoat compositions described herein. In some embodiments of the methods disclosed herein, a substrate may be coated with an oxidizing washcoat slurry and the substrate may be calcined, thereby producing an oxidizing washcoat layer. In some embodiments, the oxidizing washcoat layer is produced prior to coating the substrate with the $NO_x$ storage washcoat composition. In some embodiments, the oxidizing washcoat slurry is made up of any of the oxidizing washcoat compositions described herein.

In some embodiments, a coated substrate produced by any of the methods as described herein may demonstrate a $NO_x$ slip of 75 ppm or less when treated with exhaust gas comprising about 100 ppm $NO_x$ under lean-burn conditions for about 1000 seconds, a $NO_x$ slip of 50 ppm or less when treated with exhaust gas comprising about 100 ppm $NO_x$ under lean-burn conditions for about 1000 seconds, or a $NO_x$ slip of 50 ppm or less when treated with exhaust gas comprising about 100 ppm $NO_x$ under lean-burn conditions for about 500 seconds. In some embodiments, a coated substrate produced by any of the methods as described herein has a platinum group metal loading of about 2.0 g/l or less.

In some embodiments, coated substrate produced by any of the methods as described herein may be used in a catalytic converter. In some embodiments, a coated substrate produced as described herein may be include in an exhaust treatment system, which may further comprise a conduit for exhaust gas. In some embodiments, a vehicle may comprise a catalytic converter as described herein.

In some embodiments, a coated substrate produced by the methods as described herein may be included in a vehicle. In some embodiments, a vehicle described herein may comply with the Euro 6 emissions requirements. In some embodiments, a vehicle displays $NO_x$ emissions of 180 mg/km or less, 80 mg/km or less, 60 mg/km or less, or 40 mg/km or less. In some embodiments, a vehicle complies with the Euro 6 emissions requirements during a lean-burn engine cycle. In some embodiments, a vehicle displays $NO_x$ emissions of 180 mg/km or less during a lean-burn engine cycle, 80 mg/km or less during a lean-burn engine cycle, 60 mg/km or less during a lean-burn engine cycle, or 40 mg/km or less during a lean-burn engine cycle. In some embodiments, a vehicle described herein may comprise a gasoline engine or a diesel engine.

In some embodiments, exhaust gas may be treated by contacting the exhaust gas with a coated substrate as described herein, which in some embodiments, may be housed within a catalytic converter configured to receive exhaust gas.

Also disclosed herein are lean $NO_x$ trapping materials, including micron-sized particles with attached catalytic composite nanoparticles and $NO_x$ adsorption components for oxidizing and storing $NO_x$ gases, methods of making and using such particles and $NO_x$ adsorption components, and systems incorporating such particles and $NO_x$ adsorption components. Also described are washcoat compositions (including washcoat slurries and washcoat layers), coated substrates, and catalytic converters employing micron-sized particles with attached catalytic composite nanoparticles and $NO_x$ adsorption components, which can be used to efficiently trap $NO_x$ species from engine emissions during lean-cycle engine operation and which can be purged of $NO_x$ species during rich-cycle engine operation. Further disclosed are vehicles employing micron-sized particles with attached catalytic composite nanoparticles and $NO_x$ adsorption components in catalytic converts and LNT systems.

Described herein is a coated substrate comprising a substrate and a washcoat layer, the washcoat layer comprising micron-sized particle, the micron-sized particle comprising a carrier and a plurality of composite nanoparticles attached to the carrier, the composite nanoparticles comprising a support nanoparticle and a catalytic nanoparticle; and an alkaline earth metal oxide. In some embodiments, a portion of the alkaline earth metal oxide is attached to the carrier, and in some embodiments, a portion of the alkaline earth metal oxide is not attached to the carrier. In some embodiments, the composite nanoparticles are bonded to the carrier, and in some embodiments, the carrier bridges together the composite nanoparticles.

In any disclosed embodiment, the micron-sized carrier particle is porous. In any disclosed embodiment the micron-sized carrier particle comprises a metal oxide, such as one or more of cerium oxide, zirconium oxide, lanthanum oxide, or yttrium oxide. In any embodiment, the micron-sized carrier particle comprises cerium oxide and zirconium oxide; or cerium oxide, zirconium oxide, and lanthanum oxide; or cerium oxide, zirconium oxide, and yttrium oxide; or cerium oxide, zirconium oxide, lanthanum oxide, and yttrium oxide. In some embodiments, the micron-sized carrier particle comprises about 20% to about 100% cerium oxide, or about 30% to about 90% cerium oxide, or about 30% to about 50% cerium oxide, or about 70% to about 90% cerium oxide. In some embodiments, the micron-sized carrier particle comprises about 0% to about 80% zirconium oxide, about 5% to about 15% zirconium oxide, about 15% to about 35% zirconium oxide, about 35% to about 55% zirconium oxide, or about 55% to about 65% zirconium oxide. In some embodiments, the micron-sized carrier particle comprises about 0% to about 15% lanthanum oxide, or about 2% to about 10% lanthanum oxide, or about 2% to about 8% lanthanum oxide, or about 3% to about 6% lanthanum oxide, or about 4% to about 5% lanthanum oxide. In some embodiments, the micron-sized carrier particle comprises about 0% to about 15% yttrium oxide, or about 2% to about 10% yttrium oxide, or about 2% to about 8% yttrium oxide, or about 3% to about 6% yttrium oxide, or about 4% to about 5% yttrium oxide. In some embodiments, the micron-sized carrier particle comprises about 80% to about 90% cerium oxide and about 10% to about 20% zirconium oxide; or about 80% to about 90% cerium oxide, about 5% to about 15% zirconium oxide, and about 3% to about 5% lanthanum oxide; or about 80% to about 90% cerium oxide, about 5% to about 15% zirconium oxide, and about 3% to about 5% yttrium oxide; or about 10% zirconium oxide, and about 4% lanthanum oxide; or about 86% cerium oxide, about 10% zirconium oxide, and about 4% yttrium oxide.

In any embodiment, the composite nanoparticles are plasma generated. In some embodiments, the catalytic nanoparticle of the composite nanoparticle comprises one or more platinum group metals, such as platinum or palladium. The ratio of platinum to palladium may be between about 1:2 platinum:palladium to about 25:1 platinum to palladium, or between about 1:1 platinum:palladium to about 25:1 platinum to palladium, or between about 1:1 platinum: palladium to about 10:1 platinum to palladium, or about 10:1 platinum:palladium. In some embodiments, the composite nanoparticle may comprise platinum and no palladium, and in some embodiments, the composite nanoparticle may comprise palladium and no platinum.

In any embodiment, the support nanoparticle of the composite nanoparticle comprises one or more metal oxides, such as cerium oxide, zirconium oxide, lanthanum oxide, or yttrium oxide. In some embodiments, the support nanoparticles may be a combination of metal oxides, such as cerium oxide and zirconium oxide, or cerium oxide, zirconium oxide, and lanthanum oxide, or cerium oxide, zirconium oxide, and yttrium oxide, or cerium oxide, zirconium oxide, lanthanum oxide, and yttrium oxide. In some embodiments, the support nanoparticles of the composite nanoparticle comprises about 20% to about 100% cerium oxide, or about 30% to about 90% cerium oxide, or about 30% to about 50% cerium oxide, or about 70% to about 90% cerium oxide. In some embodiments, the support nanoparticles of the composite nanoparticle may comprise about 0% to about 80% zirconium oxide, such as about 5% to about 15% zirconium oxide, about 15% to about 35% zirconium oxide, about 35% to about 55% zirconium oxide, or about 55% to about 65% zirconium oxide. In some embodiments, the support nanoparticles of the composite nanoparticle may comprise about 0% to about 15% lanthanum oxide, or about 2% to about 10% lanthanum oxide, or about 2% to about 8% lanthanum oxide, or about 3% to about 6% lanthanum oxide, or about 4% to about 5% lanthanum oxide. In some embodiments, the support nanoparticles of the composite nanoparticle may comprise about 0% to about 15% yttrium oxide, or about 2% to about 10% yttrium oxide, or about 2% to about 8% yttrium oxide, or about 3% to about 6% yttrium oxide, or about 4% to about 5% yttrium oxide. In some embodiments, the support nanoparticles of the composite nanoparticle may comprise about 80% to about 90% cerium oxide and about 10% to about 20% zirconium oxide; or about 80% to about 90% cerium oxide, about 5% to about 15% zirconium oxide, and about 3% to about 5% lanthanum oxide; or about 80% to about 90% cerium oxide, about 5% to about 15% zirconium oxide, and about 3% to about 5% yttrium oxide; or about 86% cerium oxide, about 10% zirconium oxide, and about 4% lanthanum oxide; or about 86% cerium oxide, about 10% zirconium oxide, and about 4% yttrium oxide. In any embodiment, the composite nanoparticles may comprise about 0.01 wt % to about 60 wt % platinum group metal and about 40 wt % to about 99.99 wt % metal oxide, or about 0.5 wt % to about 2 wt % platinum group metal and about 98 wt % to about 99.5 wt % metal oxide.

In any embodiment, the alkaline earth metal oxide is barium oxide. In some embodiments, the alkaline earth metal oxide is attached to the carrier by depositing an alkaline earth metal salt from solution onto the carrier and allowing the alkaline earth metal salt to convert into an alkaline earth metal oxide. In any embodiment, the alkaline earth metal salt may be a barium salt, such as barium acetate, barium bromide, barium carbonate, barium chloride, barium chromate, barium cyclohexanebutyrate, barium fluoride, barium hydroxide, barium iodide, barium manganite, or barium perchlorate. In some embodiments the alkaline earth metal oxide is comprised in a plurality of alkaline earth metal oxide nanoparticles, and in some embodiments may be plasma generated. In some embodiments, the alkaline earth metal oxide nanoparticles may be bound to support nanoparticles, forming a plurality of alkaline earth metal oxide composite nanoparticles. In some embodiments, the alkaline earth metal oxide composite nanoparticles may be plasma generated. In some embodiments, the alkaline earth metal nanoparticles or alkaline earth metal oxide composite nanoparticles are bonded to the carrier, and in some embodiments, the carrier bridges together the alkaline earth metal oxide nanoparticles or alkaline earth metal oxide composite nanoparticles.

In some embodiments disclosed herein, a washcoat composition (such as a layer or slurry) is configured to adsorb $NO_x$ gases during a lean burn, and in some embodiments the washcoat composition (such as a layer or slurry) is configured to desorb $NO_x$ gases during a rich-purge cycle.

In some embodiments, micron-sized particles in a washcoat composition (such as a layer or slurry) comprise about 10% to about 100% by weight of the washcoat composition solids, about 30% to about 99% by weight of the washcoat composition solids, about 50% to about 97% by weight of the washcoat composition solids, or about 80% to about 96% by weight of the washcoat composition solids. In some embodiments a washcoat composition may further comprise aluminum oxide, which may be derived from boehmite in some embodiments. In some embodiments, aluminum oxide or boehmite in a washcoat composition may comprise about 1% to about 7% aluminum oxide or boehmite by weight of the washcoat composition solids, about 3% to about 6% aluminum oxide or boehmite by weight of the washcoat composition solids, or about 4% to about 5% aluminum oxide or boehmite by weight of the composition solids. In some embodiments, the alkaline earth metal oxides may comprise about 5% to about 15% by weight of the washcoat composition solids, about 8% to about 12% by weight of the washcoat composition solids or about 10% by weight of the washcoat composition solids.

In any embodiment, a coated substrate may further comprise a reducing washcoat composition (such as a washcoat layer or slurry). In some embodiments, a reducing washcoat composition described herein may comprise a plurality of reducing micron-sized catalytic particles, the reducing micron-sized catalytic particles comprising a plurality of reducing composite nanoparticles attached to a reducing catalyst carrier particle. In some embodiments, the reducing composite nanoparticles may be bonded to the reducing catalyst carrier particle, and in some embodiments, a carrier may bridge together the reducing composite nanoparticles. In some embodiments, the reducing composite nanoparticles comprise a reducing catalytic nanoparticle and a support nanoparticle, and in some embodiments may be plasma generated. In some embodiments, the reducing composite nanoparticles comprise a platinum group metal, such as rhodium, which may be in the catalytic nanoparticle of the composite nanoparticles. In some embodiments, the support nanoparticle of the reducing composite nanoparticle may include cerium oxide. In some embodiments, the reducing catalyst carrier particle comprises a metal oxide, such as cerium oxide, zirconium oxide, lanthanum oxide, or yttrium oxide. In some embodiments, the reducing washcoat composition further comprises porous alumina particles, boehmite, or aluminum oxide derived from boehmite.

In some embodiments, a coated substrate may further include an oxidizing washcoat composition (such as a slurry or layer). In some embodiments, the oxidizing washcoat composition comprises a plurality of micron-sized oxidizing catalytic particles, the micron-sized oxidizing catalytic particles comprising a plurality of oxidizing composite nanoparticles attached to an oxidizing catalyst carrier particle. In some embodiments, the oxidizing composite nanoparticles are bonded to the oxidizing catalyst carrier particle, and in some embodiments, the oxidizing catalyst carrier particle comprises a carrier bridging together the oxidizing composite nanoparticles. In some embodiments, the oxidizing composite nanoparticles comprise an oxidizing catalytic nanoparticle and a support nanoparticle, and in some embodiments may be plasma generated, in some embodiments, the oxidizing composite nanoparticle may include one or more platinum group metals, such as platinum or palladium. In some embodiments, the catalytic nanoparticle of the composite nanoparticle includes platinum or palladium. In some embodiments, the support nanoparticles of the oxidizing composite nanoparticle comprise a metal oxide, such as aluminum oxide. In some embodiments, the oxidizing catalyst carrier particle comprises a metal oxide, such as aluminum oxide. In some embodiments, an oxidizing washcoat composition (such as a slurry or layer), comprises porous aluminum oxide particles, which, in some embodiments, may have an alkaline earth metal oxide, such as barium oxide, attached. In some embodiments, a washcoat composition (such as a washcoat layer or washcoat slurry) may further comprise boehmite or aluminum oxide derived from boehmite.

In some embodiments described herein, a coated substrate demonstrates a $NO_x$ slip of 75 ppm or less when treated with exhaust gas comprising about 100 ppm $NO_x$ under lean-burn conditions for about 1000 seconds, a $NO_x$ slip of 50 ppm or less when treated with exhaust gas comprising about 100 ppm $NO_x$ under lean-burn conditions for about 1000 seconds, or a $NO_x$ slip of 50 ppm or less when treated with exhaust gas comprising about 100 ppm $NO_x$ under lean-burn conditions for about 500 seconds. In some embodiments, a coated substrate has a platinum group metal loading of about 2.0 g/l or less.

Any of the coated substrates described herein may be used in a catalytic converter or an exhaust treatment system comprising a conduit for exhaust gas and a catalytic converter. Further described herein are vehicles comprising a catalytic converter described herein and method of treating exhaust gas, comprising contacting exhaust gas with a coated substrate described herein. IN some embodiments, a coated substrate is housed within a catalytic converter and is configured to receive exhaust gas.

Further described herein are washcoat compositions that may comprise micron-sized particles, the micron-sized particles comprising a carrier and a plurality of composite nanoparticles attached to the carrier, the composite nanoparticle comprising a support nanoparticle and a catalytic nanoparticle, the washcoat further comprising an alkaline earth metal salt or alkaline earth metal oxide. In some embodiments, a portion the alkaline earth metal salt or alkaline earth metal oxide is deposited onto the micron-sized carrier particles, and in some embodiments a portion of the alkaline earth metal salt or alkaline earth metal oxide is not deposited onto the micron-sized carrier particles. In some embodiments, an alkaline earth metal salt may be converted to an alkaline earth metal oxide, for example by calcining the washcoat composition. In some embodiments described herein, the washcoat composition is configured to adsorb $NO_x$ gases during a lean burn, and in some embodiments, the washcoat composition is configured to desorb $NO_x$ gases during a rich-purge cycle. In some embodiments described herein, a washcoat composition may further include a thickening agent. In some embodiments, a washcoat composition is coated onto a substrate. In any embodiment described herein, a washcoat composition may be a washcoat layer or washcoat slurry.

In some embodiments described herein, a washcoat composition is about 150 g/l to about 400 g/l of solids, about 225 g/l to about 350 g/l of solids, or about 250 g/l to about 275 g/l of solids. In some embodiments, micron-sized catalytic particles may make up about 10% to about 100% of the washcoat composition solids, about 30% to about 99% of the washcoat composition solids, about 50% to about 97% of the washcoat composition solids, or about 80% to about 96% of the washcoat composition solids. In some embodiments, a washcoat composition may further comprise boehmite, such as about 1% to about 7% of the washcoat composition solids, about 3% to about 6% of the washcoat composition solids, or about 5% of the washcoat composition solids. In some embodiments, an alkaline earth metal oxide makes up about 5% to about 15% of the washcoat composition solids, about 8% to about 12% of the washcoat composition solids, or about 10% of the washcoat composition solids.

Further described herein are vehicles comprising a coated substrate described herein. In some embodiments, a vehicle may include a coated substrate comprising a substrate and a washcoat layer, the washcoat layer comprising micron-sized particles, the micron-sized particles comprising a carrier and a plurality of composite nanoparticles attached to the carrier, the composite nanoparticle comprising a support nanoparticle and a catalytic nanoparticle; and the washcoat layer further comprising an alkaline earth metal oxide. In some embodiments, a vehicle may comply with the Euro 6 emissions requirements. In some embodiments, a vehicle may display $NO_x$ emissions of 180 mg/km or less, 80 mg/km or less, 60 mg/km or less, or 40 mg/km or less. In some embodiments, a vehicle complies with the Euro 6 emissions requirements during a lean-burn engine cycle. In some embodiments, a vehicle displays $NO_x$ emissions of 180 mg/km or less during a lean-burn engine cycle, 80 mg/km or less during a lean-burn engine cycle, 60 mg/km or less during a lean-burn engine cycle, or 40 mg/km or less during a lean-burn engine cycle. In some embodiment, a vehicle may include a gasoline engine or a diesel engine.

Further disclosed herein are methods of forming washcoat compositions, the method including providing an alkaline earth metal salt in solution; providing micron-sized particles, the micron-sized particles comprising a carrier and a plurality of composite nanoparticles attached to the carrier, the composite nanoparticle comprising a support nanoparticle and a catalytic nanoparticle; and combining the alkaline earth metal salt solution and the micron-sized particles. In some embodiments, the method may include further calcining the washcoat composition. In some embodiments, calcining the washcoat composition converts the alkaline earth metal salt into an alkaline earth metal oxide.

Also disclosed herein are methods of forming a coated substrate, the method comprising providing an alkaline earth metal salt; providing micron-sized particles, the micron-sized particles comprising a carrier and a plurality of composite nanoparticles attached to the carrier, the composite nanoparticle comprising a support nanoparticle and a catalytic nanoparticle; mixing an alkaline earth metal salt and micron-sized particles to form a washcoat composition; and coating a substrate with the washcoat composition. In some embodiments, the method may further include calcining the coated substrate. In some embodiments, calcining the coated substrate may convert the alkaline earth metal salt into an alkaline earth metal oxide. In any method of making a washcoat composition or coated substrate, the mixing may occur in solution. In any embodiments, the alkaline earth metal salt may be dissolved in solution. In some methods disclosed herein, a portion of the alkaline earth metal salt is deposited onto the micron-sized carrier particles, and in some methods described herein a portion of the alkaline earth metal salt is not deposited onto the micron-sized carrier particles.

In some embodiments, a substrate may be further coated was a reducing washcoat composition, and, in some embodiments, may be calcined after coating with the reducing washcoat composition. In some embodiment, a reducing washcoat composition comprises a plurality of reducing micron-sized catalytic particles, the reducing micron-sized catalytic particles comprising a plurality of reducing composite nanoparticles attached to a reducing catalyst carrier particle. In some embodiments, a reducing washcoat composition may further comprise aluminum oxide particles or boehmite.

In some embodiments, a substrate may be further coated with an oxidizing washcoat composition. In some embodiments, substrate coated with an oxidizing washcoat composition may be calcined. In some embodiments, an oxidizing washcoat composition includes a plurality of micron-sized oxidizing catalytic particles, the micron-sized oxidizing catalytic particles comprising a plurality of oxidizing composite nanoparticles attached to an oxidizing catalyst carrier particle. In some embodiments the washcoat composition may further include porous alumina particles or boehmite. In some embodiments, an alkaline earth metal oxide, such as barium oxide, may be attached to the aluminum oxide particles.

Further disclosed herein are micron-sized particles for storing $NO_x$ gasses, which include a micron-sized carrier particle; a plurality of composite nanoparticles attached to the micron-sized carrier particle, the composite nanoparticles comprising a support nanoparticle and a catalytic nanoparticle; and an alkaline earth metal oxide attached to the micron-sized carrier particle. In some embodiments, the composite nanoparticles are bonded to the micron-sized carrier particle, and in some embodiments the carrier particle includes a carrier that bridges together the composite nanoparticles. In some embodiments, the alkaline earth metal oxide is barium oxide, and may comprise about 1% to about 20% by mass of the micron-sized catalytic particle, about 5% to about 15% by mass of the micron-sized catalytic particle, about 8% to about 12% by mass of the micron-sized catalytic particle, or about 10% by mass of the micron-sized catalytic particle. In some embodiments, the alkaline earth metal oxide is attached to the micron-sized carrier particle by depositing an alkaline earth metal salt from solution onto the micron-sized carrier particle and allowing the alkaline earth metal salt to convert into an alkaline earth metal oxide. In some embodiments, the alkaline earth metal oxide is comprised in a plurality of nanoparticles, which may be plasma generated. In some embodiments, the alkaline earth metal oxide nanoparticles are bonded to the micron-sized carrier particle, and in some embodiments, the micron-sized carrier particle comprises a carrier bridging together the alkaline earth metal oxide nanoparticles. In some embodiments, the alkaline earth metal oxide is comprised in a plurality of nanoparticles bound to support nanoparticles, forming a plurality of alkaline earth metal oxide composite nanoparticles, which, in some embodiments, may be plasma generate. In some embodiments, the alkaline earth metal oxide composite nanoparticles are bonded to the micron-sized carrier particle. In some embodiments, the micron-sized carrier particle comprises a carrier bridging together the alkaline earth metal oxide composite nanoparticles. In some embodiments, a micron-sized catalytic particle is configured to adsorb $NO_x$ gases during a lean burn, and in some embodiments is configured to desorb $NO_x$ gases during a rich-purge cycle.

Any embodiment of a micron-sized catalytic particle described herein may be used in a washcoat composition. In any embodiment, a washcoat composition may have a pH between about 2 and about 7, such as between 3 and about 6, or about 4. In any embodiment, a washcoat composition may further include a thickening agent. In some embodiments, a washcoat composition may be coated onto a substrate, and in some embodiments may be calcined.

Further disclosed herein are methods of producing micron-sized particles for storing $NO_x$ gas, the method comprising suspending composite catalytic nanoparticles, wherein the composite catalytic nanoparticles comprise a catalytic nanoparticle bonded to a support nanoparticle; depositing the composite catalytic nanoparticles onto micron-sized carrier particles; depositing an alkaline earth metal salt onto the micron-sized carrier particles; and calcining the micron-sized carrier particles. In some embodiments, calcining bonds the composite nanoparticles to the micron-sized particles. In some embodiments, calcining converts an alkaline earth metal salt into an alkaline earth metal oxide. In some embodiments, the micron-sized carrier particles are porous, and may comprise a metal oxide, such as cerium oxide, zirconium oxide, lanthanum oxide, or yttrium oxide. In some embodiments, the alkaline earth metal salt is deposited onto the micron-sized carrier particles before the composite catalytic nanoparticles are deposited onto the micron-sized carrier particles. In some embodiments, the alkaline earth metal salt is deposited onto the micron-sized carrier particles after the composite catalytic nanoparticles are deposited onto the micron-sized carrier particles.

Also described herein is a method of producing micron-sized particles for storing $NO_x$ gases comprising mixing a plurality of composite nanoparticles with a fluid comprising a carrier precursor, wherein the composite nanoparticles comprise a support nanoparticle and a catalytic nanoparticle; solidifying the carrier precursor to form a solidified carrier, wherein the carrier forms around the composite nanoparticles; calcining the solidified carrier; micron-sizing the solidified carrier; depositing an alkaline earth metal salt; and converting the alkaline earth metal salts to an alkaline earth metal oxide. In some embodiments, the composite nanoparticles may be suspended prior to the mixing step. In some embodiments, the carrier precursor is solidified by polymerization. In some embodiments, the carrier precursor is solidified by precipitation and the composite catalytic nanoparticles co-precipitate with the solidified carrier. In some embodiments, the carrier precursor comprises a combustible component and a non-combustible component. In some embodiments, carrier precursor (such as the combustible component) comprises resorcinol or amorphous carbon. In some embodiments, the carrier precursor (such as the non-combustible component) comprises a metal salt, such as a cerium salt (such as cerium chloride, cerium nitrate, or cerium acetate), a zirconium salt (such as zirconium oxynitrate), a lanthanum salt (such as lanthanum acetate), or a yttrium salt (such as yttrium nitrate). In some embodiments, the solidified carrier is dried prior to calcining the solidified carrier. In some embodiments, the solidified carrier comprises a combustible component and a non-combustible component. IN some embodiments, the combustible component of the solidified carrier comprises amorphous carbon or polymerized resorcinol.

In some embodiments, the non-combustible component of the solidified carrier comprises a metal oxide, such as one or more of cerium oxide, zirconium oxide, lanthanum oxide, or yttrium oxide. In some embodiments, the non-combustible component of the solidified carrier comprises cerium oxide and zirconium oxide; or cerium oxide, zirconium oxide, and lanthanum oxide; or cerium oxide, zirconium oxide, and yttrium oxide; or cerium oxide, zirconium oxide, lanthanum oxide, and yttrium oxide. In some embodiments, the non-combustible component of the solidified carrier comprises about 20% to about 100% cerium oxide, or about 30% to about 90% cerium oxide, or about 30% to about 50% cerium oxide, or about 70% to about 90% cerium oxide. In some embodiments, the non-combustible component of the solidified carrier comprises about 0% to about 80% zirconium oxide, such as about 5% to about 15% zirconium oxide, about 15% to about 35% zirconium oxide, about 35% to about 55% zirconium oxide, or about 55% to about 65% zirconium oxide. In some embodiments, the non-combustible component of the solidified carrier comprises about 0% to about 15% lanthanum oxide, or about 2% to about 10% lanthanum oxide, or about 2% to about 8% lanthanum oxide, or about 3% to about 6% lanthanum oxide, or about 4% to about 5% lanthanum oxide. In some embodiments, the non-combustible component of the solidified carrier comprises about 0% to about 15% yttrium oxide, or about 2% to about 10% yttrium oxide, or about 2% to about 8% yttrium oxide, or about 3% to about 6% yttrium oxide, or about 4% to about 5% yttrium oxide. In some embodiments, the non-combustible component of the solidified carrier comprises about 80% to about 90% cerium oxide and about 10% to about 20% zirconium oxide; or about 80% to about 90% cerium oxide, about 5% to about 15% zirconium oxide, and about 3% to about 5% lanthanum oxide; or about 80% to about 90% cerium oxide, about 5% to about 15% zirconium oxide, and about 3% to about 5% yttrium oxide; or about 10% zirconium oxide, and about 4% lanthanum oxide; or about 86% cerium oxide, about 10% zirconium oxide, and about 4% yttrium oxide. In some embodiments, the solidified carrier bridges together the composite nanoparticles, and in some embodiments the non-combustible component of the solidified carrier bridges together the composite nanoparticles.

In some embodiments, calcining combusts the combustible component, and in some embodiments the combustible component is exhausted. In some embodiments, the alkaline earth metal salt is deposited prior to solidified carrier being calcined, and in some embodiments the alkaline earth metal salt solution is applied prior to solidifying the carrier precursor. In some embodiments, the alkaline earth metal salt solution is applied after the solidified carrier is micron-sized. In some embodiments, the calcining step converts the alkaline earth metal salt into an alkaline earth metal oxide.

In some embodiments composite catalytic nanoparticles may be suspended to form a composite catalytic nanoparticle suspension. In some embodiments, the composite catalytic nanoparticle suspension comprises water or ethanol. In some embodiments, the pH of the suspension is adjusted to about between about 3 to about 5, such as about 4. In some embodiments, a surfactant or a dispersant is added to the composite nanoparticle suspension. In some embodiments, the composite catalytic nanoparticle suspension is sonicated. In some embodiments, the alkaline earth metal salt is dissolved in a solution, which in some embodiments comprises water.

BRIEF DESCRIPTION OF THE DRAWINGS

FIG. 1A illustrates one embodiment of a lean $NO_x$ trap particle in the NNm™ configuration.

FIG. 1B illustrates an alternative embodiment of a lean $NO_x$ trap particle in the NNm™ configuration.

FIG. 1C illustrates another alternative embodiment of a lean $NO_x$ trap particle in the NNm™ configuration.

FIG. 5A illustrates one embodiment of a lean $NO_x$ trap particle in the NNiM configuration.

FIG. 5B illustrates an alternative embodiment of a lean $NO_x$ trap particle in the NNiM configuration.

FIG. 5C illustrates another alternative embodiment of a lean $NO_x$ trap particle in the NNiM configuration.

FIG. 6 illustrates one embodiment of a catalytic converter employing a $NO_x$ storage washcoat composition in a lean $NO_x$ trap system.

FIG. 6A is a magnified view of a section of the catalytic converter illustrated in FIG. 6.

FIG. 7C is a flow chart illustrating another embodiment of a method of producing a coated substrate that may be used in a catalytic converter.

DETAILED DESCRIPTION OF THE INVENTION

Figure 2:
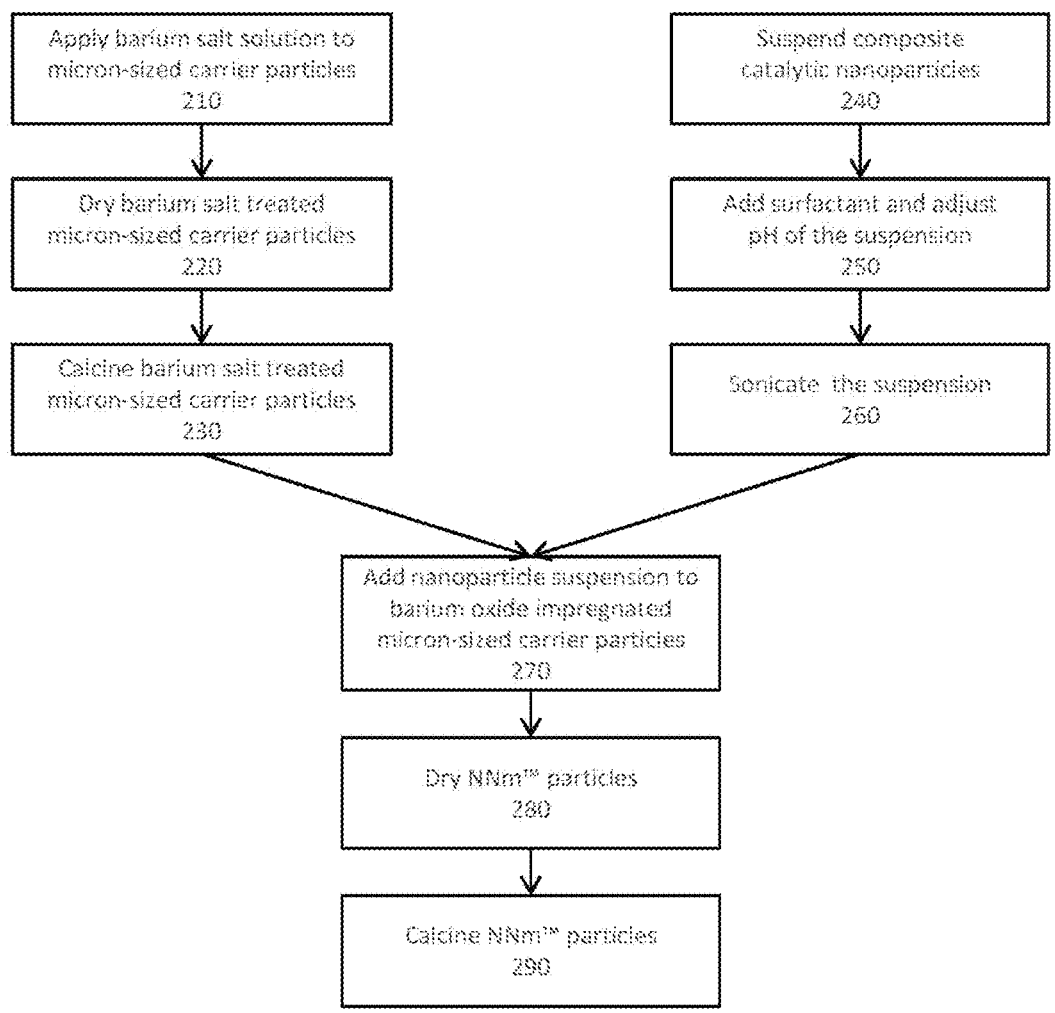
FIG. 2 illustrates one embodiment of a method of producing lean $NO_x$ trap particles in the NNm™ configuration.

Described are lean $NO_x$ trapping materials (including catalytic nanoparticles, composite nanoparticles, $NO_x$ adsorption materials, and oxygen storage materials), lean $NO_x$ traps (LNTs), and methods of making the same. Also described are micron-sized particles with attached catalytic composite nanoparticles and $NO_x$ adsorption components and methods of making micron-sized particles with attached catalytic composite nanoparticles and $NO_x$ adsorption components. Further described are lean $NO_x$ trap (LNT) systems and methods of making LNT systems by combining catalytic layers of oxidizing catalytically active particles, reducing catalytically active particles, and lean $NO_x$ trapping materials. Further described are composite nanoparticle catalysts, catalytic micro-sized particles, washcoat compositions, washcoat slurries, washcoat layers, coated substrates, catalytic converters, and methods of making and using these composite nanoparticle catalysts, catalytic micro-sized particles, washcoat compositions, washcoat slurries, washcoat layer, coated substrates, and catalytic converters. The coated substrates may also utilize oxidizing catalytically active particles or reducing catalytically active particles in combination with lean $NO_x$ trapping materials to form LNT systems with reduced platinum group loading.

The described lean $NO_x$ trapping materials described herein may reduce the amount of precious metal required by prior LNT systems and more efficiently trap $NO_x$ emissions. In addition, the described substrates, composite nanoparticle catalysts, catalytic micro-sized particles, $NO_x$ trapping materials, washcoat compositions, washcoat slurries, and washcoat layers may provide for comparable or increased performance relative to prior LNT systems when used to produce catalytic converters, allowing for the production of catalytic converters having reduced light-off temperatures and reduced emissions using reduced platinum group metal loading requirements.

Prior LNT systems used platinum group metals to catalyze the oxidation of NO gas to $NO_2$ gas, which is more efficiently stored by $NO_x$ adsorption materials. The platinum group metals of prior systems were generally deposited onto micron-sized carrier particles using wet-chemistry methods. Wet-chemistry methods generally involve use of a solution of platinum group metal ions or metal salts, which are impregnated into supports (typically micron-sized particles), and reduced to platinum group metal in elemental form for use as the catalyst. For example, a solution of chloroplatinic acid, $H_2PtCl_6$, can be applied to metal oxide micro-particles, followed by drying and calcining, resulting in precipitation of platinum onto the metal oxide particles. The platinum group metals deposited by wet-chemical methods onto metal oxide supports, such as aluminum oxide and cerium oxide, are mobile at high temperatures, such as temperatures encountered in catalytic converters or exhaust systems. That is, at elevated temperatures, the PGM atoms can migrate over the surface on which they are deposited, and will clump together with other PGM atoms. The finely-divided portions of PGM combine into larger and larger agglomerations of platinum group metal as the time of exposure to high temperature increases. This agglomeration leads to reduced catalyst surface area and degrades the performance of the catalytic converter. This phenomenon is referred to as "aging" of the catalytic converter. Consequently, catalytic converters and LNT systems employing wet-chemistry methods to deposit platinum group metals require significantly higher amounts of platinum group metals for equivalent catalytic efficiency, $NO_x$ storage, and $NO_x$ emissions.

In some prior LNT systems, two or more separate and distinct catalytic and storage particles would be employed. A first particle would catalyze the oxidation of NO to $NO_2$ while a second separate particle would adsorb the $NO_2$ gas. However, it has been found that $NO_x$ adsorption could be further optimized by minimizing the distance between the NO oxidizing component and the $NO_x$ adsorption component. The lean $NO_x$ trapping material described herein is configured to catalyze the oxidation of NO for efficient storage and efficiently store the oxidized gases more efficiently. Without being bound by scientific theory, it is currently believed that the close proximity of NO catalysis component to the $NO_x$ adsorption component allows more $NO_x$ to be adsorbed by the $NO_x$ traps rather than diffuse from the system.

In some embodiments, the described coated substrates include washcoat layers in which the lean $NO_x$ trapping materials include both a catalytic component, allowing for more efficient oxidation of NO gases, and a $NO_x$ adsorption component, allowing for storage of $NO_x$ gases. In some embodiments, the coated substrates include washcoat layers in which the catalytic composite nanoparticles, oxygen storage materials, and $NO_x$ adsorption materials synergistically function to allow for more efficient oxidation of NO gases and storage of $NO_x$ gases. By combining the catalytic component and the $NO_x$ adsorption component in close proximity, the lean $NO_x$ trap particle can more efficiently adsorb $NO_x$ emissions during the lean phase (high oxygen, low hydrocarbon content) of an engine cycle. Additionally, by combining the catalytic component, oxygen-storage materials, and the $NO_x$ adsorption materials in a single washcoat layer, the LNT system can more efficiently adsorb $NO_x$ emissions during the lean phase (high oxygen, low hydrocarbon content) of an engine cycle. In some embodiments, catalytic nanoparticles (such as catalytic composite nanoparticles), oxygen-storage particles, and $NO_x$ adsorption materials (or $NO_x$ adsorption material precursors) are separately provided to form a washcoat composition. Be separately providing these "loose ingredient" components, the lean $NO_x$ trapping materials become optimally configured to efficiently catalyze and store $NO_x$ gases during a lean engine cycle. Accordingly, these lean $NO_x$ traps and LNT systems may provide a more economical alternative to commercially available LNTs.

The composite nanoparticles described herein include catalytic nanoparticles and support nanoparticles that are bonded together to form nano-on-nano composite nanoparticles. The composite nanoparticles may be produced, for example, in a plasma reactor so that consistent and tightly bonded nano-on-nano composite particles are produced. Consequently, agglomeration of the platinum group metal in the system is minimized. The composite catalytic nanoparticle can catalyze the oxidation of NO to $NO_2$. In some embodiments, the oxygen-storage materials supply the oxygen for this reaction. The oxidized $NO_x$ gases can then be efficiently adsorbed by a $NO_x$ adsorption material mixed into the same washcoat layer.

In some embodiments described herein, the catalytic components, $NO_x$ adsorption material, and oxygen-storage particles are separately provided (i.e., "loose ingredient") during the formation of the $NO_x$ storage washcoat composition, allowing for an optimized configuration. The synergistic combination of the three material types as described herein (composite nanoparticles, oxygen-storage materials, and $NO_x$ storage materials) provides more efficient catalysis and storage of $NO_x$ gases than prior LNT systems.

In some embodiments, the catalytic composite nanoparticles are provided directly into a washcoat composition (such as a washcoat slurry) without being pre-attached to a micron-sized particle. It has been found that by providing catalytic composite nanoparticles into the washcoat composition separately from and unattached to micron-sized particles results in increased $NO_x$ adsorption (i.e., reduced $NO_x$ slip) as compared to attaching the catalytic composite nanoparticles to a micron-sized particle (for example, an aluminum oxide particle) before mixing the catalytic composite nanoparticles in the washcoat slurry. In some embodiments, a portion of the composite nanoparticles may attach to micron-sized particles (such as an oxygen-storage material, which can be included in the washcoat composition) after being supplied to the washcoat slurry or upon calcination of a substrate coated with the washcoat slurry. In some embodiments, a portion of the composite nanoparticles may not attach to micron-sized particles (such as an oxygen-storage material, which can be included in the washcoat composition) after being supplied to the washcoat slurry or upon calcination of a substrate coated with the washcoat slurry. Nevertheless, embodiments wherein the composite nanoparticles are supplied to the washcoat composition independently from the micron-sized particles demonstrate improved performance.

In some embodiments, a $NO_x$ adsorption component is present in the washcoat composition. In some embodiments, the $NO_x$ adsorption component may be an alkaline earth metal oxide, for example barium oxide. In some embodiments, the $NO_x$ adsorption component may be formed from a $NO_x$ adsorption precursor (such as an alkaline earth metal salt, such as a barium salt). The $NO_x$ adsorption precursor may be supplied to a washcoat composition (such as a washcoat slurry) and be converted into a $NO_x$ adsorption component by calcining the washcoat composition (for example, after it has been coated onto a substrate). In some embodiments, a portion of the $NO_x$ adsorption precursor (e.g., alkaline earth metal salt) may be deposited onto micron-sized particles or catalytic composite nanoparticles, for example upon mixing the components in a washcoat composition. Accordingly, in some embodiments, when the washcoat composition is calcined, a portion of the $NO_x$ adsorption component may be attached to the micron-sized particles or catalytic composite nanoparticles. In some embodiments, a portion of the provided $NO_x$ adsorption precursor (e.g., alkaline earth metal salt) may not be deposited onto micron-sized particles or catalytic composite nanoparticles, for example upon mixing the components in a washcoat composition. Accordingly, in some embodiments, when the washcoat composition is calcined, a portion of the $NO_x$ adsorption component may not be attached to the micron-sized particles or catalytic composite nanoparticles.

In some embodiments, the composite nanoparticles are bonded to a micron-sized carrier particle to form micron-sized catalytically active particles ("nano-on-nano-on-micro" particles or NNm™ particles). The nano-on-nano composite particles are predominantly located at or near the surface of the resulting NNm™ particles. Alternatively, a porous carrier material or matrix can be formed around the composite nanoparticles and micron-sized to produce micron-sized catalytic particles ("nano-on-nano-in-micro" particles or NNiM particles). In this configuration, the nano-on-nano composite nanoparticles are embedded within the micron-sized carrier particles, and a porous carrier bridges together the composite nanoparticles. More than one type of composite nanoparticle can be attached to micron-sized carrier particles in both the NNm™ and NNiM configurations. Additionally. NNm™ or NNiM particles may be impregnated by additional catalysts by wet-chemistry methods, by other composite nanoparticles, or by non-composite nanoparticles. Furthermore, NNm™ or NNiM particles may be impregnated by $NO_x$ storage components by wet-chemistry methods, by other composite nanoparticles, or by non-composite nanoparticles. Both types of micron-sized catalytically active particles bearing composite nanoparticles (i.e., NNm™ and NNiM) may offer better initial engine start-up performance, better performance over the lifetime of the catalyst and/or $NO_x$ storage material, and/or less decrease in performance over the life of the catalyst and/or $NO_x$ storage material, as compared to previous catalysts and $NO_x$ storage materials used in catalytic converters.

In some embodiments, lean $NO_x$ trapping materials described herein include a catalytic component and a $NO_x$ adsorption component. In some embodiments, the catalytic component is a nanoparticle. In some embodiments, the catalytic component is a composite nanoparticle. In some embodiments, the catalytic component is bonded to a micron-sized carrier particle, for example bonded to the surface of a micron-sized carrier particle. In some embodiments, the catalytic component is distributed throughout a micron-sized carrier particle. In some embodiments, a porous carrier may be formed around and surround the catalytic component, resulting in the carrier bridging together the catalytic component, resulting in it being embedded within the porous carrier.

In some embodiments, the catalytic component of the lean $NO_x$ trapping materials include one or more catalytic metals. In some embodiments, the catalytic component includes one or more platinum group metals, such as platinum and/or palladium. In embodiments where the catalytic component is a composite nanoparticle, the catalytic component includes a catalytic nanoparticle and a support nanoparticle. In some embodiments, the catalytic nanoparticle includes one or more platinum group metals, for example platinum, palladium, or platinum and palladium. In some embodiments, the support nanoparticles is includes one or more metal oxides, preferably one or more of cerium oxide ($CeO_2$), zirconium oxide ($ZrO_2$), lanthanum oxide ($La_2O_3$), or yttrium oxide ($Y_2O_3$), although aluminum oxide ($Al_2O_3$), barium oxide (BaO), beryllium oxide (BeO), calcium oxide (CaO), chromium oxide (CrO), cobalt oxide (CoO), magnesium oxide (MgO), silicon dioxide ($SiO_2$), strontium oxide (SrO), titanium dioxide ($TiO_2$) or any ceramic are also contemplated.

In some embodiments, the catalytic component of the lean $NO_x$ trapping materials comprise one or more platinum group metals, such as platinum, palladium, or a mixture of platinum and palladium. In some embodiments, the catalytic component comprises platinum and palladium in a weight ratio of about 1:2 platinum:palladium to about 25:1 platinum:palladium. In some embodiments, the catalytic component comprises platinum and palladium in a weight ratio of about 2:1 platinum:palladium to about 20:1 platinum:palladium. In some embodiments, the catalytic component comprises platinum and palladium in a weight ratio of about 5:1 platinum:palladium to about 15:1 platinum:palladium. In some embodiments, the catalytic component comprises platinum and palladium in a weight ratio of about 1:2 platinum:palladium, about 1:1 platinum:palladium, about 2:1 platinum:palladium, about 3:1 platinum:palladium, about 4:1 platinum:palladium, about 5:1 platinum:palladium, about 6:1 platinum:palladium, about 7:1 platinum:palladium, about 8:1 platinum:palladium, about 9:1 platinum:palladium, about 10:1 platinum:palladium, about 11:1 platinum:palladium, about 12:1 platinum:palladium, about 13:1 platinum:palladium, about 14:1 platinum:palladium, about 15:1 platinum:palladium, about 16:1 platinum:palladium, about 17:1 platinum:palladium, about 18:1 platinum:palladium, about 19:1 platinum:palladium, about 20:1 platinum:palladium, about 21:1 platinum:palladium, about 22:1 platinum:palladium, about 23:1 platinum:palladium, about 24:1 platinum:palladium, or about 25:1 platinum:palladium. In some embodiments, the catalytic component comprises platinum and is substantially free of palladium. In some embodiments, the catalytic component comprises palladium and is substantially free of platinum.

In some embodiments, the $NO_x$ adsorption component is formed on a micron-sized carrier particle by wet-chemistry methods. In some embodiments, the $NO_x$ adsorption component is a nanoparticle. In some embodiments, the $NO_x$ adsorption component is part of a composite nanoparticle. In some embodiments, the $NO_x$ adsorption component is a nanoparticle bonded to a micron-sized carrier particle, for example bonded to the surface of a micron-sized carrier particle. In some embodiments, the $NO_x$ adsorption component may be distributed throughout a micron-sized carrier particle. In some embodiments, a porous carrier may be formed around and surround the $NO_x$ adsorption component nanoparticle such that the $NO_x$ adsorption component is embedded within the carrier, such that the carrier bridges together the $NO_x$ adsorption component particles. In some embodiments, the carrier is micron-sized after being formed around the NO adsorption component. In some embodiments, a portion of the $NO_x$ adsorption component may not be bound to the micron-sized carrier particle, for example by filling a portion of the gaps between micron-sized carrier particles in a washcoat layer.

In some embodiments, the $NO_x$ adsorption component may include one or more alkaline earth metal oxides, preferably barium oxide (BaO), however beryllium oxide (BeO), calcium oxide (CaO), magnesium oxide (MgO), or strontium oxide (SrO) are also contemplated. In embodiments where the $NO_x$ adsorption component is a composite nanoparticle, the $NO_x$ adsorption component includes a $NO_x$ adsorption nanoparticle and a support nanoparticle. In some embodiments, the $NO_x$ adsorption nanoparticle includes one or more alkaline earth metal oxides, preferably barium oxide (BaO), however beryllium oxide (BeO), calcium oxide (CaO), magnesium oxide (MgO), or strontium oxide (SrO) are also contemplated. In some embodiments, the support nanoparticles may also include one or more metal oxides, preferably one or more of cerium oxide ($CeO_2$), lanthanum oxide ($La_2O_3$), yttrium oxide ($Y_2O_3$), or zirconium oxide ($ZrO_2$), however aluminum oxide ($Al_2O_3$), barium oxide (BaO), beryllium oxide (BeO), calcium oxide (CaO), chromium oxide (CrO), cobalt oxide (CoO), magnesium oxide (MgO), silicon dioxide ($SiO_2$), strontium oxide (SrO), titanium dioxide ($TiO_2$), or any ceramic are also contemplated.

In some embodiments, the lean NO trapping materials include micron-sized carrier components. In some embodiments, the micron-sized carrier component is porous. In some embodiments, the micron-sized carrier component may include one or more metal oxides, preferably one or more of cerium oxide ($CeO_2$), lanthanum oxide ($La_2O_3$), yttrium oxide ($Y_2O_3$), or zirconium oxide ($ZrO_2$), although aluminum oxide ($Al_2O_3$), barium oxide (BaO), beryllium oxide (BeO), calcium oxide (CaO), chromium oxide (CrO), cobalt oxide (CoO), magnesium oxide (MgO), silicon dioxide ($SiO_2$), strontium oxide (SrO), titanium dioxide ($TiO_2$), or any ceramic are also contemplated. In some embodiments, the catalytic component or the $NO_x$ adsorption component may be added to a pre-existing micron-sized carrier component. In some embodiments, the micron-sized carrier portion is formed from a larger carrier portion after the inclusion of a catalytic component or a $NO_x$ adsorption component, for example by adding a catalytic component or a $NO_x$ adsorption component to a carrier portion precursor, and grinding or milling the resulting precursor into a micron-sized powder.

In some embodiments, the micron-sized carrier particle includes cerium oxide; a mixture of cerium oxide and zirconium oxide; a mixture of cerium oxide, zirconium oxide, and lanthanum oxide; a mixture of cerium oxide, zirconium oxide, and yttrium oxide; or a mixture of cerium oxide, zirconium oxide, lanthanum oxide, and yttrium oxide. In some embodiments, the micron-sized carrier particle includes about 20% to about 100% cerium oxide, about 30% to about 90% cerium oxide, about 30% to about 50% cerium oxide, about 50% to about 80% cerium oxide, or about 70% to about 90% cerium oxide. In some embodiments, the micron-sized carrier particle includes about 0% to about 80% zirconium oxide, such as about 5% to about 15% zirconium oxide, about 15% to about 35% zirconium oxide, about 35% to about 55% zirconium oxide, or about 55% to about 65% zirconium oxide. In some embodiments, the micron-sized carrier particle includes 0% to about 15% lanthanum oxide, about 2% to about 12% lanthanum oxide, about 3% to about 6% lanthanum oxide, about 6% to about 12% lanthanum oxide, about 4% lanthanum oxide, about 5% lanthanum oxide, about 6% lanthanum oxide, about 7% lanthanum oxide, about 8% lanthanum oxide, about 9% lanthanum oxide, about 10% lanthanum oxide, or about 11% lanthanum oxide. In some embodiments, the micron-sized carrier particle includes 0% to about 15% yttrium oxide, about 2% to about 12% yttrium oxide, about 3% to about 6% yttrium oxide, about 6% to about 12% yttrium oxide, about 4% yttrium oxide, about 5% yttrium oxide, about 6% yttrium oxide, about 7% yttrium oxide, about 8% yttrium oxide, about 9% yttrium oxide, about 10% yttrium oxide, or about 11% yttrium oxide. In some embodiments, the micron-sized carrier particle includes about 80% to about 90% cerium oxide, about 5% to about 15% zirconium oxide, and about 3% to about 5% lanthanum oxide. In some embodiments, the micron-sized carrier particle includes about 80% to about 90% cerium oxide, about 5% to about 15% zirconium oxide, and about 3% to about 5% yttrium oxide. In some embodiments, the lean $NO_x$ trap micron-sized carrier particle includes about 86% cerium oxide, about 10% zirconium oxide, and about 4% lanthanum oxide. In some embodiments, the micron-sized carrier particle includes about 86% cerium oxide, about 10% zirconium oxide, and about 4% yttrium oxide. In some embodiments, the micron-sized carrier particle includes about 30% to about 50% cerium oxide, about 40% to about 60% zirconium oxide, about 3% to about 15% lanthanum oxide. In some embodiments, the micron-sized carrier particle includes about 30% to about 50% cerium oxide, about 40% to about 60% zirconium oxide, about 3% to about 15% yttrium oxide. In some embodiments, the micron-sized carrier particle includes about 40% cerium oxide, about 50% zirconium oxide, and about 10% lanthanum oxide. In some embodiments, the micron-sized carrier particle includes about 40% cerium oxide, about 50% zirconium oxide, and about 10% yttrium oxide. In some embodiments, the micron-sized carrier particle includes about 30% to about 50% cerium oxide, about 40% to about 60% zirconium oxide, about 3% to about 6% lanthanum oxide, and about 3% to about 6% yttrium oxide. In some embodiments, the micron-sized carrier particle includes about 40% cerium oxide, about 50% zirconium oxide, about 5% lanthanum oxide, and about 5% yttrium oxide.

In some embodiments, the $NO_x$ adsorption component is added to the micron-sized carrier particle by wet-chemistry methods. Preferably the NO adsorption component includes barium oxide. In some embodiments, the $NO_x$ adsorption component may be about 1% to about 20% of the final weight of the lean NO trapping material, about 5% to about 15% of the final weight of the lean $NO_x$ trapping material, about 8% to about 12% of the final weight of the lean $NO_x$ trapping material, about 9% to about 11% of the final weight of the lean $NO_x$ trapping material, or about 10% of the final weight of the lean $NO_x$ trapping material.

In some embodiments, the platinum group metal content of a composite nanoparticle may be about 0.01% to about 60%, about 0.1% to about 40%, about 0.2% to about 20%, about 0.2% to about 10%, about 0.5% to about 2%, or about 1%. In some embodiments, the platinum group metal content of the final weight of the lean $NO_x$ trapping material may be about 0.01% to about 5%, about 0.05% to about 1%, about 0.1% to about 2%, about 0.125% to about 1%, or about 0.15% to about 0.5%.

A LNT system can include one or more, two or more, or three or more layers of washcoat compositions on a catalyst substrate, such as a catalytic converter substrate. In some embodiments a washcoat composition includes lean $NO_x$ trapping materials. In some embodiments a washcoat includes an oxidizing catalyst. In some embodiments, a washcoat composition includes a reducing catalyst. In some embodiments, the lean $NO_x$ trapping materials are in the same washcoat composition as a reducing catalyst. In some embodiments, the lean $NO_x$ trapping materials are in the same washcoat composition as an oxidizing catalyst. In some embodiments, the lean $NO_x$ trapping materials are in a washcoat composition with no additional oxidizing or reducing catalysts.

In some embodiments, an oxidizing catalyst is applied to a micron-sized carrier particle by wet-chemistry techniques. In some embodiments, the oxidizing catalyst is a nanoparticle. In some embodiments, the oxidizing catalyst is a composite nanoparticle. In some embodiments, the oxidizing catalyst is bonded to a micron-sized carrier particle, for example bonded to the surface of a micron-sized particle. In some embodiments, the oxidizing catalyst is distributed throughout a porous carrier. In some embodiments, a porous carrier is formed around and surrounds the oxidizing catalyst such that the oxidizing catalyst is embedded within the porous carrier. In some embodiments, the porous carrier is micron-sized.

In some embodiments, the oxidizing catalyst includes one or more metals. In some embodiments, the oxidizing catalyst includes one or more platinum group metals, such as platinum, palladium, or platinum and palladium. In embodiments where the oxidizing catalyst is a composite nanoparticle, the oxidizing catalyst includes an oxidizing catalytic nanoparticle and a support nanoparticle. In some embodiments, the oxidizing catalytic nanoparticle includes one or more platinum group metals, such as platinum, palladium, or platinum and palladium. In some embodiments, the support nanoparticles is includes one or more metal oxides, preferably aluminum oxide ($Al_2O_3$), however barium oxide (BaO), beryllium oxide (BeO), calcium oxide (CaO), cerium oxide ($CeO_2$), chromium oxide (CrO), cobalt oxide (CoO), lanthanum oxide ($La_2O_3$), magnesium oxide (MgO), silicon dioxide ($SiO_2$), strontium oxide (SrO), titanium dioxide ($TiO_2$), yttrium oxide ($Y_2O_3$), zirconium oxide ($ZrO_2$), or a ceramic are contemplated.

In some embodiments, the reducing catalyst is applied to a micron-sized carrier particle by wet-chemistry techniques. In some embodiments, the reducing catalyst is a nanoparticle. In some embodiments, the reducing catalyst is a composite nanoparticle. In some embodiments, the reducing catalyst is bonded to a micron-sized carrier particle, for example bonded to the surface of a micron-sized particle. In some embodiments, the reducing catalyst is distributed throughout a porous carrier. In some embodiments, a porous carrier is formed around and surrounds the reducing catalyst such that the porous carrier bridges together the reducing catalyst, resulting in the reducing catalyst embedded within the porous carrier.

In some embodiments, the reducing catalyst includes one or more metals. In some embodiments, the reducing catalyst includes one or more platinum group metals, preferably rhodium. In embodiments where the reducing catalyst is a composite nanoparticle, the reducing catalyst includes a reducing catalytic nanoparticle and a support nanoparticle.

In some embodiments, the reducing catalytic nanoparticle includes one or more platinum group metals, preferably rhodium. In some embodiments, the support nanoparticles is includes one or more metal oxides, preferably one or more of cerium oxide ($CeO_2$), zirconium oxide ($ZrO_2$), yttrium oxide ($Y_2O_3$), or lanthanum oxide ($La_2O_3$), although aluminum oxide ($Al_2O_3$), barium oxide (BaO), beryllium oxide (BeO), calcium oxide (CaO), chromium oxide (CrO), cobalt oxide (CoO), magnesium oxide (MgO), silicon dioxide ($SiO_2$), strontium oxide (SrO), titanium dioxide ($TiO_2$), or any ceramic are contemplated.

In some embodiments, the micron-sized reducing catalyst or micron-sized oxidizing catalyst includes a micron-sized carrier component. In some embodiments, the micron-sized carrier component is porous. In some embodiments, the micron-sized carrier component may include one or more metal oxides, for example aluminum oxide ($Al_2O_3$), barium oxide (BaO), beryllium oxide (BeO), calcium oxide (CaO), cerium oxide ($CeO_2$), chromium oxide (CrO), cobalt oxide (CoO), lanthanum oxide ($La_2O_3$), magnesium oxide (MgO), silicon dioxide ($SiO_2$), strontium oxide (SrO), titanium dioxide ($TiO_2$), yttrium oxide ($Y_2O_3$), zirconium oxide ($ZrO_2$), or a ceramic may be used. In some embodiments a supplemental NO adsorption component, for example barium oxide, may be added to the oxidizing catalyst carrier particle. For example, the oxidizing catalyst carrier particle may be impregnated with up to about 20% barium oxide, or about 0% to about 20% barium oxide, or about 5% to about 15% barium oxide, or about 10% barium oxide.

Preferably, the micron-sized oxidizing catalyst includes an aluminum oxide micron-sized carrier component. Preferably, the micron-sized reducing catalyst includes a micron-sized carrier component includes cerium oxide; a mixture of cerium oxide and zirconium oxide; a mixture of cerium oxide, zirconium oxide, and lanthanum oxide; a mixture of cerium oxide, zirconium oxide, and yttrium oxide; or a mixture of cerium oxide, zirconium oxide, lanthanum oxide, and yttrium oxide. In some embodiments, the reducing catalyst micron-sized carrier particle comprises cerium oxide. In some embodiments, the reducing catalyst micron-sized carrier particle includes about 20% to about 100% cerium oxide, about 30% to about 90% cerium oxide, about 30% to about 50% cerium oxide, or about 70% to about 90% cerium oxide. In some embodiments, the reducing catalyst micron-sized carrier particle includes about 0% to about 80% zirconium oxide, such as about 5% to about 15% zirconium oxide, about 15% to about 35% zirconium oxide, about 35% to about 55% zirconium oxide, or about 55% to about 65% zirconium oxide. In some embodiments, the reducing catalyst micron-sized carrier particle includes 0% to about 15% lanthanum oxide, about 2% to about 10% lanthanum oxide, about 2% to about 8% lanthanum oxide, about 3% to about 6% lanthanum oxide, about 4% to about 5% lanthanum oxide, or about 8% to about 12% lanthanum oxide. In some embodiments, the reducing catalyst micron-sized carrier particle includes 0% to about 15% yttrium oxide, about 2% to about 10% yttrium oxide, about 2% to about 8% yttrium oxide, about 3% to about 6% yttrium oxide, about 4% to about 5% yttrium oxide, or about 8% to about 12% lanthanum oxide. In some embodiments, the reducing catalyst micron-sized carrier particle includes about 80% to about 90% cerium oxide, about 5% to about 15% zirconium oxide, and about 3% to about 5% lanthanum oxide. In some embodiments, the reducing catalyst micron-sized carrier particle includes about 80% to about 90% cerium oxide, about 5% to about 15% zirconium oxide, and about 3% to about 5% yttrium oxide. In some embodiments, the reducing catalyst micron-sized carrier particle includes about 86% cerium oxide, about 10% zirconium oxide, and about 4% lanthanum oxide. In some embodiments, the reducing catalyst micron-sized carrier particle includes about 86% cerium oxide, about 10% zirconium oxide, and about 4% yttrium oxide.

In some embodiments, the lean $NO_x$ trapping materials and reducing catalysts are in the same washcoat layer. In some embodiments, the lean $NO_x$ trapping materials and the reducing catalysts are in separate washcoat layers. When the lean $NO_x$ trapping materials and the reducing catalysts are in separate washcoat layers, the order and placement of these two washcoat layers on a substrate may vary in different embodiments. In some embodiments, additional washcoat layers may also be used over, under, or between these washcoat layers. In other embodiments, the two washcoat layers can be directly disposed on each other, without intervening washcoat layers between the first and second washcoat layers.

In some embodiments, the lean $NO_x$ trapping materials are in a washcoat layer separate from the oxidizing catalysts and the reducing catalysts. When the lean $NO_x$ trapping materials, the oxidizing catalysts, and the reducing catalysts are each in separate washcoat layers, the order and placement of these three washcoat layers on a substrate may vary in different embodiments. In some embodiments, additional washcoat layers may also be used over, under, or between these layers. In other embodiments, the three washcoat layers can be directly disposed on each other, without intervening washcoat layers between the first, second, and third washcoat layers.

The lean $NO_x$ trapping materials, coated substrates, catalytic converters, and exhaust treatment systems described herein are useful for vehicles employing a lean $NO_x$ trap (LNT) or $NO_x$ storage catalyst (NSC) system. It is understood that the coated substrates, catalytic converters, and exhaust treatment systems described herein are useful for either gasoline or diesel engines, and either gasoline or diesel vehicles. These coated substrates, catalytic converters, and exhaust treatment systems are especially useful for light-duty engines and light-duty vehicles.

When numerical values are expressed herein using the term "about" or the term "approximately," it is understood that both the value specified, as well as values reasonably close to the value specified, are included. For example, the description "about 50° C." or "approximately 50° C." includes both the disclosure of 50° C. itself, as well as values close to 50° C. Thus, the phrases "about X" or "approximately X" include a description of the value X itself. If a range is indicated, such as "approximately 50° C. to 60° C.," it is understood that both the values specified by the endpoints are included, and that values close to each endpoint or both endpoints are included for each endpoint or both endpoints; that is, "approximately 50° C. to 60° C." is equivalent to reciting both "50° C. to 60° C." and "approximately 50° C. to approximately 60° C."

As used herein, the term "embedded" when describing nanoparticles embedded in a porous carrier includes the term "bridged together by" when describing nanoparticles bridged together by a porous carrier, and refers to the configuration of the nanoparticles in the porous carrier resulting when the porous carrier is formed around or surrounds the nanoparticles, generally by using the methods described herein. That is, the resulting structure contains nanoparticles with a scaffolding of porous carrier between the nanoparticles, for example built up around or surrounding the nanoparticles. The porous carrier encompasses the nanoparticles, while at the same time, by virtue of its porosity, the porous carrier permits external gases to contact the embedded nanoparticles. Nanoparticles "embedded" within a porous carrier may include a configuration wherein nanoparticles are connected together (i.e., bridged together) by a carrier material.

The term "deposited" is understood to mean a joining of any material by any attractive force, and may include van der Waals forces, hydrogen bonds, ionic bonds, covalent bonds or any attractive force. For example, in some embodiments, a material deposited onto another material may be covalently bound to or ionically bound to the material.

It is generally understood by one of skill in the art that the unit of measure "g/l" or "grams per liter" is used as a measure of density of a substance in terms of the mass of the substance in any given volume containing that substance. In some embodiments, the "g/l" is used to refer to the loading density of a substance into, for example, a coated substrate. For example, in some embodiments, "4.0 g/l platinum" may refer to the loading of 4.0 grams of platinum into each liter of a coated substrate. Similarly, in some embodiments, "30 g/l alkaline earth metal oxide" may refer to the loading of 30 grams of an alkaline earth metal oxide into each liter of a coated substrate.

As used herein, the term "lean $NO_x$ trapping material" refers to the combination of (1) be, for example nanoparticles or composite nanoparticles), and (3) NO adsorption components (or $NO_x$ adsorption component precursors) in any configuration. In some embodiments of lean $NO_x$ trapping materials, the catalytic components (or a portion of the catalytic components) are attached to the micron-sized carrier particles. In some embodiments of lean $NO_x$ trapping material, a the catalytic components (or a portion of the catalytic components) are not attached to the oxygen-storage particles. In some embodiments of lean $NO_x$ trapping materials, a portion of the $NO_x$ adsorption components or a portion of the $NO_x$ adsorption component precursors (or a portion of the $NO_x$ adsorption components or $NO_x$ adsorption component precursors) are attached to the micron-sized carrier particles or oxygen-storage particles. In some embodiments of lean $NO_x$ trapping materials, a portion of the $NO_x$ adsorption components or a portion of the $NO_x$ adsorption component precursors (or a portion of the NO adsorption components or $NO_x$ adsorption component precursors) are not attached to the micron-sized carrier particles or oxygen-storage particles. In some embodiments, catalytic components and $NO_x$ adsorption components may both be attached to a micron-sized particle, in which case the lean $NO_x$ trapping material may be referred to as "lean $NO_x$ trap particle." In some embodiments, lean $NO_x$ trapping materials described herein store $NO_x$ gases during lean-burn engine operation and releases $NO_x$ gases when the oxygen content in the exhaust gas is reduced.

As used herein, the term "loose ingredient" lean $NO_x$ trapping materials may be used to refer to separately provided, that is, unattached, catalytic components, oxygen-storage particles, and $NO_x$ adsorption materials. In some embodiments, however, a portion of the "loose ingredient" lean $NO_x$ trapping materials may become attached or deposited, for example after mixing or calcining a washcoat composition. In some embodiments, for example, catalytic components may attach to other catalytic components, to NO adsorption components, or to oxygen-storage particles. In some embodiments, $NO_x$ adsorption materials may attach to other $NO_x$ adsorption materials, to catalytic components, or to oxygen-storage particles." abo The terms "micro-particle," "micro-sized particle," "micron-particle," and "micron-sized particle" are generally understood to encompass a particle on the order of micrometers in diameter, typically between about 0.5 µm to 1000 µm, about 1 µm to 1000 µm, about 1 µm to 100 µm, or about 1 µm to 50 µm. Additionally, the term "platinum group metals" (abbreviated "PGM") used in this disclosure refers to the collective name used for six metallic elements clustered together in the periodic table. The six platinum group metals are ruthenium, rhodium, palladium, osmium, iridium, and platinum.

A "portion" of a material is understood to mean at least some of the material and, in some embodiments, may include all of that material. In some embodiments, a "portion" of a material may include more than 0% of the material, more than about 10% of the material, more than about 20% of the material, more than about 30% of the material, more than about 40% of the material, more than about 50% of the material, more than about 60% of the material, more than about 70% of the material, more than about 80% of the material, or more than about 90% of the material. In some embodiments, a "portion" of a material may include a range from more than 0% to about 10%, a range from more than 0% to about 20%, a range from more than 0% to about 30%, a range from more than 0% to about 40%, a range from more than 0% to about 50%, a range from more than 0% to about 60%, a range from more than 0% to about 70%, a range from more than 0% to about 80%, a range from more than 0% to about 90%, or a range from more than 0% to about 100% of the material.

This disclosure refers to both particles and powders. These two terms are equivalent, except for the caveat that a singular "powder" refers to a collection of particles. The present invention can apply to a wide variety of powders and particles. The terms "nanoparticle" and "nano-sized particle" are generally understood by those of ordinary skill in the art to encompass a particle on the order of nanometers in diameter, typically between about 0.5 nm to 500 nm, about 1 nm to 500 nm, about 1 nm to 100 nm, or about 1 nm to 50 nm. Preferably, the nanoparticles have an average grain size less than 250 nanometers and an aspect ratio between one and one million. In some embodiments, the nanoparticles have an average grain size of about 50 nm or less, about 30 nm or less, or about 20 nm or less. In additional embodiments, the nanoparticles have an average diameter of about 50 nm or less, about 30 nm or less, or about 20 nm or less. The aspect ratio of the particles, defined as the longest dimension of the particle divided by the shortest dimension of the particle, is preferably between one and one hundred, more preferably between one and ten, yet more preferably between one and two. "Grain size" is measured using the ASTM (American Society for Testing and Materials) standard (see ASTM E112-10). When calculating a diameter of a particle, the average of its longest and shortest dimension is taken; thus, the diameter of an ovoid particle with long axis 20 nm and short axis 10 nm would be 15 nm. The average diameter of a population of particles is the average of diameters of the individual particles, and can be measured by various techniques known to those of skill in the art.

By "substantial absence of any platinum group metals" is meant that less than about 2%, less than about 1%, less than about 0.5%, less than about 0.1%, less than about 0.01%, less than about 0.005%, less than about 0.0025%, or less than about 0.001% of platinum group metals are present by weight. Preferably, substantial absence of any platinum group metals indicates that less than about 0.1% of platinum group metals are present by weight.

By "substantially free of" a specific component, a specific composition, a specific compound, or a specific ingredient in various embodiments, is meant that less than about 5%, less than about 2%, less than about 1%, less than about 0.5%, less than about 0.1%, less than about 0.05%, less than about 0.025%, or less than about 0.01% of the specific component, the specific composition, the specific compound, or the specific ingredient is present by weight. Preferably, "substantially free of" a specific component, a specific composition, a specific compound, or a specific ingredient indicates that less than about 1% of the specific component, the specific composition, the specific compound, or the specific ingredient is present by weight.

It should be noted that, during fabrication or during operation (particularly over long periods of time), small amounts of materials present in one washcoat layer may diffuse, migrate, or otherwise move into other washcoat layers. Accordingly, use of the terms "substantial absence of" and "substantially free of" is not to be construed as absolutely excluding minor amounts of the materials referenced.

By "substantially each" of a specific component, a specific composition, a specific compound, or a specific ingredient in various embodiments, is meant that at least about 95%, at least about 98%, at least about 99%, at least about 99.5%, at least about 99.9%, at least about 99.95%, at least about 99.975%, or at least about 99.99% of the specific component, the specific composition, the specific compound, or the specific ingredient is present by number or by weight. Preferably, "substantially each" of a specific component, a specific composition, a specific compound, or a specific ingredient is meant that at least about 99% of the specific component, the specific composition, the specific compound, or the specific ingredient is present by number or by weight.

It is understood that reference to relative weight percentages in a composition assumes that the combined total weight percentages of all components in the composition add up to 100. It is further understood that relative weight percentages of one or more components may be adjusted upwards or downwards such that the weight percent of the components in the composition combine to a total of 100, provided that the weight percent of any particular component does not fall outside the limits of the range specified for that component.

The term "washcoat composition" as used herein may be used to refer to a washcoat slurry or a washcoat layer. A washcoat slurry may comprise solids or salts suspended or dissolved in a liquid. The washcoat slurry may be coated onto a substrate, dried, and calcined. A "washcoat layer" generally refers to a washcoat composition after the composition has been applied to a substrate, dried, and calcined.

Various aspects of the disclosure can be described through the use of flowcharts. Often, a single instance of an aspect of the present disclosure is shown. As is appreciated by those of ordinary skill in the art, however, the protocols, processes, and procedures described herein can be repeated continuously or as often as necessary to satisfy the needs described herein. In addition, it is contemplated that certain method steps can be performed in alternative sequences to those disclosed in the flowcharts.

This disclosure provides several embodiments. It is contemplated that any features from any embodiment can be combined with any features from any other embodiment. In this fashion, hybrid configurations of the disclosed features are within the scope of the present invention.

Wet-Chemistry $NO_x$ Adsorption Component of the Lean $NO_x$ Trapping Materials

In some embodiments, the $NO_x$ adsorption component of the lean $NO_x$ trapping material is an alkaline metal oxide, for example barium oxide. In some embodiments, the $NO_x$ adsorption component (or a portion of the $NO_x$ adsorption component) is attached to a micron-sized carrier particle. In some embodiments, the $NO_x$ adsorption component is formed by wet chemistry methods, for example by using a NO adsorption component precursor. In some embodiments, the $NO_x$ adsorption component is deposited onto a micron-sized particle, for example by depositing a $NO_x$ adsorption component precursor onto the micron-sized particle and converting the $NO_x$ adsorption component precursor into a $NO_x$ adsorption component. In some embodiments, a $NO_x$ adsorption component or $NO_x$ adsorption component precursor is mixed with micron-sized particles in a washcoat composition, for example a washcoat slurry. In some embodiments the mixing of the micron-sized particles and the $NO_x$ adsorption component or $NO_x$ adsorption component precursor results in a portion of the $NO_x$ adsorption component or $NO_x$ adsorption component precursor being deposited onto the micron-sized particles. In some embodiments the mixing of the micron-sized particles and the $NO_x$ adsorption component or $NO_x$ adsorption component precursor results in a portion of the $NO_x$ adsorption component or $NO_x$ adsorption component precursor not being deposited onto the micron-sized particles, but instead a portion may be found elsewhere in the washcoat composition (for example, in a washcoat layer, a portion $NO_x$ adsorption component may be located within gaps between micron-sized particles).

The production of $NO_x$ adsorption components produced by wet-chemistry methods typically includes dissolving or suspending an alkaline earth metal salt (for example barium bromide, barium carbonate, barium chloride, barium chromate, barium cyclohexanebutyrate, barium fluoride, barium hydroxide, barium iodide, barium manganite, barium perchlorate, or, preferably, barium acetate) in solution. In some embodiments, alkaline earth metal salt solution or suspension is mixed with a micron-sized carrier particle, which allows a portion of the alkaline earth metal salt to be deposited onto the micron-sized carrier protein. After the addition of an alkaline earth metal salt, the wet particles may be dried and calcined under ambient or oxidizing conditions. The calcination of the material results in the conversion of the alkaline earth metal to alkaline earth metal oxide, for example barium oxide, distributed throughout the micron-sized carrier particle or washcoat composition.

In some embodiments, sufficient alkaline earth metal salt is mixed with micron-sized carrier particles such that after drying an calcining the material the resulting particle comprises about 1 wt % to about 20 wt % alkaline earth metal oxide particles, about 5 wt % to about 15 wt % alkaline earth metal oxide, about 8 wt % about 12 wt % alkaline earth metal oxide, about 9 wt % to about 11 wt % alkaline earth metal oxide, or about 10 wt % alkaline earth metal oxide. In some embodiments, an alkaline earth metal salt may be added directly to a washcoat composition, for example before coating a substrate. In some embodiments, sufficient alkaline earth metal salt is added to a micron-sized carrier particle or a washcoat composition such that after drying and calcining the particle or washcoat composition (or example, after coating a substrate with the particles or washcoat composition), the resulting coated substrate comprises about 5 g/l to about 100 g/l alkaline earth metal oxide, about 10 g/l to about 75 g/l alkaline earth metal oxide, about 20 g/l to about 50 g/l alkaline earth metal oxide, about 30 g/l to about 40 g/l alkaline earth metal oxide, about 35 g/l alkaline earth metal oxide, about 36 g/l alkaline earth metal oxide, about 37 g/l alkaline earth metal oxide, about 38 g/l alkaline earth metal oxide, about 39 g/l alkaline earth metal oxide, about 40 g/l alkaline earth metal oxide, about 5 g/l or more alkaline earth metal oxide, about 10 g/l or more alkaline earth metal oxide, about 15 g/l or more alkaline earth metal oxide, about 25 g/l or more alkaline earth metal oxide, about 30 g/l or more alkaline earth metal oxide, about 35 g/l or more alkaline earth metal oxide, about 40 g/l or more alkaline earth metal oxide, about 100 g/l or less alkaline earth metal oxide, about 75 g/l or less alkaline earth metal oxide, about 50 g/l or less alkaline earth metal oxide, or about 40 g/l or less alkaline earth metal oxide.

$NO_x$ adsorption component impregnation of a micron-sized carrier particle by wet chemistry methods may occur prior to or after the attachment of a catalytic component to the micron-sized particles. For example, in some embodiments, a micron-sized particle may be impregnated with alkaline earth metal oxide (such as barium oxide) before attachment of catalytic components (such as catalytic nanoparticles or catalytic composite nanoparticles), as described below. In some embodiments, the $NO_x$ adsorption component may be deposited into the micron-sized carrier particle after the catalytic component has been attached to the micron-sized carrier particle, also described below. For example, in some embodiments, a $NO_x$ adsorption component precursor is added directly into a washcoat formulation containing micron-sized carrier particles attached to a plurality of composite catalytic nanoparticles. In such an embodiment, a portion of the $NO_x$ adsorption component precursor can be absorbed by the micron-sized carrier particles attached to a plurality of composite catalytic nanoparticles while in the washcoat composition.

Composite Catalytic Nanoparticles and $NO_x$ Adsorption Nanoparticles

Lean $NO_x$ trapping materials may include one or more different types of composite nanoparticles. A composite nanoparticle catalyst may include a catalytic nanoparticle attached to a support nanoparticle to form a "nano-on-nano" or "NN" composite nanoparticle. In some embodiments, multiple nano-on-nano particles are then be attached to a micron-sized carrier particle to form a composite micro/nanoparticle, that is, a micro-particle bearing composite nanoparticles. In some embodiments, the composite nanoparticles are bonded to the micron-sized particles, for example on the surface of the micron-sized particle. In some embodiments, the composite nanoparticles are distributed throughout a carrier. In some embodiments, the micron-sized particle includes a carrier that is formed around and surrounds the composite nanoparticles such that the nanoparticles are embedded within the carrier. These composite micro/nanoparticles may be used in washcoat formulations and catalytic converters as described herein.

In some embodiments, the nano-on-nano particles are included in a washcoat composition for efficient oxidation of NO gas emissions. In some embodiments, the nano-on-nano particles are mixed with $NO_x$ adsorption materials so that NO gas emissions may be oxidized by the nano-on-nano particles and stored by the $NO_x$ adsorption materials during a lean-burn engine operation. In some embodiments, the catalytic composite nanoparticles may be provided separately from and unattached to the $NO_x$ adsorption materials and oxygen-storage materials.

The use of composite nanoparticles can reduce requirements for platinum group metal content and/or significantly enhance performance as compared with catalysts prepared by wet-chemistry methods. Wet-chemistry methods generally involve use of a solution of platinum group metal ions or metal salts, which are impregnated into supports (typically micron-sized particles), and reduced to platinum group metal in elemental form for use as the catalyst. For example, a solution of chloroplatinic acid, $H_2PtCl_6$, can be applied to metal oxide micro-particles, followed by drying and calcining, resulting in precipitation of platinum onto the metal oxide particles. The platinum group metals deposited by wet-chemical methods onto metal oxide supports, such as aluminum oxide and cerium oxide, are mobile at high temperatures, such as temperatures encountered in catalytic converters or exhaust systems. That is, at elevated temperatures, the PGM atoms can migrate over the surface on which they are deposited, and will clump together with other PGM atoms. The finely-divided portions of PGM combine into larger and larger agglomerations of platinum group metal as the time of exposure to high temperature increases. This agglomeration leads to reduced catalyst surface area and degrades the performance of the catalytic converter. This phenomenon is referred to as "aging" of the catalytic converter.

In contrast, the composite platinum group metal catalysts are prepared by plasma-based methods, such as those described in US 2014/0140909, the disclosure of which is herein incorporated by reference. In some embodiments, a nano-sized platinum group metal particle is deposited on a nano-sized metal oxide support, resulting in much lower mobility than the PGM deposited by wet chemistry methods. The resulting plasma-produced catalysts age at a much slower rate than the catalysts produced by wet-chemistry. Thus, systems using plasma-produced catalysts can maintain a larger surface area of exposed catalyst to gases emitted by the engine over a longer period of time, leading to better emissions performance or a lower platinum group metal loading in the system.

In some embodiments of catalytic composite nanoparticles, one or more nano-sized catalytic particles are disposed on a nano-sized support nanoparticles. In embodiments comprising a single nano-sized catalytic particle disposed on the nano-sized support nanoparticles, the nano-sized catalytic particle may be a homogenous metal or may be a metal alloy. In embodiments comprising two or more nano-sized catalytic particles, each nano-sized catalytic particle may be a homogenous metal or an alloy, and the nano-sized catalytic particles may be comprised of the same homogenous metal or alloy, or of differing homogenous metals or alloys. In some embodiments, the catalytic metal comprises a platinum group metal, such as platinum, palladium, ruthenium, rhodium, osmium, or indium.

In some embodiments, the catalytic nanoparticle comprises one or more platinum group metals, such as platinum or palladium. In some embodiments, the catalytic nanoparticle comprises platinum and palladium in a weight ratio of about 1:2 platinum:palladium to about 25:1 platinum:palladium. In some embodiments, the catalytic nanoparticle comprises platinum and palladium in a weight ratio of about 2:1 platinum:palladium to about 20:1 platinum:palladium. In some embodiments, the catalytic nanoparticle comprises platinum and palladium in a weight ratio of about 5:1 platinum:palladium to about 15:1 platinum:palladium. In some embodiments, the catalytic nanoparticle comprises platinum and palladium in a weight ratio of about 1:2 platinum:palladium, about 1:1 platinum:palladium, about 2:1 platinum:palladium, about 3:1 platinum:palladium, about 4:1 platinum:palladium, about 5:1 platinum:palladium, about 6:1 platinum:palladium, about 7:1 platinum:

palladium, about 8:1 platinum:palladium, about 9:1 platinum:palladium, about 10:1 platinum:palladium, about 11:1 platinum:palladium, about 12:1 platinum:palladium, about 13:1 platinum:palladium, about 14:1 platinum:palladium, about 15:1 platinum:palladium, about 16:1 platinum:palladium, about 17:1 platinum:palladium, about 18:1 platinum:palladium, about 19:1 platinum:palladium, about 20:1 platinum:palladium, about 21:1 platinum:palladium, about 22:1 platinum:palladium, about 23:1 platinum:palladium, about 24:1 platinum:palladium, or about 25:1 platinum:palladium. In some embodiments, the catalytic nanoparticle comprises platinum and is substantially free of palladium. In some embodiments, the catalytic nanoparticle comprises palladium and is substantially free of platinum.

In some embodiments, the nano-sized support nanoparticles may be one or more oxides, such as metal oxides. By way of example, in some embodiments, metal oxides such as aluminum oxide ($Al_2O_3$), silicon dioxide ($SiO_2$), zirconium oxide ($ZrO_2$), titanium oxide ($TiO_2$), cerium oxide ($CeO_2$), barium oxide (BaO), lanthanum oxide ($La_2O_3$), and yttrium oxide ($Y_2O_3$) may be used. In some embodiments, a mixture of two or more oxides may be used to form the support nanoparticles, for example a mixture of cerium oxide and zirconium oxide, or a mixture of cerium oxide and lanthanum oxide, or a mixture of cerium oxide, zirconium oxide, and lanthanum oxide, or a mixture of cerium oxide, zirconium oxide, and yttrium oxide, or a mixture of cerium oxide, zirconium oxide, lanthanum oxide, and yttrium oxide. Preferably, a catalytic composite nanoparticle used in a lean $NO_x$ trap particle contains a platinum and/or palladium catalytic nanoparticle and a cerium oxide support nanoparticles. In some embodiments, the cerium oxide support nanoparticles further contains one or more of zirconium oxide, lanthanum oxide, or yttrium oxide.

In some embodiments, the relative proportion of the catalytic platinum group metal of the catalytic particle to the metal oxide of the support nanoparticles, such as cerium oxide, may be a range of about 0.01 wt % to about 60 wt % platinum group metals and about 40 wt % to about 99.99 wt % metal oxide, or about 0.1 wt % to about to about 40 wt % platinum group metal and about 60 wt % to about 99.9 wt % metal oxide, or about 0.2 wt % to about 20 wt % platinum group metal and about 80 wt % to about 99.8 wt % metal oxide, or about 0.2 wt % to about 10 wt % platinum group metal and about 90 wt % to about 99.8 wt % metal oxide, or about 0.5 wt % to about 2 wt % platinum group metal and about 98 wt % to about 99.5 wt % metal oxide, or about 1% platinum group metal and about 99% metal oxide.

In some embodiments, the $NO_x$ adsorption component may be a composite nanoparticle. In some embodiments, the $NO_x$ adsorption component composite nanoparticle includes a $NO_x$ adsorption nanoparticle and a support nanoparticle. In some embodiments, the support nanoparticles may be one or more oxides, for example aluminum oxide ($Al_2O_3$), silicon dioxide ($SiO_2$), zirconium oxide ($ZrO_2$), titanium oxide ($TiO_2$), cerium oxide ($CeO_2$), barium oxide (BaO), lanthanum oxide ($La_2O_3$), and yttrium oxide ($Y_2O_3$). In some embodiments, the $NO_x$ adsorption nanoparticle may be one or more alkaline earth metal oxides, for example, barium oxide. In some embodiments, the support nanoparticle and the $NO_x$ nanoparticle may be of the same material, for example, the support nanoparticle and the $NO_x$ adsorption nanoparticle may both be barium oxide. In such an embodiment, the adsorption nanoparticle may serve as an additional $NO_x$ adsorption component.

In some embodiments, the catalytic or $NO_x$ adsorption nanoparticles have an average diameter or average grain size between about 0.3 nm and about 10 nm, such as between about 1 nm to about 5 nm, that is, about 3 nm+/−2 nm. In some embodiments, the catalytic or $NO_x$ adsorption nanoparticles have an average diameter or average grain size between approximately 0.3 nm to approximately 1 nm, while in some embodiments, the catalytic or $NO_x$ adsorption nanoparticles have an average diameter or average grain size between approximately 1 nm to approximately 5 nm, while in some embodiments, the catalytic or $NO_x$ adsorption nanoparticles have an average diameter or average grain size between approximately 5 nm to approximately 10 nm. In some embodiments, the support nanoparticles, such as those comprising a metal oxide (for example, cerium oxide) have an average diameter of about 20 nm or less; or about 15 nm or less; or about 10 nm or less; or about 5 nm or less; or about 2 nm or less; or between about 2 nm and about 5 nm, that is, 3.5 nm+/−1.5 nm; or between 2 nm and about 10 nm, that is 6 nm+/−4 nm; or between about 10 nm and about 20 nm, that is, about 15 nm+/−5 nm; or between about 10 nm and about 15 nm, that is, about 12.5 nm+/−2.5 nm. In some embodiments, the composite nanoparticles have an average diameter or average grain size of about 2 nm to about 20 nm, that is 11 nm+/−9 nm; or about 4 nm to about 18 nm, that is 11+/−7 nm; or about 6 nm to about 16 nm, that is 11+/−5 nm; or about 8 nm to about 14 nm, that is about 11 nm+/−3 nm; or about 10 nm to about 12 nm, that is about 11+/−1 nm; or about 10 nm; or about 11 nm; or about 1 nm.

The composite nanoparticles comprising two or more nanoparticles (catalytic or support) may be referred to as "nano-on-nano" particles or "NN" particles. In addition to composite nanoparticles used in a lean $NO_x$ trap particles, in some embodiments similar composite nanoparticles may be used in the formation of oxidizing or reducing catalysts. For example, in some embodiments of oxidizing washcoat composition or reducing compositions, an oxidizing composite catalyst or a reducing composite catalyst may be used. In some embodiments, an oxidizing catalytic composite nanoparticle may include a catalytic nanoparticle (which may include platinum and/or palladium) bonded to a support nanoparticle (which may include a metal oxide, for example aluminum oxide). In some embodiments, a reducing catalytic composite nanoparticle may include a catalytic nanoparticle (which may include rhodium) bonded to a support nanoparticle (which may include, for example, one or more of cerium dioxide, zirconium oxide, lanthanum dioxide, or yttrium dioxide). The oxidizing catalytic composite nanoparticles and the reducing catalytic composite nanoparticles may be attached to micron-sized carrier particles, as described below.

Production of Composite Nanoparticles by Plasma-Based Methods ("Nano-on-Nano" Particles or "NN" Particles)

Composite nanoparticles used in lean $NO_x$ trap particles or other lean $NO_x$ trapping materials may be formed by plasma reactor methods by feeding one or more catalytic materials (such as a platinum group metal(s)) and one or more support materials (such as a metal oxide), such as a metal oxide, into a plasma gun, where the materials are vaporized. The high-throughput particle production system described in US 2014/0263190 and International Patent Appl. No. PCT/US2014/02493, the disclosures of which are hereby incorporated by reference, can be used to produce the composite nanoparticles. Other equipment suitable for plasma synthesis is disclosed in U.S. Patent Application Publication No. 2008/0277267 and U.S. Pat. No. 8,663,571, the disclosures of which are hereby incorporated by reference. Plasma guns such as those disclosed in US 2011/0143041, the disclosure of which is hereby incorporated by reference, can be used, and techniques such as those disclosed in U.S. Pat. No. 5,989,648, U.S. Pat. No. 6,689,192, U.S. Pat. No. 6,755,886, and US 2005/0233380, the disclosures of which are hereby incorporated by reference, can be used to generate plasma. A working gas, such as argon, is supplied to the plasma gun for the generation of plasma; in one embodiment, an argon/hydrogen mixture (in the ratio of 10:1 Ar/$H_2$) is used as the working gas.

In one embodiment, one or more platinum group metals, such as platinum, palladium, or rhodium, which are generally in the form of metal particles of about 0.5 to 6 microns in diameter, can be introduced into the plasma reactor as a fluidized powder in a carrier gas stream such as argon. In some embodiments two or more platinum group metals may be added, such as a mixture of platinum and palladium, in any ratio, such as about 1:2 platinum:palladium by weight to about 50:1 platinum:palladium by weight, about 1:1 platinum:palladium by weight to about 25:1 platinum:palladium by weight, about 5:1 platinum:palladium by weight to about 15:1 platinum:palladium by weight, about 1:2 platinum:palladium, about 1:1 platinum:palladium, about 2:1 platinum:palladium, about 3:1 platinum:palladium, about 4:1 platinum:palladium, about 5:1 platinum:palladium, about 6:1 platinum:palladium, about 7:1 platinum:palladium, about 8:1 platinum:palladium, about 9:1 platinum:palladium, about 10:1 platinum:palladium, about 11:1 platinum:palladium, about 12:1 platinum:palladium, about 13:1 platinum:palladium, about 14:1 platinum:palladium, about 15:1 platinum:palladium, about 16:1 platinum:palladium, about 17:1 platinum:palladium, about 18:1 platinum:palladium, about 19:1 platinum:palladium, about 20:1 platinum:palladium, about 21:1 platinum:palladium, about 22:1 platinum:palladium, about 23:1 platinum:palladium, about 24:1 platinum:palladium, or about 25:1 platinum:palladium. Support material, for example a metal oxide (such as one or more of cerium oxide, zirconium oxide, lanthanum oxide, or yttrium oxide) in a particle size of about 15 to 25 microns diameter, is also introduced as a fluidized powder in carrier gas. Other methods of introducing the materials into the reactor may also be used, such as in a slurry.

In some embodiments, the feed material has a range of about 0.01 wt % to about 60 wt % platinum group metals and about 40 wt % to about 99.99 wt % metal oxide, or about 0.1 wt % to about to about 40 wt % platinum group metal and about 60 wt % to about 99.9 wt % metal oxide, or about 0.2 wt % to about 20 wt % platinum group metal and about 80 wt % to about 99.8 wt % metal oxide, or about 0.2 wt % to about 10 wt % platinum group metal and about 90 wt % to about 99.8 wt % metal oxide, or about 0.5 wt % to about 2 wt % platinum group metal and about 98 wt % to about 99.5 wt % metal oxide, or about 1% platinum group metal and about 99% metal oxide. Alternative platinum group metals or metal oxides are contemplated.

Other methods of introducing the materials into the reactor can be used, such as in a liquid slurry. Any solid or liquid materials are rapidly vaporized or turned into plasma. The kinetic energy of the superheated material, which can reach temperatures of 20,000 to 30,000 Kelvin, ensures extremely thorough mixing of all components. The superheated material of the plasma stream is then rapidly quenched using such methods as the turbulent quench chamber disclosed in US 2014/0263190. Argon quench gas is injected into the superheated material at high flow rates, such as 2400 to 2600 liters per minute. The material is further cooled in a cool-down tube, and collected and analyzed to ensure proper size ranges of material.

The plasma production method described above produces uniform composite nanoparticles, where the composite nanoparticles include a catalytic nanoparticle disposed on a support nanoparticle. Similar methods may be used to produce other types of composite nanoparticles. For example a $NO_x$ adsorption composite nanoparticle might be formed by feeding barium oxide and cerium oxide particles into a plasma reactor to form a composite nanoparticle with a barium oxide $NO_x$ adsorption nanoparticle bonded to a cerium oxide support nanoparticle. In some embodiments, an oxidizing catalytic composite nanoparticle maybe formed by feeding platinum, palladium, and aluminum oxide particles into a plasma reactor to form a platinum/palladium catalytic nanoparticle bonded to an aluminum oxide support nanoparticles. In some embodiments, a reducing catalytic composite nanoparticle may be formed by feeding rhodium and cerium oxide particles into a plasma reactor to form a rhodium catalytic nanoparticle bonded to a cerium oxide nanoparticle. Other catalytic metals and metal oxide support materials can be contemplated.

Lean $NO_x$ Trapping Materials: Micron-Sized Carrier Particles Bearing Composite Catalytic Nanoparticles ("Nano-on-Nano-on-Micro" Particles or "NNm"™ Particles) and $NO_x$ Adsorption Components Lean $NO_x$ trapping materials may include micron-sized particles bearing a plurality of catalytic composite nanoparticles and a $NO_x$ adsorption component. For example, the catalytic composite nanoparticles (nano-on-nano particles) may be bonded to micron-sized carrier particles to produce composite micro/nanoparticles, referred to as "nano-on-nano-on-micro" particles or "NNm"™ particles. In some embodiments, the composite nanoparticles are bonded to the surface of the micron-sized particles. The catalytic composite nanoparticle includes catalyst nanoparticle (such as palladium, platinum, or a mixture thereof) and a nano-sized metal oxide (such as nano-sized cerium oxide, zirconium oxide, lanthanum oxide, or yttrium oxide). In some embodiments, the catalytic composite nanoparticle is configured to catalyze the oxidation of NO to $NO_2$. In some embodiments, a portion of the $NO_x$ adsorption component is attached to the micron-size carrier particle includes.

The micron-sized carrier particles can have an average size between about 1 micron and about 100 microns, such as between about 1 micron and about 10 microns, between about 3 microns and about 7 microns, or between about 4 microns and about 6 microns. In some embodiment the micron-sized carrier particle is one or more metal oxides, for example cerium oxide (for example, HSA5 particles available from Rhodia-Solvay, or the like); or a mixture of cerium oxide and zirconium oxide; or a mixture of cerium oxide and lanthanum oxide; or a mixture of cerium oxide and yttrium oxide; or a mixture of cerium oxide, zirconium oxide, and lanthanum oxide; or a mixture of cerium oxide, zirconium oxide, and yttrium oxide; or a mixture of cerium oxide, zirconium oxide, lanthanum oxide, and yttrium oxide. In some embodiments, the micron-sized carrier particle is about 20% to about 100% cerium oxide, about 40% to about 99% cerium oxide, about 50% to about 99% cerium oxide, about 70% to about 99% cerium oxide, about 80% to 99% cerium oxide, about 80% to about 90% cerium oxide, about 81% cerium oxide, about 82% cerium oxide, about 83% cerium oxide, about 84% cerium oxide, about 85% cerium oxide, about 86% cerium oxide, about 87% cerium oxide, about 88% cerium oxide, or about 89% cerium oxide. In some embodiments, the micron-sized carrier particle i about 0% to about 80% zirconium oxide, such as about 5% to about 15% zirconium oxide, about 15% to about 35% zirconium oxide, about 35% to about 55% zirconium oxide, about 55% to about 65% zirconium oxide, about 9% zirconium oxide, about 10% zirconium oxide, about 11% zirconium oxide, about 12% zirconium oxide, about 13% zirconium oxide, or about 14% zirconium oxide. In some embodiments, the micron-sized carrier particle is about 0% to about 15% lanthanum oxide, about 1% to about 10% lanthanum oxide, about 2% to about 8% lanthanum oxide, about 3% lanthanum oxide, about 4% lanthanum oxide, about 5% lanthanum oxide, about 6% lanthanum oxide, or about 7% lanthanum oxide. In some embodiments, the micron-sized carrier particle is about 0% to about 15% yttrium oxide, about 1% to about 10% yttrium oxide, about 2% to about 8% yttrium oxide, about 3% yttrium oxide, about 4% yttrium oxide, about 5% yttrium oxide, about 6% yttrium oxide, or about 7% yttrium oxide. For example, in some embodiments, the micron-sized carrier particle may be about 86% cerium oxide, about 10% zirconium oxide, and about 4% lanthanum oxide. In some embodiments, the micron-sized carrier particle may be about 86% cerium oxide, about 10% zirconium oxide, and about 4% yttrium oxide. In some embodiments, the micron-sized carrier particle may be about 40% cerium oxide, about 50% zirconium oxide, about 5% lanthanum oxide, and about 5% yttrium oxide.

In some embodiments, the micron-sized carrier particle is impregnated with a $NO_x$ adsorption component, for example barium oxide (BaO). In some embodiments, the micron-sized carrier particles are pre-treated with a $NO_x$ adsorption component prior to attachment of the catalytic composite nanoparticles. In some embodiments, the micron-sized carrier particles are treated with a $NO_x$ adsorption component after the attachment of the catalytic composite nanoparticles.

In some embodiments, the $NO_x$ adsorption component is itself a composite nanoparticle distinct from the catalytic composite nanoparticle. For example, in some embodiments the $NO_x$ adsorption component is composite nanoparticle with a $NO_x$ adsorption nanoparticle including one or more alkaline earth metal oxides (such as barium oxide) and a support metal oxide (such as cerium oxide). In some embodiments, the $NO_x$ adsorption component is a non-composite nanoparticle, for example an alkaline earth metal oxide nanoparticle (such as barium oxide). In some embodiments, the $NO_x$ adsorption component is dispersed throughout the micron-sized carrier particle, for example by using wet-chemistry techniques. In some embodiments, the NNm™ lean $NO_x$ tap particles may contain about 5 wt % to about 15 wt % barium oxide. In some embodiments, the NNm™ lean $NO_x$ trap particles may contain about 8 wt % about 12 wt % barium oxide. In some embodiments, the NNm™ lean $NO_x$ trap particles may contain about 9 wt % to about 11 wt % barium oxide particles. In some embodiments, the NNm™ lean $NO_x$ trap particles may contain about 10 wt % barium oxide.

In NNm™ particles included in lean $NO_x$ trapping material, catalytic composite nanoparticles are bonded to the micron-sized carrier particle. In some embodiments, the NNm™ particles comprise one or more platinum group metals, for example platinum and/or palladium. In embodiments with two or more platinum group metals, the metals may be in any ratio. In some embodiments, the catalytic nanoparticles comprise platinum group metal or metals, such as about 1:2 to about 100:1 Pt/Pd (weight/weight), 1:1 to about 50:1 Pt/Pd (weight/weight), about 2:1 to about 25:1 Pt/Pd (weight/weight), about 5:1 to about 15:1 Pt/Pd (weight/weight), about 6:1 Pt/Pd (weight/weight), about 7:1 Pt/Pd (weight/weight), about 8:1 Pt/Pd (weight/weight), about 9:1 Pt/Pd (weight/weight), about 10:1 Pt/Pd (weight/weight), about 11:1 Pt/Pd (weight/weight), about 12:1 Pt/Pd (weight/weight), about 13:1 Pt/Pd (weight/weight), about 14:1 Pt/Pd (weight/weight), or about 15:1 Pt/Pd (weight/weight).

In some embodiments, platinum group metals comprise about 0.001 wt % to about 5 wt % of the total NNm™ particle. For example, platinum group metals may comprise about 0.01 wt % to about 2 wt % of the total NNm™ particle, about 0.1 wt % to about 1 wt % of the total NNm™ particle, about 0.15 wt % of the total NNm™ particle, about 0.17 wt % of the total NNm™ particle, or about 0.2 wt % of the total NNm™ particle. In some embodiments, platinum group metals may comprise less than about 5 wt %, less than about 2 wt %, less than about 1 wt %, or less than about 0.5 wt % of the total NNm™ particle.

FIG. 1A illustrates one embodiment of a lean $NO_x$ trap particle 100 as an NNm™ particle with a catalytic composite nanoparticle and an alkaline earth metal oxide treated carrier particle. The lean $NO_x$ trap particle 100 includes a micron-sized carrier component 105 formed from one or more metal oxides, such as cerium oxide, zirconium oxide, lanthanum oxide, or yttrium oxide. In some embodiments, the micron-size carrier component 105 is porous. In some embodiments, the micron-sized carrier component 105 additionally includes a $NO_x$ adsorption component, such as one or more alkaline earth metal oxides (for example, barium oxide), dispersed throughout the carrier particle 105. The dispersion may be formed by, for example, wet-chemistry methods. The lean $NO_x$ trap particle 100 may also include a plurality of catalytic composite nanoparticles, which include a support nanoparticle 110 and a catalytic nanoparticle 115, bonded the micron-sized carrier particle 105. In some embodiments, the micron-sized carrier particle 105 may be porous and the catalytic composite nanoparticles may be bonded to the surface of the micron-sized carrier particle. The support nanoparticle 110 may include one or more metal oxides, for example cerium oxide, yttrium oxide, lanthanum oxide, or zirconium oxide. The catalytic nanoparticle 115 may include one or more catalytic metals, such as one or more platinum group metals, for example platinum or palladium. In some embodiments on lean $NO_x$ trapping materials, the $NO_x$ adsorption component may be provided separately from the carrier particle 105.

FIG. 1B illustrates another embodiment of a lean $NO_x$ trap particle 120 as an NNm™ particle with a catalytic composite nanoparticle and an $NO_x$ adsorption nanoparticle 140. The lean $NO_x$ trap particle 120 includes a micron-sized carrier component 125 formed from one or more metal oxides, such as cerium oxide, zirconium oxide, lanthanum oxide, or yttrium oxide. In some embodiments, the micron-sized carrier component 125 is porous. The lean $NO_x$ trap particle 120 may also include a plurality of catalytic composite nanoparticles, which include a support nanoparticle 130 and a catalytic nanoparticle 135, bonded to the micron-sized carrier particle 125. The support nanoparticle 130 may include one or more metal oxides, for example cerium oxide, aluminum oxide, yttrium oxide, lanthanum oxide, zirconium oxide, or titanium oxide. The catalytic nanoparticle 135 may include one or more catalytic metals, such as one or more platinum group metals, for example platinum or palladium. In some embodiments, the lean $NO_x$ trap particle 120 additionally comprises a plurality of $NO_x$ adsorption nanoparticle 140 formed from an alkaline earth metal oxide, for example barium oxide, bonded to the micron-sized carrier particle 125. In some embodiments, the micron-sized carrier particle 125 is additionally impregnated with an additional $NO_x$ adsorption component, such as one or more alkaline earth metal oxides (for example, barium oxide), deposited throughout the carrier particle 125, for example by wet-chemistry methods.

FIG. 1C illustrates another embodiment of lean $NO_x$ trap particle 145 as an NNm™ particle with a catalytic composite nanoparticle and a $NO_x$ adsorption composite nanoparticle. The lean $NO_x$ trap particle 145 includes a micron-sized carrier component 150 formed from one or more metal oxides, such as cerium oxide, zirconium oxide, lanthanum oxide, or yttrium oxide. In some embodiments, the micron-sized carrier component 150 is porous. The lean $NO_x$ trap particle 145 may also include a plurality of catalytic composite nanoparticles, which include a first support nanoparticle 155 and a catalytic nanoparticle 160, bonded to the micron-sized carrier particle 150. The first support nanoparticle 155 may include one or more metal oxides, for example cerium oxide, aluminum oxide, yttrium oxide, lanthanum oxide, zirconium oxide, or titanium oxide. The catalytic nanoparticle 160 may include one or more catalytic metals, such as one or more platinum group metals, for example platinum or palladium. In some embodiments, the lean $NO_x$ trap particle 145 may also include a plurality of $NO_x$ adsorption composite nanoparticles, which include a second support nanoparticle 165 and a $NO_x$ adsorption nanoparticle 170. In some embodiments, the second support nanoparticle 165 may include one or more metal oxides, for example cerium oxide, aluminum oxide, yttrium oxide, lanthanum oxide, zirconium oxide, or titanium oxide. In some embodiments, the first support nanoparticle 155 and the second support nanoparticle 165 are of the same composition, while in other embodiments, the first support nanoparticle 155 and the second support nanoparticle 165 are of different compositions. In some embodiments, the micron-sized carrier particle 150 is additionally impregnated with an additional $NO_x$ adsorption component such as one or more alkaline earth metal oxides (for example, barium oxide), deposited throughout the carrier particle 150, for example by wet-chemistry methods.

Similar NNm™ particles may be formed for other micron-sized catalysts, for example micron-sized oxidizing catalysts or reducing catalysts. In some embodiments, an oxidizing catalyst may include an oxidizing catalyst composite nanoparticle (for example, a platinum/palladium catalytic nanoparticle bonded to an aluminum oxide support nanoparticle) bonded to a micron-sized carrier particle (for example, an aluminum oxide micro-sized particle). In some embodiments, a reducing catalyst may include a reducing catalyst composite nanoparticle (for example, a rhodium catalytic nanoparticle bonded to a cerium oxide support nanoparticles) bonded to a micron-sized carrier particle (for example a micron-sized particle comprising one or more of cerium oxide, zirconium oxide, lanthanum oxide, or yttrium oxide). In some embodiments, oxidizing NNm™ particles may be further impregnated by a $NO_x$ adsorption component, for example barium oxide, formed by wet-chemistry methods, composite nanoparticles or non-composite nanoparticles. In some embodiments, reducing NNm™ particles may be further impregnated by a $NO_x$ adsorption component, for example barium oxide, formed by wet-chemistry methods, composite nanoparticles or non-composite nanoparticles.

Production of Lean $NO_x$ Trapping Materials: Micron-Sized Carrier Particles Bearing Composite Catalytic Nanoparticles ("Nano-on-Nano-on-Micro" Particles or "NNm"™ Particles) and $NO_x$ Adsorption Components A NNm™ lean $NO_x$ trapping materials generally include a micron-sized carrier particle, a $NO_x$ adsorption component, and a catalytic composite nanoparticle. In some embodiments, the $NO_x$ adsorption component is dispersed throughout the micron-sized carrier particle. In some embodiments, the $NO_x$ adsorption component is a non-composite nanoparticle or a composite nanoparticle bonded to the micron-sized carrier particle, for example bonded to the surface of a micron-sized carrier particle. In some embodiments, a portion of the $NO_x$ adsorption component is not dispersed throughout the micron-sized carrier particle, but may be included elsewhere in the washcoat composition (such as a washcoat layer).

In some embodiments, the micron-sized carrier particles may be pre-treated with a $NO_x$ adsorption precursor, dried, and calcined, resulting in a $NO_x$ adsorption component dispersed throughout the micron-sized carrier particle. In some embodiments, the $NO_x$ adsorption component is dispersed throughout the micron-sized carrier particle by wet-chemistry. In some embodiments an alkaline earth metal salt, such as a barium salt (preferably barium acetate, however barium bromide, barium carbonate, barium chloride, barium chromate, barium cyclohexanebutyrate, barium fluoride, barium hydroxide, barium iodide, barium manganite, or barium perchlorate are contemplated) is dissolved in liquid (such as water) and applied to the micron-sized carrier particles. The pre-treated micron-sized carrier particles may then be dried, for example overnight in a convection oven, and calcined under conditions allowing the conversion of the alkaline earth metal salt to convert to an alkaline earth metal oxide (for example, under oxidizing conditions) by exposing the particle to elevated temperatures, such as to about 400° C. to about 1000° C., 450° C. to about 800° C., or 500° C. to about 700° C. Calcination of the alkaline earth metal salt treated micron-sized carrier particle allows the alkaline earth metal ions to convert to an alkaline earth metal oxide, forming a $NO_x$ adsorption component deposited throughout the micron-size carrier particle. In some embodiments, after the micron-sized carrier particle has been deposited by a $NO_x$ adsorption component, it may be bonded to the catalytic composite nanoparticles, in some embodiments, the micron-sized carrier particles may be treated with the $NO_x$ adsorption component precursor after the catalytic composite nanoparticles were bonded to the micron-sized carrier particle.

In some embodiments, an NNm™ particle may be prepared by suspending catalytic composite nanoparticles in a liquid (such as water), adjusting the pH of the suspension to between about 2 and about 7, between about 3 and about 5, or about 4 to form a suspension. The pH may be adjusted, for example by using acetic acid or another organic acid. Optionally one or more surfactants and/or dispersants may be added to the suspension (or, alternatively, adding the surfactants to the water before suspending the composite nanoparticles in the liquid). Surfactants suitable for use include Jeffsperse® X3202 (Chemical Abstracts Registry No. 68123-18-2, described as 4,4'-(1-methylethylidene)bisphenol polymer with 2-(chloromethyl)oxirane, 2-methyloxirane, and oxirane), Jeffsperse® X3204, and Jeffsperse® X3503 surfactants from Huntsman (JEFFSPERSE is a registered trademark of Huntsman Corporation, The Woodlands, Tex., United States of America for chemical s for use as dispersants and stabilizers), which are non-ionic polymeric dispersants. Other suitable surfactants include Solsperse® 24000 and Solsperse® 46000 from Lubrizol (SOLSPERSE is a registered trademark of Lubrizol Corporation, Derbyshire, United Kingdom for chemical dispersing agents). The surfactant may be added in a range, for example, of about 0.5% to about 5%, with about 2% being a typical value. In some embodiments, $NO_x$ adsorption non-composite nanoparticles or $NO_x$ composite nanoparticles may be suspended in the same or different suspension. In some embodiments, the suspension is sonicated to ensure even distribution of the particles. The suspension of catalytic composite nanoparticles is then applied to micron-sized metal oxide particles to the point of incipient wetness, thereby impregnating the micron-sized particles with catalytic composite nanoparticles. The resulting wet powder may then be dried and calcined, resulting in NNm™ particles.

FIG. 2 illustrates one method of creating NNm™ lean $NO_x$ trap particles. At step 210, micron-sized carrier particles, for example micron-sized metal oxide particles (such as particles containing one or more of cerium oxide, zirconium oxide, lanthanum oxide, or yttrium oxide) are treated with a barium salt solution (such as barium acetate). The resulting barium salt treated particles are then dried, step 220, and calcined, step 230, yielding micron-sized carrier particles impregnated by barium oxide.

Separately, composite catalytic nanoparticles (for example, platinum/palladium nanoparticles bonded to cerium oxide support nanoparticles) are suspended in a liquid, such as water at step 240. At step 250, a surfactant may be added to the suspension and the pH may be adjusted as necessary (for example, to a pH of about 4 using acetic acid). At step 260, the suspension is sonicated to ensure approximately even dispersion of the composite nanoparticles.

At step 270, the suspension of composite nanoparticles is then slowly added to the barium oxide impregnated micron-sized carrier particles to the point of incipient wetness. The damp micron-sized particles are then dried, at step 280, and calcined, at step 290. The resulting NNm™ lean $NO_x$ trap particles may then be used in washcoats, LNT systems, or other applications such as those described herein.

Figure 3:
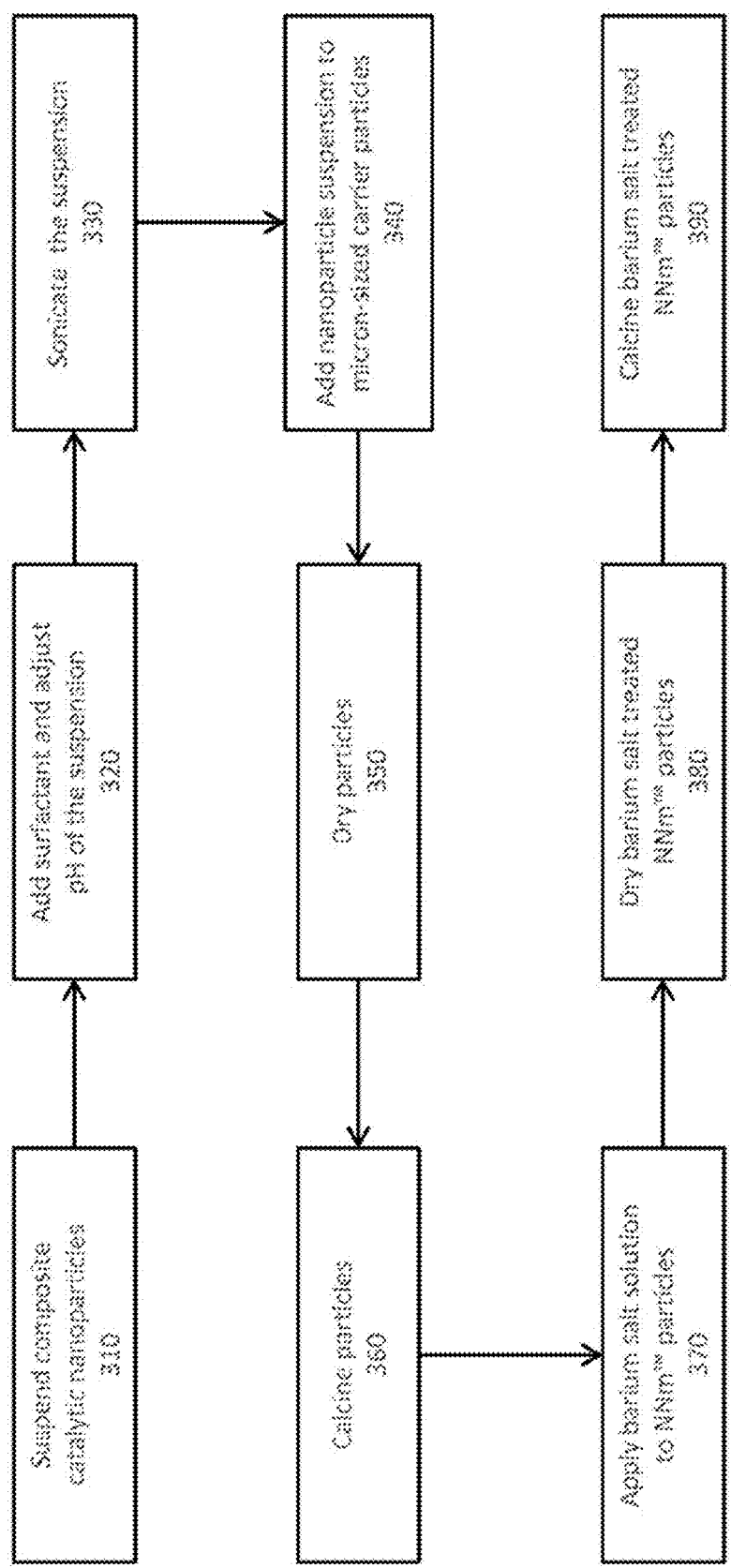
FIG. 3 illustrates another embodiment of a method of producing lean $NO_x$ trap particles in the NNm™ configuration.

FIG. 3 illustrates another method of creating NNm™ lean $NO_x$ trap particles. At step 310, composite catalytic nanoparticles (for example, platinum/palladium nanoparticles bonded to cerium oxide support nanoparticles) are suspended in an aqueous solution (such as water). At step 320, a surfactant may be added to the suspension and the pH may be adjusted as necessary (for example, to a pH of about 4 using acetic acid). At step 330, the suspension is sonicated to ensure approximately even dispersion of the composite nanoparticles.

At step 340, the suspension of composite nanoparticles is slowly added to the micron-sized carrier particles (for example, particles containing cerium oxide, zirconium oxide, lanthanum oxide, and/or yttrium oxide) to the point of incipient wetness. The damp micron-sized particles are then dried, at step 350, and calcined, at step 360. The resulting particles are micron-sized carrier particles with composite catalytic particles bonded to the carrier particle (i.e., NNm™ particles). In some embodiments, these NNm™ particles may be added to a washcoat composition before further addition of the $NO_x$ adsorption component (or precursor). In some embodiments, the $NO_x$ adsorption component is added to the NNm™ particles before being added to a washcoat composition.

At step 370, a $NO_x$ adsorption precursor, for example a barium salt (such barium acetate) solution is added to the NNm™ particles. The particles can then be dried, at step 380, and calcined, at step 390, thereby producing NNm™ lean $NO_x$ trap particles. The calcination process oxidizing the barium acetate salt to yield barium oxide $NO_x$ adsorption components on the NNm™ particles.

Figure 4:
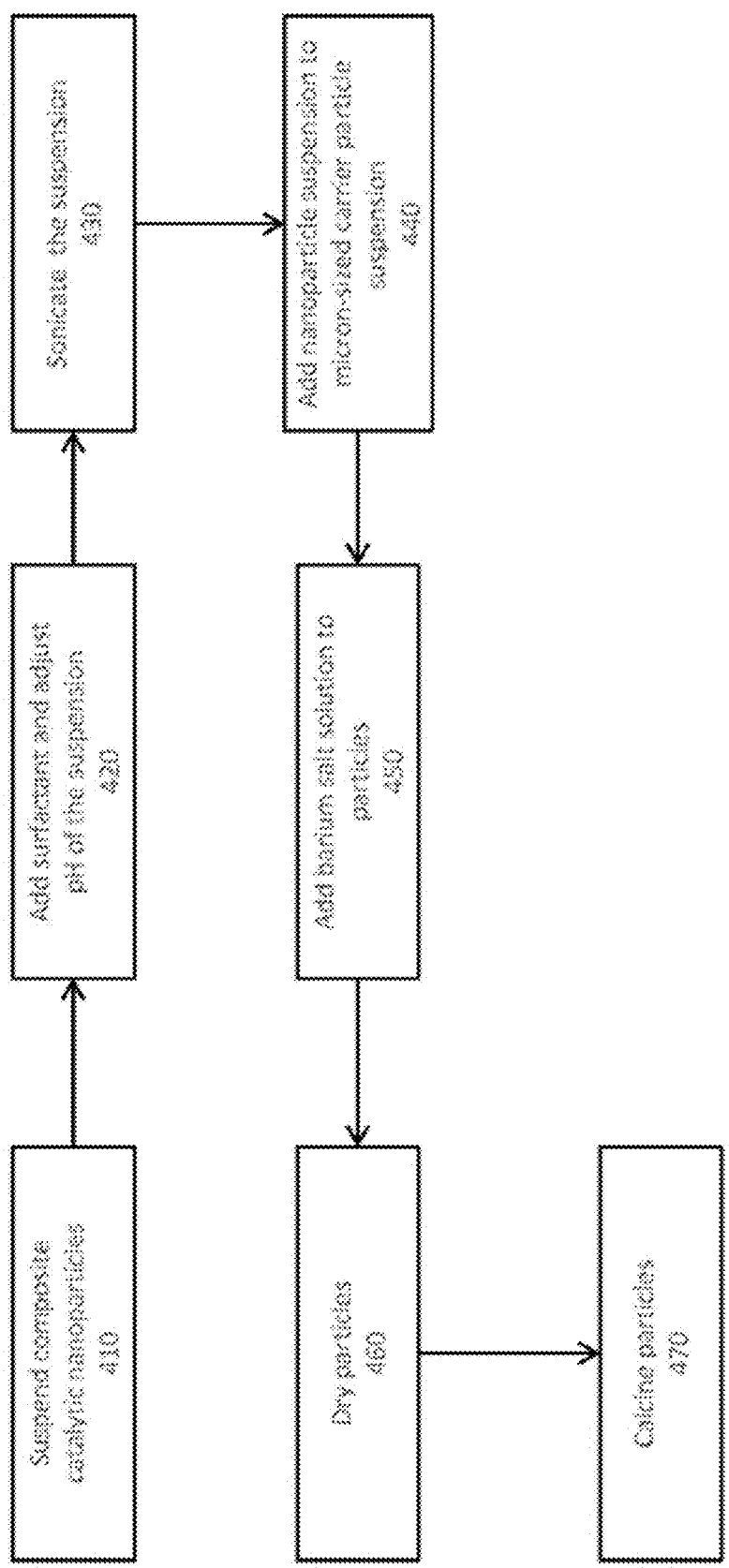
FIG. 4 illustrates one embodiment of a method of producing lean $NO_x$ trapping materials including NNm™ particles.

FIG. 4 illustrates another method of forming lean $NO_x$ trapping materials including NNm™ particles. At step 410, composite catalytic nanoparticles (for example, platinum/palladium nanoparticles bonded to cerium oxide support nanoparticles) are suspended in an aqueous solution or water. At step 420, a surfactant may be added to the suspension and the pH may be adjusted as necessary (for example, to a pH of about 4 using acetic acid). At step 430, the suspension is sonicated to ensure approximately even dispersion of the composite nanoparticles.

At step 440, the suspension of composite nanoparticles is mixed with a suspension comprising micron-sized carrier particles (for example, particles containing cerium oxide, zirconium oxide, lanthanum oxide, and/or yttrium oxide). At step 450, an alkaline earth metal salt (such as a barium salt, such as barium acetate) solution is added the particle mixture. At this step, in some embodiments, additional compositions may be optionally added to the mixture as desired. For example, in some embodiments, boehmite may optionally be added to the suspension to be used as a washcoat slurry. In some embodiments, the washcoat slurry may be coated onto a substrate.

At step 460, the lean $NO_x$ trapping materials can be dried, and, at step 470, the particles may be calcined, thereby simultaneously or approximately simultaneously bonding the composite nanoparticles to the micron-sized particles and converting the alkaline earth metal salt to an alkaline earth metal oxide.

Lean $NO_x$ Trapping Materials: Micron-Sized Carrier Particles Embedded with Composite Catalytic Nanoparticles ("Nano-on-Nano-in-Micro" Particles or "NNiM" Particles) and $NO_x$ Adsorption Components In some embodiments, a lean $NO_x$ trapping materials may include a micron-sized particle with a porous carrier formed around and surrounding a plurality of catalytic composite nanoparticles, and further contain a $NO_x$ adsorption component. In this configuration, the carrier bridges together the catalytic composite nanoparticles, thereby embedding the nanoparticles within the porous carrier. For example, a carrier may be formed around the catalytic composite nanoparticles (nano-on-nano particles) and micron-sized, resulting in micron-sized particles referred to as "nano-on-nano-in-micro" particles or "NNiM" particles, which are catalytically active particles. The catalytic composite nanoparticle includes catalyst nanoparticle (such as palladium, platinum, or a mixture thereof) and a nano-sized metal oxide (such as nano-sized cerium oxide). In some embodiments, the catalytic composite nanoparticle is configured to catalyze the oxidation of NO. In some embodiments, the NNiM particle includes a $NO_x$ adsorption component, for example an alkaline earth metal oxide.

In typical NNiM lean $NO_x$ trap particle, a porous material (or matrix) may be formed around and surround nanoparticles or composite nanoparticles produced by plasma production or other methods. The porous material bridges together the surrounded nanoparticles or composite nanoparticles, thereby embedding the particles within the matrix. The porous material may then serve as a carrier for the composite nanoparticles, allowing gases and fluids to slowly flow throughout the porous material (i.e., the interconnected bridges) via the interconnected channels. The high porosity of the carrier results in a high surface area within the carrier allowing increased contact of the gases and fluids with the contained catalytic components, such as composite nanoparticles.

The micron-sized NNiM particles can have an average size between about 1 micron and about 100 microns, such as between about 1 micron and about 10 microns, between about 3 microns and about 7 microns, or between about 4 microns and about 6 microns.

In some embodiments, the carrier portion of the NNiM particles includes a porous metal oxide (such as one or more of cerium oxide, zirconium oxide, lanthanum oxide, or yttrium oxide) that contains a large number of interconnected pores, holes, channels, or pits, with an average pore, hole, channel, or pit width (diameter) ranging from 1 nm to about 200 nm, or about 1 nm to about 100 nm, or about 2 nm to about 50 nm, or about 3 nm to about 25 nm. In some embodiments, the porous carrier portion has a mean pore, hole, channel, or pit width (diameter) of less than about 1 nm, while in some embodiments the carrier portion has a mean pore, hole, channel, or pit width (diameter) of greater than about 100 nm. In some embodiments, the carrier portion has an average pore surface area in a range of about 50 $m^2/g$ to about 500 $m^2/g$. In some embodiments, the carrier portion has an average pore surface area in a range of about 100 $m^2/g$ to about 400 $m^2/g$. In some embodiments, a carrier portion has an average pore surface area in a range of about 150 $m^2/g$ to about 300 $m^2/g$. In some embodiments, the carrier portion has an average pore surface area of less than about 50 $m^2/g$. In some embodiments, the carrier portion has an average pore surface area of greater than about 200 $m^2/g$. In some embodiments, the carrier portion has an average pore surface area of greater than about 300 $m^2/g$. In some embodiments, a carrier portion has an average pore surface area of about 200 $m^2/g$. In some embodiments, a carrier portion has an average pore surface area of about 300 $m^2/g$.

In some embodiments the carrier portion of the NNiM particle is one or more porous metal oxides, for example cerium oxide; a mixture of cerium oxide and zirconium oxide; a mixture of cerium oxide and lanthanum oxide; a mixture of cerium oxide and yttrium oxide; a mixture of cerium oxide, zirconium oxide, and lanthanum oxide; a mixture of cerium oxide, zirconium oxide, and yttrium oxide; or a mixture of cerium oxide, zirconium oxide, lanthanum oxide, and yttrium oxide. In some embodiments, the carrier portion of the NNiM particle is about 20% to about 100% cerium oxide, about 40% to about 99% cerium oxide, about 50% to about 99% cerium oxide, about 70% to about 99% cerium oxide, about 80% to 99% cerium oxide, about 80% to about 90% cerium oxide, about 81% cerium oxide, about 82% cerium oxide, about 83% cerium oxide, about 84% cerium oxide, about 85% cerium oxide, about 86% cerium oxide, about 87% cerium oxide, about 88% cerium oxide, or about 89% cerium oxide. In some embodiments, the carrier portion of the NNiM particle is about 0% to about 80% zirconium oxide, such as about 5% to about 15% zirconium oxide, about 15% to about 35% zirconium oxide, about 35% to about 55% zirconium oxide, or about 55% to about 65% zirconium oxide, about 9% zirconium oxide, about 10% zirconium oxide, about 11% zirconium oxide, about 1'2% zirconium oxide, about 13% zirconium oxide, or about 14% zirconium oxide. In some embodiments, the carrier portion of the NNiM particle is about 0% to about 15% lanthanum oxide, about 1% to about 10% lanthanum oxide, about 2% to about 8% lanthanum oxide, about 3% lanthanum oxide, about 4% lanthanum oxide, about 5% lanthanum oxide, about 6% lanthanum oxide, or about 7% lanthanum oxide. In some embodiments, the carrier portion of the NNiM particle is about 0% to about 15% yttrium oxide, about 1% to about 10% yttrium oxide, about 2% to about 8% yttrium oxide, about 3% yttrium oxide, about 4% yttrium oxide, about 5% yttrium oxide, about 6% yttrium oxide, or about 7% yttrium oxide. For example, in some embodiments, the carrier portion of the NNiM particle may be about 86% cerium oxide, about 10% zirconium oxide, and about 4% lanthanum oxide. In some embodiments, the carrier portion of the NNiM particle may be about 86% cerium oxide, about 10% zirconium oxide, and about 4% yttrium oxide. In some embodiments, the carrier portion of the NNiM particle may be about 40% cerium oxide, about 50% zirconium oxide, about 5% lanthanum oxide, and about 5% yttrium oxide.

In some embodiments, the carrier portion of the NNiM particle includes a $NO_x$ adsorption component, for example an alkaline earth metal oxide, (such as barium oxide). In some embodiments, a $NO_x$ adsorption component is included during the preparation of the NNiM particles. In some embodiments, a $NO_x$ adsorption component can be added to the formed NNiM particles. In some embodiments, the $NO_x$ adsorption component is itself a composite nanoparticle distinct from the catalytic composite nanoparticle. For example, in some embodiments the $NO_x$ adsorption component is composite nanoparticle with a catalytic nanoparticle including one or more platinum group metals (such as platinum and palladium) and a metal oxide (such as barium oxide). In some embodiments, the $NO_x$ adsorption component is a non-composite nanoparticle, for example a metal oxide nanoparticle (such as barium oxide). Such a non-composite metal oxide nanoparticle may be made by plasma generated methods or any other method known in the art. In some embodiments, the $NO_x$ adsorption component is dispersed throughout the carrier portion of the NNiM particle, for example by using wet-chemistry techniques or by including the $NO_x$ adsorption component (or precursor) during the formation of the NNiM particles. In some embodiments, the NNiM particles may contain about 5 wt % to about 15 wt % barium oxide, about 8 wt % about 12 wt % barium oxide, about 9 wt % to about 11 wt % barium oxide, or about 10 wt % barium oxide.

In some embodiments, platinum group metals comprise about 0.001 wt % to about 5 wt % of the NNiM particles. For example, platinum group metals may comprise about 0.01 wt % to about 2 wt % of the NNiM particle, about 0.1 wt % to about 1 wt % of the NNiM particle, about 0.15 wt % of the total NNiM particle, about 0.17 wt % of the NNiM particle, or about 0.2 wt % of the NNiM particle. In some embodiments, platinum group metals may comprise less than about 5 wt %, less than about 2 wt %, less than about 1 wt %, or less than about 0.5 wt % of the NNiM particle.

In some embodiments, the NNiM particles comprise one or more platinum group metals. In embodiments with two or more platinum group metals, the metals may be in any ratio. In some embodiments, the catalytic nanoparticles comprise platinum group metal or metals, such as about 1:2 to about 100:1 Pt/Pd (weight/weight), 1:1 to about 50:1 Pt/Pd (weight/weight), about 2:1 to about 25:1 Pt/Pd (weight/weight), about 5:1 to about 15:1 Pt/Pd (weight/weight), about 6:1 Pt/Pd (weight/weight), about 7:1 Pt/Pd (weight/weight), about 8:1 Pt/Pd (weight/weight), about 9:1 Pt/Pd (weight/weight), about 10:1 Pt/Pd (weight/weight), about 11:1 Pt/Pd (weight/weight), about 12:1 Pt/Pd (weight/ weight), about 13:1 Pt/Pd (weight/weight), about 14:1 Pt/Pd (weight/weight), or about 15:1 Pt/Pd (weight/weight).

In some embodiments, catalytic components and $NO_x$ adsorption components (such as when the $NO_x$ adsorption component is a nanoparticle or composite nanoparticle not introduced by wet chemistry methods) may be embedded within a porous carrier by including the particles in a gel precursor, polymerizing the gel, drying and calcining the material, and grinding or milling the resulting gel into micron-sized particles. Gel formation around the included nanoparticles results in the nanoparticles distributed throughout the carrier material. In another embodiment, nano-sized particles of a carrier precursor may be co-precipitated with catalytic composite nanoparticles or nano-sized $NO_x$ adsorption components. A nano-sized combustible material, for example amorphous carbon, may be included in the co-precipitation so that upon calcination, the combustible material is exhausted, resulting in a porous carrier. The resulting NNiM particles may be used, for example, in washcoats, catalytic converters, or other application as described herein.

FIG. 5A illustrates one embodiment a lean $NO_x$ trap particle 500 as an NNiM particle with a porous carrier component 505, which includes a $NO_x$ adsorption component, formed around or surrounding a plurality of catalytic composite nanoparticles. The carrier component 505 may also bridge the nanoparticles together through interconnected linkages. The porous carrier component 505 is formed from one or more metal oxides, such as cerium oxide, zirconium oxide, lanthanum oxide, or yttrium oxide. The $NO_x$ adsorption component may be one or more alkaline earth metal oxides (for example, barium oxide), deposited throughout the carrier component 505. This impregnation may be formed by, for example, wet-chemistry methods or by including the $NO_x$ adsorption component (or precursor) during the formation of the carrier. The lean $NO_x$ trap particle 500 may also include a plurality of catalytic composite nanoparticles, which include a support nanoparticle 510 and a catalytic nanoparticle 515, distributed throughout the porous carrier component 505. The support nanoparticle 510 may include one or more metal oxides, for example cerium oxide, yttrium oxide, lanthanum oxide, or zirconium oxide. The catalytic nanoparticle 515 may include one or more catalytic metals, such as one or more platinum group metals, for example platinum or palladium. In some embodiments, lean $NO_x$ trapping materials may be formed using similar NNiM particles as described herein, but where the $NO_x$ adsorption component is provided separately from the NNiM particle. In such an embodiment, a portion of the $NO_x$ adsorption component may not be attached to the NNiM particle.

FIG. 5B illustrates another embodiment of a lean $NO_x$ trap particle 520 as an NNiM particle with a plurality of catalytic composite nanoparticles and a plurality of $NO_x$ adsorption non-composite nanoparticles distributed throughout a porous carrier component 525. The porous carrier component 525 is formed from one or more metal oxides, such as cerium oxide, zirconium oxide, lanthanum oxide, or yttrium oxide. The NNiM lean $NO_x$ trap particle 520 may include a plurality of catalytic composite nanoparticles, which include a support nanoparticle 530 and a catalytic nanoparticle 535, distributed throughout the porous carrier component 525. The support nanoparticle 530 may include one or more metal oxides, for example cerium oxide, yttrium oxide, lanthanum oxide, or zirconium oxide. The catalytic nanoparticle 535 may include one or more catalytic metals, such as one or more platinum group metals, for example platinum or palladium. The $NO_x$ adsorption non-composite nanoparticles 540 may be one or more alkaline earth metal oxides (for example, barium oxide) and are distributed throughout the porous carrier 525.

FIG. 5C illustrates another embodiment of a lean $NO_x$ trap particle 545 as an NNiM particle with a porous carrier component 550 formed around a plurality of catalytic composite nanoparticles and a plurality of $NO_x$ adsorption composite nanoparticles. The porous carrier component 550 is formed from one or more metal oxides, such as cerium oxide, zirconium oxide, lanthanum oxide, or yttrium oxide. The lean $NO_x$ trap particle 545 may include a plurality of catalytic composite nanoparticles, which include a first support nanoparticle 555 and a catalytic nanoparticle 560, distributed throughout the porous carrier component 550. The first support nanoparticle 555 may include one or more metal oxides, for example cerium oxide, yttrium oxide, lanthanum oxide, or zirconium oxide. The catalytic nanoparticle 560 may include one or more catalytic metals, such as one or more platinum group metals, for example platinum or palladium. The $NO_x$ adsorption composite nanoparticles include a second support nanoparticle 565 and a $NO_x$ adsorption nanoparticle 570. The second support nanoparticle 565 may include one or more metal oxides, for example cerium oxide, yttrium oxide, lanthanum oxide, or zirconium oxide. The $NO_x$ adsorption nanoparticle 570 may be one or more alkaline earth metal oxides (for example, barium oxide) and are distributed throughout the porous carrier 550.

Production of Lean $NO_x$ Trapping Materials: Micron-Sized Carrier Particles Embedded with Composite Catalytic Nanoparticles ("Nano-on-Nano-in-Micro" Particles or "NNiM" Particles) and $NO_x$ Adsorption Components NNiM lean $NO_x$ trapping materials may include a micron-sized carrier particle embedded with a plurality of catalytic composite nanoparticles. In some embodiments, the NNiM lean $NO_x$ trapping materials include a $NO_x$ adsorption component, for example an alkaline earth metal oxide. In some embodiments, the $NO_x$ adsorption component is a composite nanoparticle or a non-composite nanoparticle. In some embodiments, the $NO_x$ adsorption component is distributed throughout the porous carrier component. In some embodiments, a portion of the $NO_x$ adsorption component is not dispersed throughout the micron-sized carrier particle, but may be included elsewhere in the washcoat composition (such as a washcoat layer).

In some embodiments, a NNiM particles may be produced by forming a suspension of composite catalytic nanoparticles with a porous material precursor solution. In some embodiments, the suspension of composite catalytic nanoparticles may further include composite $NO_x$ adsorption nanoparticles or non-composite $NO_x$ adsorption nanoparticles. In some embodiments, the porous material precursor solution may include a $NO_x$ adsorption component or $NO_x$ adsorption component precursors (such as an alkaline earth metal salt). In some embodiments, a $NO_x$ adsorption component precursor can be added to pre-formed NNiM particles. Upon solidification of the porous material with the mixture, such as by polymerization, precipitation, or freeze-drying, the material will form around the catalytic composite nanoparticles, resulting in a catalytic material comprising catalytic composite nanoparticles distributed throughout. In some embodiments, this precursor material may include a combustible component and a non-combustible component. In some embodiments, the material may be dried and calcined, resulting in the combustion and exhaustion of the combustible component. The resulting catalytic material is a porous carrier surrounding the catalytic composite nanoparticles, wherein the porous carrier bridges together the nanoparticles. In some embodiments, the catalytic material is then processed, such as by grinding or milling, into a micron-sized powder, resulting in NNiM particles.

For typical NNiM particles, suspended catalytic composite nanoparticles are mixed with a gel activation solution and a carrier precursor solution. In some embodiments, the gel activation solution induces polymerization of the carrier precursor solution components, resulting in the catalytic composite nanoparticles surrounded by a carrier gel. In some embodiments, the carrier precursor solution includes a combustible component (for example, resorcinol) and a non-combustible component (such as a metal salt). In some embodiments, the resulting gel can be dried and calcined, resulting in the combustion of a combustible component. In some embodiments, upon exhaustion of the combustible components the resulting carrier is a porous metal oxide formed around composite catalytic nanoparticles.

For typical NNiM particle formation, catalytic composite nanoparticles are initially suspended in ethanol. In some embodiments, at least 95 vol % ethanol is used. In other embodiments, at least 99 vol % ethanol is used. In still other embodiments, at least 99.9 vol % ethanol is used. Dispersants and/or surfactants are typically added to the ethanol before suspension of the composite nano-particles. A suitable surfactant includes DisperBYK®-145 (and others of the family) from BY K-Chemie GmbH LLC, Wesel, which can be added in a range of about 2 wt % to about 12 wt %, with about 7 wt % being a typical value, and dodecylamine, which can be added in a range of about 0.25 wt % to about 3 wt % with about 1 wt % being a typical value. In some embodiments, both DisperBYK®-145 and dodecylamine are used at about 7 wt % and 1 wt %, respectively. In some embodiments, the mixture of ethanol, composite nano-particles, and surfactants and/or dispersants is sonicated to uniformly disperse the composite nano-particles. The quantity of composite nanoparticles particles in the dispersion is usually in the range of about 5 wt % to about 20 wt %. In some embodiments, composite $NO_x$ adsorbing nanoparticles or non-composite $NO_x$ adsorbing nanoparticles may be added to the catalytic composite nanoparticle suspension. In some embodiments, a $NO_x$ adsorption precursor, for example a barium salt (such as barium acetate) is added to the composite nanoparticle suspension.

Separately from the composite nanoparticle suspension, a gel activation solution is prepared by mixing formaldehyde and propylene oxide. The formaldehyde is preferably in an aqueous solution. In some embodiments, the concentration of the aqueous formaldehyde solution is about 5 wt % to about 50 wt % formaldehyde, about 20 wt % to about 40 wt % formaldehyde, or about 30 wt % to about 40 wt % formaldehyde. Preferably, the aqueous formaldehyde is about 37 wt % formaldehyde. In some embodiments, the aqueous formaldehyde may contain about 5 wt % to about 15 wt % methanol to stabilize the formaldehyde in solution. The aqueous formaldehyde solution can be added in a range of about 25% to about 50% of the final weight of the gel activation solution, with the remainder being propylene oxide. Preferably, the gel activation solution comprises 37.5 wt % of the aqueous formaldehyde solution (which itself comprises 37 wt % formaldehyde) and 62.5 wt % propylene oxide, resulting in a final formaldehyde concentration of about 14 wt % of the final gel activation solution.

Separately from the composite nanoparticle suspension and gel activation solution, a carrier precursor solution is produced by dissolving a carrier precursor salt in a mixture of resorcinol and ethanol. The composition of the carrier precursor may be altered to achieve the desired metal oxide materials and proportions. For example, in some embodiments, cerium chloride, cerium nitrate, or cerium acetate may be used to form a cerium oxide carrier. Similarly, in some embodiments, zirconium oxynitrate may be included to form a zirconium oxide carrier, or lanthanum acetate may be included to form a lanthanum oxide carrier, or yttrium nitrate may be included to form a yttrium nitrate carrier. In some embodiments, more than one type of carrier precursor can be used to produce the desired carrier. For example, in some embodiments, a mixture of cerium nitrate and zirconium oxynitrate may be used, or a mixture of cerium nitrate, zirconium oxynitrate and lanthanum acetate may be used, or a mixture of cerium nitrate, zirconium oxynitrate, and yttrium nitrate may be used, or a mixture of cerium nitrate, zirconium oxynitrate, lanthanum acetate, and yttrium nitrate may be used. Other carrier precursors are contemplated. Resorcinol can be added to the carrier precursor solution at a range of about 10 wt % to about 30 wt %, with about 23 wt % being a typical value. The carrier precursor salt can be added at a range of about 2 wt % to about 12 wt %, with about 7 wt % being a typical value.

The composite nanoparticle suspension, gel activation solution, and carrier precursor solution can be mixed together at a ratio from of about 100:10:10 to about 100:40:40, or about 100:20:20 to about 100:30:30, or about 100:25:25, in terms of (weight of catalytic composite nanoparticle suspension):(weight of gel activation solution): (weight of carrier precursor solution). The final mixture will begin to polymerize into a porous gel embedded with the catalytic composite nanoparticles and, in some embodiments, $NO_x$ adsorption precursors (if included in any prior solution. The carrier comprises a combustible component, an organic gel, and a non-combustible component, metal oxide. The resulting carrier may then be dried (for example, at about 30° C. to about 95° C., preferably about 50° C. to about 60° C., at atmospheric pressure or at reduced pressure such as from about 1 pascal to about 90,000 pascal, for about one day to about 5 days, or for about 2 days to about 3 days). After drying, the resulting gel may then be calcined (at elevated temperatures, such as from 400° C. to about 700° C., preferably about 500° C. to about 600° C., more preferably at about 540° C. to about 560° C., still more preferably at about 550° C. to about 560° C., or at about 550° C.; at atmospheric pressure or at reduced pressure, for example, from about 1 pascal to about 90,000 pascal, in ambient atmosphere or under an inert atmosphere such as nitrogen or argon) to yield a composite gel comprising a porous metal oxide carrier formed around and surrounding composite catalytic nanoparticles.

When the composite gel is calcined under ambient atmosphere or other oxygenated conditions, organic material, such as polymerized resorcinol, formaldehyde, or propylene oxide, is burnt off, resulting in a substantially pure metal oxide porous carrier embedded with composite catalytic nanoparticles. In some embodiments, calcination under oxidizing conditions results in the conversion of the $NO_x$ adsorption precursor alkaline earth metal salts to form $NO_x$ adsorption components. For example, in some embodiments, barium acetate would be oxidized to form barium oxide dispersed throughout the resulting porous gel. The resulting gel can be processed, such as by grinding or milling, into a micron-sized powder of NNiM. In some embodiments, for example when no $NO_x$ adsorption component or component precursor was added during the formation of the NNiM particles, the NNiM particles may be treated with a $NO_x$ adsorption component precursor, for example a barium salt solution (such as a barium acetate solution). The $NO_x$ adsorption component precursor may be added to the NNiM particles before or after the NNiM particles are used in other embodiments, for example in a washcoat composition. In some embodiments, upon drying and calcination of the $NO_x$ adsorption component precursor impregnated NNiM particles, the $NO_x$ adsorption component precursor may be oxidized to form a $NO_x$ adsorption component, for example barium oxide. The resulting NNiM lean $NO_x$ trap particles may be used, for example in a washcoat composition or a LNT system.

NNiM particles may also be formed by a co-precipitation method. In some embodiments of the co-precipitation method of forming NNiM particles, composite catalytic nanoparticles may be mixed with a dispersion comprising carrier metal oxide nanoparticles (such as one or more of cerium oxide nanoparticles, zirconium oxide nanoparticles, lanthanum oxide nanoparticles, or yttrium oxide nanoparticles), and amorphous carbon, such as carbon black. In some embodiments, a $NO_x$ adsorption component, such as composite $NO_x$ adsorption nanoparticles or non-composite $NO_x$ adsorption nanoparticles, may be included in the dispersion. The dispersed solid particles from the resulting dispersed colloid may be separated from the liquid by co-precipitation, dried, and calcined. Upon calcination of the solid material in an ambient or oxygenated environment, the amorphous carbon is exhausted. Simultaneously, the heat from the calcination process causes the metal oxide nanoparticles to sinter together, resulting in pores throughout the precipitated metal oxide. After calcination of the resulting material, the material may be ground, milled, or otherwise processed into micron-sized NNiM particles. In some embodiments, the NNiM particles may then be treated with a $NO_x$ adsorption precursor, such as a alkaline earth metal salt (for example, barium acetate), dried, and calcined, to form the final NNiM lean $NO_x$ trap particles.

In some embodiments of making the NNiM particles by the co-precipitation method, carrier metal oxide nanoparticles can be suspended in ethanol, water, or a mix of ethanol and water. Carbon black with an average grain size ranging from about 1 nm to about 200 nm, or about 20 nm to about 100 nm, or about 20 nm to about 50 nm, or about 35 nm, may be added to the carrier metal oxide nanoparticle suspension. In some embodiments, sufficient carbon black to obtain a pore surface area of about 50 $m^2/g$ to about 500 $m^2/g$ should be used, such as about 50 $m^2/g$, about 100 $m^2/g$, about 150 $m^2/g$, about 200 $m^2/g$, about 250 $m^2/g$, about 300 $m^2/g$, about 350 $m^2/g$, about 400 $m^2/g$, about 450 $m^2/g$, or about 500 $m^2/g$. Composite catalytic nanoparticles may be mixed into the dispersion of carrier metal oxide nanoparticles and carbon black. In some embodiments, a $NO_x$ adsorption component, such as composite $NO_x$ adsorption nanoparticles or non-composite $NO_x$ adsorption nanoparticles, may be included. In some embodiments, the composite nanoparticles are dispersed in a separate colloid, optionally with dispersants or surfactants, before being mixed with the dispersion comprising carrier metal oxide nanoparticles and carbon black. The pH of the resulting mixture can be adjusted to a range of about 2 to about 7, such as a pH of between about 3 and about 5, preferably a pH of about 4, allowing the particles to precipitate. The precipitant can be dried (for example, at about 30° C. to about 95° C., preferably about 50° C. to about 70° C., at atmospheric pressure or at reduced pressure such as from about 1 pascal to about 90,000 pascal, for about one day to about 5 days, or for about 2 days to about 3 days). After drying, the carrier may then be calcined (at elevated temperatures, such as from 400° C. to about 700° C., preferably about 500° C. to about 600° C., more preferably at about 540° C. to about 560° C., still more preferably at about 550° C. to about 560° C., or at about 550° C.; at atmospheric pressure or at reduced pressure, for example, from about 1 pascal to about 90,000 pascal, in ambient atmosphere). The calcination process causes the carbon black to substantially burn away and the metal oxide nanoparticles sinter together, yielding a porous metal oxide carrier formed around composite nanoparticles, or NNiM particles. The NNiM particles may be further processed by treating the particles with a $NO_x$ adsorption component precursor, such as an alkaline earth metal salt (such as barium acetate) in solution, drying the resulting wet powder, and calcining the powder to oxidize the $NO_x$ adsorption component precursor. The resulting particles are one embodiment of a NNiM lean $NO_x$ trap particle. In some embodiments, the NNiM particles may be included in a washcoat composition, which in some embodiments may further include a $NO_x$ adsorption material or $NO_x$ adsorption material precursor. In such embodiments, a portion of the $NO_x$ adsorption material may not attach to the NNiM particles.

NNm™ and NNiM Particles with Inhibited Migration of Platinum Group Metals

The NNm™ and NNiM particles including composite nanoparticles attached to a metal oxide carrier particle, where the composite nanoparticles are plasma-generated (for example, under reducing conditions), are particularly advantageous for use in catalytic converter and LNT system applications. The platinum group metal of the catalytic nanoparticle has a greater affinity for the metal oxide surface of the plasma-generated support nanoparticle than for the metal oxide surface of the micron-size carrier particle. Thus, at elevated temperatures, such as during the operation of a catalytic converter in a vehicle, neighboring plasma-generated catalytic nanoparticles bound to neighboring plasma-generated metal oxide support nanoparticles are less likely to migrate on the metal oxide micron-sized carrier particle surface and agglomerate. Since the larger agglomerations of the catalytic material have less surface area and are less effective as catalysts, the inhibition of migration and agglomeration provides a significant advantage for the NNm™ and NNiM particles. In contrast, palladium and platinum particles deposited on carriers by wet-chemical precipitation demonstrate higher mobility and migration, forming agglomerations of catalytic material and leading to decreased catalytic efficacy over time (that is, increased catalyst aging).

Oxygen-Storage Materials

In some embodiments, lean $NO_x$ trapping materials can contain an oxygen-storage material. An oxygen-storage material has oxygen-storage capacity with which the catalyst can accumulate oxygen when exhaust gas is in an oxygen-excess state (oxidative atmosphere), and releases the accumulated oxygen when exhaust gas is in an oxygen-deficient state (reductive atmosphere). With an oxygen-storage material, NO can be effectively oxidized to $NO_2$ by an oxidizing catalyst even in an oxygen-deficient state, as oxygen can be released from the oxygen storage component. In some embodiments the oxygen-storage materials may provide oxygen during system operation to enhance the oxidation of the $NO_x$ exhaust gases catalyzed by the catalytic composite nanoparticles. Preferably, the oxygen-storage material is a metal oxide micron-sized particle. In some embodiments the micron-sized particle is porous.

In some embodiments, the oxygen-storage material is a micron-sized metal oxide particle, for example cerium oxide. In some embodiments, the oxygen-storage material includes a mixture of metal oxides, for example one or more of cerium oxide, zirconium oxide, lanthanum oxide, or yttrium oxide. In some embodiments, the oxygen-storage material includes a mixture of cerium oxide and zirconium oxide; a mixture of cerium oxide, zirconium oxide, and lanthanum oxide; a mixture of cerium oxide, zirconium oxide, and yttrium oxide; or a mixture of cerium oxide, zirconium oxide, lanthanum oxide, and yttrium oxide. In some embodiments, the oxygen-storage material includes about 20% to about 100% cerium oxide, about 30% to about 90% cerium oxide, about 30% to about 50% cerium oxide, about 50% to about 80% cerium oxide, or about 70% to about 90% cerium oxide. In some embodiments, the oxygen-storage material includes about 0% to about 80% zirconium oxide, about 5% to about 65% zirconium oxide, about 5% to about 15% zirconium oxide, about 15% to about 25% zirconium oxide, about 25% to about 35% zirconium oxide, about 35% to about 45% zirconium oxide, or about 55% to about 65% zirconium oxide. In some embodiments, the oxygen-storage material includes 0% to about 15% lanthanum oxide, about 2% to about 12% lanthanum oxide, about 3% to about 6% lanthanum oxide, about 6% to about 12% lanthanum oxide, about 4% lanthanum oxide, about 5% lanthanum oxide, about 6% lanthanum oxide, about 7% lanthanum oxide, about 8% lanthanum oxide, about 9% lanthanum oxide, about 10% lanthanum oxide, or about 11% lanthanum oxide. In some embodiments, the oxygen-storage material includes 0% to about 15% yttrium oxide, about 2% to about 12% yttrium oxide, about 3% to about 6% yttrium oxide, about 6% to about 12% yttrium oxide, about 4% yttrium oxide, about 5% yttrium oxide, about 6% yttrium oxide, about 7% yttrium oxide, about 8% yttrium oxide, about 9% yttrium oxide, about 10% yttrium oxide, or about 11% yttrium oxide. In some embodiments, the oxygen-storage material includes about 80% to about 90% cerium oxide, about 5% to about 15% zirconium oxide, and about 3% to about 5% lanthanum oxide. In some embodiments, the oxygen-storage material includes about 80% to about 90% cerium oxide, about 5% to about 15% zirconium oxide, and about 3% to about 5% yttrium oxide. In some embodiments, the oxygen-storage material includes about 86% cerium oxide, about 10% zirconium oxide, and about 4% lanthanum oxide. In some embodiments, the oxygen-storage material includes about 86% cerium oxide, about 10% zirconium oxide, and about 4% yttrium oxide. In some embodiments, the oxygen-storage material includes about 30% to about 50% cerium oxide, about 40% to about 60% zirconium oxide, about 3% to about 15% lanthanum oxide. In some embodiments, the oxygen-storage material includes about 30% to about 50% cerium oxide, about 40% to about 60% zirconium oxide, about 3% to about 15% yttrium oxide. In some embodiments, the oxygen-storage material includes about 40% cerium oxide, about 50% zirconium oxide, and about 10% lanthanum oxide. In some embodiments, the oxygen-storage material includes about 40% cerium oxide, about 50% zirconium oxide, and about 10% yttrium oxide. In some embodiments, the oxygen-storage material includes about 30% to about 50% cerium oxide, about 40% to about 60% zirconium oxide, about 3% to about 6% lanthanum oxide, and about 3% to about 6% yttrium oxide. In some embodiments, the oxygen-storage material includes about 40% cerium oxide, about 50% zirconium oxide, about 5% lanthanum oxide, and about 5% yttrium oxide. An example micron-sized oxygen-storage particle that may be used is HSA5 (available from Rhodia-Solvay).

$NO_x$ Adsorption Materials $NO_2$ exhaust gas (or $NO_x$ exhaust gas catalyzed to $NO_2$ gas, for example by a composite catalyst described above) may be adsorbed during a lean-burn cycle and desorb during a rich-burn cycle. In some embodiments, the $NO_x$ adsorption material may be an alkaline earth metal oxide. Preferably the alkaline earth metal oxide is barium oxide (BaO), however beryllium oxide (BeO), calcium oxide (CaO), magnesium oxide (MgO), or strontium oxide (SrO) are also contemplated. In some embodiments, the $NO_x$ adsorption material may be nanoparticles, composite nanoparticles, micron-sized particles, or provided as an alkaline earth metal salt and converted into an alkaline earth metal oxide (which may, in some embodiments, be deposited on or attached to other lean $NO_x$ trapping materials).

In some embodiments, a $NO_x$ adsorption material may be formed from an alkaline earth metal salt (that is, a $NO_x$ adsorption material precursor). For example, in some embodiments a $NO_x$ adsorption material may be formed from a barium salt (preferably barium acetate, however barium bromide, barium carbonate, barium chloride, barium chromate, barium cyclohexanebutyrate, barium fluoride, barium hydroxide, barium iodide, barium manganite, and barium perchlorate are contemplated). In some embodiments, the alkaline earth metal salt may be converted to an alkaline earth metal oxide, for example by exposing the alkaline earth metal salt to ambient atmosphere at an elevated temperature, such as about 400° C. to about 1000° C., 450° C. to about 800° C., or 500° C. to about 700° C. In some embodiments, the alkaline earth metal salt may be included directly into a washcoat composition. In such an embodiment, the alkaline earth metal salt may be converted to an alkaline earth metal oxide during calcination of a coated substrate, as described below. In some embodiments, the alkaline earth metal salt is converted into the alkaline earth metal oxide before it is included in a washcoat composition.

In some embodiments a $NO_x$ adsorption material or $NO_x$ adsorption material precursor may be added directly to a washcoat composition, such as to a washcoat slurry, as a "loose ingredient." In some embodiments, the washcoat composition may also include oxygen-storage materials or catalytic composite nanoparticles in addition to the $NO_x$ adsorption material or $NO_x$ adsorption material precursor.

In some embodiments, a portion of the $NO_x$ adsorption material (or precursor) may be deposited onto a micron-sized particle, such as an oxygen-storage material particle. In some embodiments, the oxygen-storage material is provided separately from the $NO_x$ adsorption component (or precursor) before being mixed together, for example to form a washcoat composition (such as a slurry). In some embodiments, a portion of the $NO_x$ adsorption component is deposited onto the oxygen-storage material after it has been included in the washcoat composition. In some embodiments, a portion of the $NO_x$ adsorption component is not deposited onto the oxygen-storage material after it has been included in the washcoat composition.

In some embodiments, a portion the $NO_x$ adsorption material (or precursor) may be deposited onto a composite nanoparticle, such as onto the support nanoparticle of the composite nanoparticle. In some embodiments, a portion of the $NO_x$ adsorption component may be deposited onto or attached to the composite nanoparticle after it has been included in the washcoat composition, for example by including a $NO_x$ adsorption component precursor (for example, an alkaline earth metal salt) in the washcoat composition and allowing the $NO_x$ adsorption component precursor to convert into a $NO_x$ adsorption component, for example by drying and calcining a substrate coated with the washcoat composition. In some embodiments, a portion of the $NO_x$ adsorption material (or precursor) is not deposited onto or attached to the composite nanoparticles.

In some embodiments, an alkaline earth metal salt may be dissolved in a solvent, for example an aqueous solvent (such as water). In some embodiments, such as in the formation of a washcoat composition, the solution may then be mixed with a porous micron-sized metal oxide particle (such as an oxygen-storage material particle), which, in some embodiments, deposits a portion of the alkaline earth metal salt onto the metal oxide particle. In some embodiments, the particles may then be dried for example by heating at about 40° C. to about 80° C., or about 50° C. to about 70° C., or about 60° C. for about 10 h or more, about 16 hours or more, or about 24 hours or more. The particles may then be calcined (for example, after coating onto a substrate) thereby allowing the conversion of the alkaline earth metal salt into an alkaline earth metal oxide distributed throughout the micron-sized particle. Calcination may occur, for example, under ambient atmosphere at about 400° C. to about 1000° C., 450° C. to about 800° C., or 500° C. to about 700° C. for about 1 hour or more, about 2 hours or more, or about 6 hours or more.

In some embodiments, the $NO_x$ adsorption components may be micron-sized particles, nanoparticles, or composite nanoparticles added directly into a washcoat composition. Alkaline earth metal oxide nanoparticles may be produced by the plasma-based methods similar to those described above with respect to the composite nanoparticles. The alkaline earth metal oxide feed material can be fed into the into a plasma gun, where the material is vaporized. As the vapor cools, alkaline earth metal oxide nanoparticles are formed.

In some embodiments, the alkaline earth metal oxide nanoparticles have an average diameter of approximately 20 nm or less, or approximately 15 nm or less, or between approximately 10 nm and approximately 20 nm, that is, approximately 15 nm±5 nm, or between approximately 10 nm and approximately 15 nm, that is, approximately 12.5 nm±2.5 nm. In some embodiments, the alkaline earth metal oxide nanoparticles have a diameter of approximately 20 nm or less, or approximately 15 nm or less, or between approximately 10 nm and approximately 20 nm, that is, approximately 15 nm±5 nm, or between approximately 10 nm and approximately 15 nm, that is, approximately 12.5 nm±2.5 nm.

In some embodiments, the alkaline earth metal oxide micron particles have an average diameter of approximately 10 μm or less, or approximately 8 μm or less, or approximately 5 μm or less, or approximately 2 μm or less, or approximately 1.5 μm or less, or approximately 1 μm or less, or approximately 0.5 μm or less. In some embodiments, the alkaline earth metal oxide micron particles have an average diameter between approximately 6 μm and approximately 10 μm, that is, approximately 8 μm±2 μm, or between approximately 7 μm and approximately 9 μm in, that is, approximately 8 μm±1 μm. In some embodiments, the alkaline earth metal oxide micron particles have an average diameter between approximately 0.5 μm and approximately 2 μm, that is, approximately 1.25 μm±0.751 μm, or between approximately 1.0 μm and approximately 1.5 μm, that is, approximately 1.25 μm±0.25 μm.

Lean $NO_x$ Trap (LNT) Systems

In some embodiments, the lean $NO_x$ trapping materials described herein may be used in a lean $NO_x$ trap (LNT) system, such as on a catalytic converter. LNT systems may be formed by applying one or more washcoat compositions onto a substrate. In some embodiments, at least one washcoat composition applied to a substrate includes lean $NO_x$ trapping materials. In some embodiments, the $NO_x$ storage washcoat composition comprises micron-sized particles with catalytic components attached and $NO_x$ adsorption component precursors (such as an alkaline earth metal salt). In some embodiments, at least one washcoat composition applied to the substrate includes the catalytic composite nanoparticles, oxygen-storage materials and $NO_x$ adsorption materials (or precursors).

In some embodiments, hybrid washcoat compositions may be applied to substrate, for example a washcoat composition that includes both reducing catalysts and lean $NO_x$ trap particles (or other lean $NO_x$ trapping materials). In some embodiments, additional washcoat compositions may be applied to the substrate in addition to the $NO_x$ storage washcoat composition or a hybrid washcoat composition. For example, in some embodiments, a corner fill washcoat composition, oxidizing washcoat composition (including an oxidizing catalyst), or reducing washcoat composition (including a reducing catalyst) may be applied to the substrate. In some embodiments, washcoat compositions may include zeolite particles. In other embodiments, washcoat compositions are substantially free of zeolite particles. In some embodiments, two washcoat compositions are applied to a substrate. In some embodiments, three or more washcoat compositions are applied to a substrate. Preferably, the substrate is dried and calcined after the application of each washcoat composition.

Washcoat slurries may be coated onto substrates, dried, and calcined to produce washcoat layers. In some embodiments, a $NO_x$ storage washcoat slurry is coated onto a substrate, dried, and calcined to produce a $NO_x$ storage washcoat layer. Similarly, a corner fill washcoat slurry, a reducing washcoat slurry, an oxidizing washcoat slurry, or a hybrid washcoat slurry is coated onto a substrate, dried, and calcined to produce a corner fill washcoat layer, a reducing washcoat layer, an oxidizing washcoat layer, or a hybrid washcoat layer.

In some embodiments, the coated substrate may be used in a catalytic converter system or an exhaust system. In some embodiments, the lean $NO_x$ trapping materials may be used to reduce $NO_x$ emissions from an automobile. In some embodiments, the automobile may include a diesel engine or a gasoline engine, such as a lean-burn gasoline engine.

In the following descriptions, the percentages of the components of the washcoat compositions are provided in terms of the amount of solids present in the washcoat compositions, as the washcoat compositions can be provided in an aqueous suspension, as dry powder, or as a layer coated onto a substrate. The oxidizing washcoat layer (also described herein as the oxidizing catalyst-containing layer, oxidizing catalyst layer, or oxidizing layer) refers to the oxidizing-catalyst containing washcoat composition after it has been applied to the substrate, dried, and calcined. The reducing washcoat layer (also described herein as the reducing catalyst-containing layer, reducing catalyst layer, or reducing layer) refers to the reducing-catalyst containing washcoat composition after it has been applied to the substrate, dried, and calcined. The $NO_x$ storage washcoat layer (also described herein as the $NO_x$ storage layer or lean $NO_x$ trapping material-containing layer) refers to the lean $NO_x$ trapping material-containing washcoat composition after it has been applied to the substrate, dried, and calcined. Similarly, any other referenced washcoat layer refers to a washcoat composition after it has been applied to the substrate, dried, and calcined.

In some embodiments, a system may comprise one or more, two or more, or three or more coated substrates. In some embodiments, each coated substrate may be coated with one or more of a reducing catalytic washcoat layer, an oxidizing catalytic washcoat layer, or a $NO_x$ storage washcoat layer. In some embodiments, the coated substrates may be connected in series such that, for example, exhaust gas passes through a first coated substrate followed by a second coated substrate. For example, in some embodiments, an exhaust gas may be treated by first flowing through a substrate coated with a $NO_x$ storage washcoat layer, then second flowing through a substrate coated with an oxidizing catalyst washcoat layer, and then third flowing through a substrate coated with a reducing catalyst washcoat layer. In some embodiments, an exhaust gas may be treated by first flowing through a substrate coated with a $NO_x$ storage washcoat layer, then second flowing through a substrate coated with a reducing catalyst washcoat layer, and then third flowing through a substrate coated with an oxidizing catalyst washcoat layer.

Substrates and Coated Substrate Architecture

The initial substrate is preferably a catalytic converter substrate that demonstrates good thermal stability, including resistance to thermal shock, and to which the described washcoats can be affixed in a stable manner. Suitable substrates include, but are not limited to, substrates formed from cordierite or other ceramic materials, and substrates formed from metal. The substrates may be a honeycomb structure or any other structure that provides numerous channels and results in a high surface area. The high surface area of the coated substrate with its applied washcoats in the catalytic converter provides for effective treatment of the exhaust gas flowing through the catalytic converter.

In some embodiments, a corner-fill washcoat layer, buffer washcoat layer, or adhesion washcoat layer, may be applied to the substrate prior to applying any of the active layers, but is not required. In some embodiments, a reducing washcoat layer, an oxidizing washcoat layer, or a $NO_x$ storage washcoat layer may be applied to a substrate. In some embodiments, a hybrid washcoat layer may be applied to a substrate. For example, in some embodiments, a reducing catalyst/$NO_x$ storage hybrid washcoat layer or an oxidizing catalyst/$NO_x$ storage washcoat hybrid layer may be applied to the substrate. In some embodiments, a $NO_x$ storage washcoat layer includes lean $NO_x$ trapping materials. In some embodiments, a $NO_x$ storage washcoat layer includes catalytic composite nanoparticles, oxygen-storage materials, and $NO_x$ adsorption materials. In some embodiments, a reducing washcoat layer includes reducing catalyst particles. In some embodiments an oxidizing washcoat layer includes oxidizing catalyst particles. In some embodiments, a reducing catalyst/$NO_x$ storage hybrid washcoat layer includes reducing catalyst particles and lean $NO_x$ trapping materials. In some embodiments, an oxidizing catalyst/$NO_x$ storage hybrid washcoat layer includes oxidizing catalyst particles and lean $NO_x$ trapping materials.

Some embodiments of washcoat layers applied to a substrate may be configured as follows:

Substrate-Oxidizing Catalyst Layer-Reducing Catalyst/$NO_x$ Storage Hybrid Layer (S-O-R/N)

Substrate-Oxidizing Catalyst/$NO_x$ Storage Hybrid Layer-Reducing Catalyst Layer (S-O/N-R)

Substrate-Reducing Catalyst Layer-Oxidizing Catalyst/$NO_x$ Storage Hybrid Layer (S-R-O/N)

Substrate-Reducing Catalyst/$NO_x$ Storage Hybrid Layer-Oxidizing Catalytic Layer (S-R/N-O)

Substrate-Reducing Catalyst Layer-Oxidizing Catalytic Layer-$NO_x$ Storage Layer (S-R-O-N)

Substrate-Reducing Catalyst Layer-$NO_x$ Storage Layer-Oxidizing Catalytic Layer (S-R-N-O)

Substrate-Oxidizing Catalytic Layer-Reducing Catalyst Layer-$NO_x$ Storage Layer (S-O-R-N)

Substrate-Oxidizing Catalytic Layer-$NO_x$ Storage Layer Reducing Catalyst Layer (S-O-N-R)

Substrate-$NO_x$ Storage Layer-Reducing Catalyst Layer-Oxidizing Catalytic Layer (S-N-R-O)

Substrate-$NO_x$ Storage Layer-Oxidizing Catalytic Layer-Reducing Catalyst Layer (S-N-O-R)

It should be noted that, in some embodiments, additional washcoat layers can be disposed under, over, or between any of the washcoat layers indicated in these basic configurations; that is, further washcoat layers can be present on the catalytic converter substrate in addition to the ones listed in the configurations above. For example, in any embodiment a corner fill washcoat layer may be included as the first coating layer. In other embodiments, additional washcoat layers are not applied; that is, the washcoats listed in the configurations above are the only washcoats present on the catalytic converter substrate.

General Washcoat Compositions and Layers

LNT systems may include $NO_x$ storage washcoat layers, oxidizing washcoat layers, or reducing washcoat layers, generally formed from $NO_x$ storage washcoat slurries, oxidizing washcoat slurries, or reducing washcoat slurries. The washcoat compositions may include oxidizing catalytic particles, reducing catalytic particles and/or lean $NO_x$ trapping materials. The catalytic or $NO_x$ storage washcoat compositions may be applied to a substrate as part of a LNT system or catalytic converter. In some embodiments, the oxidizing catalytic particles, reducing catalytic particles, or lean $NO_x$ trapping materials are nano-on-nano-on-micro particles (NNm™ particles). In some embodiments, the oxidizing catalytic particles, reducing catalytic particles, or lean $NO_x$ trapping materials are nano-on-nano-in-micro particles (NNiM particles). In some embodiments of the $NO_x$ storage washcoat compositions, the NNm or NNiM particles may be pre-treated with an alkaline earth metal oxide or alkaline earth metal salt, or, in some embodiments, an alkaline earth metal salt may be added directly to the washcoat composition. In some embodiments, a portion of the alkaline earth metal salt may be deposited on the NNm or NNiM particles when mixed in a washcoat composition. In such an embodiment, an alkaline earth metal oxide may form on the micron-sized particles and the $NO_x$ storage washcoat layer can comprise lean $NO_x$ trap particles upon drying and calcining the substrate. In some embodiments, the $NO_x$ storage washcoat slurries and layers include catalytic nanoparticles, oxygen-storage materials, and $NO_x$ adsorption materials.

The washcoat compositions can include materials that are inert or less active to exhausts. Such materials can be incorporated as supports for the reactive catalysts or to provide surface area for the metals. In some embodiments, the catalyst-containing washcoat composition further includes "spacer" or "filler" particles, where the spacer particles may, for example, be ceramic, metal oxide, or metallic particles. In some embodiments, the spacer particles may be alumina or boehmite.

In some embodiments, a washcoat composition can contain an oxygen-storage component. An oxygen-storage component has oxygen-storage capacity with which the catalyst can accumulate oxygen when exhaust gas is in an oxygen-excess state (oxidative atmosphere), and releases the accumulated oxygen when exhaust gas is in an oxygen-deficient state (reductive atmosphere). With an oxygen-storage component, carbon monoxide and hydrocarbons can be efficiently oxidized to $CO_2$ even in an oxygen-deficient state, as oxygen can be released from the oxygen storage component. Materials such as cerium oxide particles can be used as oxygen-storage components. The cerium oxide particles may further contain zirconium oxide, lanthanum oxide, or yttrium oxide. In some embodiment, the oxygen-storage particles are substantially free of zirconium oxide, lanthanum oxide, or yttrium oxide. In some embodiments, the oxygen-storage particles include about 20% to about 100% cerium oxide, about 30% to about 90% cerium oxide, about 30% to about 50% cerium oxide, or about 70% to about 90% cerium oxide. In some embodiments, the oxygen-storage particles include about 0% to about 80% zirconium oxide, such as about 5% to about 15% zirconium oxide, about 15% to about 35% zirconium oxide, about 35% to about 55% zirconium oxide, or about 55% to about 65% zirconium oxide. In some embodiments, the oxygen-storage particles include 0% to about 15% lanthanum oxide, about 2% to about 8% lanthanum oxide, about 3% to about 6% lanthanum oxide, about 4% to about 5% lanthanum oxide, or about 8% to about 12% lanthanum oxide. In some embodiments, the oxygen-storage particles includes 0% to about 15% yttrium oxide, about 2% to about 8% yttrium oxide, about 3% to about 6% yttrium oxide, about 4% to about 5% yttrium oxide, or about 8% to about 12% yttrium oxide. In some embodiments, the oxygen-storage particles includes about 80% to about 90% cerium oxide, about 5% to about 15% zirconium oxide, and about 3% to about 5% lanthanum oxide. In some embodiments, the oxygen-storage particles includes about 80% to about 90% cerium oxide, about 5% to about 15% zirconium oxide, and about 3% to about 5% yttrium oxide. In some embodiments, the oxygen-storage particles include about 86% cerium oxide, about 10% zirconium oxide, and about 4% lanthanum oxide. In some embodiments, the oxygen-storage particles include about 86% cerium oxide, about 10% zirconium oxide, and about 4% yttrium oxide. In some embodiments, the oxygen-storage particles includes about 30% to about 50% cerium oxide, about 40% to about 60% zirconium oxide, about 3% to about 15% lanthanum oxide. In some embodiments, the oxygen-storage particles includes about 30% to about 50% cerium oxide, about 40% to about 60% zirconium oxide, about 3% to about 15% yttrium oxide. In some embodiments, the oxygen-storage particles include about 40% cerium oxide, about 50% zirconium oxide, and about 10% lanthanum oxide. In some embodiments, the oxygen-storage particles include about 40% cerium oxide, about 50% zirconium oxide, and about 10% yttrium oxide. In some embodiments, the oxygen-storage particles includes about 30% to about 50% cerium oxide, about 40% to about 60% zirconium oxide, about 3% to about 6% lanthanum oxide, and about 3% to about 6% yttrium oxide. In some embodiments, the oxygen-storage particles include about 40% cerium oxide, about 50% zirconium oxide, about 5% lanthanum oxide, and about 5% yttrium oxide.

General Washcoat Compositions Preparation and Application to Substrate

Washcoat slurries are generally prepared by suspending the designated materials in an aqueous solution. In some embodiments, the resulting slurry may comprise about 1% to about 30% solids content, about 2% to about 20% solids content, or about 5% to about 10% solids content. In some embodiments, the resulting slurry may comprise more than about 30% solids content or less than about 1% solids content. The pH may be adjusted to between about 2 and about 7, to between about 3 and about 5, or to about 4 by adding an acid, for example acetic acid. In some embodiments, the washcoat slurry may be milled to arrive at an average particle size of less than 4 μm, less than 10 μm, less than 15 μm, or between about 4 μm and 15 μm. In some embodiments, the washcoat slurry is aged for about 24 hours to about 48 hours after adjusting the viscosity of the washcoat slurry by adding thickening agent such as cellulose, cornstarch, or other thickeners, to a value between about 300 cP to about 1200 cP.

The washcoat slurry is applied to the substrate (which may already have one or more previously-applied washcoat compositions) by coating the substrate with the aqueous suspension (for example by dip-coating or vacuum coating), blowing excess washcoat off the substrate (and optionally collecting and recycling the excess washcoat blown off the substrate), drying the substrate, and calcining the substrate. Drying of the washcoats can be performed at room temperature or elevated temperature (for example, from about 30° C. to about 95° C., preferably about 60° C. to about 70° C.), at atmospheric pressure or at reduced pressure (for example, from about 1 pascal to about 90,000 pascal, or from about 7.5 mTorr to about 675 Torr), in ambient atmosphere or under an inert atmosphere (such as nitrogen or argon), and with or without passing a stream of gas over the substrate (for example, dry air, dry nitrogen gas or dry argon gas). In some embodiments, the drying process is a hot-drying process. A hot drying process includes any way to remove the solvent at a temperature greater than room temperature, but at a temperature below a standard calcining temperature. In some embodiments, the drying process may be a flash drying process, involving the rapid evaporation of moisture from the substrate via a sudden reduction in pressure or by placing the substrate in an updraft of warm air. It is contemplated that other drying processes may also be used.

After drying the washcoat composition onto the substrate, the washcoat may then be calcined onto the substrate. Calcining takes place at elevated temperatures, such as from 400° C. to about 700° C., preferably about 500° C. to about 600° C., more preferably at about 540° C. to about 560° C. or at about 550° C. Calcining can take place at atmospheric pressure or at reduced pressure (for example, from about 1 pascal to about 90,000 pascal, or about 7.5 mTorr to about 675 Torr), in ambient atmosphere or under an inert atmosphere (such as nitrogen or argon), and with or without passing a stream of gas over the substrate (for example, dry air, dry nitrogen gas, or dry argon gas).

Corner-Fill Washcoat Compositions

The corner-fill washcoat layer (C) may be a relatively inexpensive layer, which may be applied to the substrate to fill up the "corners" and other areas of the substrate where exhaust gases are unlikely to penetrate in significant amounts. Preferably, this layer does not include any PGM. In some embodiments, the corner-fill layer may comprise zeolite particles. In some embodiments, the corner-fill layer does not comprise zeolite particles or is substantially free of zeolite particles.

In some embodiments, the corner-fill washcoat compositions may comprise filler particles, such as aluminum oxide particles (i.e., alumina). In some embodiments, aluminum-oxide particles such as MI-386 material from Grace Davison, or the like, can be used. The size of the aluminum oxide particles is generally above about 0.2 microns, preferably above about 1 micron. In some embodiments, the solids content of the corner-fill washcoat composition comprises about 80 wt % to about 100 wt % porous alumina (MI-386 or the like). In some embodiments, the solids content of the corner-fill washcoat composition comprises about 80 wt % to about 99 wt % porous alumina and about 20 wt % to about 1 wt % boehmite, such as about 90 wt % to 99 wt % alumina and about 10 wt % to 1 wt % boehmite, or about 95 wt % to 99 wt % alumina and about 5 wt % to about 1 wt % boehmite, such as a corner-fill washcoat composition including about 97 wt % porous alumina and about 3 wt % boehmite. In some embodiments, boehmite oxidizes to aluminum oxide after calcination of the washcoat composition.

In some embodiments, each of the aluminum oxide particles or substantially each of the aluminum oxide particles in the corner-fill washcoat composition have a diameter of approximately 0.2 microns to approximately 8 microns, such as about 4 microns to about 6 microns. In some embodiments, the aluminum oxide particles in the corner-fill washcoat composition have an average grain size of approximately 0.2 microns to approximately 8 microns, such as about 4 microns to about 6 microns. In some embodiments, at least about 75 wt %, at least about 80 wt %, at least about 90 wt %, or at least about 95 wt % of the aluminum oxide particles in the corner-fill washcoat composition have a particle size falling within the range of approximately 0.2 microns to approximately 8 microns, such as within the range of about 4 microns to about 6 microns. After a washcoat composition has been applied to a substrate, it may be dried, and then calcined, onto the substrate. The corner-fill washcoat composition may be applied in a thickness of from about 30 g/l up to about 100 g/l; a typical value may be about 50 g/l.

Oxidizing Washcoat Compositions

In some embodiments, the oxidizing washcoat composition includes an oxidizing catalyst capable of catalyzing certain exhaust gases. Examples of oxidizing catalysts used in a catalytic converter are detailed in US 2014/0140909, the disclosure of which is hereby incorporated by reference. In some embodiments, the oxidizing catalyst may be applied to a micron-sized carrier particle by wet-chemistry methods, be a NNm™ catalytic particle, or be a NNiM catalytic particle. The NNm™ or NNiM particle may include a catalytic composite nanoparticle attached to a micron-sized carrier particle. In some embodiments, the oxidizing washcoat composition further comprises boehmite particles and aluminum oxide filler/sealant particles (for example MI-386) with or without barium oxide. The composition of the oxidizing washcoat components and the reducing washcoat components may be as described below regardless of the order in which the washcoats are deposited.

The oxidizing catalyst generally includes platinum, palladium, or a mixture thereof. At the high temperatures involved in gasoline or diesel exhaust engines, both palladium and platinum are effective oxidizing catalysts. In certain embodiments, the oxidizing catalyst includes platinum. In other embodiments, the oxidizing catalyst includes palladium. In some embodiments, the oxidizing catalyst includes a mixture of platinum and palladium. For example, an oxidizing catalyst may contain a mixture of 5:1 to 100:1 platinum to palladium. In some embodiments, an oxidizing catalyst may contain a mixture of 6:1 to 75:1 platinum to palladium. In some embodiments, an oxidizing catalyst may contain a mixture of 7:1 to 50:1 platinum to palladium. In some embodiments, an oxidizing catalyst may contain a mixture of 8:1 to 25:1 platinum to palladium. In some embodiments, an oxidizing catalyst may contain a mixture of 9:1 to 15:1 platinum to palladium. In some embodiments, an oxidizing catalyst may contain a mixture of 10:1 platinum to palladium, or approximately 10:1 platinum to palladium.

In some embodiments, an oxidizing catalyst includes a micron-sized support nanoparticle. Typically, the micron-sized support nanoparticle is a metal oxide, preferably aluminum oxide. In some embodiments, such as wet-chemistry produced oxidizing catalysts or NNm™ oxidizing catalysts, aluminum-oxide particles such as MI-386 material from Grace Davison, or the like, can be used.

In some embodiments, an oxidizing catalyst is formed by impregnating a micron-sized carrier particle with a platinum group metal, preferably platinum and/or palladium, by wet-chemistry methods. The production of an oxidizing catalyst produced by wet-chemistry methods generally involves the use of a solution of one or more catalytic metal ions or metal salts, which are impregnated into micron-sized carrier particles, and reduced to platinum group metal in elemental form. In some embodiments a solution of chloroplatinic acid ($H_2PtCl_6$) can be applied to metal oxide micro-particles, followed by drying and calcining, resulting in precipitation of platinum onto the metal oxide carrier particle. In some embodiments, a mixture of two or more different solutions of catalytic metal ions or metal salts, such as chloroplatinic acid ($H_2PtCl_6$) and chloropalladic acid ($H_2PdCl_6$) may be applied to metal oxide micro-particles, followed by drying and calcining, resulting in precipitation of both platinum and palladium onto the metal oxide carrier particle. When using two or more different solutions of catalytic metal ions or metal salts, the solution may be of the concentration or amount necessary to obtain the desired ratio of catalytic metal.

In some embodiments, an oxidizing composite nanoparticle may include one or more oxidizing catalyst composite nanoparticles, with a catalytic nanoparticle attached to a support nanoparticle to form an oxidizing "nano-on-nano" composite nanoparticle. The catalytic nanoparticle may be any oxidizing catalytic metal, preferably platinum, palladium, or a mixture of platinum and palladium. The support nanoparticle of the oxidizing catalyst composite nanoparticle may be any a metal oxide, preferably aluminum oxide. The oxidizing catalyst composite nanoparticle can be made using a procedure similar to that employed for production of the catalytic composite nanoparticles of the lean $NO_x$ trapping materials.

In some embodiments, an oxidizing catalyst includes a micron-sized oxidizing catalyst carrier particle. As used herein, the terms "micron-sized oxidizing catalyst carrier particle" and "oxidizing catalyst carrier particle" refer to any carrier particle to which an oxidizing catalyst (such as an oxidizing nanoparticle or oxidizing composite nanoparticle) is attached. In some embodiments, an oxidizing catalyst includes an oxidizing catalytic composite nanoparticle bonded to a micron-sized oxidizing catalyst carrier particle to form a NNm™ oxidizing particle. The carrier particle of the NNm™ oxidizing particle may be any suitable metal oxide, preferably aluminum oxide (such as MI-386, or the like). NNm™ oxidizing particles may be produced in a similar manner as described above.

In some embodiments, an oxidizing catalyst includes an oxidizing composite nanoparticles distributed throughout a micron-sized porous oxidizing catalyst carrier particle, or a NNiM oxidizing particle. For example, in some embodiments, oxidizing composite nanoparticles are bridged together by a porous carrier such that the nanoparticles are embedded within the porous carrier. The porous carrier of the NNiM oxidizing particle may be any suitable metal oxide, preferably aluminum oxide. NNiM oxidizing particles may be produced in a similar manner as described above, for example using aluminum chloride as a carrier precursor salt. In some embodiments, the oxidizing catalytic washcoat layer may be about 50 g/l to about 200 g/l of solids, or about 70 g/l to about 150 g/l of solids, or about 80 g/l to about 120 g/l of solids.

In some embodiments, the oxidizing catalytic particles make up between approximately 25% to approximately 75% by weight of the combination of the oxidizing catalytic particles, boehmite particles, and alumina filler/sealant particles of the oxidizing washcoat composition. In some embodiments, the oxidizing catalytic particles make up between approximately 30% to approximately 60% by weight of the combination of the oxidizing catalytic particles, boehmite particles, and alumina filler/sealant particles of the oxidizing washcoat composition. In some embodiments, the oxidizing catalytic particles make up between approximately 35% to approximately 50% by weight of the combination of the oxidizing catalytic particles, boehmite particles, and alumina filler/sealant particles in the oxidizing washcoat composition. In some embodiments, the oxidizing catalytic particles make up about 40% by weight of the combination of the oxidizing catalytic particles, boehmite particles, and alumina filler/sealant particles in the oxidizing washcoat composition.

In some embodiments, the catalytically active particle in the oxidizing catalytic particles includes one or more platinum group metals, for example a mixture of platinum or palladium. In some embodiments, the platinum group metal is about 0.5 wt % to about 3 wt % of the oxidizing catalytic particles. In some embodiments, the platinum group metal comprises about 0.25 wt % to about 1.5 wt % of the oxidizing layer of a coated substrates. In some embodiments, the platinum group metal loading in an oxidizing washcoat layer of a coated substrate is about 0.5 g/l to about 2.0 g/l.

In some embodiments, the boehmite particles make up between approximately 0.5% to approximately 10% by weight of the combination of the oxidizing catalytic particles, boehmite particles, and alumina filler/sealant particles in the oxidizing washcoat composition. In some embodiments, the boehmnite particles make up between approximately 1% to approximately 7% by weight of the combination of the oxidizing catalytic particles, boehmite particles, and alumina filler/sealant particles in the oxidizing washcoat composition. In some embodiments, the boehmite particles make up between approximately 2% to approximately 5% by weight of the combination of the oxidizing catalytic particles, boehmite particles, and alumina filler/sealant particles in the oxidizing washcoat composition. In some embodiments, the boehmite particles make up about 3% by weight of the combination of the oxidizing catalytic particles, boehmite particles, and alumina filler/sealant particles in the oxidizing washcoat composition.

In some embodiments, the alumina filler/sealant particles make up between approximately 35% to approximately 80% by weight of the combination of the oxidizing catalytic particles, boehmite particles, and alumina filler/sealant particles in the oxidizing washcoat composition. In some embodiments, the alumina filler/sealant particles make up between approximately 45% to approximately 70% by weight of the combination of the oxidizing catalytic particles, boehmite particles, and alumina filler/sealant particles in the oxidizing washcoat composition. In some embodiments, the alumina filler/sealant particles make up between approximately 50% to approximately 60% by weight of the combination of the oxidizing catalytic particles, boehmite particles, and alumina filler/sealant particles in the oxidizing washcoat composition. In some embodiments, the alumina filler/sealant particles make up about 50% by weight of the combination of the oxidizing catalytic particles, boehmite particles, and alumina filler/sealant particles in the oxidizing washcoat composition. The alumina filler/sealant particles may be porous lanthanum-stabilized alumina, for example MI-386. In some embodiments, a different filler particle may be used in place of some or all of the alumina particles of the oxidizing washcoat composition.

In the oxidizing washcoat composition, from 0 to 100% of the alumina filler/sealant particles may be alumina impregnated with nano-sized BaO particles, alumina mixed with micron-sized BaO particles, or both alumina impregnated with nano-sized BaO particles and admixed with micron-sized BaO particles. In some embodiments, from 1 wt %-100 wt %, from 20 wt %-80 wt %, or from 30 wt %-60 wt % micron-sized BaO may be used in place of non-BaO-impregnated alumina. In some embodiments, a 50:50 mixture of regular MI-386 and BaO-impregnated MI-386 (impregnated with nano-sized BaO particles), or a 50:50 mixture of MI-386 and micron-sized BaO particles, or a mixture of MI-386 impregnated with nano-sized BaO particles and admixed with micron-sized BaO particles, may be used for this component of the washcoat. In some embodiments, the alumina can comprise from 5% to 30% nano-BaO-impregnated alumina and from 70% to 95% non-BaO-impregnated alumina. In some embodiments, the alumina can comprise from 5% to 20% nano-BaO-impregnated alumina and from 80% to 95% non-BaO-impregnated alumina. In some embodiments, the alumina can comprise from 8% to 16% nano-BaO-impregnated alumina and from 84% to 92% non-BaO)-impregnated alumina. In one embodiment, 12%, or about 12%, nano-BaO-impregnated alumina is mixed with 88%, or about 88%, alumina without impregnated BaO. In one embodiment, 10%, or about 10%, nano-BaO-impregnated alumina is mixed with 90%, or about 90%, alumina without impregnated BaO.

In some embodiments, the alumina can comprise from 5% to 30% micron-sized BaO and from 70% to 95% non-BaO-impregnated alumina. In some embodiments, the alumina can comprise from 5% to 20% micron-sized BaO and from 80% to 95% non-BaO-impregnated alumina. In some embodiments, the alumina can comprise from 8% to 16% micron-sized-BaO and from 84% to 92% non-BaO-impregnated alumina. In one embodiment, 12%, or about 12%, micron-sized BaO is mixed with 88%, or about 88%, alumina without impregnated BaO. In one embodiment, 15%, or about 15%, micron-sized BaO is mixed with 85%, or about 85%, alumina without impregnated BaO.

The ranges for the nano-sized BaO-alumina ratio, that is, the amount of nano-BaO impregnated into the alumina, include 1-25% BaO to 75% to 99% aluminum oxide micron support; 3-20% BaO to 80% to 97% aluminum oxide micron support; 5%-15% BaO to 85% to 95% aluminum oxide micron support; and about 15% BaO to about 85% aluminum oxide micron support, expressed as weight percentages. In one embodiment, the nano-BaO-impregnated aluminum oxide comprises 15%, or about 15%, nano-BaO by weight and 85%, or about 85%, aluminum oxide by weight.

In some embodiments, an oxidizing washcoat slurry may be formed by mixing oxidizing particles, alumina particles and/or boehmite particles in an aqueous solution, and adjusting the pH of the slurry to between about 2 and about 6, or between about 3 and about 5, or about 4. In some embodiments, an organic acid, such as acetic acid, is used to adjust the pH of the slurry. In some embodiments, the oxidizing washcoat slurry can be coated onto a substrate, dried, and calcined to produce an oxidizing washcoat layer.

In some embodiments, the oxidizing catalytic washcoat layer may be about 50 g/l to about 200 g/l of solids, or about 70 g/l to about 150 g/l of solids, or about 80 g/l to about 120 g/l of solids.

Reducing Washcoat Compositions

A reducing washcoat composition includes a reducing catalytic component that can reduce gases, for example $NO_2$ released from the $NO_x$ storage washcoat layer other $NO_x$ trapping material during a rich-purge phase of a LNT system. Examples of reducing catalysts used in a catalytic converter are detailed in US 2014/0140909, the disclosure of which is hereby incorporated by reference. In some embodiments, the reducing catalyst may be applied to a micron-sized carrier particle by wet-chemistry methods, be a NNm™ catalytic particle, or be a NNiM catalytic particle. In some embodiments, the reducing washcoat composition comprises, consists essentially of, or consists of reducing nano-on-nano-on-micro reducing catalytic particles, boehmite particles, and alumina filler/sealant particles (for example MI-386).

A reducing catalyst may include any catalytic material capable of reducing nitrogen oxides in fuel-rich conditions. In some embodiments, the reducing catalytic material is rhodium. The reducing catalyst may also include a micron-sized reducing catalyst carrier particle, such as one or more metal oxides. As used herein, the terms "micron-sized reducing catalyst carrier particle" and "reducing catalyst carrier particle" refer to any carrier particle to which a reducing catalyst (such as a reducing nanoparticle or reducing composite nanoparticle) is attached. In some embodiments, the reducing catalyst carrier particle includes cerium oxide or a mixture of cerium oxide and zirconium oxide. In some embodiments, the reducing micron-sized carrier particles may further contain lanthanum oxide or yttrium oxide. In some embodiment, the reducing catalyst carrier particles are substantially free of zirconium oxide, lanthanum oxide, or yttrium oxide. In some embodiments, the reducing catalyst carrier particles include about 20% to about 100% cerium oxide, about 30% to about 90% cerium oxide, about 30% to about 50% cerium oxide, or about 70% to about 90% cerium oxide. In some embodiments, the reducing catalyst carrier particles include 0% to about 80% zirconium oxide, such as about 5% to about 15% zirconium oxide, about 15% to about 35% zirconium oxide, about 35% to about 55% zirconium oxide, or about 55% to about 65% zirconium oxide. In some embodiments, the reducing catalyst carrier particles include 0% to about 15% lanthanum oxide, about 2% to about 8% lanthanum oxide, about 3% to about 6% lanthanum oxide, about 4% to about 5% lanthanum oxide, or about 8% to about 12% lanthanum oxide. In some embodiments, the reducing catalyst carrier particles includes 0% to about 15% yttrium oxide, about 2% to about 8% yttrium oxide, about 3% to about 6% yttrium oxide, about 4% to about 5% yttrium oxide, or about 8% to about 12% yttrium oxide. In some embodiments, the reducing catalyst carrier particles includes about 80% to about 90% cerium oxide, about 5% to about 15% zirconium oxide, and about 3% to about 5% lanthanum oxide. In some embodiments, the reducing catalyst carrier particles includes about 80% to about 90% cerium oxide, about 5% to about 15% zirconium oxide, and about 3% to about 5% yttrium oxide. In some embodiments, the reducing catalyst carrier particles include about 86% cerium oxide, about 10% zirconium oxide, and about 4% lanthanum oxide. In some embodiments, the reducing catalyst carrier particles include about 86% cerium oxide, about 10% zirconium oxide, and about 4% yttrium oxide. In some embodiments, the reducing catalyst carrier particles includes about 30% to about 50% cerium oxide, about 40% to about 60% zirconium oxide, about 3% to about 15% lanthanum oxide. In some embodiments, the reducing catalyst carrier particles includes about 30% to about 50% cerium oxide, about 40% to about 60% zirconium oxide, about 3% to about 15% yttrium oxide. In some embodiments, the reducing catalyst carrier particles include about 40% cerium oxide, about 50% zirconium oxide, and about 10% lanthanum oxide. In some embodiments, the reducing catalyst carrier particles include about 40% cerium oxide, about 50% zirconium oxide, and about 10% yttrium oxide. In some embodiments, the reducing catalyst carrier particles includes about 30% to about 50% cerium oxide, about 40% to about 60% zirconium oxide, about 3% to about 6% lanthanum oxide, and about 3% to about 6% yttrium oxide. In some embodiments, the reducing catalyst carrier include about 40% cerium oxide, about 50% zirconium oxide, about 5% lanthanum oxide, and about 5% yttrium oxide.

In some embodiments, a reducing catalyst may include a composite nanoparticle with a reducing catalytic nanoparticle bonded to a support nanoparticle. Preferably, the reducing catalytic nanoparticle is rhodium. A suitable support nanoparticle for the reducing composite nanoparticle includes, but is not limited to, nano-sized cerium oxide ($CeO_2$). In some embodiments, the support nanoparticle may further contain zirconium oxide, lanthanum oxide, or yttrium oxide. In some embodiment, the support nanoparticles are substantially free of zirconium oxide, lanthanum oxide, or yttrium oxide. In some embodiments, the support nanoparticles include about 20% to about 100% cerium oxide, about 30% to about 90% cerium oxide, about 30% to about 50% cerium oxide, or about 70% to about 90% cerium oxide. In some embodiments, the support nanoparticle includes about 0% to about 80% zirconium oxide, such as about 5% to about 15% zirconium oxide, about 15% to about 35% zirconium oxide, about 35% to about 55% zirconium oxide, or about 55% to about 65% zirconium oxide. In some embodiments, the support nanoparticle includes 0% to about 15% lanthanum oxide, about 2% to about 8% lanthanum oxide, about 3% to about 6% lanthanum oxide, about 4% to about 5% lanthanum oxide, or about 8% to about 12% lanthanum oxide. In some embodiments, the support nanoparticle includes 0% to about 15% yttrium oxide, about 2% to about 8% yttrium oxide, about 3% to about 6% yttrium oxide, about 4% to about 5% yttrium oxide, or about 8% to about 12% yttrium oxide. In some embodiments, the support nanoparticle includes about 80% to about 90% cerium oxide, about 5% to about 15% zirconium oxide, and about 3% to about 5% lanthanum oxide. In some embodiments, the support nanoparticle includes about 80% to about 90% cerium oxide, about 5% to about 15% zirconium oxide, and about 3% to about 5% yttrium oxide. In some embodiments, the support nanoparticle includes about 86% cerium oxide, about 10% zirconium oxide, and about 4% lanthanum oxide. In some embodiments, the support nanoparticle includes about 86% cerium oxide, about 10% zirconium oxide, and about 4% yttrium oxide. In some embodiments, the support nanoparticle includes about 30% to about 50% cerium oxide, about 40% to about 60% zirconium oxide, about 3% to about 15% lanthanum oxide. In some embodiments, the support nanoparticle includes about 30% to about 50% cerium oxide, about 40% to about 60% zirconium oxide, about 3% to about 15% yttrium oxide. In some embodiments, the support nanoparticle includes about 40% cerium oxide, about 50% zirconium oxide, and about 10% lanthanum oxide. In some embodiments, the support nanoparticle includes about 40% cerium oxide, about 50% zirconium oxide, and about 10% yttrium oxide. In some embodiments, the support nanoparticle includes about 30% to about 50% cerium oxide, about 40% to about 60% zirconium oxide, about 3% to about 6% lanthanum oxide, and about 3% to about 6% yttrium oxide. In some embodiments, the support nanoparticle includes about 40% cerium oxide, about 50% zirconium oxide, about 5% lanthanum oxide, and about 5% yttrium oxide.

The reducing catalyst composite nanoparticle can be made using a procedure similar to that employed for production of the catalytic component nanoparticles of the lean $NO_x$ trapping materials, as described above, except a reducing catalytic metal is used (such as rhodium). In some embodiments, the reducing catalyst composite nanoparticle includes a rhodium catalytic nanoparticle and a support nanoparticle that includes one or more of cerium oxide, zirconium oxide, lanthanum oxide, or yttrium oxide. In some instances, the sizes of the nano-sized Rh are about 1 nm and the sizes of the nano-sized cerium oxide are about 10 nm. In some instances, the sizes of the nano-sized Rh are approximately 1 nm or less and the sizes of the nano-sized cerium oxide are approximately 10 nm or less. In some embodiments, the weight ratio of nano-sized Rh:nano-sized support oxide is from 1:99 to 20:80. In some embodiments, the weight ratio of nano-sized Rh:nano-sized support oxide is from 2:98 to 15:85. In some embodiments, the weight ratio of nano-sized Rh:nano-sized support oxide is from 3:97 to 10:90. In some embodiments, the weight ratio of nano-sized Rh:nano-sized support oxide is from 4:96 to 6:94. In some embodiments, the weight ratio of nano-sized Rh:nano-sized support oxide is about 5:95.

In some embodiments, the reducing catalytic composite nanoparticle is bonded to a micron-sized carrier particle to produce a micron-sized NNm™ reducing catalytic particle, similar to the production of NNm™ particles used in lean $NO_x$ trapping materials, as described above, excluding any impregnation by barium oxide. In some embodiments, a reducing catalyst includes a reducing composite nanoparticle distributed throughout a micron-sized porous carrier particle. In some embodiments, the reducing catalyst may be a NNiM reducing catalytic particle. NNiM reducing particles may be produced in a similar manner as described above, for example using a reducing composite nanoparticle.

In some embodiments, the reducing catalytic washcoat layer may be about 50 g/l to about 200 g/l of solids, or about 70 g/l to about 150 g/l of solids, or about 75 g/l to about 100 g/l of solids.

In some embodiments, the reducing catalytic particles make up between approximately 50% to approximately 95% by weight of the combination of the reducing catalytic particles, boehmite particles, and alumina filler/sealant particles in the reducing washcoat composition. In some embodiments, the reducing catalytic particles make up between approximately 60% to approximately 90% by weight of the combination of the reducing catalytic particles, boehmite particles, and alumina filler/sealant particles in the reducing washcoat composition. In some embodiments, the reducing catalytic particles make up between approximately 75% to approximately 85% by weight of the combination of the reducing catalytic particles, boehmite particles, and alumina filler/sealant particles in the reducing washcoat composition. In some embodiments, the reducing catalytic particles make up about 80% by weight of the combination of the reducing catalytic particles, boehmite particles, and alumina filler/sealant particles in the reducing washcoat composition.

In some embodiments, the catalytically active particle in the reducing catalytic particles includes one or more platinum group metals, for example rhodium. In some embodiments, the platinum group metal or rhodium content of a reducing catalytic particle is about 0.1 wt % to about 2 wt %, or about 0.25 wt % to about 1 wt %. In some embodiments, the rhodium content in the reducing catalytic particles is about 0.3 wt %. Other weight percentages described previously may also be used. In some embodiments, the reducing washcoat layer of a coated substrate may have a platinum group metal loading content of about 0.1 g/l to about 1 g/l, about 0.1 g/l to about 0.5 g/l, or about 0.1 g/l to about 0.3 g/l.

In some embodiments, the alumina filler/sealant particles make up between approximately 5% to approximately 40% by weight of the combination of the reducing catalytic particles, boehmite particles, and alumina filler/sealant particles in the reducing washcoat composition. In some embodiments, the alumina filler/sealant particles make up between approximately 10% to approximately 30% by weight of the combination of the reducing catalytic particles, boehmite particles, and alumina filler/sealant particles in the reducing washcoat composition. In some embodiments, the alumina filler/sealant particles make up between approximately 15% to approximately 20% by weight of the combination of the reducing catalytic particles, boehmite particles, and alumina filler/sealant particles in the reducing washcoat composition, in some embodiments, the alumina filler/sealant particles make up about 17% by weight of the combination of the reducing catalytic particles, boehmite particles, and alumina filler/sealant particles in the reducing washcoat composition. The alumina filler/sealant particles may be porous lanthanum-stabilized alumina, for example MI-386. In some embodiments, a different filler particle may be used in place of some or all of the alumina particles.

In some embodiments, the boehmite particles make up between approximately 0.5% to approximately 10% by weight of the combination of the reducing catalytic particles, boehmite particles, and alumina filler/sealant particles in the reducing washcoat composition. In some embodiments, the boehmite particles make up between approximately 1% to approximately 7% by weight of the combination of the reducing catalytic particles, boehmite particles, and alumina filler/sealant particles in the reducing washcoat composition. In some embodiments, the boehmite particles make up between approximately 2% to approximately 5% by weight of the combination of the reducing catalytic particles, boehmite particles, and alumina filler/sealant particles in the reducing washcoat composition. In some embodiments, the boehmite particles make up about 3% by weight of the combination of the reducing catalytic particles, boehmite particles, and alumina filler/sealant particles in the reducing washcoat composition.

$NO_x$ Storage Washcoat Compositions

In some embodiments, a $NO_x$ storage washcoat composition may include "loose ingredient" lean $NO_x$ trapping materials. In some embodiments, a $NO_x$ storage washcoat composition may include composite nanoparticles. In some embodiments a $NO_x$ storage washcoat composition may include a $NO_x$ adsorption material or $NO_x$ adsorption material precursor (for example, an alkaline earth metal salt). In some embodiments, the $NO_x$ storage washcoat composition may include an oxygen-storage material. In some embodiments, the $NO_x$ adsorption material may be deposited onto the oxygen-storage material or composite catalytic nanoparticle.

In some embodiments, oxygen-storage material make up between about 10% and about 90% by weight of the combination of oxygen-storage material, composite nanoparticles, boehmite, and $NO_x$ adsorption material (or $NO_x$ adsorption material precursor) in a $NO_x$ storage washcoat composition. In some embodiments, oxygen-storage material make up between about 40% and about 80% by weight of the combination of oxygen-storage material, composite nanoparticles, boehmite, and $NO_x$ adsorption material (or $NO_x$ adsorption material precursor) in a $NO_x$ storage washcoat composition. In some embodiments, oxygen-storage material make up between about 60% and about 70% by weight of the combination of oxygen-storage material, composite nanoparticles, boehmite, and $NO_x$ adsorption material (or $NO_x$ adsorption material precursor) in a $NO_x$ storage washcoat composition.

In some embodiments, composite nanoparticles make up between about 1% and about 40% by weight of the combination of the oxygen-storage material, composite nanoparticles, boehmite, and $NO_x$ adsorption material (or $NO_x$ adsorption material precursor) in a $NO_x$ storage washcoat composition. In some embodiments, composite nanoparticles make up between about 5% and about 25% by weight of the combination of the oxygen-storage material, composite nanoparticles, boehmite, and $NO_x$ adsorption material (or $NO_x$ adsorption material precursor) in a $NO_x$ storage washcoat composition. In some embodiments, composite nanoparticles make up between about 10% and about 20% by weight of the combination of the oxygen-storage material, composite nanoparticles, boehmite, and $NO_x$ adsorption material (or $NO_x$ adsorption material precursor) in a $NO_x$ storage washcoat composition.

In some embodiments, $NO_x$ adsorption component makes up between about 1% and about 20% by weight of the combination of the oxygen-storage material, composite nanoparticles, boehmite, and $NO_x$ adsorption component in a $NO_x$ storage washcoat composition. In some embodiments, $NO_x$ adsorption component makes up between about 5% and about 15% by weight of the combination of the oxygen-storage material, composite nanoparticles, boehmite, and $NO_x$ adsorption component in a $NO_x$ storage washcoat composition. In some embodiments, $NO_x$ adsorption component makes up between about 10% and about 15% by weight of the combination of the oxygen-storage material, composite nanoparticles, boehmite, and $NO_x$ adsorption component in a $NO_x$ storage washcoat composition. In some embodiments, $NO_x$ adsorption component makes up between about 8% and about 12% by weight of the combination of the oxygen-storage material, composite nanoparticles, boehmite, and $NO_x$ adsorption component in a $NO_x$ storage washcoat composition. In some embodiments, $NO_x$ adsorption component makes up between about 10% by weight of the combination of the oxygen-storage material, composite nanoparticles, boehmite, and $NO_x$ adsorption component in a $NO_x$ storage washcoat composition.

In some embodiments, $NO_x$ adsorption component precursor makes up between about 1% and about 30% by weight of the combination of the oxygen-storage material precursor, composite nanoparticles, boehmite, and $NO_x$ adsorption component in a $NO_x$ storage washcoat composition. In some embodiments, $NO_x$ adsorption component precursor makes up between about 5% and about 25% by weight of the combination of the oxygen-storage material, composite nanoparticles, boehmite, and $NO_x$ adsorption component precursor in a $NO_x$ storage washcoat composition. In some embodiments, $NO_x$ adsorption component precursor makes up between about 10% and about 20% by weight of the combination of the oxygen-storage material, composite nanoparticles, boehmite, and $NO_x$ adsorption component precursor in a $NO_x$ storage washcoat composition. In some embodiments, $NO_x$ adsorption component precursor makes up about 17% by weight of the combination of the oxygen-storage material, composite nanoparticles, boehmite, and $NO_x$ adsorption component precursor in a $NO_x$ storage washcoat composition. In some embodiments, once the $NO_x$ storage washcoat is applied to a substrate, dried, and calcined, the $NO_x$ adsorption material precursor is converted into a $NO_x$ adsorption material in the washcoat layers. After conversion to a $NO_x$ adsorption material, the material may have the weight contributions as indicated above. A person of skill in the art would understand how much alkaline earth metal salt to include in a washcoat composition to obtain a desired amount of alkaline earth metal oxide after calcining the alkaline earth metal salt. For purposes of calculating the weight of a alkaline earth metal salt as disclosed herein, the alkaline earth metal salt should be considered a solid even if the alkaline earth metal salt is present in an embodiment dissolved in solution.

In some embodiments, the boehmite particles make up between approximately 0.5% to approximately 10% by weight of the combination of the oxygen-storage material, composite nanoparticles, boehmite, and $NO_x$ adsorption material (or $NO_x$ adsorption material precursor) in the $NO_x$ storage washcoat composition. In some embodiments, the boehmite particles make up between approximately 1% to approximately 7% by weight of the combination of the oxygen-storage material, composite nanoparticles, boehmite, and $NO_x$ adsorption material (or $NO_x$ adsorption material precursor) in the $NO_x$ storage washcoat composition. In some embodiments, the boehmite particles make up between approximately 3% to approximately 6% by weight of the combination of the oxygen-storage material, composite nanoparticles, boehmite, and $NO_x$ adsorption material (or $NO_x$ adsorption material precursor) in the $NO_x$ storage washcoat composition. In some embodiments, the boehmite particles make up about 5% by weight of the combination of the oxygen-storage material, composite nanoparticles, boehmite, and $NO_x$ adsorption material (or $NO_x$ adsorption material precursor) in the $NO_x$ storage washcoat composition.

In some embodiments, a $NO_x$ storage washcoat slurry may be formed by mixing composite nanoparticles, $NO_x$ adsorption materials (or precursors), oxygen-storage materials, and/or boehmite particles in an aqueous solution. In some embodiments, the pH of the washcoat slurry suspension may be adjusted to between about 2 and about 6, or between about 3 and about 5, or about 4. In some embodiments, an organic acid, such as acetic acid, is used to adjust the pH of the slurry. In some embodiments, the $NO_x$ storage washcoat slurry can be coated onto a substrate, dried, and calcined to produce a $NO_x$ storage washcoat layer.

In some embodiments, the $NO_x$ storage layer on a coated substrate may be about 150 g/l to about 500 g/l of solids, or about 250 g/l to about 400 g/l of solids, or about 300 g/l to about 375 g/l of solids, or about 365 g/l of solids. In some embodiments, the $NO_x$ storage layer on a coated substrate may contain about 100 g/l to about 400 g/l of oxygen-storage materials, or about 200 g/l to about 300 g/l of oxygen-storage materials, or about 250 g/l of oxygen-storage materials. In some embodiments, the $NO_x$ storage layer on a coated substrate may contain about 20 g/l to about 100 g/l composite nanoparticles, or about 40 g/l to about 80 g/l composite nanoparticles, or about 60 g/l composite nanoparticles. In some embodiments, the $NO_x$ storage layer on a coated substrate may contain about 10 g/l to about 60 g/l $NO_x$ adsorption components (for example, an alkaline earth metal oxide, such as barium oxide), or about 25 g/l to about 45 g/l $NO_x$ adsorption components (for example, an alkaline earth metal oxide, such as barium oxide), or about 38 g/l $NO_x$ adsorption components (for example, an alkaline earth metal oxide, such as barium oxide). In some embodiments, the $NO_x$ storage layer on a coated substrate may contain about 0.2 g/l to about 5 g/l platinum group metal loading, or about 0.4 g/l to about 3 g/l platinum group metal loading, or about 0.5 g/l to about 1 g/l platinum group metal loading, or about 0.6 g/l platinum group metal loading.

In some embodiments, the $NO_x$ storage washcoat composition includes lean $NO_x$ trapping materials for temporarily storing $NO_x$ gases. In some embodiments, the $NO_x$ storage washcoat composition may include lean $NO_x$ trap particles. In some embodiments, the $NO_x$ storage washcoat composition includes NNm™ or NNiM particles and a $NO_x$ adsorption component (or precursor), a portion of which may be attached to the NNm™ or NNiM particles. In some embodiments, the $NO_x$ storage washcoat composition may further include boehmite.

In some embodiments, the lean $NO_x$ trapping materials make up between approximately 70% to approximately 100% by weight of the combination of the dissolved salts and solid materials in the $NO_x$ storage washcoat composition. In some embodiments, the lean $NO_x$ trapping materials make up between approximately 80% to approximately 99% by weight of the combination of the dissolved salts and solid materials in the $NO_x$ storage washcoat composition. In some embodiments, the lean $NO_x$ trapping materials make up between approximately 85% to approximately 97% by weight of the combination of the dissolved salts and solid materials in the $NO_x$ storage washcoat composition. In some embodiments, the lean $NO_x$ trapping materials make up between approximately 90% to approximately 96% by weight of the combination of the dissolved salts and solid materials in the $NO_x$ storage washcoat composition.

In some embodiments, the boehmite particles make up between approximately 0.5% to approximately 10% by weight of the combination of the dissolved salts and solid materials in the $NO_x$ storage washcoat composition. In some embodiments, the boehmite particles make up between approximately 1% to approximately 7% by weight of the combination of the dissolved salts and solid materials in the $NO_x$ storage washcoat composition. In some embodiments, the boehmite particles make up between approximately 3% to approximately 6% by weight of the combination of the dissolved salts and solid materials in the $NO_x$ storage washcoat composition. In some embodiments, the boehmite particles make up about 5% by weight of the combination of the dissolved salts and solid materials in the $NO_x$ storage washcoat composition. Boehmite particles in a washcoat composition that is calcined (for example, after being coated onto a substrate) in an ambient or oxidizing environment can be converted into aluminum oxide. Accordingly, it is understood that any reference to a percent weight of boehmite in a washcoat composition may be converted into an calculable weight of aluminum oxide in a final washcoat layer.

In some embodiments, the $NO_x$ adsorption components make up about 5% to about 20% by weight of the combination of the dissolved salts and solid materials in the $NO_x$ storage washcoat composition. In some embodiments, the $NO_x$ adsorption components make up about 8% to about 12% by weight of the combination of the dissolved salts and solid materials in the $NO_x$ storage washcoat composition. In some embodiments, the $NO_x$ adsorption components make up about 9% to about 11% by weight of the combination of the dissolved salts and solid materials in the $NO_x$ storage washcoat composition. In some embodiments, the $NO_x$ adsorption components make up about 10% by weight of the combination of the dissolved salts and solid materials in the $NO_x$ storage washcoat composition.

In some embodiments, a $NO_x$ adsorption component precursor, for example an alkaline earth metal salt (such as a barium salt, for example, barium acetate) solution, can be added directly to the washcoat, which may impregnate NNm™ particles or NNiM particles. In some embodiments, the $NO_x$ adsorption component precursor will convert to the $NO_x$ adsorption component of the lean $NO_x$ trapping materials during calcination of the washcoat (for example, after being applied to a substrate). In such embodiments, the amount of expected $NO_x$ adsorption component may be predetermined, and the sum of the resulting $NO_x$ adsorption component and the NNm™ particles or NNiM particles in the washcoat composition may be considered the weight of the solids present in the $NO_x$ storage washcoat composition.

In some embodiments, a $NO_x$ storage washcoat slurry may be formed by mixing lean $NO_x$ trapping materials and boehmite particles in an aqueous solution, and adjusting the pH of the suspension to between about 2 and about 6, or between about 3 and about 5, or about 4. In some embodiments, an organic acid, such as acetic acid, is used to adjust the pH of the suspension. In some embodiments, a $NO_x$ storage washcoat slurry may be formed by mixing lean $NO_x$ trapping materials and boehmite particles in an aqueous solution, and adjusting the pH of the suspension to between about 2 and about 6, or between about 3 and about 5, or about 4. In some embodiments, an organic acid, such as acetic acid, is used to adjust the pH of the suspension. In some embodiments, a $NO_x$ storage washcoat slurry may be formed by mixing NNm particles or NNiM particles, boehmite, and a $NO_x$ adsorption component precursor (such as a barium salt, for example barium acetate) in an aqueous solution, and adjusting the pH of the suspension to between about 2 and about 6, or between about 3 and about 5, or about 4. In some embodiments, an organic acid, such as acetic acid, is used to adjust the pH of the suspension. In any embodiment, the $NO_x$ storage washcoat slurry can be coated onto a substrate, dried, and calcined to produce a $NO_x$ storage washcoat layer, as described above.

In some embodiments, the $NO_x$ storage composition on a coated substrate may be about 150 g/l to about 500 g/l of solids, or about 250 g/l to about 400 g/l of solids, or about 300 g/l to about 375 g/l of solids, or about 365 g/l of solids. In some embodiments, such as when a $NO_x$ adsorption component precursor (such as an alkaline earth metal salt, for example a barium salt such as barium acetate) is added directly to a washcoat slurry, the expected resulting $NO_x$ adsorption component after calcination may be considered in the calculation of weight solids in the resulting washcoat layer. For example, in some embodiments, sufficient alkaline earth metal salt is added to a washcoat slurry before application to a substrate such that after application to the substrate and calcination, the solids content contribution of the resulting alkaline earth metal oxide may be about 30 g/l to about 50 g/l.

In some embodiments, the $NO_x$ storage layer on a coated substrate may contain about 150 gi/to about 500 g/l of lean $NO_x$ trapping materials, about 250 g/l to about 400 g/l of lean $NO_x$ trapping materials, about 300 g/l to about 375 g/l of lean $NO_x$ trapping materials, or about 348 g/l of lean $NO_x$ trapping materials. In some embodiments, the $NO_x$ storage layer on a coated substrate may contain about 100 g/l to about 400 g/l of micron-sized carrier particles, about 200 g/l to about 300 g/l of micron-sized carrier particles, or about 250 g/l of micron sized carrier particles. In some embodiments, the $NO_x$ storage layer on a coated substrate may contain about 20 g/l to about 100 g/l composite nanoparticles, about 40 g/l to about 80 g/l composite nanoparticles, or about 60 g/l composite nanoparticles. In some embodiments, the $NO_x$ storage layer on a coated substrate may contain about 10 g/l to about 60 g/l $NO_x$ adsorption components (for example, an alkaline earth metal oxide, such as barium oxide), or about 25 g/l to about 45 g/l $NO_x$ adsorption components (for example, an alkaline earth metal oxide, such as barium oxide), or about 38 g/l $NO_x$ adsorption components (for example, an alkaline earth metal oxide, such as barium oxide). In some embodiments, the $NO_x$ storage layer on a coated substrate may contain about 0.2 g/l to about 5 g/l platinum group metal loading, or about 0.4 g/l to about 3 g/l platinum group metal loading, or about 0.5 g/l to about 1 g/l platinum group metal loading, or about 0.6 g/l platinum group metal loading.

Hybrid $NO_x$ Storage and Reducing Catalytic Washcoat and Layer Compositions

In some embodiment, a hybrid reducing catalytic/$NO_x$ storage washcoat composition may contain both reducing catalytic particles and lean $NO_x$ trapping materials. In some embodiments, the combined $NO_x$ storage and reducing catalytic washcoat composition comprises, consists essentially of, or consists of reducing catalytic particles, lean $NO_x$ trapping materials, or boehmite particles.

In some embodiments, the lean $NO_x$ trapping materials make up between approximately 30% to approximately 98% by weight of the combination of the reducing catalytic particles, lean $NO_x$ trapping materials, and boehmite particles in the hybrid washcoat composition. In some embodiments, the lean $NO_x$ trapping materials make up between approximately 50% to approximately 95% by weight of the combination of the reducing catalytic particles, lean $NO_x$ trapping materials, and boehmite particles in the hybrid washcoat composition. In some embodiments, the lean $NO_x$ trapping materials make up between approximately 70% to approximately 90% by weight of the combination of the reducing catalytic particles, lean $NO_x$ trapping materials, and boehmite particles in the hybrid washcoat composition. In some embodiments, the lean $NO_x$ trapping materials make up between approximately 80% to approximately 85% by weight of the combination of the reducing catalytic particles, lean $NO_x$ trapping materials, and boehmite particles in the hybrid washcoat composition. In some embodiments, the lean $NO_x$ trapping materials make up about 85% by weight of the combination of the reducing catalytic particles, lean $NO_x$ trapping materials, and boehmite particles in the hybrid washcoat composition.

In some embodiments, the reducing catalytic particles make up between approximately 3% to approximately 40% by weight of the combination of the reducing catalytic particles, lean $NO_x$ trapping materials, and boehmite particles in the hybrid washcoat composition. In some embodiments, the reducing catalytic particles make up between approximately 5% to approximately 30% by weight of the combination of the reducing catalytic particles, lean $NO_x$ trapping materials, and boehmite particles in the hybrid washcoat composition. In some embodiments, the reducing catalytic particles make up between approximately 10% to approximately 20% by weight of the combination of the reducing catalytic particles, lean $NO_x$ trapping materials, and boehmite particles in the hybrid washcoat composition. In some embodiments, the reducing catalytic particles make up about 15% by weight of the combination of the reducing catalytic particles, lean $NO_x$ trapping materials, and boehmite particles in the hybrid washcoat composition. In some embodiments, the catalytically active particle in the reducing catalytic is rhodium at a loading of about 0.3 wt % in the reducing catalytic particles. In some embodiments, the catalytically active particle in the reducing catalytic particles is rhodium at a loading of about 0.4 wt % in the reducing catalytic particles. Other loadings described previously may also be used.

In some embodiments, the boehmite particles make up between approximately 0.5% to approximately 10% by weight of the combination of the reducing catalytic particles, lean $NO_x$ trapping materials, and boehmite particles in the hybrid washcoat composition. In some embodiments, the boehmite particles make up between approximately 1% to approximately 7% by weight of the combination of the reducing catalytic particles, lean $NO_x$ trapping materials, and boehmite particles in the hybrid washcoat composition. In some embodiments, the boehmite particles make up between approximately 2% to approximately 5% by weight of the combination of the reducing catalytic particles, lean $NO_x$ trapping materials, and boehmite particles in the hybrid washcoat composition. In some embodiments, the boehmite particles make up about 3% by weight of the combination of the reducing catalytic particles, lean $NO_x$ trapping materials, and boehmite particles in the hybrid washcoat composition.

In some embodiments, the $NO_x$ adsorption components make up about 5% to about 15% by weight of the combination of the reducing catalytic particles, lean $NO_x$ trapping materials, and boehmite particles in the hybrid washcoat composition. In some embodiments, the $NO_x$ adsorption components make up about 8% to about 12% by weight of the combination of the reducing catalytic particles, lean $NO_x$ trapping materials, and boehmite particles in the hybrid washcoat composition. In some embodiments, the $NO_x$ adsorption components make up about 9% to about 11% by weight of the combination of the reducing catalytic particles, lean $NO_x$ trapping materials, and boehmite particles in the hybrid washcoat composition. In some embodiments, the $NO_x$ adsorption components make up about 10% by weight of the combination of the reducing catalytic particles, lean $NO_x$ trapping materials, and boehmite particles in the hybrid washcoat composition.

In some embodiments, a reducing catalyst/NO storage washcoat slurry may be formed by mixing reducing catalysts, lean $NO_x$ trapping materials, and boehmite particles in an aqueous solution, and adjusting the pH of the slurry to between about 2 and about 6, or between about 3 and about 5, or about 4. Preferably, an organic acid, such as acetic acid, is used to adjust the pH of the slurry. In any embodiment, the hybrid washcoat slurry can be coated onto a substrate, dried, and calcined to produce a hybrid washcoat layer, as described above.

Catalytic Converters and Methods of Producing Catalytic Converters

In some embodiments, the invention provides for catalytic converters, which can comprise any of the washcoat compositions, washcoat configurations, or coated substrates described herein. The catalytic converters are useful in a variety of applications, such as in gasoline and diesel vehicles.

FIG. 6 illustrates one catalytic converter in accordance with some embodiments. Catalytically active material is included in a washcoat composition, which is coated onto a substrate to form a coated substrate. The coated substrate 614 is enclosed within an insulating material 612, which in turn is enclosed within a metallic container 610 (of, for example, stainless steel). A heat shield 608 and a gas sensor (for example, an oxygen sensor) 606 are depicted. The catalytic converter may be affixed to the exhaust system of the vehicle through flanges 604 and 618. The exhaust gas, which includes the raw emissions of hydrocarbons, carbon monoxide, and nitrogen oxides, enters the catalytic converter at 602. As the raw emissions pass through the catalytic converter, they react with the catalytically active material on the coated substrate, resulting in tailpipe emissions of water, carbon dioxide, and nitrogen exiting at 620. FIG. 6A is a magnified view of a section of the coated substrate 614, which shows the honeycomb structure of the coated substrate. The coated substrates, as described above, may be incorporated into a catalytic converter for use in a vehicle emissions control system.

Figure 7A:
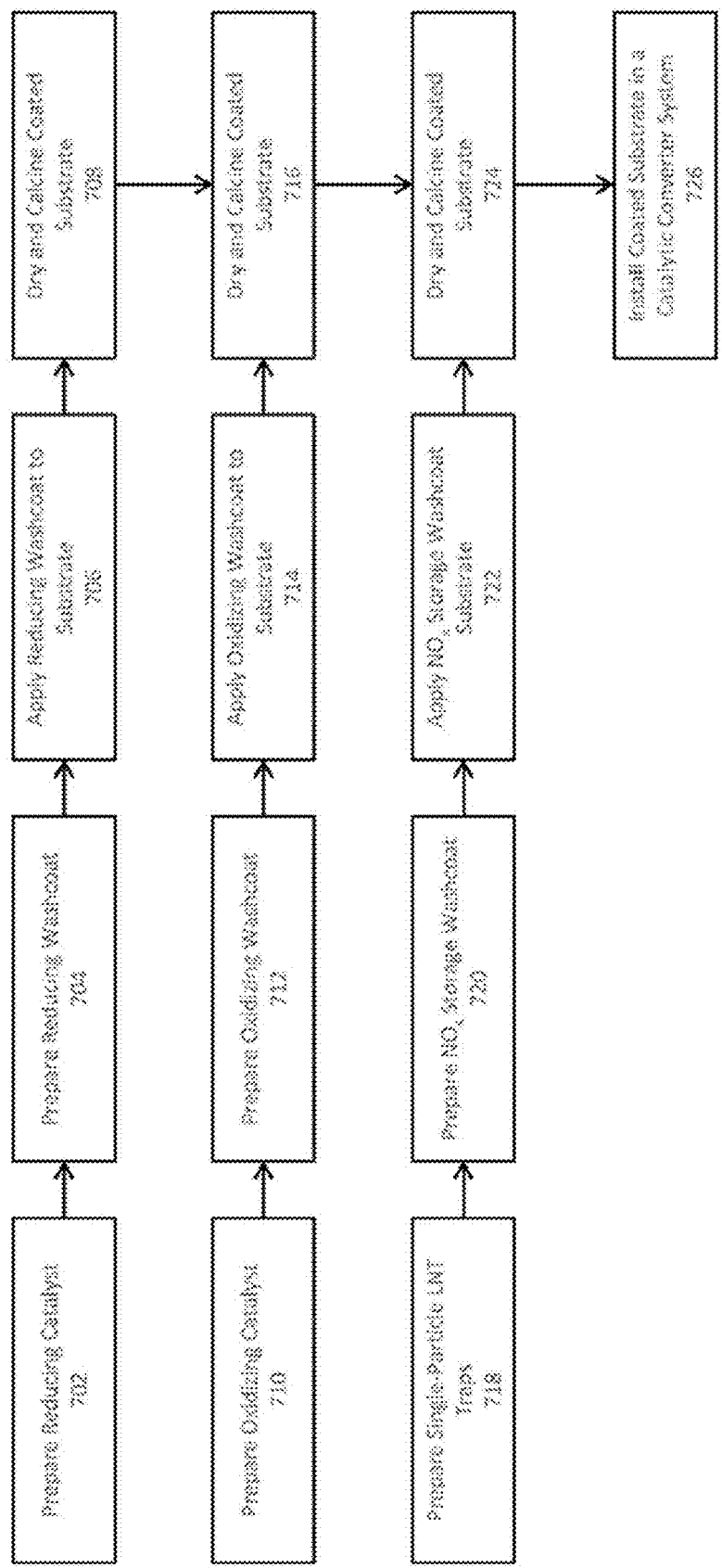
FIG. 7A is a flow chart illustrating one embodiment of a method of producing a coated substrate as described herein that may be used in a catalytic converter.

FIG. 7A is a flow chart illustrating one embodiment of a method of producing a coated substrate that may be used in a catalytic converter. The catalytic converter substrate includes reducing catalytically active particles in a reducing layer, oxidative catalytically active particles in an oxidative layer, and lean $NO_x$ trapping material in a $NO_x$ storage layer.

At step 702, a reducing catalyst is prepared. At step 704, a reducing washcoat slurry containing the reducing catalyst is prepared. At step 706, the reducing washcoat slurry is applied to the substrate. At step 708, the substrate is dried and calcined. At step 710, an oxidizing catalyst is prepared. At step 712, an oxidizing washcoat slurry containing the oxidizing catalyst is prepared. At step 714, the oxidizing washcoat slurry is applied to the substrate. At step 716, the substrate is dried and calcined. At step 718, lean $NO_x$ trap particles are prepared. At step 720, a $NO_x$ storage washcoat slurry containing the lean $NO_x$ trap particles is prepared. At step 722, the $NO_x$ storage washcoat slurry is applied to the substrate. At step 724, the substrate is dried and calcined. The final three-layer coated substrate may then be used in a catalytic converter at step 726.

Figure 7B:
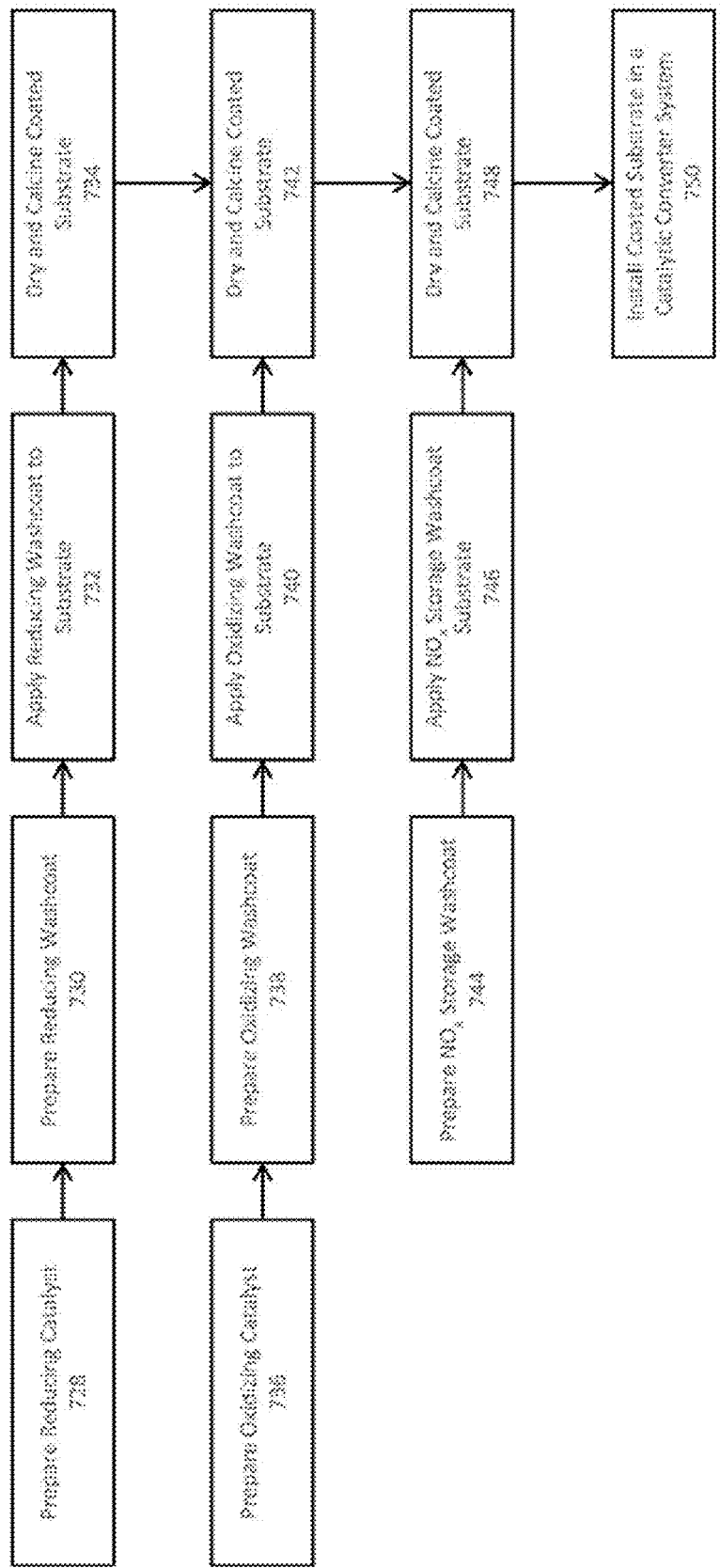
FIG. 7B is a flow chart illustrating another embodiment of a method of producing a coated substrate as described herein that may be used in a catalytic converter.

FIG. 7B is a flow chart illustrating another embodiment of a method of producing a coated substrate that may be used in a catalytic converter. The catalytic converter substrate produced by this method similarly includes reducing catalytically active particles in a reducing layer, oxidative catalytically active particles in an oxidative layer, and lean $NO_x$ trapping materials in a $NO_x$ storage layer.

At step 728, a reducing catalyst is prepared. At step 730 a reducing washcoat slurry containing the reducing catalyst is prepared. At step 732, the reducing washcoat slurry is applied to the substrate. At step 734, the substrate is dried and calcined. At step 736, an oxidizing catalyst is prepared. At step 738, an oxidizing washcoat slurry containing the oxidizing catalyst is prepared. At step 740, the oxidizing washcoat slurry is applied to the substrate. At step 742, the substrate is dried and calcined. At step 744, a $NO_x$ storage washcoat slurry containing micron-sized carrier particles with composite catalytic components attached (such as NNm™ particles or NNiM particles) and an alkaline earth metal salt is formed. At step 746, the $NO_x$ storage washcoat slurry is applied to the substrate. At step 748, the substrate is dried and calcined, thereby resulting in the alkaline earth metal salt being converted into an alkaline earth metal oxide. In some embodiments, a portion of the alkaline earth metal salt may been absorbed by the NNiM or NNm™ particles, resulting in impregnation of the NNiM or NNm™ particles with an alkaline earth metal oxide. The final three-layer coated substrate may then be used in a catalytic converter at step 750.

FIG. 7C is a flow chart illustrating another embodiment of a method of producing a coated substrate that may be used in a catalytic converter. The catalytic converter substrate includes reducing catalytically active particles in a reducing layer, oxidative catalytically active particles in an oxidative layer, and composite nanoparticles and $NO_x$ adsorption materials in a $NO_x$ storage layer.

At step 752, a reducing catalyst is prepared. At step 754, a reducing washcoat slurry containing the reducing catalyst is prepared. At step 756, the reducing washcoat slurry is applied to the substrate. At step 758, the substrate is dried and calcined. At step 760, an oxidizing catalyst is prepared. At step 762, an oxidizing washcoat formulation containing the oxidizing catalyst is prepared. At step 764, the oxidizing washcoat formulation is applied to the substrate. At step 766, the substrate is dried and calcined. At step 768, a $NO_x$ storage washcoat slurry containing composite catalytic particles, oxygen-storage materials, a barium salt, and boehmite is prepared. At step 770, the $NO_x$ storage washcoat slurry is applied to the substrate. At step 772, the substrate is dried and calcined. The final three-layer coated substrate may then be used in a catalytic converter at step 774.

LNT System $NO_x$ Storage Performance

Catalytic converters disclosed herein are designed to oxidize carbon monoxide and hydrocarbon emissions to less harmful carbon dioxide and reduce NO emissions to less harmful nitrogen gas. Optimal carbon monoxide and hydrocarbon oxidation occurs in an oxygen rich, or lean-burn, environment. However, the lean-burn stage results in poor catalysis of the $NO_x$ emissions. Instead, $NO_x$ catalysis is more efficient during the rich-burn stage. An LNT system first stores $NO_x$ gases during a lean-burn stage. The system may then be cycled to a rich-purge stage, whereby the $NO_x$ gases are released from the lean $NO_x$ trapping materials and may be reduced by a reducing catalyst to nitrogen gas. By cycling the system between the lean-burn stage and rich-purge stage, $NO_x$ exhaust gases can be minimized. Prior LNT systems were inefficient at storing $NO_x$ emissions during the lean-burn stage, resulting in significant $NO_x$ leakage, or $NO_x$ slip.

LNT systems, coated substrates, and catalytic converters employing the lean $NO_x$ trapping materials disclosed herein demonstrate reduced $NO_x$ slip compared to prior systems. In some embodiments, LNT systems, coated substrates, and catalytic converters employing the lean $NO_x$ trapping materials disclosed herein demonstrate a $NO_x$ slip of 1 ppm or less, 2 ppm or less, 5 ppm or less, 10 ppm or less, 25 ppm or less, 50 ppm or less, or 75 ppm per less when treated with exhaust gas including about 100 ppm $NO_x$ at about 125° C. under lean-burn conditions for about 100 seconds, about 200 seconds, about 500 seconds, about 800 seconds, or about 100 seconds. In some embodiments, LNT systems, coated substrates, and catalytic converters employing the lean $NO_x$ trapping materials disclosed herein demonstrate a $NO_x$ slip of 1 ppm or less, 2 ppm or less, 5 ppm or less, 10 ppm or less, 25 ppm or less, 50 ppm or less, or 75 ppm per less when treated with exhaust gas including about 100 ppm $NO_x$ at about 250° C. under lean-burn conditions for about 100 seconds, about 200 seconds, about 500 seconds, about 800 seconds, or about 100 seconds. In some embodiments, LNT systems, coated substrates, and catalytic converters employing the lean $NO_x$ trapping materials disclosed herein demonstrate a $NO_x$ slip of 1 ppm or less, 2 ppm or less, 5 ppm or less, 10 ppm or less, 25 ppm or less, 50 ppm or less, or 75 ppm per less when treated with exhaust gas including about 100 ppm $NO_x$ at about 400° C. under lean-burn conditions for about 100 seconds, about 200 seconds, about 500 seconds, about 800 seconds, or about 100 seconds.

In some embodiments, LNT systems, coated substrates, and catalytic converters employing the lean $NO_x$ trapping materials disclosed herein demonstrate a $NO_x$ slip of 1 ppm or less, 2 ppm or less, 5 ppm or less, 10 ppm or less, 25 ppm or less, 50 ppm or less, or 75 ppm per less when treated with exhaust gas including about 100 ppm $NO_x$ under lean-burn conditions for about 100 seconds, about 200 seconds, about 500 seconds, about 800 seconds, or about 100 seconds with a platinum group metal loading content of 2 g/l or less. In some embodiments, LNT systems, coated substrates, and catalytic converters employing the lean $NO_x$ trapping materials disclosed herein demonstrate a $NO_x$ slip of 1 ppm or less, 2 ppm or less, 5 ppm or less, 10 ppm or less, 25 ppm or less, 50 ppm or less, or 75 ppm per less when treated with exhaust gas including about 100 ppm $NO_x$ under lean-burn conditions for about 100 seconds, about 200 seconds, about 500 seconds, about 800 seconds, or about 100 seconds with a platinum group metal loading content of 3 g/l or less. In some embodiments, LNT systems, coated substrates, and catalytic converters employing the lean $NO_x$ trapping materials disclosed herein demonstrate a $NO_x$ slip of 1 ppm or less, 2 ppm or less, 5 ppm or less, 10 ppm or less, 25 ppm or less, 50 ppm or less, or 75 ppm per less when treated with exhaust gas including about 100 ppm $NO_x$ under lean-burn conditions for about 100 seconds, about 200 seconds, about 500 seconds, about 800 seconds, or about 100 seconds with a platinum group metal loading content of 4 g/l or less.

In some embodiments, the LNT systems, coated substrates, and catalytic converters are artificially aged by heating to about 400° C., about 500° C., about 600° C., about 700° C., about 800° C., about 900° C., about 1000° C., about 1100° C., or about 1200° C. for about (or up to about) 4 hours, about (or up to about) 6 hours, about (or up to about) 8 hours, about (or up to about) 10 hours, about (or up to about) 12 hours, about (or up to about) 14 hours, about (or up to about) 16 hours, about (or up to about) 18 hours, about (or up to about) 20 hours, about (or up to about) 22 hours, or about (or up to about) 24 hours, or about (or up to about) 50 hours prior to measuring $NO_x$ slip. In some embodiments, they are artificially aged by heating to about 800° C. for about 16 hours prior to measuring $NO_x$ slip.

Exhaust Systems, Vehicles, and Emissions Performance

LNT systems have utility in a number of fields including the treatment of exhaust gas streams from internal combustion engines such as automobile, truck, and other gasoline-fueled or diesel-fueled engines. Emission standards for unburned hydrocarbons, carbon monoxide and nitrogen oxide contaminants have been set by various governments and must be met by older, as well as new, vehicles. In order to meet such standards, catalytic converters containing an LNT system are located in the exhaust gas line of internal combustion engines.

In some embodiments, a coated substrate as disclosed herein is housed within a catalytic converter in a position configured to receive exhaust gas from an internal combustion engine, such as in an exhaust system of an internal combustion engine. The catalytic converter can be used with the exhaust from a gasoline engine or diesel engine. The catalytic converter can be installed on a vehicle containing a gasoline engine or a vehicle containing a diesel engine.

The coated substrate is placed into a housing, such as that shown in FIG. 6, which can in turn be placed into an exhaust system (also referred to as an exhaust treatment system) of an internal combustion engine. The internal combustion engine can be a gasoline engine or a diesel engine, such as a light-duty engine, such as the engine of a light-duty vehicle. The exhaust system of the internal combustion engine receives exhaust gases from the engine, typically into an exhaust manifold, and delivers the exhaust gases to an exhaust treatment system. The exhaust system can also include other components, such as oxygen sensors, HEGO (heated exhaust gas oxygen) sensors, UEGO (universal exhaust gas oxygen) sensors, sensors for other gases, and temperature sensors. The exhaust system can also include a controller such as an engine control unit (ECU), a microprocessor, or an engine management computer, which can adjust various parameters in the vehicle (fuel flow rate, fuel/air ratio, fuel injection, engine timing, valve timing, etc.) in order to optimize the components of the exhaust gases that reach the exhaust treatment system, so as to manage the emissions released into the environment.

"Treating" an exhaust gas, such as the exhaust gas from a gasoline or diesel engine, refers to having the exhaust gas proceed through an exhaust system (exhaust treatment system) prior to release into the environment.

When used in a catalytic converter, the substrates coated with the washcoat formulations including nano-on-nano-on-micro particles disclosed herein provide a significant improvement over other catalytic converters. The coated substrates may exhibit performance in converting hydrocarbons, carbon monoxide, and nitrogen oxides that is comparable to or better than present commercial coated substrates using wet chemistry techniques with the same or less loading of PGM. The coated substrates, catalytic converters, and exhaust treatment systems described herein are useful for any vehicle employing an LNT or NSC system.

Emissions limits for Europe are summarized at the URL europa.eu/legislation_-summaries/environment/air_pollution/128186_en.htm. The Euro 6 emissions standards, scheduled for implementation as of September 2014, specify a limit for diesel vehicles of 500 mg/km of CO emissions, 80 mg/km of $NO_x$ emissions, and 170 mg/km of HC (hydrocarbon)+$NO_x$ emissions. The Euro 6 emissions standards specify a limit for gasoline vehicles of 1000 mg/km of CO emissions, 60 mg/km of $NO_x$ emissions, 100 mg/km of THC (total hydrocarbon), and 68 mg/km NMHC (non-methane hydrocarbons). The disclosed catalytic converter substrates can be used in an emission system to meet or exceed these standards.

In some embodiments, a catalytic converter made with a coated substrate of the invention employed on a diesel engine, gasoline engine, gasoline vehicle, or diesel vehicle complies with Euro 6 requirements. In some embodiments, a catalytic converter made with a coated substrate of the invention employed on a diesel engine, gasoline engine, gasoline vehicle, or diesel vehicle complies with Euro 6 requirements during a lean-burn engine cycle. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention employed on a diesel engine, gasoline engine, gasoline vehicle, or diesel vehicle complies with Euro 6 requirements, while using at least about 30% less, up to about 30% less, at least about 40% less, up to about 40% less, at least about 50% less, up to about 50% less, at least about 60% less, or up to about 60% less platinum group metal or platinum group metal loading, as compared to a catalytic converter made with wet chemistry methods which complies with Euro 6 requirements. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention employed on a diesel engine, gasoline engine, gasoline vehicle, or diesel vehicle complies with United States EPA emissions requirements. In some embodiments, a catalytic converter made with a coated substrate of the invention employed on a diesel engine, gasoline engine, gasoline vehicle, or diesel vehicle complies with United States EPA emissions requirements, while using at least about 30% less, up to about 30% less, at least about 40% less, up to about 40% less, at least about 50% less, up to about 50% less, at least about 60% less, or up to about 60% less platinum group metal or platinum group metal loading, as compared to a catalytic converter made with wet chemistry methods which complies with the same standard. In some embodiments, the coated substrate is used in a catalytic converter to meet or exceed these standards. The emissions requirements can be intermediate life requirements or full life requirements. The requirements can be TLEV requirements, LEV requirements, or ULEV requirements. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention employed on a diesel engine, gasoline engine, gasoline vehicle, or diesel vehicle complies with EPA TLEV/LEV intermediate life requirements. In some embodiments, a catalytic converter made with a coated substrate of the invention employed on a diesel engine, gasoline engine, gasoline vehicle, or diesel vehicle complies with EPA TLEV/LEV full life requirements. In some embodiments, a catalytic converter made with a coated substrate of the invention employed on a diesel engine, gasoline engine, gasoline vehicle, or diesel vehicle complies with EPA ULEV intermediate life requirements. In some embodiments, a catalytic converter made with a coated substrate of the invention employed on a diesel engine, gasoline engine, gasoline vehicle, or diesel vehicle complies with EPA ULEV full life requirements. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention employed on a diesel engine, gasoline engine, gasoline vehicle, or diesel vehicle complies with EPA TLEV/LEV intermediate life requirements, while using at least about 30% less, up to about 30% less, at least about 40% less, up to about 40% less, at least about 50% less, up to about 50% less, at least about 60% less, or up to about 60% less platinum group metal or platinum group metal loading, as compared to a catalytic converter made with wet chemistry methods which complies with that standard. In some embodiments, a catalytic converter made with a coated substrate of the invention employed on a diesel engine, gasoline engine, gasoline vehicle, or diesel vehicle complies with EPA TLEV/LEV full life requirements, while using at least about 30% less, up to about 30% less, at least about 40% less, up to about 40% less, at least about 50% less, up to about 50% less, at least about 60% less, or up to about 60% less, platinum group metal or platinum group metal loading, as compared to a catalytic converter made with wet chemistry methods which complies with that standard. In some embodiments, a catalytic converter made with a coated substrate of the invention employed on a diesel engine, gasoline engine, gasoline vehicle, or diesel vehicle complies with EPA ULEV intermediate life requirements, while using at least about 30% less, up to about 30% less, at least about 40% less, up to about 40% less, at least about 50% less, up to about 50% less, at least about 60% less, or up to about 60% less, platinum group metal or platinum group metal loading, as compared to a catalytic converter made with wet chemistry methods which complies with that standard. In some embodiments, a catalytic converter made with a coated substrate of the invention employed on a diesel engine, gasoline engine, gasoline vehicle, or diesel vehicle complies with EPA ULEV full life requirements, while using at least about 30% less, up to about 30% less, at least about 40% less, up to about 40% less, at least about 50% less, up to about 50% less, at least about 60% less, or up to about 60% less, platinum group metal or platinum group metal loading, as compared to a catalytic converter made with wet chemistry methods which complies with that standard. In some embodiments, a catalytic converter made with a coated substrate of the invention employed on a diesel engine, gasoline engine, gasoline vehicle, or diesel vehicle complies with EPA S ULEV intermediate life requirements, while using at least about 30% less, up to about 30% less, at least about 40% less, up to about 40% less, at least about 50% less, up to about 50% less, at least about 60% less, or up to about 60% less, platinum group metal or platinum group metal loading, as compared to a catalytic converter made with wet chemistry methods which complies with that standard. In some embodiments, a catalytic converter made with a coated substrate of the invention employed on a diesel engine, gasoline engine, gasoline vehicle, or diesel vehicle complies with EPA SULEV full life requirements, while using at least about 30% less, up to about 30% less, at least about 40% less, up to about 40% less, at least about 50% less, up to about 50% less, at least about 60% less, or up to about 60% less, platinum group metal or platinum group metal loading, as compared to a catalytic converter made with wet chemistry methods which complies with that standard. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter). In some embodiments, the requirements above are those for light duty vehicles. In some embodiments, the requirements above are those for light duty trucks. In some embodiments, the requirements above are those for medium duty vehicles.

In some embodiments, a catalytic converter made with a coated substrate of the invention and employed on a diesel engine, gasoline engine, gasoline vehicle, or diesel vehicle displays $NO_x$ emissions of 180 mg/km or less during a lean-burn engine cycle. In some embodiments, a catalytic converter made with a coated substrate of the invention and employed on a diesel engine, gasoline engine, gasoline vehicle, or diesel vehicle displays $NO_x$ emissions of 80 mg/km or less during a lean-burn engine cycle. In some embodiments, a catalytic converter made with a coated substrate of the invention and employed on a diesel engine, gasoline engine, gasoline vehicle, or diesel vehicle displays $NO_x$ emissions of 60 mg/km or less during a lean-burn engine cycle. In some embodiments, a catalytic converter made with a coated substrate of the invention and employed on a diesel engine, gasoline engine, gasoline vehicle, or diesel vehicle displays $NO_x$ emissions of 40 mg/km or less during a lean-burn engine cycle. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention and employed on a diesel engine, gasoline engine, gasoline vehicle, or diesel vehicle displays $NO_x$ emissions of 180 mg/km or less. In some embodiments, a catalytic converter made with a coated substrate of the invention and employed on a diesel engine, gasoline engine, gasoline vehicle, or diesel vehicle displays $NO_x$ emissions of 80 mg/km or less. In some embodiments, a catalytic converter made with a coated substrate of the invention and employed on a diesel engine, gasoline engine, gasoline vehicle, or diesel vehicle displays $NO_x$ emissions of 60 mg/km or less. In some embodiments, a catalytic converter made with a coated substrate of the invention and employed on a diesel engine, gasoline engine, gasoline vehicle, or diesel vehicle displays $NO_x$ emissions of 40 mg/km or less. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention and employed on a diesel engine or diesel vehicle displays $NO_x$ plus HC emissions of 230 mg/km or less during a lean-burn engine cycle. In some embodiments, a catalytic converter made with a coated substrate of the invention and employed on a diesel engine or diesel vehicle displays $NO_x$ plus HC emissions of 170 mg/km or less during a lean-burn engine cycle. In some embodiments, a catalytic converter made with a coated substrate of the invention and employed on a diesel engine or diesel vehicle displays $NO_x$ plus HC emissions of 85 mg/km or less during a lean-burn engine cycle. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention and employed on a diesel engine or diesel vehicle displays $NO_x$ plus HC emissions of 230 mg/km or less. In some embodiments, a catalytic converter made with a coated substrate of the invention and employed on a diesel engine or diesel vehicle displays $NO_x$ plus HC emissions of 170 mg/km or less. In some embodiments, a catalytic converter made with a coated substrate of the invention and employed on a diesel engine or diesel vehicle displays $NO_x$ plus HC emissions of 85 mg/km or less. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention and employed on a diesel engine, gasoline engine, gasoline vehicle, or diesel vehicle displays $NO_x$ emissions of 180 mg/km or less during a lean-burn engine cycle, while using at least about 30% less, up to about 30% less, at least about 40% less, up to about 40% less, at least about 50% less, up to about 50% less, at least about 60% less, or up to about 60% less platinum group metal or platinum group metal loading, as compared to a catalytic converter made with wet chemistry methods which displays the same or similar emissions. In some embodiments, a catalytic converter made with a coated substrate of the invention and employed on a diesel engine, gasoline engine, gasoline vehicle, or diesel vehicle displays $NO_x$ emissions of 80 mg/km or less during a lean-burn engine cycle, while using at least about 30% less, up to about 30% less, at least about 40% less, up to about 40% less, at least about 50% less, up to about 50% less, at least about 60% less, or up to about 60% less platinum group metal or platinum group metal loading, as compared to a catalytic converter made with wet chemistry methods which displays the same or similar emissions. In some embodiments, a catalytic converter made with a coated substrate of the invention and employed on a diesel engine, gasoline engine, gasoline vehicle, or diesel vehicle displays $NO_x$ emissions of 60 mg/km or less during a lean-burn engine cycle, while using at least about 30% less, up to about 30% less, at least about 40% less, up to about 40% less, at least about 50% less, up to about 50% less, at least about 60% less, or up to about 60% less platinum group metal or platinum group metal loading, as compared to a catalytic converter made with wet chemistry methods which displays the same or similar emissions. In some embodiments, a catalytic converter made with a coated substrate of the invention and employed on a diesel engine, gasoline engine, gasoline vehicle, or diesel vehicle displays $NO_x$ emissions of 40 mg/km or less during a lean-burn engine cycle, while using at least about 30% less, up to about 30% less, at least about 40% less, up to about 40% less, at least about 50% less, up to about 50% less, at least about 60% less, or up to about 60% less platinum group metal or platinum group metal loading, as compared to a catalytic converter made with wet chemistry methods which displays the same or similar emissions. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention and employed on a diesel engine, gasoline engine, gasoline vehicle, or diesel vehicle displays $NO_x$ emissions of 180 mg/km or less, while using at least about 30% less, up to about 30% less, at least about 40% less, up to about 40% less, at least about 50% less, up to about 50% less, at least about 60% less, or up to about 60% less platinum group metal or platinum group metal loading, as compared to a catalytic converter made with wet chemistry methods which displays the same or similar emissions. In some embodiments, a catalytic converter made with a coated substrate of the invention and employed on a diesel engine, gasoline engine, gasoline vehicle, or diesel vehicle displays $NO_x$ emissions of 80 mg/km or less, while using at least about 30% less, up to about 30% less, at least about 40% less, up to about 40% less, at least about 50% less, up to about 50% less, at least about 60% less, or up to about 60% less platinum group metal or platinum group metal loading, as compared to a catalytic converter made with wet chemistry methods which displays the same or similar emissions. In some embodiments, a catalytic converter made with a coated substrate of the invention and employed on a diesel engine, gasoline engine, gasoline vehicle, or diesel vehicle displays $NO_x$ emissions of 60 mg/km or less, while using at least about 30% less, up to about 30% less, at least about 40% less, up to about 40% less, at least about 50% less, up to about 50% less, at least about 60% less, or up to about 60% less platinum group metal or platinum group metal loading, as compared to a catalytic converter made with wet chemistry methods which displays the same or similar emissions. In some embodiments, a catalytic converter made with a coated substrate of the invention and employed on a diesel engine, gasoline engine, gasoline vehicle, or diesel vehicle displays $NO_x$ emissions of 40 mg/km or less, while using at least about 30% less, up to about 30% less, at least about 40% less, up to about 40% less, at least about 50% less, up to about 50% less, at least about 60% less, or up to about 60% less platinum group metal or platinum group metal loading, as compared to a catalytic converter made with wet chemistry methods which displays the same or similar emissions. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention and employed on a diesel engine or diesel vehicle displays $NO_x$ plus HC emissions of 230 mg/km or less during a lean-burn engine cycle, while using at least about 30% less, up to about 30% less, at least about 40% less, up to about 40% less, at least about 50% less, up to about 50% less, at least about 60% less, or up to about 60% less platinum group metal or platinum group metal loading, as compared to a catalytic converter made with wet chemistry methods which displays the same or similar emissions. In some embodiments, a catalytic converter made with a coated substrate of the invention and employed on a diesel engine or diesel vehicle displays $NO_x$ plus HC emissions of 170 mg/km or less during a lean-burn engine cycle, while using at least about 30% less, up to about 30% less, at least about 40% less, up to about 40% less, at least about 50% less, up to about 50% less, at least about 60% less, or up to about 60% less platinum group metal or platinum group metal loading, as compared to a catalytic converter made with wet chemistry methods which displays the same or similar emissions. In some embodiments, a catalytic converter made with a coated substrate of the invention and employed on a diesel engine or diesel vehicle displays $NO_x$ plus HC emissions of 85 mg/km or less during a lean-burn engine cycle, while using at least about 30% less, up to about 30% less, at least about 40% less, up to about 40% less, at least about 50% less, up to about 50% less, at least about 60% less, or up to about 60% less platinum group metal or platinum group metal loading, as compared to a catalytic converter made with wet chemistry methods which displays the same or similar emissions. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention and employed on a diesel engine or diesel vehicle displays $NO_x$ plus HC emissions of 230 mg/km or less, while using at least about 30% less, up to about 30% less, at least about 40% less, up to about 40% less, at least about 50% less, up to about 50% less, at least about 60% less, or up to about 60% less platinum group metal or platinum group metal loading, as compared to a catalytic converter made with wet chemistry methods which displays the same or similar emissions. In some embodiments, a catalytic converter made with a coated substrate of the invention and employed on a diesel engine or diesel vehicle displays $NO_x$ plus I-C emissions of 170 mg/km or less, while using at least about 30% less, up to about 30% less, at least about 40% less, up to about 40% less, at least about 50% less, up to about 50% less, at least about 60% less, or up to about 60% less platinum group metal or platinum group metal loading, as compared to a catalytic converter made with wet chemistry methods which displays the same or similar emissions. In some embodiments, a catalytic converter made with a coated substrate of the invention and employed on a diesel engine or diesel vehicle displays $NO_x$ plus HC emissions of 85 mg/km or less, while using at least about 30% less, up to about 30% less, at least about 40% less, up to about 40% less, at least about 50% less, up to about 50% less, at least about 60% less, or up to about 60% less platinum group metal or platinum group metal loading, as compared to a catalytic converter made with wet chemistry methods which displays the same or similar emissions. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention and employed on a diesel engine, gasoline engine, gasoline vehicle, or diesel vehicle displays carbon monoxide emissions of 1000 mg/km or less. In some embodiments, a catalytic converter made with a coated substrate of the invention and employed on a diesel engine, gasoline engine, gasoline vehicle, or diesel vehicle displays carbon monoxide emissions of 500 mg/km or less. In some embodiments, a catalytic converter made with a coated substrate of the invention and employed on a diesel engine, gasoline engine, gasoline vehicle, or diesel vehicle displays carbon monoxide emissions of 375 mg/km or less. In some embodiments, a catalytic converter made with a coated substrate of the invention and employed on a diesel engine, gasoline engine, gasoline vehicle, or diesel vehicle displays carbon monoxide emissions of 250 mg/km or less. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate and employed on a diesel engine, gasoline engine, gasoline vehicle, or diesel vehicle displays carbon monoxide emissions of 1000 mg/km or less, while using at least about 30% less, up to about 30% less, at least about 40% less, up to about 40% less, at least about 50% less, up to about 50% less, at least about 60% less, or up to about 60% less platinum group metal or platinum group metal loading, as compared to a catalytic converter made with wet chemistry methods which displays the same or similar emissions. In some embodiments, a catalytic converter made with a coated substrate and employed on a diesel engine, gasoline engine, gasoline vehicle, or diesel vehicle displays carbon monoxide emissions of 500 mg/km or less, while using at least about 30% less, up to about 30% less, at least about 40% less, up to about 40% less, at least about 50% less, up to about 50% less, at least about 60% less, or up to about 60% less platinum group metal or platinum group metal loading, as compared to a catalytic converter made with wet chemistry methods which displays the same or similar emissions. In some embodiments, a catalytic converter made with a coated substrate of the invention and employed on a diesel engine, gasoline engine, gasoline vehicle, or diesel vehicle displays carbon monoxide emissions of 375 mg/km or less, while using at least about 30% less, up to about 30% less, at least about 40% less, up to about 40% less, at least about 50% less, up to about 50% less, at least about 60% less, or up to about 60% less platinum group metal or platinum group metal loading, as compared to a catalytic converter made with wet chemistry methods which displays the same or similar emissions. In some embodiments, a catalytic converter made with a coated substrate of the invention and employed on a diesel engine, gasoline engine, gasoline vehicle, or diesel vehicle displays carbon monoxide emissions of 250 mg/km or less, while using at least about 30% less, up to about 30% less, at least about 40% less, up to about 40% less, at least about 50% less, up to about 50% less, at least about 60% less, or up to about 60% less platinum group metal or platinum group metal loading, as compared to a catalytic converter made with wet chemistry methods which displays the same or similar emissions. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention, loaded with 4.0 g/l of PGM or less displays a carbon monoxide light-off temperature at least 5° C. lower than a catalytic converter made with wet chemistry methods and having the same or similar PGM loading. In some embodiments, a catalytic converter made with a coated substrate of the invention, loaded with 4.0 g/l of PGM or less, displays a carbon monoxide light-off temperature at least 10° C. lower than a catalytic converter made with wet chemistry methods and having the same or similar PGM loading. In some embodiments, a catalytic converter made with a coated substrate of the invention, loaded with 4.0 g/l of PGM or less, displays a carbon monoxide light-off temperature at least 15° C. lower than a catalytic converter made with wet chemistry methods and having the same or similar PGM loading. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention, loaded with 4.0 g/l of PGM or less, displays a hydrocarbon light-off temperature at least 5° C. lower than a catalytic converter made with wet chemistry methods and having the same or similar PGM loading. In some embodiments, a catalytic converter made with a coated substrate of the invention, loaded with 4.0 g/l of PGM or less, displays a hydrocarbon light-off temperature at least 10° C. lower than a catalytic converter made with wet chemistry methods and having the same or similar PGM loading. In some embodiments, a catalytic converter made with a coated substrate of the invention, loaded with 4.0 g/l of PGM or less, displays a hydrocarbon light-off temperature at least 15° C. lower than a catalytic converter made with wet chemistry methods and having the same or similar PGM loading. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention, loaded with 4.0 g/l of PGM or less, displays a nitrogen oxide light-off temperature at least 5° C. lower than a catalytic converter made with wet chemistry methods and having the same or similar PGM loading. In some embodiments, a catalytic converter made with a coated substrate of the invention, loaded with 4.0 g/l of PGM or less, displays a nitrogen oxide light-off temperature at least 10° C. lower than a catalytic converter made with wet chemistry methods and having the same or similar PGM loading. In some embodiments, a catalytic converter made with a coated substrate of the invention, loaded with 4.0 g/l of PGM or less, displays a nitrogen oxide light-off temperature at least 15° C. lower than a catalytic converter made with wet chemistry methods and having the same or similar PGM loading. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention, loaded with 3.0 g/l of PGM or less, displays a carbon monoxide light-off temperature at least 5° C. lower than a catalytic converter made with wet chemistry methods and having the same or similar PGM loading. In some embodiments, a catalytic converter made with a coated substrate of the invention, loaded with 3.0 g/l of PGM or less, displays a carbon monoxide light-off temperature at least 10° C. lower than a catalytic converter made with wet chemistry methods and having the same or similar PGM loading. In some embodiments, a catalytic converter made with a coated substrate of the invention, loaded with 3.0 g/l of PGM or less, displays a carbon monoxide light-off temperature at least 15° C. lower than a catalytic converter made with wet chemistry methods and having the same or similar PGM loading. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention, loaded with 3.0 g/l of PGM or less, displays a hydrocarbon light-off temperature at least 5° C. lower than a catalytic converter made with wet chemistry methods and having the same or similar PGM loading. In some embodiments, a catalytic converter made with a coated substrate of the invention, loaded with 3.0 g/l of PGM or less, displays a hydrocarbon light-off temperature at least 10° C. lower than a catalytic converter made with wet chemistry methods and having the same or similar PGM loading. In some embodiments, a catalytic converter made with a coated substrate of the invention, loaded with 3.0 g/l of PGM or less, displays a hydrocarbon light-off temperature at least 15° C. lower than a catalytic converter made with wet chemistry methods and having the same or similar PGM loading. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention, loaded with 3.0 g/l of PGM or less, displays a nitrogen oxide light-off temperature at least 5° C. lower than a catalytic converter made with wet chemistry methods and having the same or similar PGM loading. In some embodiments, a catalytic converter made with a coated substrate of the invention, loaded with 3.0 g/l of PGM or less, displays a nitrogen oxide light-off temperature at least 10° C. lower than a catalytic converter made with wet chemistry methods and having the same or similar PGM loading. In some embodiments, a catalytic converter made with a coated substrate of the invention, loaded with 3.0 g/l of PGM or less, displays a nitrogen oxide light-off temperature at least 15° C. lower than a catalytic converter made with wet chemistry methods and having the same or similar PGM loading. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within ±2° C. of the carbon monoxide light-off temperature of a catalytic converter made with wet chemistry methods, while the catalytic converter made with a coated substrate employing about 40 to 60% less catalyst than the catalytic converter made with wet chemistry methods. In some embodiments, the catalytic converter made with a coated substrate of the invention demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within ±1° C. of the carbon monoxide light-off temperature of a catalytic converter made with wet chemistry methods, while the catalytic converter made with a coated substrate employing about 40 to 60% less catalyst than the catalytic converter made with wet chemistry methods. In some embodiments, the catalytic converter made with a coated substrate of the invention demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within ±2° C. of the hydrocarbon light-off temperature of a catalytic converter made with wet chemistry methods, while the catalytic converter made with a coated substrate employing about 40 to 60% less catalyst than the catalytic converter made with wet chemistry methods. In some embodiments, the catalytic converter made with a coated substrate of the invention demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within ±1° C. of the hydrocarbon light-off temperature of a catalytic converter made with wet chemistry methods, while the catalytic converter made with a coated substrate employing about 40 to 60% less catalyst than the catalytic converter made with wet chemistry methods. In some embodiments, the catalytic converter made with a coated substrate of the invention demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within ±2° C. of the nitrogen oxide light-off temperature of a catalytic converter made with wet chemistry methods, while the catalytic converter made with a coated substrate employing about 40 to 60% less catalyst than the catalytic converter made with wet chemistry methods. In some embodiments, the catalytic converter made with a coated substrate of the invention demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within ±4° C. of the nitrogen oxide light-off temperature of a catalytic converter made with wet chemistry methods, while the catalytic converter made with a coated substrate employing about 40 to 60% less catalyst than the catalytic converter made with wet chemistry methods. In some embodiments, the catalytic converter made with a coated substrate of the invention demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, for the above-described comparisons, both the coated substrate according to the invention, and the catalyst used in the commercially available catalytic converter or the catalyst prepared using wet chemistry methods, are aged (by the same amount) prior to testing. In some embodiments, both the coated substrate according to the invention, and the catalyst substrate used in the commercially available catalytic converter or the catalyst substrate prepared using wet chemistry methods, are aged to about (or up to about) 50,000 kilometers, about (or up to about) 50,000 miles, about (or up to about) 75,000 kilometers, about (or up to about) 75,000 miles, about (or up to about) 100,000 kilometers, about (or up to about) 100,000 miles, about (or up to about) 125,000 kilometers, about (or up to about) 125,000 miles, about (or up to about) 150,000 kilometers, or about (or up to about) 150,000 miles. In some embodiments, for the above-described comparisons, both the coated substrate according to the invention, and the catalyst substrate used in the commercially available catalytic converter or the catalyst substrate prepared using wet chemistry methods, are artificially aged (by the same amount) prior to testing. In some embodiments, they are artificially aged by heating to about 400° C., about 500° C., about 600° C., about 700° C., about 800° C., about 900° C., about 1000° C., about 1100° C., or about 1200° C. for about (or up to about) 4 hours, about (or up to about) 6 hours, about (or up to about) 8 hours, about (or up to about) 10 hours, about (or up to about) 12 hours, about (or up to about) 14 hours, about (or up to about) 16 hours, about (or up to about) 18 hours, about (or up to about) 20 hours, about (or up to about) 22 hours, or about (or up to about) 24 hours, or about (or up to about) 50 hours. In some embodiments, they are artificially aged by heating to about 800° C. for about 16 hours.

In some embodiments, for the above-described comparisons, the thrifting (reduction) of platinum group metal for the catalytic converters made with substrates of the invention is compared with either (1) a commercially available catalytic converter made using wet chemistry for the application disclosed (e.g., for use on a gasoline engine, gasoline vehicle, diesel engine, or diesel vehicle) or (2) a catalytic converter made with wet chemistry that uses the minimal amount of platinum group metal to achieve the performance standard indicated, and after the coated substrate according to the invention and the substrate of the compared catalytic converter are aged as described above.

In some embodiments, for the above-described catalytic converters employing the coated substrates of the invention, for the exhaust treatment systems using catalytic converters employing the coated substrates of the invention, and for vehicles employing these catalytic converters and exhaust treatment systems, the catalytic converter may be employed as a diesel oxidation catalyst along with a diesel particulate filter, or the catalytic converter may be employed as a diesel oxidation catalyst along with a diesel particulate filter and a selective catalytic reduction unit, to meet or exceed the standards for CO and/or $NO_x$ and/or HC described above.

EXAMPLE EMBODIMENTS

Embodiment 1

A coated substrate comprising:
a substrate; and
a washcoat layer comprising:
   micron-sized particles, the micron-sized particles comprising:

a carrier; and a plurality of composite nanoparticles attached to the carrier, the composite nanoparticle comprising a support nanoparticle and a catalytic nanoparticle; and an alkaline earth metal oxide.

Embodiment 2

The coated substrate of embodiment 1, wherein a portion of the alkaline earth metal oxide is attached to the carrier.

Embodiment 3

The coated substrate of embodiment 1 or 2, wherein a portion of the alkaline earth metal oxide is not attached to the carrier.

Embodiment 4

The coated substrate of any one of embodiments 1-3, wherein the composite nanoparticles are bonded to the carrier.

Embodiment 5

The coated substrate of any one of embodiments 1-3, wherein the composite nanoparticles are embedded within the carrier.

Embodiment 6

The coated substrate of any one of embodiments 1-5, wherein the carrier is porous.

Embodiment 7

The coated substrate of any one of embodiments 1-6, wherein the carrier comprises a metal oxide.

Embodiment 8

The coated substrate of any one of embodiments 1-7, wherein the carrier comprises cerium oxide, zirconium oxide, lanthanum oxide, or yttrium oxide.

Embodiment 9

The coated substrate of any one of embodiments 1-8, wherein the carrier comprises cerium oxide.

Embodiment 10

The coated substrate of any one of embodiments 1-9, wherein the carrier comprises zirconium oxide.

Embodiment 11

The coated substrate of any one of embodiments 1-10, wherein the carrier comprises lanthanum oxide.

Embodiment 12

The coated substrate of any one of embodiments 1-11, wherein the carrier comprises yttrium oxide.

Embodiment 13

The coated substrate of any one of embodiments 1-12, wherein the carrier comprises cerium oxide and zirconium oxide.

Embodiment 14

The coated substrate of any one of embodiments 1-13, wherein the carrier comprises cerium oxide, zirconium oxide, and lanthanum oxide.

Embodiment 15

The coated substrate of any one of embodiments 1-14, wherein the carrier comprises cerium oxide, zirconium oxide, and yttrium oxide.

Embodiment 16

The coated substrate of any one of embodiments 1-15, wherein the carrier comprises cerium oxide, zirconium oxide, lanthanum oxide, and yttrium oxide.

Embodiment 17

The coated substrate of any one of embodiments 1-16, wherein the carrier comprises about 20% to about 100% cerium oxide.

Embodiment 18

The coated substrate of any one of embodiments 1-17, wherein the carrier comprises about 30% to about 90% cerium oxide.

Embodiment 19

The coated substrate of any one of embodiments 1-18, wherein the carrier comprises about 30% to about 50% cerium oxide.

Embodiment 20

The coated substrate of any one of embodiments 1-19, wherein the carrier comprises about 70% to about 90% cerium oxide.

Embodiment 21

The coated substrate of any one of embodiments 1-20, wherein the carrier comprises about 0% to about 80% zirconium oxide.

Embodiment 22

The coated substrate of any one of embodiments 1-21, wherein the carrier comprises about 5% to about 15% zirconium oxide.

Embodiment 23

The coated substrate of any one of embodiments 1-21, wherein the carrier comprises about 15% to about 35% zirconium oxide.

Embodiment 24

The coated substrate of any one of embodiments 1-21, wherein the carrier comprises about 35% to about 55% zirconium oxide.

Embodiment 25

The coated substrate of any one of embodiments 1-21, wherein the carrier comprises about 55% to about 65% zirconium oxide.

Embodiment 26

The coated substrate of any one of embodiments 1-25, wherein the carrier comprises about 0% to about 15% lanthanum oxide.

Embodiment 27

The coated substrate of any one of embodiments 1-26, wherein the carrier comprises about 2% to about 10% lanthanum oxide.

Embodiment 28

The coated substrate of any one of embodiments 1-27, wherein the carrier comprises about 2% to about 8% lanthanum oxide.

Embodiment 29

The coated substrate of any one of embodiments 1-28, wherein the carrier comprises about 3% to about 6% lanthanum oxide.

Embodiment 30

The coated substrate of any one of embodiments 1-29, wherein the carrier comprises about 4% to about 5% lanthanum oxide.

Embodiment 31

The coated substrate of any one of embodiments 1-30, wherein the carrier comprises about 0% to about 15% yttrium oxide.

Embodiment 32

The coated substrate of any one of embodiments 1-31, wherein the carrier comprises about 2% to about 10% yttrium oxide.

Embodiment 33

The coated substrate of any one of embodiments 1-32, wherein the carrier comprises about 2% to about 8% yttrium oxide.

Embodiment 34

The coated substrate of any one of embodiments 1-33, wherein the carrier comprises about 3% to about 6% yttrium oxide.

Embodiment 35

The coated substrate of any one of embodiments 1-34, wherein the carrier comprises about 4% to about 5% yttrium oxide.

Embodiment 36

The coated substrate of any one of embodiments 1-35, wherein the carrier comprises about 80% to about 90% cerium oxide and about 10% to about 20% zirconium oxide.

Embodiment 37

The coated substrate of any one of embodiments 1-36, wherein the carrier comprises about 80% to about 90% cerium oxide, about 5% to about 15% zirconium oxide, and about 3% to about 5% lanthanum oxide.

Embodiment 38

The coated substrate of any one of embodiments 1-37, wherein the carrier comprises about 80% to about 90% cerium oxide, about 5% to about 15% zirconium oxide, and about 3% to about 5% yttrium oxide.

Embodiment 39

The coated substrate of any one of embodiments 1-38, wherein the carrier comprises about 86% cerium oxide, about 10% zirconium oxide, and about 4% lanthanum oxide.

Embodiment 40

The coated substrate of any one of embodiments 1-39, wherein the carrier comprises about 86% cerium oxide, about 10% zirconium oxide, and about 4% yttrium oxide.

Embodiment 41

The coated substrate of any one of embodiments 1-40, wherein the composite nanoparticles are plasma generated.

Embodiment 42

The coated substrate of any one of embodiments 1-41, wherein the catalytic nanoparticle comprises one or more platinum group metals.

Embodiment 43

The coated substrate of any one of embodiments 1-42, wherein the catalytic nanoparticle comprises platinum or palladium.

Embodiment 44

The coated substrate of any one of embodiments 1-43, wherein the catalytic nanoparticle comprises platinum and palladium.

Embodiment 45

The coated substrate of any one of embodiments 1-44, wherein the catalytic nanoparticle comprises platinum and palladium of a ratio of about 1:2 platinum:palladium to about 25:1 platinum:palladium.

Embodiment 46

The coated substrate of any one of embodiments 1-45, wherein the catalytic nanoparticle comprises platinum and palladium of a ratio of about 10:1 platinum:palladium.

Embodiment 47

The coated substrate of any one of embodiments 1-46, wherein the support nanoparticle comprises a metal oxide.

Embodiment 48

The coated substrate of any one of embodiments 1-47, wherein the support nanoparticle comprises cerium oxide.

Embodiment 49

The coated substrate of any one of embodiments 1-48, wherein the composite nanoparticles comprise about 0.01 wt % to about 60 wt % platinum group metal and about 40 wt % to about 99.99 wt % metal oxide.

Embodiment 50

The coated substrate of any one of embodiments 1-49, wherein the composite nanoparticles comprise about 0.5 wt % to about 2 wt % platinum group metal and about 98 wt % to about 99.5 wt % metal oxide.

Embodiment 51

The coated substrate of any one of embodiments 1-50, wherein the alkaline earth metal oxide is barium oxide.

Embodiment 52

The coated substrate of any one of embodiments 2-51, wherein the alkaline earth metal oxide is attached to the carrier by depositing an alkaline earth metal salt from a solution onto the carrier and allowing the alkaline earth metal salt to convert into an alkaline earth metal oxide.

Embodiment 53

The coated substrate of embodiment 52, wherein the barium salt is barium acetate, barium bromide, barium carbonate, barium chloride, barium chromate, barium cyclohexanebutyrate, barium fluoride, barium hydroxide, barium iodide, barium manganite, or barium perchlorate.

Embodiment 54

The coated substrate of embodiment 52 or 53, wherein the barium salt is barium acetate.

Embodiment 55

The coated substrate of any one of embodiments 1-54, wherein the alkaline earth metal oxide is comprised in a plurality of alkaline earth metal oxide nanoparticles.

Embodiment 56

The coated substrate of to embodiment 55, wherein the plurality of alkaline earth metal oxide nanoparticles are plasma generated.

Embodiment 57

The coated substrate of any one of embodiments 1-54, wherein the alkaline earth metal oxide is comprised in a plurality of nanoparticles bound to support nanoparticles, forming a plurality of alkaline earth metal oxide composite nanoparticles.

Embodiment 58

The coated substrate of embodiment 57, wherein the plurality of alkaline earth metal oxide composite nanoparticles are plasma generated.

Embodiment 59

The coated substrate of any one of embodiments 55-58, wherein the alkaline earth metal nanoparticles or alkaline earth metal oxide composite nanoparticles are bonded to the carrier.

Embodiment 60

The coated substrate of any one of embodiments 55-58, wherein the alkaline earth metal oxide nanoparticles or alkaline earth metal oxide composite nanoparticles are embedded within the carrier.

Embodiment 61

The coated substrate of any one of embodiments 1-60, wherein the washcoat layer is configured to adsorb $NO_x$ gases during a lean burn.

Embodiment 62

The coated substrate of any one of embodiments 1-61, wherein the washcoat layer is configured to desorb $NO_x$ gases during a rich-purge cycle.

Embodiment 63

The coated substrate of any one of embodiments 1-62, wherein the micron-sized particles are about 10% to about 100% by weight of the washcoat layer solids.

Embodiment 64

The coated substrate of any one of embodiments 1-63, wherein the micron-sized particles are about 30% to about 99% by weight of the washcoat layer solids.

Embodiment 65

The coated substrate of any one of embodiments 1-64, wherein the micron-sized particles are about 50% to about 97% by weight of the washcoat layer solids.

Embodiment 66

The coated substrate of any one of embodiments 1-65, wherein the micron-sized particles are about 80% to about 96% by weight of the washcoat layer solids.

Embodiment 67

The coated substrate of any one of embodiments 1-66, wherein the washcoat layer further comprises aluminum oxide.

Embodiment 68

The coated substrate of embodiment 67, wherein the aluminum oxide is derived from boehmite.

Embodiment 69

The coated substrate of any one of embodiments 1-68, wherein the washcoat layer comprises about 1% to about 7% aluminum oxide by weight of the layer solids.

Embodiment 70

The coated substrate of any one of embodiments 1-69, wherein the washcoat layer comprises about 3% to about 6% aluminum oxide by weight of the layer solids.

Embodiment 71

The coated substrate of any one of embodiments 1-70, wherein the layer comprises about 4% to about 5% aluminum oxide by weight of the layer solids.

Embodiment 72

The coated substrate of any one of embodiments 1-71, wherein the alkaline earth metal oxides comprises about 5% to about 15% by weight of the washcoat layer solids.

Embodiment 73

The coated substrate of any one of embodiments 1-72, wherein the alkaline earth metal oxides comprises about 8% to about 12% by weight of the washcoat layer solids.

Embodiment 74

The coated substrate of any one of embodiments 1-73, wherein the alkaline earth metal oxides comprises about 10% by weight of the washcoat layer solids.

Embodiment 75

The coated substrate of any one of embodiments 1-74, further comprising a reducing washcoat layer.

Embodiment 76

The coated substrate of embodiment 75, wherein the reducing washcoat layer comprises a plurality of reducing micron-sized catalytic particles, the reducing micron-sized catalytic particles comprising a plurality of reducing composite nanoparticles attached to a reducing catalyst carrier particle.

Embodiment 77

The coated substrate of embodiment 76, wherein the reducing composite nanoparticles are bonded to the reducing catalyst carrier particle.

Embodiment 78

The coated substrate of embodiment 76, wherein the reducing composite nanoparticles are embedded within the reducing catalyst carrier particle.

Embodiment 79

The coated substrate of any one of embodiments 76-78, wherein the reducing composite nanoparticles comprise a reducing catalytic nanoparticle and a support nanoparticle.

Embodiment 80

The coated substrate of any one of embodiments 76-79, wherein the reducing composite nanoparticles are plasma-generated.

Embodiment 81

The coated substrate of any one of embodiments 76-80, wherein the reducing composite nanoparticles comprise rhodium.

Embodiment 82

The coated substrate of any one of embodiments 79-81, wherein the reducing catalytic nanoparticle comprises rhodium.

Embodiment 83

The coated substrate of any one of embodiments 79-82, wherein the support nanoparticle comprises cerium oxide.

Embodiment 84

The coated substrate of any one of embodiments 76-83, wherein the reducing catalyst carrier particle comprises a metal oxide.

Embodiment 85

The coated substrate of any one of embodiments 76-84, wherein the reducing catalyst carrier particle comprises cerium oxide, zirconium oxide, lanthanum oxide, or yttrium oxide.

Embodiment 86

The coated substrate of any one of embodiments 76-85, wherein the reducing catalyst carrier particle comprises cerium oxide.

Embodiment 87

The coated substrate of one of embodiments 75-86, wherein the reducing washcoat layer further comprises porous alumina particles.

Embodiment 88

The coated substrate of any one of embodiments 75-87, wherein the reducing washcoat layer further comprises aluminum oxide derived from boehmite.

Embodiment 89

The coated substrate of any one of embodiments 1-88, further comprising an oxidizing washcoat layer.

Embodiment 90

The coated substrate of embodiment 89, wherein the oxidizing washcoat layer comprises a plurality of micron-sized oxidizing catalytic particles, the micron-sized oxidizing catalytic particles comprising a plurality of oxidizing composite nanoparticles attached to an oxidizing catalyst carrier particle.

Embodiment 91

The coated substrate of embodiment 90, wherein the oxidizing composite nanoparticles are bonded to the oxidizing catalyst carrier particle.

Embodiment 92

The coated substrate according to embodiment 90, wherein the oxidizing composite nanoparticles are embedded within the oxidizing catalyst carrier particle.

Embodiment 93

The coated substrate of any one of embodiments 90-92, wherein the oxidizing composite nanoparticles comprise an oxidizing catalytic nanoparticle and a support nanoparticle.

Embodiment 94

The coated substrate of any one of embodiments 90-93, wherein the oxidizing composite nanoparticles are plasma-generated.

Embodiment 95

The coated substrate of any one of embodiments 90-94, wherein the oxidizing composite nanoparticles comprise one or more platinum group metals.

Embodiment 96

The coated substrate of any one of embodiments 90-95, wherein the oxidizing composite nanoparticles comprise platinum or palladium.

Embodiment 97

The coated substrate of any one of embodiments 93-96, wherein the oxidizing catalytic nanoparticle comprises platinum or palladium.

Embodiment 98

The coated substrate of any one of embodiments 93-97, wherein the support nanoparticles comprise a metal oxide.

Embodiment 99

The coated substrate of any one of embodiments 93-98, wherein the support nanoparticles comprise aluminum oxide.

Embodiment 100

The coated substrate of any one of embodiments 90-99, wherein the oxidizing catalyst carrier particle comprises aluminum oxide.

Embodiment 101

The coated substrate of any one of embodiments 89-100, wherein the oxidizing washcoat layer further comprises porous alumina particles.

Embodiment 102

The coated substrate of embodiment 101, wherein an alkaline earth metal oxide is attached to the alumina particles.

Embodiment 103

The coated substrate of embodiment 102, wherein the alkaline earth metal oxide is barium oxide.

Embodiment 104

The coated substrate of any one of embodiments 89-103, wherein the oxidizing washcoat layer further comprises aluminum oxide derived from boehmite.

Embodiment 105

The coated substrate of any one of embodiments 1-104, wherein the coated substrate demonstrates a $NO_x$ slip of 75 ppm or less when treated with exhaust gas comprising about 100 ppm $NO_x$ under lean-burn conditions for about 1000 seconds.

Embodiment 106

The coated substrate of any one of embodiments 1-105, wherein the coated substrate demonstrates a $NO_x$ slip of 50 ppm or less when treated with exhaust gas comprising about 100 ppm $NO_x$ under lean-burn conditions for about 1000 seconds.

Embodiment 107

The coated substrate of any one of embodiments 1-106, wherein the coated substrate demonstrates a $NO_x$ slip of 50 ppm or less when treated with exhaust gas comprising about 100 ppm $NO_x$ under lean-burn conditions for about 500 seconds.

Embodiment 108

The coated substrate of any one of embodiments 1-107, wherein the coated substrate has a platinum group metal loading of about 2.0 g/l or less.

Embodiment 109

A catalytic converter comprising the coated substrate of any one of embodiments 1-105.

Embodiment 110

An exhaust treatment system comprising a conduit for exhaust gas and a catalytic converter according to embodiment 109.

Embodiment 111

A vehicle comprising a catalytic converter according to embodiment 109.

Embodiment 112

A method of treating exhaust gas, comprising contacting the coated substrate of any one of embodiments 1-108 with the exhaust gas.

Embodiment 113

The method of embodiment 112, wherein the coated substrate is housed within a catalytic converter configured to receive exhaust gas.

Embodiment 114

A washcoat composition comprising:
micron-sized particles, the micron-sized particles comprising:
 a carrier; and
 a plurality of composite nanoparticles attached to the carrier, the composite nanoparticle comprising a support nanoparticle and a catalytic nanoparticle; and
an alkaline earth metal salt in solution.

Embodiment 115

The washcoat composition of embodiment 114, wherein a portion of the alkaline earth metal salt is deposited onto the micron-sized carrier particles.

Embodiment 116

The washcoat composition of embodiment 114 or 115, wherein a portion of the alkaline earth metal salt is not deposited onto the micron-sized carrier particles.

Embodiment 117

The washcoat composition of any one of embodiments 114-116, wherein the washcoat composition is calcined, thereby converting the alkaline earth metal salt into an alkaline earth metal oxide.

Embodiment 118

A washcoat composition comprising:
micron-sized particles, the micron-sized particles comprising:
 a carrier; and
 a plurality of composite nanoparticles attached to the carrier, the composite nanoparticle comprising a support nanoparticle and a catalytic nanoparticle; and
an alkaline earth metal oxide.

Embodiment 119

The washcoat composition of embodiment 118, wherein a portion of the alkaline earth metal oxide is attached to the micron-sized carrier particles.

Embodiment 120

The washcoat composition of embodiment 118 or 119, wherein a portion of the alkaline earth metal oxide is not attached to the micron-sized carrier particles.

Embodiment 121

The washcoat composition of any one of embodiments 114-120, wherein the composite nanoparticles are bonded to the micron-sized carrier particle.

Embodiment 122

The washcoat composition of any one of embodiments 114-121, wherein the composite nanoparticles are embedded within the carrier.

Embodiment 123

The washcoat composition of any one of embodiments 114-122, wherein the carrier comprises a metal oxide.

Embodiment 124

The washcoat composition of any one of embodiments 114-123, wherein the carrier comprises cerium oxide, zirconium oxide, lanthanum oxide, or yttrium oxide.

Embodiment 125

The washcoat composition of any one of embodiments 114-124, wherein the carrier comprises cerium oxide.

Embodiment 126

The washcoat composition of any one of embodiments 114-125, wherein the carrier comprises zirconium oxide.

Embodiment 127

The washcoat composition of any one of embodiments 114-126, wherein the carrier comprises lanthanum oxide.

Embodiment 128

The washcoat composition of any one of embodiments 114-127, wherein the carrier comprises yttrium oxide.

Embodiment 129

The washcoat composition of any one of embodiments 114-128, wherein the carrier comprises cerium oxide and zirconium oxide.

Embodiment 130

The washcoat composition of any one of embodiments 114-129, wherein the carrier comprises cerium oxide, zirconium oxide, and lanthanum oxide.

Embodiment 131

The washcoat composition of any one of embodiments 114-130, wherein the carrier comprises cerium oxide, zirconium oxide, and yttrium oxide.

Embodiment 132

The washcoat composition of any one of embodiments 114-131, wherein the carrier comprises cerium oxide, zirconium oxide, lanthanum oxide, and yttrium oxide.

Embodiment 133

The washcoat composition of any one of embodiments 114-132, wherein the carrier comprises about 20% to about 100% cerium oxide.

Embodiment 134

The washcoat composition of any one of embodiments 114-133, wherein the carrier comprises about 30% to about 90% cerium oxide.

Embodiment 135

The washcoat composition of any one of embodiments 114-134, wherein the carrier comprises about 30% to about 50% cerium oxide.

Embodiment 136

The washcoat composition of any one of embodiments 114-135, wherein the carrier comprises about 70% to about 90% cerium oxide.

Embodiment 137

The washcoat composition of any one of embodiments 114-136, wherein the carrier comprises about 0% to about 80% zirconium oxide.

Embodiment 138

The washcoat composition of any one of embodiments 114-136, wherein the carrier comprises about 5% to about 15% zirconium oxide.

Embodiment 139

The washcoat composition of any one of embodiments 114-136, wherein the carrier comprises about 15% to about 35% zirconium oxide.

Embodiment 140

The washcoat composition of any one of embodiments 114-136, wherein the carrier comprises about 35% to about 55% zirconium oxide.

Embodiment 141

The washcoat composition of any one of embodiments 114-136, wherein the carrier comprises about 55% to about 65% zirconium oxide.

Embodiment 142

The washcoat composition of any one of embodiments 114-141, wherein the carrier comprises about 0% to about 15% lanthanum oxide.

Embodiment 143

The washcoat composition of any one of embodiments 114-142, wherein the carrier comprises about 2% to about 10% lanthanum oxide.

Embodiment 144

The washcoat composition of any one of embodiments 114-143, wherein the carrier comprises about 2% to about 8% lanthanum oxide.

Embodiment 145

The washcoat composition of any one of embodiments 114-144, wherein the carrier comprises about 3% to about 6% lanthanum oxide.

Embodiment 146

The washcoat composition of any one of embodiments 114-145, wherein the carrier comprises about 4% to about 5% lanthanum oxide.

Embodiment 147

The washcoat composition of any one of embodiments 114-146, wherein the carrier comprises about 0% to about 15% yttrium oxide.

Embodiment 148

The washcoat composition of any one of embodiments 114-147, wherein the carrier comprises about 2% to about 10% yttrium oxide.

Embodiment 149

The washcoat composition of any one of embodiments 114-148, wherein the carrier comprises about 2% to about 8% yttrium oxide.

Embodiment 150

The washcoat composition of any one of embodiments 114-149, wherein the carrier comprises about 3% to about 6% yttrium oxide.

Embodiment 151

The washcoat composition of any one of embodiments 114-150, wherein the carrier comprises about 4% to about 5% yttrium oxide.

Embodiment 152

The washcoat composition of any one of embodiments 114-151, wherein the carrier comprises about 80% to about 90% cerium oxide and about 10% to about 20% zirconium oxide.

Embodiment 153

The washcoat composition of any one of embodiments 114-152, wherein the carrier comprises about 80% to about 90% cerium oxide, about 5% to about 15% zirconium oxide, and about 3% to about 5% lanthanum oxide.

Embodiment 154

The washcoat composition of any one of embodiments 114-153, wherein the carrier comprises about 80% to about 90% cerium oxide, about 5% to about 15% zirconium oxide, and about 3% to about 5% yttrium oxide.

Embodiment 155

The washcoat composition of any one of embodiments 114-154, wherein the carrier comprises about 86% cerium oxide, about 10% zirconium oxide, and about 4% lanthanum oxide.

Embodiment 156

The washcoat composition of any one of embodiments 114-155, wherein the carrier comprises about 86% cerium oxide, about 10% zirconium oxide, and about 4% yttrium oxide.

Embodiment 157

The washcoat composition of any one of embodiments 114-156, wherein the composite nanoparticles are plasma generated.

Embodiment 158

The washcoat composition of any one of embodiments 114-157, wherein the catalytic nanoparticle comprises one or more platinum group metals.

Embodiment 159

The washcoat composition of any one of embodiments 114-158, wherein the catalytic nanoparticle comprises platinum or palladium.

Embodiment 160

The washcoat composition of any one of embodiments 114-159, wherein the catalytic nanoparticle comprises platinum and palladium.

Embodiment 161

The washcoat composition of any one of embodiments 114-160, wherein the catalytic nanoparticle comprises platinum and palladium of a ratio of about 1:2 platinum:palladium to about 25:1 platinum:palladium.

Embodiment 162

The washcoat composition of any one of embodiments 114-161, wherein the catalytic nanoparticle comprises platinum and palladium of a ratio of about 10:1 platinum:palladium.

Embodiment 163

The washcoat composition of any one of embodiments 114-162, wherein the support nanoparticle comprises a metal oxide.

Embodiment 164

The washcoat composition of any one of embodiments 114-163, wherein the support nanoparticle comprises cerium oxide.

Embodiment 165

The washcoat composition of any one of embodiments 114-164, wherein the composite nanoparticles comprise about 0.01 wt % to about 60 wt % platinum group metal and about 40 wt % to about 99.99 wt % metal oxide.

Embodiment 166

The washcoat composition of any one of embodiments 114-165, wherein the composite nanoparticles comprise about 0.5 wt % to about 2 wt % platinum group metal and about 98 wt % to about 99.5 wt % metal oxide.

Embodiment 167

The washcoat composition of any one of embodiments 117-166, wherein the alkaline earth metal oxide is barium oxide.

Embodiment 168

The washcoat composition of any one of embodiments 118-167, wherein the alkaline earth metal oxide is attached to the carrier by depositing an alkaline earth metal salt onto the carrier and allowing the alkaline earth metal to convert into an alkaline earth metal oxide.

Embodiment 169

The washcoat composition of any one of embodiments 114-168, wherein the alkaline earth metal salt is barium acetate, barium bromide, barium carbonate, barium chloride, barium chromate, barium cyclohexanebutyrate, barium fluoride, barium hydroxide, barium iodide, barium manganite, or barium perchlorate.

Embodiment 170

The washcoat composition of any one of embodiments 114-169, wherein the alkaline earth metal salt is barium acetate.

Embodiment 171

The washcoat composition of any one of embodiments 117-170, wherein the alkaline earth metal oxide is comprised in a plurality of alkaline earth metal oxide nanoparticles.

Embodiment 172

The washcoat composition of embodiment 171, wherein the plurality of alkaline earth metal oxide nanoparticles are plasma generated.

Embodiment 173

The washcoat composition of any one of embodiments 118-173, wherein the alkaline earth metal oxide is comprised in a plurality of alkaline earth metal oxide composite nanoparticles, the alkaline earth metal oxide composite nanoparticles comprising alkaline earth metal oxide nanoparticles bound to support nanoparticles.

Embodiment 174

The washcoat composition of embodiment 173, wherein the plurality of alkaline earth metal oxide composite nanoparticles are plasma generated.

Embodiment 175

The washcoat composition of any one of embodiments 171-174, wherein the alkaline earth metal nanoparticles or alkaline earth metal oxide composite nanoparticles are bonded to the carrier.

Embodiment 176

The washcoat composition of any one of embodiments 171-174, wherein the alkaline earth metal oxide nanoparticles or alkaline earth metal oxide composite nanoparticles are embedded within the carrier.

Embodiment 177

The washcoat composition of any one of embodiments 114-176, wherein the washcoat composition is configured to adsorb $NO_x$ gases during a lean burn.

Embodiment 178

The washcoat composition of any one of embodiments 114-177, wherein the washcoat composition is configured to desorb $NO_x$ gases during a rich-purge cycle.

Embodiment 179

The washcoat composition of any one of embodiments 114-178, further comprising a thickening agent.

Embodiment 180

The washcoat composition of any one of embodiments 114-179, wherein the washcoat composition is coated on a substrate.

Embodiment 181

The washcoat composition according to embodiment 180, wherein the washcoat composition is a washcoat layer.

Embodiment 182

The washcoat composition of any one of embodiments 114-181, wherein the washcoat composition is about 150 g/l to about 400 gi of solids.

Embodiment 183

The washcoat composition of any one of embodiments 114-182, wherein the washcoat composition is about 225 g/l to about 350 g/l of solids.

Embodiment 184

The washcoat composition of any one of embodiments 114-183, wherein the washcoat composition is about 250 g/l to about 275 g/l of solids.

Embodiment 185

The washcoat composition of any one of embodiments 114-184, wherein the micron-sized catalytic particles make up about 10% to about 100% of the washcoat composition solids.

Embodiment 186

The washcoat composition of any one of embodiments 114-185, wherein the micron-sized catalytic particles make up about 30% to about 99% of the washcoat composition solids.

Embodiment 187

The washcoat composition of any one of embodiments 114-186, wherein the micron-sized catalytic particles make up about 50% to about 97% of the washcoat composition solids.

Embodiment 188

The washcoat composition of any one of embodiments 114-187, wherein the micron-sized catalytic particles make up about 80% to about 96% of the washcoat composition solids.

Embodiment 189

The washcoat composition of any one of embodiments 114-188, wherein the washcoat composition further comprises boehmite.

Embodiment 190

The washcoat composition of any one of embodiments 114-189, wherein the washcoat composition comprises boehmite of about 1% to about 7% of the washcoat composition solids.

Embodiment 191

The washcoat composition of any one of embodiments 114-190, wherein the washcoat composition comprises boehmite of about 3% to about 6% of the washcoat composition solids.

Embodiment 192

The washcoat composition of any one of embodiments 114-191, wherein the washcoat composition comprises boehmite of about 5% of the washcoat composition solids.

Embodiment 193

The washcoat composition of any one of embodiments 114-192, wherein an alkaline earth metal oxide makes up about 5% to about 15% of the washcoat composition solids.

Embodiment 194

The washcoat composition of any one of embodiments 114-193, wherein an alkaline earth metal oxide makes up about 8% to about 12% of the washcoat composition solids.

Embodiment 195

The washcoat composition of any one of embodiments 114-194, wherein an alkaline earth metal oxide makes up about 10% of the washcoat composition solids.

Embodiment 196

A coated substrate comprising a substrate coated with the washcoat composition of any one of embodiments 114-195.

Embodiment 197

The coated substrate of embodiment 196, wherein the coated substrate demonstrates a $NO_x$ slip of 75 ppm or less when treated with exhaust gas comprising about 100 ppm $NO_x$ under lean-burn conditions for about 1000 seconds.

Embodiment 198

The coated substrate of any one of embodiments 196 or 197, wherein the coated substrate demonstrates a $NO_x$ slip of 50 ppm or less when treated with exhaust gas comprising about 100 ppm $NO_x$ under lean-burn conditions for about 1000 seconds.

Embodiment 199

The coated substrate of any one of embodiments 196-198, wherein the coated substrate demonstrates a $NO_x$ slip of 50 ppm or less when treated with exhaust gas comprising about 100 ppm $NO_x$ under lean-burn conditions for about 500 seconds.

Embodiment 200

A catalytic converter comprising the coated substrate of any one of embodiments 196-199.

Embodiment 201

An exhaust treatment system comprising a conduit for exhaust gas and a catalytic converter according to embodiment 200.

Embodiment 202

A vehicle comprising a catalytic converter according to embodiment 200.

Embodiment 203

A method of treating exhaust gas, comprising contacting the coated substrate of any one of embodiments 196-199 with the exhaust gas.

Embodiment 204

The method according to embodiment 203, wherein the coated substrate is housed within a catalytic converter configured to receive exhaust gas.

Embodiment 205

A vehicle comprising a coated substrate, the coated substrate comprising:
  a substrate; and
  a washcoat layer comprising
  micron-sized particles, the micron-sized particles comprising:
    a carrier; and
    a plurality of composite nanoparticles attached to the carrier, the composite nanoparticle comprising a support nanoparticle and a catalytic nanoparticle; and
  an alkaline earth metal oxide.

Embodiment 206

The vehicle of embodiment 205, wherein a portion of the alkaline earth metal oxide is attached to the carrier.

Embodiment 207

The vehicle of embodiment 205 or 206, wherein a portion of the alkaline earth metal oxide is not attached to the carrier.

Embodiment 208

The vehicle of any one of embodiments 205-207, wherein the composite nanoparticles are bonded to the carrier.

Embodiment 209

The vehicle of any one of embodiments 205-208, wherein the composite nanoparticles are embedded within the carrier.

Embodiment 210

The vehicle of any one of embodiments 205-209, wherein the carrier is porous.

Embodiment 211

The vehicle of any one of embodiments 205-210, wherein the carrier comprises a metal oxide.

Embodiment 212

The vehicle of any one of embodiments 205-211, wherein the carrier comprises cerium oxide, zirconium oxide, lanthanum oxide, or yttrium oxide.

Embodiment 213

The vehicle of any one of embodiments 205-212, wherein the carrier comprises cerium oxide.

Embodiment 214

The vehicle of any one of embodiments 205-213, wherein the carrier comprises zirconium oxide.

Embodiment 215

The vehicle of any one of embodiments 205-214, wherein the carrier comprises lanthanum oxide.

Embodiment 216

The vehicle of any one of embodiments 205-215, wherein the carrier comprises yttrium oxide.

Embodiment 217

The vehicle of any one of embodiments 205-216, wherein the carrier comprises cerium oxide and zirconium oxide.

Embodiment 218

The vehicle of any one of embodiments 205-217, wherein the carrier comprises cerium oxide, zirconium oxide, and lanthanum oxide.

Embodiment 219

The vehicle of any one of embodiments 205-218, wherein the carrier comprises cerium oxide, zirconium oxide, and yttrium oxide.

Embodiment 220

The vehicle of any one of embodiments 205-219, wherein the carrier comprises cerium oxide, zirconium oxide, lanthanum oxide, and yttrium oxide.

Embodiment 221

The vehicle of any one of embodiments 205-220, wherein the carrier comprises about 20% to about 100% cerium oxide.

Embodiment 222

The vehicle of any one of embodiments 205-221, wherein the carrier comprises about 30% to about 90% cerium oxide.

Embodiment 223

The vehicle of any one of embodiments 205-222, wherein the carrier comprises about 30% to about 50% cerium oxide.

Embodiment 224

The vehicle of any one of embodiments 205-223, wherein the carrier comprises about 70% to about 90% cerium oxide.

Embodiment 225

The vehicle of any one of embodiments 205-224, wherein the carrier comprises about 0% to about 80% zirconium oxide.

Embodiment 226

The vehicle of any one of embodiments 205-225, wherein the carrier comprises about 5% to about 15% zirconium oxide.

Embodiment 227

The vehicle of any one of embodiments 205-225, wherein the carrier comprises about 15% to about 35% zirconium oxide.

Embodiment 228

The vehicle of any one of embodiments 205-225, wherein the carrier comprises about 35% to about 55% zirconium oxide.

Embodiment 229

The vehicle of any one of embodiments 205-225, wherein the carrier comprises about 55% to about 65% zirconium oxide.

Embodiment 230

The vehicle of any one of embodiments 205-229, wherein the carrier comprises about 0% to about 15% lanthanum oxide.

Embodiment 231

The vehicle of any one of embodiments 205-230, wherein the carrier comprises about 2% to about 10% lanthanum oxide.

Embodiment 232

The vehicle of any one of embodiments 205-231, wherein the carrier comprises about 2% to about 8% lanthanum oxide.

Embodiment 233

The vehicle of any one of embodiments 205-232, wherein the carrier comprises about 3% to about 6% lanthanum oxide.

Embodiment 234

The vehicle of any one of embodiments 205-233, wherein the carrier comprises about 4% to about 5% lanthanum oxide.

Embodiment 235

The vehicle of any one of embodiments 205-234, wherein the carrier comprises about 0% to about 15% yttrium oxide.

Embodiment 236

The vehicle of any one of embodiments 205-235, wherein the carrier comprises about 2% to about 10% yttrium oxide.

Embodiment 237

The vehicle of any one of embodiments 205-236, wherein the carrier comprises about 2% to about 8% yttrium oxide.

Embodiment 238

The vehicle of any one of embodiments 205-237, wherein the carrier comprises about 3% to about 6% yttrium oxide.

Embodiment 239

The vehicle of any one of embodiments 205-238, wherein the carrier comprises about 4% to about 5% yttrium oxide.

Embodiment 240

The vehicle of any one of embodiments 205-239, wherein the carrier comprises about 80% to about 90% cerium oxide and about 10% to about 20% zirconium oxide.

Embodiment 241

The vehicle of any one of embodiments 205-240, wherein the carrier comprises about 80% to about 90% cerium oxide, about 5% to about 15% zirconium oxide, and about 3% to about 5% lanthanum oxide.

Embodiment 242

The vehicle of any one of embodiments 205-241, wherein the carrier comprises about 80% to about 90% cerium oxide, about 5% to about 15% zirconium oxide, and about 3% to about 5% yttrium oxide.

Embodiment 243

The vehicle of any one of embodiments 205-242, wherein the carrier comprises about 86% cerium oxide, about 10% zirconium oxide, and about 4% lanthanum oxide.

Embodiment 244

The vehicle of any one of embodiments 205-243, wherein the carrier comprises about 86% cerium oxide, about 10% zirconium oxide, and about 4% yttrium oxide.

Embodiment 245

The vehicle of any one of embodiments 205-244, wherein the composite nanoparticles are plasma generated.

Embodiment 246

The vehicle of any one of embodiments 205-245, wherein the catalytic nanoparticle comprises one or more platinum group metals.

Embodiment 247

The vehicle of any one of embodiments 205-246, wherein the catalytic nanoparticle comprises platinum or palladium.

Embodiment 248

The vehicle of any one of embodiments 205-247, wherein the catalytic nanoparticle comprises platinum and palladium.

Embodiment 249

The vehicle of any one of embodiments 205-248, wherein the catalytic nanoparticle comprises platinum and palladium of a ratio of about 1:2 platinum:palladium to about 25:1 platinum:palladium.

Embodiment 250

The vehicle of any one of embodiments 205-249, wherein the catalytic nanoparticle comprises platinum and palladium of a ratio of about 10:1 platinum:palladium.

Embodiment 251

The vehicle of any one of embodiments 205-250, wherein the support nanoparticle comprises a metal oxide.

Embodiment 252

The vehicle of any one of embodiments 205-251, wherein the support nanoparticle comprises cerium oxide.

Embodiment 253

The vehicle of any one of embodiments 205-252, wherein the composite nanoparticles comprise about 0.01 wt % to about 60 wt % platinum group metal and about 40 wt % to about 99.99 wt % metal oxide.

Embodiment 254

The vehicle of any one of embodiments 205-253, wherein the composite nanoparticles comprise about 0.5 wt % to about 2 wt % platinum group metal and about 98 wt % to about 99.5 wt % metal oxide.

Embodiment 255

The vehicle of any one of embodiments 205-254, wherein the alkaline earth metal oxide is barium oxide.

Embodiment 256

The vehicle of any one of embodiments 205-255, wherein the alkaline earth metal oxide is attached to the carrier by depositing an alkaline earth metal salt from solution onto the carrier and allowing the alkaline earth metal salt to convert into an alkaline earth metal oxide.

Embodiment 257

The vehicle of embodiment 256, wherein the barium salt is barium acetate, barium bromide, barium carbonate, barium chloride, barium chromate, barium cyclohexanebutyrate, barium fluoride, barium hydroxide, barium iodide, barium manganite, or barium perchlorate.

Embodiment 258

The vehicle of embodiment 256 or 257, wherein the barium salt is barium acetate.

Embodiment 259

The vehicle of any one of embodiments 205-258, wherein the alkaline earth metal oxide is comprised in a plurality of alkaline earth metal oxide nanoparticles.

Embodiment 260

The coated substrate of to embodiment 259, wherein the plurality of alkaline earth metal oxide nanoparticles are plasma generated.

Embodiment 261

The vehicle of any one of embodiments 205-260, wherein the alkaline earth metal oxide is comprised in a plurality of nanoparticles bound to support nanoparticles, forming a plurality of alkaline earth metal oxide composite nanoparticles.

Embodiment 262

The vehicle of embodiment 261, wherein the plurality of alkaline earth metal oxide composite nanoparticles are plasma generated.

Embodiment 263

The vehicle of any one of embodiments 259-262, wherein the alkaline earth metal nanoparticles or alkaline earth metal oxide composite nanoparticles are bonded to the carrier.

Embodiment 264

The vehicle of any one of embodiments 259-262, wherein the alkaline earth metal oxide nanoparticles or alkaline earth metal oxide composite nanoparticles are embedded within the carrier.

Embodiment 265

The vehicle of any one of embodiments 205-264, wherein the washcoat layer is configured to adsorb $NO_x$ gases during a lean burn.

Embodiment 266

The vehicle of any one of embodiments 205-265, wherein the washcoat layer is configured to desorb $NO_x$ gases during a rich-purge cycle.

Embodiment 267

The vehicle of any one of embodiments 205-266, wherein the micron-sized particles are about 10% to about 100% by weight of the washcoat layer solids.

Embodiment 268

The vehicle of any one of embodiments 205-267, wherein the micron-sized particles are about 30% to about 99% by weight of the washcoat layer solids.

Embodiment 269

The vehicle of any one of embodiments 205-268, wherein the micron-sized particles are about 50% to about 97% by weight of the washcoat layer solids.

Embodiment 270

The vehicle of any one of embodiments 205-269, wherein the micron-sized particles are about 80% to about 96% by weight of the washcoat layer solids.

Embodiment 271

The vehicle of any one of embodiments 205-270, wherein the washcoat layer further comprises aluminum oxide.

Embodiment 272

The coated substrate of embodiment 271, wherein the aluminum oxide is derived from boehmite.

Embodiment 273

The vehicle of any one of embodiments 205-272, wherein the washcoat layer comprises about 1% to about 7% aluminum oxide by weight of the layer solids.

Embodiment 274

The vehicle of any one of embodiments 205-273, wherein the washcoat layer comprises about 3% to about 6% aluminum oxide by weight of the layer solids.

Embodiment 275

The vehicle of any one of embodiments 205-274, wherein the layer comprises about 4% to about 5% aluminum oxide by weight of the layer solids.

Embodiment 276

The vehicle of any one of embodiments 205-275, wherein the alkaline earth metal oxides comprises about 5% to about 15% by weight of the washcoat layer solids.

Embodiment 277

The vehicle of any one of embodiments 205-276, wherein the alkaline earth metal oxides comprises about 8% to about 12% by weight of the washcoat layer solids.

Embodiment 278

The vehicle of any one of embodiments 205-277, wherein the alkaline earth metal oxides comprises about 10% by weight of the washcoat layer solids.

Embodiment 279

The vehicle of any one of embodiments 205-278, wherein the coated substrate further comprises a reducing washcoat layer.

Embodiment 280

The vehicle of embodiment 279, wherein the reducing washcoat layer comprises a plurality of reducing micron-sized catalytic particles, the reducing micron-sized catalytic particles comprising a plurality of reducing composite nanoparticles attached to a reducing catalyst carrier particle.

Embodiment 281

The vehicle of embodiment 280, wherein the reducing composite nanoparticles are bonded to the reducing catalyst carrier particle.

Embodiment 282

The vehicle of embodiment 280, wherein the reducing composite nanoparticles are embedded within the reducing catalyst carrier particle.

Embodiment 283

The vehicle of any one of embodiments 280-282, wherein the reducing composite nanoparticles comprise a reducing catalytic nanoparticle and a support nanoparticle.

Embodiment 284

The vehicle of any one of embodiments 280-283, wherein the reducing composite nanoparticles are plasma-generated.

Embodiment 285

The vehicle of any one of embodiments 280-284, wherein the reducing composite nanoparticles comprise rhodium.

Embodiment 286

The vehicle of any one of embodiments 280-285, wherein the reducing catalytic nanoparticle comprises rhodium.

Embodiment 287

The vehicle of any one of embodiments 280-286, wherein the support nanoparticle comprises cerium oxide.

Embodiment 288

The vehicle of any one of embodiments 280-287, wherein the reducing catalyst carrier particle comprises a metal oxide.

Embodiment 289

The vehicle of any one of embodiments 280-288, wherein the reducing catalyst carrier particle comprises cerium oxide, zirconium oxide, lanthanum oxide, or yttrium oxide.

Embodiment 290

The vehicle of any one of embodiments 280-289, wherein the reducing catalyst carrier particle comprises cerium oxide.

Embodiment 291

The vehicle of any one of embodiments 279-290, wherein the reducing washcoat layer further comprises porous alumina particles.

Embodiment 292

The vehicle of any one of embodiments 279-291, wherein the reducing washcoat layer further comprises aluminum oxide derived from boehmite.

Embodiment 293

The vehicle of any one of embodiments 205-292, wherein the coated substrate further comprises an oxidizing washcoat layer.

Embodiment 294

The vehicle of embodiment 293, wherein the oxidizing washcoat layer comprises a plurality of micron-sized oxidizing catalytic particles, the micron-sized oxidizing catalytic particles comprising a plurality of oxidizing composite nanoparticles attached to an oxidizing catalyst carrier particle.

Embodiment 295

The vehicle of embodiment 294, wherein the oxidizing composite nanoparticles are bonded to the oxidizing catalyst carrier particle.

Embodiment 296

The vehicle of embodiment 294, wherein the oxidizing composite nanoparticles are embedded within the oxidizing catalyst carrier particle.

Embodiment 297

The vehicle of any one of embodiments 294-296, wherein the oxidizing composite nanoparticles comprise an oxidizing catalytic nanoparticle and a support nanoparticle.

Embodiment 298

The vehicle of any one of embodiments 294-297, wherein the oxidizing composite nanoparticles are plasma-generated.

Embodiment 299

The vehicle of any one of embodiments 293-298, wherein the oxidizing composite nanoparticles comprise one or more platinum group metals.

Embodiment 300

The vehicle of any one of embodiments 294-299, wherein the oxidizing composite nanoparticles comprise platinum or palladium.

Embodiment 301

The vehicle of any one of embodiments 297-300, wherein the oxidizing catalytic nanoparticle comprises platinum or palladium.

Embodiment 302

The vehicle of any one of embodiments 297-301, wherein the support nanoparticle comprises a metal oxide.

Embodiment 303

The vehicle of any one of embodiments 297-302, wherein the support nanoparticle comprises aluminum oxide.

Embodiment 304

The vehicle of any one of embodiments 297-303, wherein the oxidizing catalyst carrier particle comprises aluminum oxide.

Embodiment 305

The vehicle of any one of embodiments 293-304, wherein the oxidizing washcoat layer further comprises porous alumina particles.

Embodiment 306

The vehicle of embodiment 305, wherein an alkaline earth metal oxide is attached to the alumina particles.

Embodiment 307

The vehicle of embodiment 306, wherein the alkaline earth metal oxide is barium oxide.

Embodiment 308

The vehicle of any one of embodiments 293-307, wherein the oxidizing washcoat layer further comprises aluminum oxide derived from boehmite.

Embodiment 309

The vehicle of any one of embodiments 205-308, wherein the coated substrate demonstrates a $NO_x$ slip of 75 ppm or less when treated with exhaust gas comprising about 100 ppm $NO_x$ under lean-burn conditions for about 1000 seconds.

Embodiment 310

The vehicle of any one of embodiments 205-309, wherein the coated substrate demonstrates a $NO_x$ slip of 50 ppm or less when treated with exhaust gas comprising about 100 ppm $NO_x$ under lean-burn conditions for about 1000 seconds.

Embodiment 311

The vehicle of any one of embodiments 205-310, wherein the coated substrate demonstrates a $NO_x$ slip of 50 ppm or less when treated with exhaust gas comprising about 100 ppm $NO_x$ under lean-burn conditions for about 500 seconds.

Embodiment 312

The vehicle of any one of embodiments 205-311, wherein the coated substrate has a platinum group metal loading of about 2.0 g/l or less.

Embodiment 313

The vehicle according to any one of embodiments 110, 202 and 205-312, wherein the vehicle complies with the Euro 6 emissions requirements.

Embodiment 314

The vehicle according to any one of embodiments 110, 202 and 205-313, wherein the vehicle displays $NO_x$ emissions of 180 mg/km or less.

Embodiment 315

The vehicle according to any one of embodiments 110, 202 and 205-314, wherein the vehicle displays $NO_x$ emissions of 80 mg/km or less.

Embodiment 316

The vehicle according to any one of embodiments 110, 202 and 205-315, wherein the vehicle displays $NO_x$ emissions of 60 mg/km or less.

Embodiment 317

The vehicle according to any one of embodiments 110, 202 and 205-316, wherein the vehicle displays $NO_x$ emissions of 40 mg/km or less.

Embodiment 318

The vehicle according to any one of embodiments 110, 202 and 205-317, wherein the vehicle complies with the Euro 6 emissions requirements during a lean-burn engine cycle.

Embodiment 319

The vehicle according to any one of embodiments 110, 202 and 205-318, wherein the vehicle displays $NO_x$ emissions of 180 mg/km or less during a lean-burn engine cycle.

Embodiment 320

The vehicle according to any one of embodiments 110, 202 and 205-319, wherein the vehicle displays $NO_x$ emissions of 80 mg/km or less during a lean-burn engine cycle.

Embodiment 321

The vehicle according to any one of embodiments 110, 202 and 205-320, wherein the vehicle displays $NO_x$ emissions of 60 mg/km or less during a lean-burn engine cycle.

Embodiment 322

The vehicle according to any one of embodiments 110, 202 and 205-321, wherein the vehicle displays $NO_x$ emissions of 40 mg/km or less during a lean-burn engine cycle.

Embodiment 323

The vehicle according to any one of embodiments 110, 202 and 205-322, wherein the vehicle comprises a gasoline engine.

Embodiment 324

The vehicle according to any one of embodiments 110, 202 and 205-323, wherein the vehicle comprises a diesel engine.

Embodiment 325

A method of forming a washcoat composition comprising:
 combining an alkaline earth metal salt solution and a plurality of micron-sized particles, the plurality of micron-sized particles comprising:
  a carrier; and
  a plurality of composite nanoparticles attached to the carrier, the composite nanoparticle comprising a support nanoparticle and a catalytic nanoparticle.

Embodiment 326

The method of embodiment 325, further comprising dissolving an alkaline earth metal salt to form the alkaline earth metal salt solution.

Embodiment 327

The method of embodiment 325 or 326, further comprising calcining the washcoat composition.

Embodiment 328

The method of embodiment 327, wherein calcining the washcoat composition converts the alkaline earth metal salt into an alkaline earth metal oxide.

Embodiment 329

A method of forming a coated substrate comprising:
combining an alkaline earth metal salt solution and a plurality of micron-sized particles, the plurality of micron-sized particles comprising:
a carrier; and
a plurality of composite nanoparticles attached to the carrier, the composite nanoparticle comprising a support nanoparticle and a catalytic nanoparticle.
coating a substrate with the washcoat composition.

Embodiment 330

The method of embodiment 329, further comprising dissolving an alkaline earth metal salt to form the alkaline earth metal salt solution.

Embodiment 331

The method according to embodiment 329 or 330, further comprising calcining the coated substrate.

Embodiment 332

The method of embodiment 331, wherein calcining the coated substrate converts the alkaline earth metal salt into an alkaline earth metal oxide.

Embodiment 333

The method of any one of embodiments 325-332, wherein the combining step occurs in solution.

Embodiment 334

The method of embodiment 333, wherein the alkaline earth metal salt is dissolved in solution.

Embodiment 335

The method of any one of embodiments 325-334, wherein a portion of the alkaline earth metal salt is deposited onto the micron-sized carrier particles.

Embodiment 336

The method of any one of embodiments 325-335, wherein a portion of the alkaline earth metal salt is not deposited onto the micron-sized carrier particles.

Embodiment 337

The method of any one of embodiments 325-336, wherein the composite nanoparticles are bonded to the carrier.

Embodiment 338

The method of any one of embodiments 325-337, wherein the composite nanoparticles are embedded within the carrier.

Embodiment 339

The method of any one of embodiments 325-338, wherein the carrier is porous.

Embodiment 340

The method of any one of embodiments 325-339, wherein the carrier comprises a metal oxide.

Embodiment 341

The method of any one of embodiments 325-340, wherein the carrier comprises cerium oxide, zirconium oxide, lanthanum oxide, or yttrium oxide.

Embodiment 342

The method of any one of embodiments 325-341, wherein the carrier comprises cerium oxide.

Embodiment 343

The method of any one of embodiments 325-342, wherein the carrier comprises zirconium oxide.

Embodiment 344

The method of any one of embodiments 325-343, wherein the carrier comprises lanthanum oxide.

Embodiment 345

The method of any one of embodiments 325-344, wherein the carrier comprises yttrium oxide.

Embodiment 346

The method of any one of embodiments 325-345, wherein the carrier comprises cerium oxide and zirconium oxide.

Embodiment 347

The method of any one of embodiments 325-346, wherein the carrier comprises cerium oxide, zirconium oxide, and lanthanum oxide.

Embodiment 348

The method of any one of embodiments 325-347, wherein the carrier comprises cerium oxide, zirconium oxide, and yttrium oxide.

Embodiment 349

The method of any one of embodiments 325-348, wherein the carrier comprises cerium oxide, zirconium oxide, lanthanum oxide, and yttrium oxide.

Embodiment 350

The method of any one of embodiments 325-349, wherein the carrier comprises about 20% to about 100% cerium oxide.

Embodiment 351

The method of any one of embodiments 325-350, wherein the carrier comprises about 30% to about 90% cerium oxide.

Embodiment 352

The method of any one of embodiments 325-351, wherein the carrier comprises about 30% to about 50% cerium oxide.

Embodiment 353

The method of any one of embodiments 325-352, wherein the carrier comprises about 70% to about 90% cerium oxide.

Embodiment 354

The method of any one of embodiments 325-353, wherein the carrier comprises about 0% to about 80% zirconium oxide.

Embodiment 355

The method of any one of embodiments 325-354, wherein the carrier comprises about 5% to about 15% zirconium oxide.

Embodiment 356

The method of any one of embodiments 325-354, wherein the carrier comprises about 15% to about 35% zirconium oxide.

Embodiment 357

The method of any one of embodiments 325-354, wherein the carrier comprises about 35% to about 55% zirconium oxide.

Embodiment 358

The method of any one of embodiments 325-354, wherein the carrier comprises about 55% to about 65% zirconium oxide.

Embodiment 359

The method of any one of embodiments 325-358, wherein the carrier comprises about 0% to about 15% lanthanum oxide.

Embodiment 360

The method of any one of embodiments 325-359, wherein the carrier comprises about 2% to about 10% lanthanum oxide.

Embodiment 361

The method of any one of embodiments 325-360, wherein the carrier comprises about 2% to about 8% lanthanum oxide.

Embodiment 362

The method of any one of embodiments 325-361, wherein the carrier comprises about 3% to about 6% lanthanum oxide.

Embodiment 363

The method of any one of embodiments 325-362, wherein the carrier comprises about 4% to about 5% lanthanum oxide.

Embodiment 364

The method of any one of embodiments 325-363, wherein the carrier comprises about 0% to about 15% yttrium oxide.

Embodiment 365

The method of any one of embodiments 325-364, wherein the carrier comprises about 2% to about 10% yttrium oxide.

Embodiment 366

The method of any one of embodiments 325-365, wherein the carrier comprises about 2% to about 8% yttrium oxide.

Embodiment 367

The method of any one of embodiments 325-366, wherein the carrier comprises about 3% to about 6% yttrium oxide.

Embodiment 368

The method of any one of embodiments 325-367, wherein the carrier comprises about 4% to about 5% yttrium oxide.

Embodiment 369

The method of any one of embodiments 325-368, wherein the carrier comprises about 80% to about 90% cerium oxide and about 10% to about 20% zirconium oxide.

Embodiment 370

The method of any one of embodiments 325-369, wherein the carrier comprises about 80% to about 90% cerium oxide, about 5% to about 15% zirconium oxide, and about 3% to about 5% lanthanum oxide.

Embodiment 371

The method of any one of embodiments 325-370, wherein the carrier comprises about 80% to about 90% cerium oxide, about 5% to about 15% zirconium oxide, and about 3% to about 5% yttrium oxide.

Embodiment 372

The method of any one of embodiments 325-371, wherein the carrier comprises about 86% cerium oxide, about 10% zirconium oxide, and about 4% lanthanum oxide.

Embodiment 373

The method of any one of embodiments 325-371, wherein the carrier comprises about 86% cerium oxide, about 10% zirconium oxide, and about 4% yttrium oxide.

Embodiment 374

The method of any one of embodiments 325-373, wherein the composite nanoparticles are plasma generated.

Embodiment 375

The method of any one of embodiments 325-374, wherein the catalytic nanoparticle comprises one or more platinum group metals.

Embodiment 376

The method of any one of embodiments 325-375, wherein the catalytic nanoparticle comprises platinum or palladium.

Embodiment 377

The method of any one of embodiments 325-376, wherein the catalytic nanoparticle comprises platinum and palladium.

Embodiment 378

The method of any one of embodiments 325-377, wherein the catalytic nanoparticle comprises platinum and palladium of a ratio of about 1:2 platinum:palladium to about 25:1 platinum:palladium.

Embodiment 379

The method of any one of embodiments 325-378, wherein the catalytic nanoparticle comprises platinum and palladium of a ratio of about 10:1 platinum:palladium.

Embodiment 380

The method of any one of embodiments 325-379, wherein the support nanoparticle comprises a metal oxide.

Embodiment 381

The method of any one of embodiments 325-380, wherein the support nanoparticle comprises cerium oxide.

Embodiment 382

The method of any one of embodiments 325-381, wherein the composite nanoparticles comprise about 0.01 wt % to about 60 wt % platinum group metal and about 40 wt % to about 99.99 wt % metal oxide.

Embodiment 383

The method of any one of embodiments 325-382, wherein the composite nanoparticles comprise about 0.5 wt % to about 2 wt % platinum group metal and about 98 wt % to about 99.5 wt % metal oxide.

Embodiment 384

The method of any one of embodiments 325-383, wherein the alkaline earth metal salt is a barium salt.

Embodiment 385

The method of embodiment 384, wherein the barium salt is barium acetate, barium bromide, barium carbonate, barium chloride, barium chromate, barium cyclohexanebutyrate, barium fluoride, barium hydroxide, barium iodide, barium manganite, or barium perchlorate.

Embodiment 386

The method of embodiment 384 or 385, wherein the barium salt is barium acetate.

Embodiment 387

The method of any one of embodiments 325-386, wherein the washcoat composition is configured to adsorb $NO_x$ gases during a lean burn.

Embodiment 388

The method of any one of embodiments 325-387, wherein the washcoat composition is configured to desorb $NO_x$ gases during a rich-purge cycle.

Embodiment 389

The method of any one of embodiments 325-388, wherein the micron-sized particles are about 10% to about 100% by weight of the washcoat composition solids.

Embodiment 390

The method of any one of embodiments 325-389, wherein the micron-sized particles are about 30% to about 99% by weight of the washcoat composition solids.

Embodiment 391

The method of any one of embodiments 325-390, wherein the micron-sized particles are about 50% to about 97% by weight of the washcoat composition solids.

Embodiment 392

The method of any one of embodiments 325-391, wherein the micron-sized particles are about 80% to about 96% by weight of the washcoat composition solids.

Embodiment 393

The method of any one of embodiments 325-392, further comprising combining boehmite with the alkaline earth metal salt and micron-sized particles.

Embodiment 394

The method of any one of embodiments 325-393, wherein the washcoat composition comprises about 1% to about 7% boehmite by weight of the composition solids.

Embodiment 395

The method of any one of embodiments 325-394, wherein the washcoat composition comprises about 3% to about 6% boehmite by weight of the composition solids.

Embodiment 396

The method of any one of embodiments 325-395, wherein the washcoat composition comprises about 4% to about 5% boehmite by weight of the composition solids.

Embodiment 397

The method of any one of embodiments 325-396, wherein the alkaline earth metal salts comprises about 5% to about 15% by weight of the washcoat composition solids.

Embodiment 398

The method of any one of embodiments 325-397, wherein the alkaline earth metal salts comprises about 8% to about 12% by weight of the washcoat composition solids.

Embodiment 399

The method of any one of embodiments 325-398, wherein the alkaline earth metal salts comprises about 8% by weight of the washcoat composition solids.

Embodiment 400

The method of any one of embodiments 329-399, further comprising coating the substrate with a reducing washcoat composition.

Embodiment 401

The method of embodiment 400, further comprising calcining the substrate coated with the reducing washcoat composition.

Embodiment 402

The method of embodiment 400 or 401, wherein the reducing washcoat composition comprises a plurality of reducing micron-sized catalytic particles, the reducing micron-sized catalytic particles comprising a plurality of reducing composite nanoparticles attached to a reducing catalyst carrier particle.

Embodiment 403

The method of embodiment 402, wherein the reducing composite nanoparticles are bonded to the reducing catalyst carrier particle.

Embodiment 404

The method of embodiment 402, wherein the reducing composite nanoparticles are embedded within the reducing catalyst carrier particle.

Embodiment 405

The method of any one of embodiments 402-404, wherein the reducing composite nanoparticles comprise a reducing catalytic nanoparticle and a support nanoparticle.

Embodiment 406

The method of any one of embodiments 402-405, wherein the reducing composite nanoparticles are plasma-generated.

Embodiment 407

The method of any one of embodiments 402-406, wherein the reducing composite nanoparticles comprise rhodium.

Embodiment 408

The method of any one of embodiments 405-407, wherein the reducing catalytic nanoparticle comprises rhodium.

Embodiment 409

The method of any one of embodiments 405-408, wherein the support nanoparticle comprises cerium oxide.

Embodiment 410

The method of any one of embodiments 402-409, wherein the reducing catalyst carrier particle comprises a metal oxide.

Embodiment 411

The method of any one of embodiments 402-410, wherein the reducing catalyst carrier particle comprises cerium oxide, zirconium oxide, lanthanum oxide, or yttrium oxide.

Embodiment 412

The method of any one of embodiments 402-411, wherein the reducing catalyst carrier particle comprises cerium oxide.

Embodiment 413

The method of any one of embodiments 402-412, wherein the reducing washcoat composition further comprises porous alumina particles.

Embodiment 414

The method of any one of embodiments 402-413, wherein the reducing washcoat composition further comprises boehmite.

Embodiment 415

The method of any one of embodiments 329-414, further comprising coating the substrate with an oxidizing washcoat composition.

Embodiment 416

The method of embodiment 415, further comprising calcining the substrate coated with the oxidizing washcoat composition.

Embodiment 417

The method of embodiment 415 or 416, wherein the oxidizing washcoat composition comprises a plurality of micron-sized oxidizing catalytic particles, the micron-sized oxidizing catalytic particles comprising a plurality of oxidizing composite nanoparticles attached to an oxidizing catalyst carrier particle.

Embodiment 418

The method of embodiment 417, wherein the oxidizing composite nanoparticles are bonded to the oxidizing catalyst carrier particle.

Embodiment 419

The method of embodiment 417, wherein the oxidizing composite nanoparticles are embedded within the oxidizing catalyst carrier particle.

Embodiment 420

The method of any one of embodiments 417-419, wherein the oxidizing composite nanoparticles comprise an oxidizing catalytic nanoparticle and a support nanoparticle.

Embodiment 421

The method of any one of embodiments 417-420, wherein the oxidizing composite nanoparticles are plasma-generated.

Embodiment 422

The method of any one of embodiments 417-421, wherein the oxidizing composite nanoparticles comprise one or more platinum group metals.

Embodiment 423

The method of any one of embodiments 417-422, wherein the oxidizing composite nanoparticles comprise platinum or palladium.

Embodiment 424

The method of any one of embodiments 420-423, wherein the oxidizing catalytic nanoparticle comprises platinum or palladium.

Embodiment 425

The method of any one of embodiments 420-424, wherein the support nanoparticles comprise a metal oxide.

Embodiment 426

The method of any one of embodiments 420-425, wherein the support nanoparticles comprise aluminum oxide.

Embodiment 427

The method of any one of embodiments 417-424, wherein the oxidizing catalyst carrier particle comprises aluminum oxide.

Embodiment 428

The method of any one of embodiments 415-427, wherein the oxidizing washcoat composition further comprises porous alumina particles.

Embodiment 429

The method of embodiment 428, wherein an alkaline earth metal oxide is attached to the alumina particles.

Embodiment 430

The method of embodiment 429, wherein the alkaline earth metal oxide is barium oxide.

Embodiment 431

The method of any one of embodiments 415-430, wherein the oxidizing washcoat composition further comprises boehmite.

Embodiment 432

A washcoat composition formed by any one of methods 325-328 and 331-399.

Embodiment 433

A coated substrate formed by any one of methods 329-431.

Embodiment 434

The coated substrate of embodiment 433, wherein the coated substrate demonstrates a $NO_x$ slip of 75 ppm or less when treated with exhaust gas comprising about 100 ppm $NO_x$ under lean-burn conditions for about 1000 seconds.

Embodiment 435

The coated substrate of embodiment 433 or 434, wherein the coated substrate demonstrates a $NO_x$ slip of 50 ppm or less when treated with exhaust gas comprising about 100 ppm $NO_x$ under lean-burn conditions for about 1000 seconds.

Embodiment 436

The coated substrate of any one of embodiments 433-435, wherein the coated substrate demonstrates a $NO_x$ slip of 50 ppm or less when treated with exhaust gas comprising about 100 ppm $NO_x$ under lean-burn conditions for about 500 seconds.

Embodiment 437

The coated substrate of any one of embodiments 433-436, wherein the coated substrate has a platinum group metal loading of about 2.0 g/l or less.

Embodiment 438

A catalytic converter comprising the coated substrate of any one of embodiments 433-437.

Embodiment 439

An exhaust treatment system comprising a conduit for exhaust gas and a catalytic converter according to embodiment 438.

Embodiment 440

A vehicle comprising a catalytic converter according to embodiment 438.

Embodiment 441

A method of treating exhaust gas, comprising contacting the coated substrate of any one of embodiments 433-437 with the exhaust gas.

Embodiment 442

The method of embodiment 441, wherein the coated substrate is housed within a catalytic converter configured to receive exhaust gas.

Embodiment 443

A micron-sized particle for storing $NO_x$ gases comprising:
a micron-sized carrier particle;
a plurality of composite nanoparticles attached to the micron-sized carrier particle, the composite nanoparticles comprising a support nanoparticle and a catalytic nanoparticle; and
an alkaline earth metal oxide attached to the micron-sized carrier particle.

Embodiment 444

The micron-sized particle of embodiment 443, wherein the composite nanoparticles are bonded to the micron-sized carrier particle.

Embodiment 445

The micron-sized particle of embodiment 443, wherein the composite nanoparticles are embedded within the micron-sized carrier particle.

Embodiment 446

The micron-sized particle of any one of embodiments 443-445, wherein the composite nanoparticles are plasma generated.

Embodiment 447

The micron-sized particle of any one of embodiments 443-446, wherein the catalytic nanoparticle comprises one or more platinum group metals.

Embodiment 448

The micron-sized particle of any one of embodiments 443-447, wherein the catalytic nanoparticle comprises platinum or palladium.

Embodiment 449

The micron-sized particle of any one of embodiments 443-448, wherein the catalytic nanoparticle comprises platinum.

Embodiment 450

The micron-sized particle of any one of embodiments 443-449, wherein the catalytic nanoparticle comprises palladium.

Embodiment 451

The micron-sized particle of any one of embodiments 443-450, wherein the catalytic nanoparticle comprises platinum and palladium.

Embodiment 452

The micron-sized particle of any one of embodiments 443-451, wherein the catalytic nanoparticle comprises platinum and palladium at a range of about 1:2 platinum:palladium to about 25:1 platinum to palladium.

Embodiment 453

The micron-sized particle of any one of embodiments 443-452, wherein the catalytic nanoparticle comprises platinum and palladium at a range of about 1:1 platinum:palladium to about 25:1 platinum to palladium.

Embodiment 454

The micron-sized particle of any one of embodiments 443-453, wherein the catalytic nanoparticle comprises of platinum and palladium at a range of about 1:1 platinum:palladium to about 10:1 platinum to palladium.

Embodiment 455

The micron-sized particle of any one of embodiments 443-454, wherein the catalytic nanoparticle comprises of platinum and palladium at a range of about 10:1 platinum:palladium.

Embodiment 456

The micron-sized particle of any one of embodiments 443-455, wherein the support nanoparticle comprises a metal oxide.

Embodiment 457

The micron-sized particle of any one of embodiments 443-456, wherein the support nanoparticle comprises cerium oxide.

Embodiment 458

The micron-sized particle of any one of embodiments 443-457, wherein the composite nanoparticles comprise about 0.01 wt % to about 60 wt % platinum group metal and about 40 wt % to about 99.99 wt % metal oxide.

Embodiment 459

The micron-sized particle of any one of embodiments 443-458, wherein the composite nanoparticles comprise about 0.5 wt % to about 2 wt % platinum group metal and about 98 wt % to about 99.5 wt % metal oxide.

Embodiment 460

The micron-sized particle of any one of embodiments 443-459, wherein the micron-sized carrier particle comprises a metal oxide.

Embodiment 461

The micron-sized particle of any one of embodiments 443-460, wherein the micron-sized carrier particle is porous.

Embodiment 462

The micron-sized particle of any one of embodiments 443-461, wherein the micron-sized carrier particle comprises one or more of cerium oxide, zirconium oxide, lanthanum oxide, or yttrium oxide.

Embodiment 463

The micron-sized particle of any one of embodiments 443-462, wherein the micron-sized carrier particle comprises cerium oxide.

Embodiment 464

The micron-sized particle of any one of embodiments 443-463, wherein the micron-sized carrier particle comprises zirconium oxide.

Embodiment 465

The micron-sized particle of any one of embodiments 443-464, wherein the micron-sized carrier particle comprises lanthanum oxide.

Embodiment 466

The micron-sized particle of any one of embodiments 443-465, wherein the micron-sized carrier particle comprises yttrium oxide.

Embodiment 467

The micron-sized particle of any one of embodiments 443-466, wherein the micron-sized carrier particle comprises cerium oxide and zirconium oxide.

Embodiment 468

The micron-sized particle of any one of embodiments 443-467, wherein the micron-sized carrier particle comprises cerium oxide, zirconium oxide, and lanthanum oxide.

Embodiment 469

The micron-sized particle of any one of embodiments 443-468, wherein the micron-sized carrier particle comprises cerium oxide, zirconium oxide, and yttrium oxide.

Embodiment 470

The micron-sized particle of any one of embodiments 443-469, wherein the micron-sized carrier particle comprises cerium oxide, zirconium oxide, lanthanum oxide, and yttrium oxide.

Embodiment 471

The micron-sized particle of any one of embodiments 443-440, wherein the micron-sized carrier particle comprises about 20% to about 100% cerium oxide.

Embodiment 472

The micron-sized particle of any one of embodiments 443-471, wherein the micron-sized carrier particle comprises about 30% to about 90% cerium oxide.

Embodiment 473

The micron-sized particle of any one of embodiments 443-472, wherein the micron-sized carrier particle comprises about 30% to about 50% cerium oxide.

Embodiment 474

The micron-sized particle of any one of embodiments 443-473, wherein the micron-sized carrier particle comprises about 70% to about 90% cerium oxide.

Embodiment 475

The micron-sized particle of any one of embodiments 443-474, wherein the micron-sized carrier particle comprises about 0% to about 80% zirconium oxide.

Embodiment 476

The micron-sized particle of any one of embodiments 443-475, wherein the micron-sized carrier particle comprises about 5% to about 15% zirconium oxide.

Embodiment 477

The micron-sized particle of any one of embodiments 443-475, wherein the micron-sized carrier particle comprises about 15% to about 35% zirconium oxide.

Embodiment 478

The micron-sized particle of any one of embodiments 443-475, wherein the micron-sized carrier particle comprises about 35% to about 55% zirconium oxide.

Embodiment 479

The micron-sized particle of any one of embodiments 443-475, wherein the micron-sized carrier particle comprises about 55% to about 65% zirconium oxide.

Embodiment 480

The micron-sized particle of any one of embodiments 443-479, wherein the micron-sized carrier particle comprises about 0% to about 15% lanthanum oxide.

Embodiment 481

The micron-sized particle of any one of embodiments 443-480, wherein the micron-sized carrier particle comprises about 2% to about 10% lanthanum oxide.

Embodiment 482

The micron-sized particle of any one of embodiments 443-481, wherein the micron-sized carrier particle comprises about 2% to about 8% lanthanum oxide.

Embodiment 483

The micron-sized particle of any one of embodiments 443-482, wherein the micron-sized carrier particle comprises about 3% to about 6% lanthanum oxide.

Embodiment 484

The micron-sized particle of any one of embodiments 443-483, wherein the micron-sized carrier particle comprises about 4% to about 5% lanthanum oxide.

Embodiment 485

The micron-sized particle of any one of embodiments 443-484, wherein the micron-sized carrier particle comprises about 0% to about 15% yttrium oxide.

Embodiment 486

The micron-sized particle of any one of embodiments 443-485, wherein the micron-sized carrier particle comprises about 2% to about 10% yttrium oxide.

Embodiment 487

The micron-sized particle of any one of embodiments 443-486, wherein the micron-sized carrier particle comprises about 2% to about 8% yttrium oxide.

Embodiment 488

The micron-sized particle of any one of embodiments 443-487, wherein the micron-sized carrier particle comprises about 3% to about 6% yttrium oxide.

Embodiment 489

The micron-sized particle of any one of embodiments 443-488, wherein the micron-sized carrier particle comprises about 4% to about 5% yttrium oxide.

Embodiment 490

The micron-sized particle of any one of embodiments 443-488, wherein the micron-sized carrier particle comprises about 80% to about 90% cerium oxide and about 10% to about 20% zirconium oxide.

Embodiment 491

The micron-sized particle of any one of embodiments 443-490, wherein the micron-sized carrier particle comprises about 80% to about 90% cerium oxide, about 5% to about 15% zirconium oxide, and about 3% to about 5% lanthanum oxide.

Embodiment 492

The micron-sized particle of any one of embodiments 443-491, wherein the micron-sized carrier particle comprises about 80% to about 90% cerium oxide, about 5% to about 15% zirconium oxide, and about 3% to about 5% yttrium oxide.

Embodiment 493

The micron-sized particle of any one of embodiments 443-492, wherein the micron-sized carrier particle comprises about 86% cerium oxide, about 10% zirconium oxide, and about 4% lanthanum oxide.

Embodiment 494

The micron-sized particle of any one of embodiments 443-493, wherein the micron-sized carrier particle comprises about 86% cerium oxide, about 10% zirconium oxide, and about 4% yttrium oxide.

Embodiment 495

The micron-sized particle of any one of embodiments 443-494, wherein the alkaline earth metal oxide is barium oxide.

Embodiment 496

The micron-sized particle of any one of embodiments 443-495, wherein the alkaline earth metal oxide comprises about 1% to about 20% by mass of the micron-sized catalytic particle.

Embodiment 497

The micron-sized particle of any one of embodiments 443-496, wherein the alkaline earth metal oxide comprises about 5% to about 15% by mass of the micron-sized catalytic particle.

Embodiment 498

The micron-sized particle of any one of embodiments 443-497, wherein the alkaline earth metal oxide comprises about 8% to about 12% by mass of the micron-sized catalytic particle.

Embodiment 499

The micron-sized particle of any one of embodiments 443-498, wherein the alkaline earth metal oxide comprises about 10% by mass of the micron-sized catalytic particle.

Embodiment 500

The micron-sized particle of any one of embodiments 443-499, wherein the alkaline earth metal oxide is attached to the micron-sized carrier particle by depositing an alkaline earth metal salt from solution onto the micron-sized carrier particle and allowing the alkaline earth metal salt to convert into an alkaline earth metal oxide.

Embodiment 501

The micron-sized particle of any one of embodiments 443-500, wherein the alkaline earth metal oxide is comprised in a plurality of nanoparticles.

Embodiment 502

The micron-sized particle of embodiment 501, wherein the alkaline earth metal oxide nanoparticles are plasma generated.

Embodiment 503

The micron-sized particle of embodiment 500 or 501, wherein the alkaline earth metal oxide nanoparticles are bonded to the micron-sized carrier particle.

Embodiment 504

The micron-sized particle of embodiment 500 or 501, wherein the alkaline earth metal oxide nanoparticles are embedded within the micron-sized carrier particle.

Embodiment 505

The micron-sized particle of any one of embodiments 443-500, wherein the alkaline earth metal oxide is comprised in a plurality of nanoparticles bound to support nanoparticles, forming a plurality of alkaline earth metal oxide composite nanoparticles.

Embodiment 506

The micron-sized particle of embodiment 505, wherein the alkaline earth metal oxide composite nanoparticles are plasma generated.

Embodiment 507

The micron-sized particle of embodiment 505 or 506, wherein the alkaline earth metal oxide composite nanoparticles are bonded to the micron-sized carrier particle.

Embodiment 508

The micron-sized particle of embodiment 505 or 506, wherein the alkaline earth metal oxide composite nanoparticles are embedded within the micron-sized carrier particle.

Embodiment 509

The micron-sized catalytic particle of any one of embodiments 443-508, wherein the particle is configured to adsorb $NO_x$ gases during a lean burn.

Embodiment 510

The micron-sized catalytic particle of any one of embodiments 443-509, wherein the particle is configured to desorb $NO_x$ gases during a rich-purge cycle.

Embodiment 511

A washcoat composition comprising a plurality of micron-sized catalytic particle according to any one of embodiments 443-510.

Embodiment 512

The washcoat composition of embodiment 511, wherein the pH of the washcoat composition is between about 2 and about 7.

Embodiment 513

The washcoat composition of embodiment 511 or 512, wherein the pH of the washcoat composition is between about 3 and about 6.

Embodiment 514

The washcoat composition of any one of embodiments 511-513, wherein the pH of the washcoat composition is between about 4.

Embodiment 515

The washcoat composition of any one of embodiments 511-514, further comprising a thickening agent.

Embodiment 516

The washcoat composition of any one of embodiments 511-515, wherein the washcoat composition is coated onto a substrate.

Embodiment 517

The washcoat composition of embodiment 516, wherein the coated substrate has been calcined.

Embodiment 518

The washcoat composition of embodiment 517, wherein the washcoat composition is about 150 g/l to about 400 g/l of washcoat composition solids.

Embodiment 519

The washcoat composition of embodiment 517 or 518, wherein the washcoat composition is about 225 g/l to about 350 g/l of the washcoat composition solids.

Embodiment 520

The washcoat composition of any one of embodiments 517-519, wherein the washcoat composition is about 250 g/l to about 275 g/l of the washcoat composition solids.

Embodiment 521

The washcoat composition of any one of embodiments 511-520, wherein the micron-sized catalytic particles make up about 10% to about 100% of the washcoat composition solids.

Embodiment 522

The washcoat composition of any one of embodiments 511-521, wherein the micron-sized catalytic particles make up about 30% to about 99% of the washcoat composition solids.

Embodiment 523

The washcoat composition of any one of embodiments 511-522, wherein the micron-sized catalytic particles make up about 50% to about 97% of the washcoat composition solids.

Embodiment 524

The washcoat composition of any one of embodiments 511-523, wherein the micron-sized catalytic particles make up about 80% to about 96% of the washcoat composition solids.

Embodiment 525

The washcoat composition of any one of embodiments 511-524, wherein the washcoat composition further comprises boehmite.

Embodiment 526

The washcoat composition of embodiment 511-525, wherein the washcoat composition comprises boehmite of about 1% to about 7% of the washcoat composition solids.

Embodiment 527

The washcoat composition of any one of embodiments 511-526, wherein the washcoat composition comprises boehmite of about 3% to about 6% of the washcoat composition solids.

Embodiment 528

A coated substrate comprising a substrate coated with the washcoat composition according to any one of embodiments 511-527.

Embodiment 529

The coated substrate according to embodiment 528, wherein the coated substrate demonstrates a $NO_x$ slip of 75 ppm or less when treated with exhaust gas comprising about 100 ppm $NO_x$ under lean-burn conditions for about 1000 seconds.

Embodiment 530

The coated substrate of embodiment 528 or 529, wherein the coated substrate demonstrates a $NO_x$ slip of 50 ppm or less when treated with exhaust gas comprising about 100 ppm $NO_x$ under lean-burn conditions for about 1000 seconds.

Embodiment 531

The coated substrate of any one of embodiments 528-530, wherein the coated substrate demonstrates a $NO_x$ slip of 50 ppm or less when treated with exhaust gas comprising about 100 ppm $NO_x$ under lean-burn conditions for about 500 seconds.

Embodiment 532

The coated substrate of any one of embodiments 528-531, wherein the coated substrate has a platinum group metal loading of about 2.0 g/l or less.

Embodiment 533

A catalytic converter comprising the coated substrate according to any one of embodiments 528-532.

Embodiment 534

An exhaust treatment system comprising a conduit for exhaust gas and a catalytic converter according to embodiment 533.

Embodiment 535

A vehicle comprising a catalytic converter according to embodiment 533.

Embodiment 536

A vehicle of embodiment 535, wherein the vehicle complies with the Euro 6 emissions requirements.

Embodiment 537

A vehicle of embodiment 535 or 536, wherein the vehicle displays $NO_x$ emissions of 180 mg/km or less.

Embodiment 538

A vehicle of any one of embodiments 535-537, wherein the vehicle displays $NO_x$ emissions of 80 mg/km or less.

Embodiment 539

A vehicle of any one of embodiments 535-538, wherein the vehicle displays $NO_x$ emissions of 60 mg/km or less.

Embodiment 540

A vehicle of any one of embodiments 535-539, wherein the vehicle displays $NO_x$ emissions of 40 mg/km or less.

Embodiment 541

A vehicle of any one of embodiments 535-540, wherein the vehicle complies with the Euro 6 emissions requirements during a lean-burn engine cycle.

Embodiment 542

A vehicle of any one of embodiments 535-541, wherein the vehicle displays $NO_x$ emissions of 180 mg/km or less during a lean-burn engine cycle.

Embodiment 543

A vehicle of any one of embodiments 535-542, wherein the vehicle displays $NO_x$ emissions of 80 mg/km or less during a lean-burn engine cycle.

Embodiment 544

A vehicle of any one of embodiments 535-543, wherein the vehicle displays $NO_x$ emissions of 60 mg/km or less during a lean-burn engine cycle.

Embodiment 545

A vehicle of any one of embodiments 535-544, wherein the vehicle displays $NO_x$ emissions of 40 mg/km or less during a lean-burn engine cycle.

Embodiment 546

A vehicle of any one of embodiments 535-545, wherein the vehicle comprises a gasoline engine.

Embodiment 547

A vehicle of any one of embodiments 535-546, wherein the vehicle comprises a diesel engine.

Embodiment 548

A method of producing micron-sized particles for storing $NO_x$ gases comprising:
  suspending composite catalytic nanoparticles, wherein the composite catalytic nanoparticles comprise a catalytic nanoparticle bonded to a support nanoparticle;
  depositing the composite catalytic nanoparticles onto micron-sized carrier particles;
  depositing an alkaline earth metal salt onto the micron-sized carrier particles; and
  calcining the micron-sized carrier particles.

Embodiment 549

The method of embodiment 548, wherein the alkaline earth metal salt is in a solution.

Embodiment 550

The method of embodiment 548 or 549, wherein calcining bonds the composite nanoparticles to the micron-sized particles.

Embodiment 551

The method of embodiment 548 or 550, wherein the micron-sized carrier particles are porous.

Embodiment 552

The method of any one of embodiments 548-551, wherein the micron-sized carrier particles comprise a metal oxide.

Embodiment 553

The method of any one of embodiments 548-552, wherein the micron-sized carrier particles comprise a cerium oxide, zirconium oxide, lanthanum oxide, or yttrium oxide.

Embodiment 554

The method of any one of embodiments 548-553, wherein the micron-sized carrier particles comprise a cerium oxide.

Embodiment 555

The method of any one of embodiments 548-554, wherein the micron-sized carrier particles comprise zirconium oxide.

Embodiment 556

The method of any one of embodiments 548-555, wherein the micron-sized carrier particles comprise lanthanum oxide.

Embodiment 557

The method of any one of embodiments 548-556, wherein the micron-sized carrier particles comprise yttrium oxide.

Embodiment 558

The method of any one of embodiments 548-557, wherein the micron-sized carrier particles comprise cerium oxide and zirconium oxide.

Embodiment 559

The method of any one of embodiments 548-558, wherein the micron-sized carrier particles comprise cerium oxide, zirconium oxide, and lanthanum oxide.

Embodiment 560

The method of any one of embodiments 548-559, wherein the micron-sized carrier particles comprise cerium oxide, zirconium oxide, and yttrium oxide.

Embodiment 561

The method of any one of embodiments 548-560, wherein the micron-sized carrier particles comprise cerium oxide, zirconium oxide, lanthanum oxide, and yttrium oxide.

Embodiment 562

The method of any one of embodiments 548-561, wherein the micron-sized carrier particles comprise about 20% to about 100% cerium oxide.

Embodiment 563

The method of any one of embodiments 548-562, wherein the micron-sized carrier particles comprise about 30% to about 90% cerium oxide.

Embodiment 564

The method of any one of embodiments 548-563, wherein the micron-sized carrier particles comprise about 30% to about 50% cerium oxide.

Embodiment 565

The method of any one of embodiments 548-564, wherein the micron-sized carrier particles comprise about 70% to about 90% cerium oxide.

Embodiment 566

The method of any one of embodiments 548-565, wherein the micron-sized carrier particles comprise about 0% to about 80% zirconium oxide.

Embodiment 567

The method of any one of embodiments 548-566, wherein the micron-sized carrier particles comprise about 5% to about 15% zirconium oxide.

Embodiment 568

The method of any one of embodiments 548-566, wherein the micron-sized carrier particles comprise about 15% to about 35% zirconium oxide.

Embodiment 569

The method of any one of embodiments 548-566, wherein the micron-sized carrier particles comprise about 35% to about 55% zirconium oxide.

Embodiment 570

The method of any one of embodiments 548-566, wherein the micron-sized carrier particles comprise about 55% to about 65% zirconium oxide.

Embodiment 571

The method of any one of embodiments 548-570, wherein the micron-sized carrier particles comprise about 0% to about 15% lanthanum oxide.

Embodiment 572

The method of any one of embodiments 548-571, wherein the micron-sized carrier particles comprise about 2% to about 10% lanthanum oxide.

Embodiment 573

The method of any one of embodiments 548-572, wherein the micron-sized carrier particles comprise about 2% to about 8% lanthanum oxide.

Embodiment 574

The method of any one of embodiments 548-573, wherein the micron-sized carrier particles comprise about 3% to about 6% lanthanum oxide.

Embodiment 575

The method of any one of embodiments 548-574, wherein the micron-sized carrier particles comprise about 4% to about 5% lanthanum oxide.

Embodiment 576

The method of any one of embodiments 548-575 wherein the micron-sized carrier particles comprise about 0% to about 15% yttrium oxide.

Embodiment 577

The method of any one of embodiments 548-576, wherein the micron-sized carrier particles comprise about 2% to about 10% yttrium oxide.

Embodiment 578

The method of any one of embodiments 548-577, wherein the micron-sized carrier particles comprise about 2% to about 8% yttrium oxide.

Embodiment 579

The method of any one of embodiments 548-578, wherein the micron-sized carrier particles comprise about 3% to about 6% yttrium oxide.

Embodiment 580

The method of any one of embodiments 548-579, wherein the micron-sized carrier particles comprise about 4% to about 5% yttrium oxide.

Embodiment 581

The method of any one of embodiments 548-580, wherein the micron-sized carrier particles comprise about 80% to about 90% cerium oxide and about 10% to about 20% zirconium oxide.

Embodiment 582

The method of any one of embodiments 548-581, wherein the micron-sized carrier particles comprise about 80% to about 90% cerium oxide, about 5% to about 15% zirconium oxide, and about 3% to about 5% lanthanum oxide.

Embodiment 583

The method of any one of embodiments 548-582, wherein the micron-sized carrier particles comprise about 80% to about 90% cerium oxide, about 5% to about 15% zirconium oxide, and about 3% to about 5% yttrium oxide.

Embodiment 584

The method of any one of embodiments 548-582, wherein the micron-sized carrier particles comprise about 86% cerium oxide, about 10% zirconium oxide, and about 4% lanthanum oxide.

Embodiment 585

The method of any one of embodiments 548-583, wherein the micron-sized carrier particles comprise about 86% cerium oxide, about 10% zirconium oxide, and about 4% yttrium oxide.

Embodiment 586

The method of any one of embodiments 548-585, wherein the calcining step converts the alkaline earth metal salt into an alkaline earth metal oxide.

Embodiment 587

The method of any one of embodiments 548-586, wherein the calcining step bonds the composite catalytic nanoparticles to the micron-sized carrier particle.

Embodiment 588

The method of any one of embodiments 548-587, wherein the alkaline earth metal salt is deposited onto the micron-sized carrier particles before the composite catalytic nanoparticles are deposited onto the micron-sized carrier particles.

Embodiment 589

The method of any one of embodiments 548-588, wherein the alkaline earth metal salt is deposited onto the micron-sized carrier particles after the composite catalytic nanoparticles are deposited onto the micron-sized carrier particles.

Embodiment 590

A method of producing micron-sized particles for storing $NO_x$ gases comprising:

combining a plurality of composite nanoparticles with a fluid comprising a carrier precursor, wherein the composite nanoparticles comprise a support nanoparticle and a catalytic nanoparticle;

solidifying the carrier precursor to form a solidified carrier, wherein the carrier forms around the composite nanoparticles;

calcining the solidified carrier;

micron-sizing the solidified carrier;

depositing an alkaline earth metal salt; and converting the alkaline earth metal salts to an alkaline earth metal oxide.

Embodiment 591

The method of embodiment 590, wherein the alkaline earth metal salt is deposited from solution.

Embodiment 592

The method of embodiment 590 or 591, further comprising dissolving the alkaline earth metal salt in solution.

Embodiment 593

The method of any one of embodiments 590-592, further comprising suspending the composite nanoparticles prior to the combining step.

Embodiment 594

The method of any one of embodiments 590-593, wherein the carrier precursor is solidified by polymerization.

Embodiment 595

The method of any one of embodiments 590-593, wherein the carrier precursor is solidified by precipitation and the composite catalytic nanoparticles co-precipitate with the solidified carrier.

Embodiment 596

The method of any one of embodiments 590-595, wherein the carrier precursor comprises a combustible component and a non-combustible component.

Embodiment 597

The method of embodiment any one of embodiments 590-596, wherein the carrier precursor comprises resorcinol or amorphous carbon.

Embodiment 598

The method of any one of claims 590-597, wherein the carrier precursor comprises a metal salt.

Embodiment 599

The method of any one of embodiments 590-598, wherein the carrier precursor comprises a cerium salt, a zirconium salt, a lanthanum salt, or a yttrium salt.

Embodiment 600

The method of any one of embodiments 590-599, wherein the carrier precursor comprises cerium chloride, cerium nitrate, or cerium acetate.

Embodiment 601

The method of any one of embodiments 590-600, wherein the carrier precursor comprises zirconium oxynitrate.

Embodiment 602

The method of any one of embodiments 590-601, wherein the carrier precursor comprises lanthanum acetate.

Embodiment 603

The method of any one of embodiments 590-602, wherein the carrier precursor comprises yttrium nitrate.

Embodiment 604

The method of any one of embodiments 590-603, further comprising drying the solidified carrier prior to calcining the solidified carrier.

Embodiment 605

The method of any one of embodiments 590-604, wherein the solidified carrier comprises a combustible component and a non-combustible component.

Embodiment 606

The method of embodiment 605, wherein the combustible component of the solidified carrier comprises amorphous carbon or polymerized resorcinol.

Embodiment 607

The method of embodiment 605 or 606, wherein the non-combustible component of the solidified carrier comprises a metal oxide.

Embodiment 608

The method of any one of embodiments 605-607, wherein the non-combustible component of the solidified carrier comprises cerium oxide, zirconium oxide, lanthanum oxide, or yttrium oxide.

Embodiment 609

The method of any one of embodiments 605-608, wherein the non-combustible component of the solidified carrier comprises a cerium oxide.

Embodiment 610

The method of any one of embodiments 605-609, wherein the non-combustible component of the solidified carrier comprises zirconium oxide.

Embodiment 611

The method of any one of embodiments 605-610, wherein the non-combustible component of the solidified carrier comprises lanthanum oxide.

Embodiment 612

The method of any one of embodiments 605-611, wherein the non-combustible component of the solidified carrier comprises yttrium oxide.

Embodiment 613

The method of any one of embodiments 605-612, wherein the non-combustible component of the solidified carrier comprises cerium oxide and zirconium oxide.

Embodiment 614

The method of any one of embodiments 605-613, wherein the non-combustible component of the solidified carrier comprises cerium oxide, zirconium oxide, and lanthanum oxide.

Embodiment 615

The method of any one of embodiments 605-614, wherein the non-combustible component of the solidified carrier comprises e cerium oxide, zirconium oxide, and yttrium oxide.

Embodiment 616

The method of any one of embodiments 605-615, wherein the non-combustible component of the solidified carrier comprises e cerium oxide, zirconium oxide, lanthanum oxide, and yttrium oxide.

Embodiment 617

The method of any one of embodiments 605-616, wherein the non-combustible component of the solidified carrier comprises about 20% to about 100% cerium oxide.

Embodiment 618

The method of any one of embodiments 605-617, wherein the non-combustible component of the solidified carrier comprises about 30% to about 90% cerium oxide.

Embodiment 619

The method of any one of embodiments 605-618, wherein the non-combustible component of the solidified carrier comprises about 30% to about 50% cerium oxide.

Embodiment 620

The method of any one of embodiments 605-619, wherein the non-combustible component of the solidified carrier comprises about 70% to about 90% cerium oxide.

Embodiment 621

The method of any one of embodiments 605-620, wherein the non-combustible component of the solidified carrier comprises about 0% to about 80% zirconium oxide.

Embodiment 622

The method of any one of embodiments 605-621, wherein the non-combustible component of the solidified carrier comprises about 5% to about 15% zirconium oxide.

Embodiment 623

The method of any one of embodiments 605-621, wherein the non-combustible component of the solidified carrier comprises about 15% to about 35% zirconium oxide.

Embodiment 624

The method of any one of embodiments 605-621, wherein the non-combustible component of the solidified carrier comprises about 35% to about 55% zirconium oxide.

Embodiment 625

The method of any one of embodiments 605-621, wherein the non-combustible component of the solidified carrier comprises about 55% to about 65% zirconium oxide.

Embodiment 626

The method of any one of embodiments 605-625, wherein the non-combustible component of the solidified carrier comprises about 0% to about 15% lanthanum oxide.

Embodiment 627

The method of any one of embodiments 605-626, wherein the non-combustible component of the solidified carrier comprises about 2% to about 10% lanthanum oxide.

Embodiment 628

The method of any one of embodiments 605-627, wherein the non-combustible component of the solidified carrier comprises about 2% to about 8% lanthanum oxide.

Embodiment 629

The method of any one of embodiments 605-628, wherein the non-combustible component of the solidified carrier comprises about 3% to about 6% lanthanum oxide.

Embodiment 630

The method of any one of embodiments 605-629, wherein the non-combustible component of the solidified carrier comprises about 4% to about 5% lanthanum oxide.

Embodiment 631

The method of any one of embodiments 605-630, wherein the non-combustible component of the solidified carrier comprises about 0% to about 15% yttrium oxide.

Embodiment 632

The method of any one of embodiments 605-631, wherein the non-combustible component of the solidified carrier comprises about 2% to about 10% yttrium oxide.

Embodiment 633

The method of any one of embodiments 605-632, wherein the non-combustible component of the solidified carrier comprises about 2% to about 8% yttrium oxide.

Embodiment 634

The method of any one of embodiments 605-633, wherein the non-combustible component of the solidified carrier comprises about 3% to about 6% yttrium oxide.

Embodiment 635

The method of any one of embodiments 605-634, wherein the non-combustible component of the solidified carrier comprises about 4% to about 5% yttrium oxide.

Embodiment 636

The method of any one of embodiments 605-635, wherein the non-combustible component of the solidified carrier comprises about 80% to about 90% cerium oxide and about 10% to about 20% zirconium oxide.

Embodiment 637

The method of any one of embodiments 605-636, wherein the non-combustible component of the solidified carrier comprises about 80% to about 90% cerium oxide, about 5% to about 15% zirconium oxide, and about 3% to about 5% lanthanum oxide.

Embodiment 638

The method of any one of embodiments 605-637, wherein the non-combustible component of the solidified carrier comprises about 80% to about 90% cerium oxide, about 5% to about 15% zirconium oxide, and about 3% to about 5% yttrium oxide.

Embodiment 639

The method of any one of embodiments 605-637, wherein the non-combustible component of the solidified carrier comprises about 86% cerium oxide, about 10% zirconium oxide, and about 4% lanthanum oxide.

Embodiment 640

The method of any one of embodiments 605-638, wherein the non-combustible component of the solidified carrier comprises about 86% cerium oxide, about 10% zirconium oxide, and about 4% yttrium oxide.

Embodiment 641

The method of any one of embodiments 590-640, wherein the composite nanoparticles are embedded within the solidified carrier.

Embodiment 642

The method of any one of embodiments 605-636, wherein the composite nanoparticles are embedded within the non-combustible component of the solidified carrier.

Embodiment 643

The method of any one of embodiments 596-637, wherein the calcining step combusts the combustible component.

Embodiment 644

The method of embodiment 643, wherein the combustible component is exhausted.

Embodiment 645

The method of any one of embodiments 590-644, wherein the alkaline earth metal salt is deposited prior to the solidified carrier being calcined.

Embodiment 646

The method of any one of embodiments 590-645, wherein the alkaline earth metal salt solution is applied prior to solidifying the carrier precursor.

Embodiment 647

The method of any one of embodiments 590-646, wherein the alkaline earth metal salt solution is applied after the solidified carrier is micron-sized.

Embodiment 648

The method of any one of embodiments 590-647, wherein the calcining step converts the alkaline earth metal salt into an alkaline earth metal oxide.

Embodiment 649

The method of any one of embodiments 548-648, wherein suspending the composite catalytic nanoparticles forms a composite catalytic nanoparticle suspension.

Embodiment 650

The method of embodiment 649, wherein the composite catalytic nanoparticle suspension comprises water or ethanol.

Embodiment 651

The method of embodiments 649 or 650, wherein the pH of the composite catalytic nanoparticle suspension is adjusted to about 3 to about 5.

Embodiment 652

The method of any one of embodiments 649-651, wherein a surfactant or a dispersant is added to the composite nanoparticle suspension.

Embodiment 653

The method of any one of embodiments 649-652, wherein the composite catalytic nanoparticle suspension is sonicated.

Embodiment 654

The method of any one of embodiments 548-653, wherein the composite catalytic nanoparticles are plasma generated.

Embodiment 655

The method of any one of embodiments 548-654, wherein the catalytic nanoparticles comprise a platinum group metal.

Embodiment 656

The method of any one of embodiments 548-655, wherein the catalytic nanoparticles comprise platinum or palladium.

Embodiment 657

The method of any one of embodiments 548-656, wherein the catalytic nanoparticles comprise platinum and palladium at a ratio of about 1:2 platinum:palladium to about 25:1 platinum:palladium.

Embodiment 658

The method of any one of embodiments 548-657, wherein the catalytic nanoparticles comprise platinum and palladium at a ratio of about 10:1 platinum:palladium.

Embodiment 659

The method of any one of embodiments 548-658, wherein the support nanoparticles comprise a metal oxide.

Embodiment 660

The method of any one of embodiments 548-659, wherein the support nanoparticles comprise cerium oxide.

Embodiment 661

The method of any one of embodiments 548-660, wherein the composite nanoparticles comprise about 0.01 wt % to about 60 wt % platinum group metal and about 40 wt % to about 99.99 wt % metal oxide.

Embodiment 662

The method of any one of embodiments 548-661, wherein the composite nanoparticles comprise about 0.5 wt % to about 2 wt % platinum group metal and about 98 wt % to about 99.5 wt % metal oxide.

Embodiment 663

The method of any one of embodiments 548-662, wherein the alkaline earth metal salt is dissolved in a solution comprising water.

Embodiment 664

The method of any one of embodiments 548-663, wherein the alkaline earth metal salt is a barium salt.

Embodiment 665

The method of claim 664, wherein the barium salt is barium acetate, barium bromide, barium carbonate, barium chloride, barium chromate, barium cyclohexanebutyrate, barium fluoride, barium hydroxide, barium iodide, barium manganite, or barium perchlorate.

Embodiment 666

The method of embodiment 664 or 665, wherein the barium salt is barium acetate.

Embodiment 667

The method of any one of embodiments 548-666, wherein the particles are configured to adsorb $NO_x$ gases during a lean burn.

Embodiment 668

The method of any one of embodiments 548-667, wherein the particles are configured to desorb $NO_x$ gases during a rich-purge cycle.

Embodiment 669

A coated substrate comprising:
a substrate; and
a washcoat layer comprising:
  micron-sized oxygen-storage particles;
  a plurality of composite nanoparticles, the composite nanoparticles comprising a support nanoparticle and a catalytic nanoparticle, the catalytic nanoparticle comprising one or more platinum group metals; and
  an alkaline earth metal oxide.

Embodiment 670

The coated substrate according to embodiment 669, wherein a portion of the composite nanoparticles are not covalently bound to the micron-sized oxygen-storage particles.

Embodiment 671

The coated substrate according to embodiment 669 or 670, wherein a portion of the composite nanoparticles are covalently bound to the micron-sized oxygen-storage particles.

Embodiment 672

The coated substrate of any one of embodiments 669-671, wherein a portion of the alkaline earth metal oxide is not covalently bound to the micron-sized oxygen-storage particles.

Embodiment 673

The coated substrate of any one of embodiments 669-672, wherein a portion of the alkaline earth metal oxide is covalently bound to the micron-sized oxygen-storage particles.

Embodiment 674

The coated substrate of any one of embodiments 669-673, wherein the washcoat layer is formed by:
  combining a first component comprising the oxygen-storage particles, a second component comprising the composite nanoparticles, and a third component comprising the alkaline earth metal salt to form a washcoat slurry;
  coating the washcoat slurry onto the substrate; and
  calcining the substrate, thereby:
    converting the alkaline earth metal salt into the alkaline earth metal oxide; and
    forming the washcoat layer.

Embodiment 675

The coated substrate of any one of embodiments 669-674, wherein the oxygen-storage particles are porous.

Embodiment 676

The coated substrate of any one of embodiments 669-675, wherein the oxygen-storage particles comprise a metal oxide.

Embodiment 677

The coated substrate of any one of embodiments 669-676, wherein the oxygen-storage particles comprise cerium oxide, zirconium oxide, lanthanum oxide, or yttrium oxide.

Embodiment 678

The coated substrate of any one of embodiments 669-677, wherein the oxygen-storage particles comprise cerium oxide.

Embodiment 679

The coated substrate of any one of embodiments 669-678, wherein the oxygen-storage particles comprise zirconium oxide.

Embodiment 680

The coated substrate of any one of embodiments 669-679, wherein the oxygen-storage particles comprise lanthanum oxide.

Embodiment 681

The coated substrate of any one of embodiments 669-680, wherein the oxygen-storage particles comprise yttrium oxide.

Embodiment 682

The coated substrate of any one of embodiments 669-681, wherein the oxygen-storage particles comprise cerium oxide and zirconium oxide.

Embodiment 683

The coated substrate of any one of embodiments 669-682, wherein the oxygen-storage particles comprise cerium oxide, zirconium oxide, and lanthanum oxide.

Embodiment 684

The coated substrate of any one of embodiments 669-683, wherein the oxygen-storage particles comprise cerium oxide, zirconium oxide, and yttrium oxide.

Embodiment 685

The coated substrate of any one of embodiments 669-684, wherein the oxygen-storage particles comprise cerium oxide, zirconium oxide, lanthanum oxide, and yttrium oxide.

Embodiment 685

The coated substrate of any one of embodiments 669-685, wherein the oxygen-storage particles comprise about 20% to about 100% cerium oxide.

Embodiment 686

The coated substrate of any one of embodiments 669-686, wherein the oxygen-storage particles comprise about 30% to about 90% cerium oxide.

Embodiment 688

The coated substrate of any one of embodiments 669-689, wherein the oxygen-storage particles comprise about 30% to about 50% cerium oxide.

Embodiment 689

The coated substrate of any one of embodiments 669-688, wherein the oxygen-storage particles comprise about 70% to about 90% cerium oxide.

Embodiment 690

The coated substrate of any one of embodiments 669-689, wherein the oxygen-storage particles comprise about 0% to about 80% zirconium oxide.

Embodiment 691

The coated substrate of any one of embodiments 669-690, wherein the oxygen-storage particles comprise about 5% to about 15% zirconium oxide.

Embodiment 692

The coated substrate of any one of embodiments 669-691, wherein the oxygen-storage particles comprise about 15% to about 35% zirconium oxide.

Embodiment 693

The coated substrate of any one of embodiments 669-692, wherein the oxygen-storage particles comprise about 35% to about 55% zirconium oxide.

Embodiment 694

The coated substrate of any one of embodiments 669-693, wherein the oxygen-storage particles comprise about 55% to about 65% zirconium oxide.

Embodiment 695

The coated substrate of any one of embodiments 669-694, wherein the oxygen-storage particles comprise about 0% to about 15% lanthanum oxide.

Embodiment 696

The coated substrate of any one of embodiments 669-695, wherein the oxygen-storage particles comprise about 2% to about 10% lanthanum oxide.

Embodiment 697

The coated substrate of any one of embodiments 669-696, wherein the oxygen-storage particles comprise about 2% to about 8% lanthanum oxide.

Embodiment 698

The coated substrate of any one of embodiments 669-697, wherein the oxygen-storage particles comprise about 3% to about 6% lanthanum oxide.

Embodiment 699

The coated substrate of any one of embodiments 669-698, wherein the oxygen-storage particles comprise about 4% to about 5% lanthanum oxide.

Embodiment 700

The coated substrate of any one of embodiments 669-699, wherein the oxygen-storage particles comprise about 0% to about 15% yttrium oxide.

Embodiment 701

The coated substrate of any one of embodiments 669-700, wherein the oxygen-storage particles comprise about 2% to about 10% yttrium oxide.

Embodiment 702

The coated substrate of any one of embodiments 669-701, wherein the oxygen-storage particles comprise about 2% to about 8% yttrium oxide.

Embodiment 703

The coated substrate of any one of embodiments 669-702, wherein the oxygen-storage particles comprise about 3% to about 6% yttrium oxide.

Embodiment 704

The coated substrate of any one of embodiments 669-703, wherein the oxygen-storage particles comprise about 4% to about 5% yttrium oxide.

Embodiment 705

The coated substrate of any one of embodiments 669-704, wherein the oxygen-storage particles comprise about 80% to about 90% cerium oxide and about 10% to about 20% zirconium oxide.

Embodiment 706

The coated substrate of any one of embodiments 669-705, wherein the oxygen-storage particles comprise about 80% to about 90% cerium oxide, about 5% to about 15% zirconium oxide, and about 3% to about 5% lanthanum oxide.

Embodiment 707

The coated substrate of any one of embodiments 669-706, wherein the oxygen-storage particles comprise about 80% to about 90% cerium oxide, about 5% to about 15% zirconium oxide, and about 3% to about 5% yttrium oxide.

Embodiment 708

The coated substrate of any one of embodiments 669-707, wherein the oxygen-storage particles comprise about 86% cerium oxide, about 10% zirconium oxide, and about 4% lanthanum oxide.

Embodiment 709

The coated substrate of any one of embodiments 669-708, wherein the oxygen-storage particles comprise about 86% cerium oxide, about 10% zirconium oxide, and about 4% yttrium oxide.

Embodiment 710

The coated substrate of any one of embodiments 669-709, wherein the composite nanoparticles are plasma generated.

Embodiment 711

The coated substrate of any one of embodiments 669-710, wherein the catalytic nanoparticle comprises one or more platinum group metals.

Embodiment 712

The coated substrate of any one of embodiments 669-711, wherein the catalytic nanoparticle comprises platinum or palladium.

Embodiment 713

The coated substrate of any one of embodiments 669-712, wherein the catalytic nanoparticle comprises platinum and palladium.

Embodiment 714

The coated substrate of any one of embodiments 669-713, wherein the catalytic nanoparticle comprises platinum and palladium of a ratio of about 1:2 platinum:palladium to about 25:1 platinum:palladium.

Embodiment 715

The coated substrate of any one of embodiments 669-714, wherein the catalytic nanoparticle comprises platinum and palladium of a ratio of about 10:1 platinum:palladium.

Embodiment 716

The coated substrate of any one of embodiments 669-715, wherein the support nanoparticle comprises a metal oxide.

Embodiment 717

The coated substrate of any one of embodiments 669-716, wherein the support nanoparticle comprises cerium oxide.

Embodiment 718

The coated substrate of any one of embodiments 669-717, wherein the composite nanoparticles comprise about 0.01 wt % to about 60 wt % platinum group metal and about 40 wt % to about 99.99 wt % metal oxide.

Embodiment 719

The coated substrate of any one of embodiments 669-718, wherein the composite nanoparticles comprise about 0.5 wt % to about 2 wt % platinum group metal and about 98 wt % to about 99.5 wt % metal oxide.

Embodiment 720

The coated substrate of any one of embodiments 669-719, wherein the alkaline earth metal oxide is barium oxide.

Embodiment 721

The coated substrate of any one of embodiments 669-720, wherein a portion of the alkaline earth metal oxide is covalently bound to the oxygen-storage particles by depositing an alkaline earth metal salt from onto the oxygen-storage particles and allowing the alkaline earth metal salt to convert into the alkaline earth metal oxide.

Embodiment 722

The coated substrate of embodiment 721, wherein the alkaline earth metal salt is converted into an alkaline earth metal oxide by calcining the coated substrate.

Embodiment 723

The coated substrate of embodiment 721 or 722, wherein the alkaline earth metal salt is a barium salt.

Embodiment 724

The coated substrate of any one of embodiments 721-723, wherein the barium salt is barium acetate, barium bromide, barium carbonate, barium chloride, barium chromate, barium cyclohexanebutyrate, barium fluoride, barium hydroxide, barium iodide, barium manganite, or barium perchlorate.

Embodiment 725

The coated substrate of any one of embodiments 721-724, wherein the barium salt is barium acetate.

Embodiment 726

The coated substrate of any one of embodiments 669-720, wherein the alkaline earth metal oxide is comprised in a plurality of alkaline earth metal oxide nanoparticles.

Embodiment 727

The coated substrate of embodiment 726, wherein the plurality of alkaline earth metal oxide nanoparticles are plasma generated.

Embodiment 728

The coated substrate of any one of embodiments 669-727, wherein the washcoat layer is configured to adsorb $NO_x$ gasses during a lean burn.

Embodiment 729

The coated substrate of any one of embodiments 669-728, wherein the washcoat layer is configured to desorb $NO_x$ gasses during a rich-purge cycle.

Embodiment 730

The coated substrate of any one of embodiments 669-729, wherein the oxygen-storage particles are about 100 g/l to about 400 g/l of the washcoat layer solids.

Embodiment 731

The coated substrate of any one of embodiments 669-730, wherein the oxygen-storage particles are about 200 g/l to about 300 g/l of the washcoat layer solids.

Embodiment 732

The coated substrate of any one of embodiments 669-731, wherein the composite nanoparticles are about 20 g/l to about 100 g/l of the washcoat layer solids.

Embodiment 733

The coated substrate of any one of embodiments 669-732, wherein the composite nanoparticles are about 40 g/l to about 80 g/l of the washcoat layer solids.

Embodiment 734

The coated substrate of any one of embodiments 669-733, wherein the alkaline earth metal oxide is about 10 g/l to about 60 g/l of the washcoat layer solids.

Embodiment 735

The coated substrate of any one of embodiments 669-734, wherein the alkaline earth metal oxide is about 25 g/l to about 45 g/l of the washcoat layer solids.

Embodiment 736

The coated substrate of any one of embodiments 669-735, wherein the platinum group metal is about 0.2 g/l to about 5 g/l of the washcoat layer solids.

Embodiment 737

The coated substrate of any one of embodiments 669-736, wherein the platinum group metal is about 0.4 g/l to about 3 g/l of the washcoat layer solids.

Embodiment 738

The coated substrate of any one of embodiments 669-737, wherein the platinum group metal is about 0.5 g/l to about 1 g/l of the washcoat layer solids.

Embodiment 739

The coated substrate of any one of embodiments 669-738, wherein the washcoat layer further comprises aluminum oxide.

Embodiment 740

The coated substrate of embodiment 739, wherein the aluminum oxide is derived from boehmite.

Embodiment 741

The coated substrate of any one of embodiments 669-740, wherein the washcoat layer comprises about 1% to about 7% aluminum oxide by weight of the washcoat layer solids.

Embodiment 742

The coated substrate of any one of embodiments 669-741, wherein the washcoat layer comprises about 3% to about 6% aluminum oxide by weight of the washcoat layer solids.

Embodiment 743

The coated substrate of any one of embodiments 669-742, wherein the washcoat layer comprises about 4% to about 5% aluminum oxide by weight of the washcoat layer solids.

Embodiment 744

The coated substrate of any one of embodiments 669-743, further comprising a reducing washcoat layer.

Embodiment 745

The coated substrate of embodiment 744, wherein the reducing washcoat layer comprises a plurality of reducing micron-sized catalytic particles, the reducing micron-sized catalytic particles comprising a plurality of reducing composite nanoparticles covalently bound to a reducing catalyst carrier particle.

Embodiment 746

The coated substrate of embodiment 745, wherein the reducing composite nanoparticles are bonded to the reducing catalyst carrier particle.

Embodiment 747

The coated substrate of embodiment 746, wherein the reducing composite nanoparticles are embedded within the reducing catalyst carrier particle.

Embodiment 748

The coated substrate of any one of embodiments 745-747, wherein the reducing composite nanoparticles comprise a reducing catalytic nanoparticle and a support nanoparticle.

Embodiment 749

The coated substrate of any one of embodiments 745-748, wherein the reducing composite nanoparticles are plasma-generated.

Embodiment 750

The coated substrate of any one of embodiments 745-749, wherein the reducing composite nanoparticles comprise rhodium.

Embodiment 751

The coated substrate of any one of embodiments 748-750, wherein the reducing catalytic nanoparticle comprises rhodium.

Embodiment 752

The coated substrate of any one of embodiments 748-751 wherein the support nanoparticle comprises cerium oxide.

Embodiment 753

The coated substrate of any one of embodiments 745-752, wherein the reducing catalyst carrier particle comprises a metal oxide.

Embodiment 754

The coated substrate of any one of embodiments 745-753, wherein the reducing catalyst carrier particle comprises cerium oxide, zirconium oxide, lanthanum oxide, or yttrium oxide.

Embodiment 755

The coated substrate of any one of embodiments 745-754, wherein the reducing catalyst carrier particle comprises cerium oxide.

Embodiment 756

The coated substrate of any one of embodiments 744-755, wherein the reducing washcoat layer further comprises porous alumina particles.

Embodiment 757

The coated substrate of any one of embodiments 744-756, wherein the reducing washcoat layer further comprises aluminum oxide derived from boehmite.

Embodiment 758

The coated substrate of any one of embodiments 669-757, further comprising an oxidizing washcoat layer.

Embodiment 759

The coated substrate of embodiment 758, wherein the oxidizing washcoat layer comprises a plurality of micron-sized oxidizing catalytic particles, the micron-sized oxidizing catalytic particles comprising a plurality of oxidizing composite nanoparticles covalently bound to an oxidizing catalyst carrier particle.

Embodiment 760

The coated substrate of embodiment 759, wherein the oxidizing composite nanoparticles are bonded to the oxidizing catalyst carrier particle.

Embodiment 761

The coated substrate according to embodiment 760, wherein the oxidizing composite nanoparticles are embedded within the oxidizing catalyst carrier particles.

Embodiment 762

The coated substrate of any one of embodiments 759-761, wherein the oxidizing composite nanoparticles comprise an oxidizing catalytic nanoparticle and a support nanoparticle.

Embodiment 763

The coated substrate of any one of embodiments 759-762, wherein the oxidizing composite nanoparticles are plasma-generated.

Embodiment 764

The coated substrate of any one of embodiments 759-763, wherein the oxidizing composite nanoparticles comprise one or more platinum group metals.

Embodiment 765

The coated substrate of any one of embodiments 759-764, wherein the oxidizing composite nanoparticles comprise platinum or palladium.

Embodiment 766

The coated substrate of any one of embodiments 762-765, wherein the oxidizing catalytic nanoparticle comprises platinum or palladium.

Embodiment 767

The coated substrate of any one of embodiments 762-766, wherein the support nanoparticles comprise a metal oxide.

Embodiment 768

The coated substrate of any one of embodiments 762-767, wherein the support nanoparticles comprise aluminum oxide.

Embodiment 769

The coated substrate of any one of embodiments 759-768, wherein the oxidizing catalyst carrier particle comprises aluminum oxide.

Embodiment 770

The coated substrate of any one of embodiments 758-769, wherein the oxidizing washcoat layer further comprises porous alumina particles.

Embodiment 771

The coated substrate of embodiment 770, wherein an alkaline earth metal oxide is covalently bound to the alumina particles.

Embodiment 772

The coated substrate of embodiment 771, wherein the alkaline earth metal oxide is barium oxide.

Embodiment 773

The coated substrate of any one of embodiments 758-772, wherein the oxidizing washcoat layer further comprises aluminum oxide derived from boehmite.

Embodiment 774

The coated substrate according to any one of embodiments 669-773, wherein the coated substrate demonstrates a $NO_x$ slip of 75 ppm or less when treated with exhaust gas comprising about 100 ppm $NO_x$ under lean-burn conditions for about 1000 seconds.

Embodiment 775

The coated substrate according to any one of embodiments 669-774, wherein the coated substrate demonstrates a $NO_x$ slip of 50 ppm or less when treated with exhaust gas comprising about 100 ppm $NO_x$ under lean-burn conditions for about 1000 seconds.

Embodiment 776

The coated substrate according to any one of embodiments 669-775, wherein the coated substrate demonstrates a $NO_x$ slip of 50 ppm or less when treated with exhaust gas comprising about 100 ppm $NO_x$ under lean-burn conditions for about 500 seconds.

Embodiment 777

The coated substrate of any one of embodiments 669-776, wherein the coated substrate has a platinum group metal loading of about 2.0 g/l or less.

Embodiment 778

A catalytic converter comprising a coated substrate of any one of embodiments 669-777.

Embodiment 779

An exhaust treatment system comprising a conduit for exhaust gas and a catalytic converter according to embodiment 778.

Embodiment 780

A vehicle comprising a catalytic converter according to embodiment 778.

Embodiment 781

A method of treating exhaust gas, comprising contacting the coated substrate of any one of embodiments 669-777 with the exhaust gas.

Embodiment 782

The method according to embodiment 781, wherein the coated substrate is housed within a catalytic converter configured to receive exhaust gas.

Embodiment 783

A $NO_x$ storage washcoat composition comprising:
micron-sized oxygen-storage particles;

composite nanoparticles, the composite nanoparticle comprising a support nanoparticle and a catalytic nanoparticle, the catalytic nanoparticle comprising one or more platinum group metals; and
an alkaline earth metal salt.

Embodiment 784

The $NO_x$ storage washcoat composition of embodiment 783, wherein a portion of the alkaline earth metal salt is deposited onto the micron-sized oxygen-storage particles.

Embodiment 785

The $NO_x$ storage washcoat composition of embodiment 783 or 784, wherein a portion of the alkaline earth metal salt is not deposited onto the micron-sized oxygen-storage particles.

Embodiment 786

The $NO_x$ storage washcoat composition of any one of embodiments 783-785, wherein the washcoat composition is coated onto a substrate.

Embodiment 787

The $NO_x$ storage washcoat composition of any one of embodiments 783-786, wherein the washcoat composition is calcined, thereby converting the alkaline earth metal salt into an alkaline earth metal oxide.

Embodiment 788

A $NO_x$ storage washcoat composition comprising:
micron-sized oxygen-storage particles;
composite nanoparticles, the composite nanoparticle comprising a support nanoparticle and a catalytic nanoparticle, the catalytic nanoparticle comprising one or more platinum group metals; and
an alkaline earth metal oxide.

Embodiment 789

The $NO_x$ storage washcoat composition of embodiment 788, wherein a portion of the alkaline earth metal oxide is covalently bound to the micron-sized oxygen-storage particles.

Embodiment 790

The $NO_x$ storage washcoat composition of embodiment 788 or 789, wherein a portion of the alkaline earth metal oxide is not covalently bound to the micron-sized oxygen-storage particles.

Embodiment 791

The $NO_x$ storage washcoat composition of any one of embodiments 783-790, wherein a portion of the composite nanoparticles are covalently bound to the micron-sized oxygen-storage particles.

Embodiment 792

The $NO_x$ storage washcoat composition of any one of embodiments 783-791, wherein a portion of the composite nanoparticles are not covalently bound to the micron-sized oxygen-storage particles.

Embodiment 793

The $NO_x$ storage washcoat composition of any one of embodiments 783-792, wherein the oxygen-storage particles comprise a metal oxide.

Embodiment 794

The $NO_x$ storage washcoat composition of any one of embodiments 783-793, wherein the oxygen-storage particles comprise cerium oxide, zirconium oxide, lanthanum oxide, or yttrium oxide.

Embodiment 795

The $NO_x$ storage washcoat composition of any one of embodiments 783-794, wherein the oxygen-storage particles comprise cerium oxide.

Embodiment 796

The $NO_x$ storage washcoat composition of any one of embodiments 783-795, wherein the oxygen-storage particles comprise zirconium oxide.

Embodiment 797

The $NO_x$ storage washcoat composition of any one of embodiments 783-796, wherein the oxygen-storage particles comprise lanthanum oxide.

Embodiment 798

The $NO_x$ storage washcoat composition of any one of embodiments 783-797, wherein the oxygen-storage particles comprise yttrium oxide.

Embodiment 799

The $NO_x$ storage washcoat composition of any one of embodiments 783-798, wherein the oxygen-storage particles comprise cerium oxide and zirconium oxide.

Embodiment 800

The $NO_x$ storage washcoat composition of any one of embodiments 783-799, wherein the oxygen-storage particles comprise cerium oxide, zirconium oxide, and lanthanum oxide.

Embodiment 801

The $NO_x$ storage washcoat composition of any one of embodiments 783-800, wherein the oxygen-storage particles comprise cerium oxide, zirconium oxide, and yttrium oxide.

Embodiment 802

The $NO_x$ storage washcoat composition of any one of embodiments 783-801, wherein the oxygen-storage particles comprise cerium oxide, zirconium oxide, lanthanum oxide, and yttrium oxide.

Embodiment 803

The $NO_x$ storage washcoat composition of any one of embodiments 783-802, wherein the oxygen-storage particles comprise about 20% to about 100% cerium oxide.

Embodiment 804

The $NO_x$ storage washcoat composition of any one of embodiments 783-803, wherein the oxygen-storage particles comprise about 30% to about 90% cerium oxide.

Embodiment 805

The $NO_x$ storage washcoat composition of any one of embodiments 783-804, wherein the oxygen-storage particles comprise about 30% to about 50% cerium oxide.

Embodiment 806

The $NO_x$ storage washcoat composition of any one of embodiments 783-805, wherein the oxygen-storage particles comprise about 70% to about 90% cerium oxide.

Embodiment 807

The $NO_x$ storage washcoat composition of any one of embodiments 783-806, wherein the oxygen-storage particles comprises about 0% to about 80% zirconium oxide.

Embodiment 808

The $NO_x$ storage washcoat composition of any one of embodiments 783-807, wherein the oxygen-storage particles about 5% to about 15% zirconium oxide.

Embodiment 809

The $NO_x$ storage washcoat composition of any one of embodiments 783-807, wherein the oxygen-storage particles about 15% to about 35% zirconium oxide.

Embodiment 810

The $NO_x$ storage washcoat composition of any one of embodiments 783-807, wherein the oxygen-storage particles comprises about 35% to about 55% zirconium oxide.

Embodiment 811

The $NO_x$ storage washcoat composition of any one of embodiments 783-807, wherein the oxygen-storage particles about 55% to about 65% zirconium oxide.

Embodiment 811

The $NO_x$ storage washcoat composition of any one of embodiments 783-811, wherein the oxygen-storage particles about 0% to about 15% lanthanum oxide.

Embodiment 813

The $NO_x$ storage washcoat composition of any one of embodiments 783-812, wherein the oxygen-storage particles about 2% to about 10% lanthanum oxide.

Embodiment 813

The $NO_x$ storage washcoat composition of any one of embodiments 783-813, wherein the oxygen-storage particles about 2% to about 8% lanthanum oxide.

Embodiment 814

The $NO_x$ storage washcoat composition of any one of embodiments 783-814, wherein the oxygen-storage particles about 3% to about 6% lanthanum oxide.

Embodiment 816

The $NO_x$ storage washcoat composition of any one of embodiments 783-815, wherein the oxygen-storage particles about 4% to about 5% lanthanum oxide.

Embodiment 817

The $NO_x$ storage washcoat composition of any one of embodiments 783-816, wherein the oxygen-storage particles about 0% to about 15% yttrium oxide.

Embodiment 818

The $NO_x$ storage washcoat composition of any one of embodiments 783-817, wherein the oxygen-storage particles about 2% to about 10% yttrium oxide.

Embodiment 819

The $NO_x$ storage washcoat composition of any one of embodiments 783-818, wherein the oxygen-storage particles about 2% to about 8% yttrium oxide.

Embodiment 820

The $NO_x$ storage washcoat composition of any one of embodiments 783-819, wherein the oxygen-storage particles about 3% to about 6% yttrium oxide.

Embodiment 821

The $NO_x$ storage washcoat composition of any one of embodiments 783-820, wherein the oxygen-storage particles about 4% to about 5% yttrium oxide.

Embodiment 822

The $NO_x$ storage washcoat composition of any one of embodiments 783-821, wherein the oxygen-storage particles about 80% to about 90% cerium oxide and about 10% to about 20% zirconium oxide.

Embodiment 823

The $NO_x$ storage washcoat composition of any one of embodiments 783-822, wherein the oxygen-storage particles about 80% to about 90% cerium oxide, about 5% to about 15% zirconium oxide, and about 3% to about 5% lanthanum oxide.

Embodiment 824

The $NO_x$ storage washcoat composition of any one of embodiments 783-823, wherein the oxygen-storage particles about 80% to about 90% cerium oxide, about 5% to about 15% zirconium oxide, and about 3% to about 5% yttrium oxide.

Embodiment 825

The $NO_x$ storage washcoat composition of any one of embodiments 783-824, wherein the oxygen-storage particles about 86% cerium oxide, about 10% zirconium oxide, and about 4% lanthanum oxide.

Embodiment 826

The $NO_x$ storage washcoat composition of any one of embodiments 783-825, wherein the oxygen-storage particles about 86% cerium oxide, about 10% zirconium oxide, and about 4% yttrium oxide.

Embodiment 827

The $NO_x$ storage washcoat composition of any one of embodiments 783-826, wherein the composite nanoparticles are plasma generated.

Embodiment 828

The $NO_x$ storage washcoat composition of any one of embodiments 783-827, wherein the catalytic nanoparticle comprises platinum or palladium.

Embodiment 829

The $NO_x$ storage washcoat composition of any one of embodiments 783-828, wherein the catalytic nanoparticle comprises platinum and palladium.

Embodiment 830

The $NO_x$ storage washcoat composition of any one of embodiments 783-829, wherein the catalytic nanoparticle comprises platinum and palladium of a ratio of about 1:2 platinum:palladium to about 25:1 platinum:palladium.

Embodiment 831

The $NO_x$ storage washcoat composition of any one of embodiments 783-830, wherein the catalytic nanoparticle comprises platinum and palladium of a ratio of about 10:1 platinum:palladium.

Embodiment 832

The $NO_x$ storage washcoat composition of any one of embodiments 783-831, wherein the support nanoparticle comprises a metal oxide.

Embodiment 833

The $NO_x$ storage washcoat composition of any one of embodiments 783-832, wherein the support nanoparticle comprises cerium oxide.

Embodiment 834

The $NO_x$ storage washcoat composition of any one of embodiments 783-833, wherein the composite nanoparticles comprise about 0.01 wt % to about 60 wt % platinum group metal and about 40 wt % to about 99.99 wt % metal oxide.

Embodiment 835

The $NO_x$ storage washcoat composition of any one of embodiments 783-834, wherein the composite nanoparticles comprise about 0.5 wt % to about 2 wt % platinum group metal and about 98 wt % to about 99.5 wt % metal oxide.

Embodiment 836

The $NO_x$ storage washcoat composition of any one of embodiments 788-835, wherein the alkaline earth metal oxide is formed from an alkaline earth metal salt.

Embodiment 837

The $NO_x$ storage washcoat composition of any one of embodiments 783-787 and 790-836, wherein the alkaline earth metal salt is a barium salt.

Embodiment 838

The $NO_x$ storage washcoat composition of embodiment 837, wherein the barium salt is barium acetate, barium bromide, barium carbonate, barium chloride, barium chromate, barium cyclohexanebutyrate, barium fluoride, barium hydroxide, barium iodide, barium manganite, or barium perchlorate.

Embodiment 839

The $NO_x$ storage washcoat composition of embodiment 838, wherein the barium salt is barium acetate.

Embodiment 840

The $NO_x$ storage washcoat composition of any one of embodiments 783-839, wherein the washcoat composition is a washcoat slurry.

Embodiment 841

The $NO_x$ storage washcoat composition of any one of embodiments 783-840, further comprising a thickening agent.

Embodiment 842

The $NO_x$ storage washcoat composition of any one of embodiments 783-841, wherein the oxygen-storage particles make up about 10% to about 90% of the washcoat composition solids.

Embodiment 843

The $NO_x$ storage washcoat composition of any one of embodiments 783-842, wherein the oxygen-storage particles make up about 40% to about 80% of the washcoat composition solids.

Embodiment 844

The $NO_x$ storage washcoat composition of any one of embodiments 783-843, wherein the oxygen-storage particles make up about 60% to about 70% of the washcoat composition solids.

Embodiment 845

The $NO_x$ storage washcoat composition of any one of embodiments 783-844, wherein the composite nanoparticles make up about 5% to about 25% of the washcoat composition solids.

Embodiment 846

The $NO_x$ storage washcoat composition of any one of embodiments 783-845, wherein the composite nanoparticles make up about 10% to about 20% of the washcoat composition solids.

Embodiment 847

The $NO_x$ storage washcoat composition of any one of embodiments 783-846, wherein the washcoat composition further comprises boehmite.

Embodiment 848

The $NO_x$ storage washcoat composition of any one of embodiments 783-847, wherein the washcoat composition comprises boehmite of about 1% to about 7% of the washcoat composition solids.

Embodiment 849

The $NO_x$ storage washcoat composition of any one of embodiments 783-848, wherein the washcoat composition comprises boehmite of about 3% to about 6% of the washcoat composition solids.

Embodiment 850

The $NO_x$ storage washcoat composition of any one of embodiments 783-849, wherein the washcoat composition comprises boehmite of about 5% of the washcoat composition solids.

Embodiment 851

The $NO_x$ storage washcoat composition of any one of embodiments 783-850, wherein an alkaline earth metal oxide or alkaline earth metal salt makes up about 5% to about 25% of the washcoat composition solids.

Embodiment 852

The $NO_x$ storage washcoat composition of any one of embodiments 783-851, wherein an alkaline earth metal oxide or alkaline earth metal salt makes up about 10% to about 20% of the washcoat composition solids.

Embodiment 853

The $NO_x$ storage washcoat composition of any one of embodiments 783-852, wherein an alkaline earth metal oxide or alkaline earth metal salt makes up about 10% of the washcoat composition solids.

Embodiment 854

The $NO_x$ storage washcoat composition of any one of embodiments 783-853, wherein the washcoat composition is coated on a substrate.

Embodiment 855

The $NO_x$ storage washcoat composition of any one of embodiments 783-854, wherein the washcoat composition is a $NO_x$ storage washcoat layer.

Embodiment 856

The $NO_x$ storage washcoat layer of embodiment 855, wherein the $NO_x$ storage washcoat layer comprises about 100 g/l to about 400 g/l micron-sized oxygen-storage particles.

Embodiment 857

The $NO_x$ storage washcoat layer of embodiment 855 or 856, wherein the $NO_x$ storage washcoat layer comprises about 200 g/l to about 300 g/l micron-sized oxygen-storage particles.

Embodiment 858

The $NO_x$ storage washcoat layer of any one of embodiments 855-857, wherein the $NO_x$ storage washcoat layer comprises about 20 g/l to about 100 g/l composite nanoparticles.

Embodiment 859

The $NO_x$ storage washcoat layer of any one of embodiments 855-858, wherein the $NO_x$ storage washcoat layer comprises about 40 g/l to about 80 g/l composite nanoparticles.

Embodiment 860

The $NO_x$ storage washcoat layer of any one of embodiments 855-859, wherein the $NO_x$ storage washcoat layer comprises about 10 g/l to about 60 g/l alkaline earth metal oxide.

Embodiment 861

The $NO_x$ storage washcoat layer of any one of embodiments 855-860, wherein the $NO_x$ storage washcoat layer comprises about 25 g/l to about 45 g/l alkaline earth metal oxide.

Embodiment 862

The $NO_x$ storage washcoat layer of any one of embodiments 855-861, wherein the $NO_x$ storage washcoat layer comprises about 0.2 g/l to about 5 g/l platinum group metal.

Embodiment 863

The $NO_x$ storage washcoat layer of any one of embodiments 855-862, wherein the $NO_x$ storage washcoat layer comprises about 0.4 g/l to about 3 g/l platinum group metal.

Embodiment 864

The $NO_x$ storage washcoat layer of any one of embodiments 855-863, wherein the $NO_x$ storage washcoat layer comprises about 0.5 g/l to about 1 g/l platinum group metal.

Embodiment 865

A coated substrate comprising a substrate coated comprising a $NO_x$ storage washcoat composition according to any one of embodiments 783-864.

Embodiment 866

The coated substrate of embodiment 865, wherein the coated substrate demonstrates a $NO_x$ slip of 75 ppm or less when treated with exhaust gas comprising about 100 ppm $NO_x$ under lean-burn conditions for about 1000 seconds.

Embodiment 867

The coated substrate of embodiments 865 or 866, wherein the coated substrate demonstrates a $NO_x$ slip of 50 ppm or less when treated with exhaust gas comprising about 100 ppm $NO_x$ under lean-burn conditions for about 1000 seconds.

Embodiment 868

The coated substrate of any one of embodiments 865-867, wherein the coated substrate demonstrates a $NO_x$ slip of 50 ppm or less when treated with exhaust gas comprising about 100 ppm $NO_x$ under lean-burn conditions for about 500 seconds.

Embodiment 869

The coated substrate of any one of embodiments 865-868, wherein the coated substrate has a platinum group metal loading of about 2.0 g/l or less.

Embodiment 870

A catalytic converter comprising a coated substrate according to any one of embodiments 865-869.

Embodiment 871

An exhaust treatment system comprising a conduit for exhaust gas and a catalytic converter according to embodiment 870.

Embodiment 872

A vehicle comprising a catalytic converter according to embodiment 870.

Embodiment 873

A method of treating exhaust gas, comprising contacting the coated substrate of any one of embodiments 865-869 with the exhaust gas.

Embodiment 874

The method according to embodiment 873, wherein the coated substrate is housed within a catalytic converter configured to receive exhaust gas.

Embodiment 875

A vehicle comprising a coated substrate, the coated substrate comprising:
  a substrate; and
  a $NO_x$ storage washcoat composition comprising:
    micron-sized oxygen-storage particles;
    composite nanoparticles, the composite nanoparticle comprising a support nanoparticle and a catalytic nanoparticle, the catalytic nanoparticle comprising one or more platinum group metals; and
    an alkaline earth metal oxide.

Embodiment 876

The vehicle of embodiment 875, wherein a portion of the alkaline earth metal oxide is covalently bound to the micron-sized oxygen-storage particles.

Embodiment 877

The vehicle of embodiment 876, wherein a portion of the alkaline earth metal oxide is not covalently bound to the micron-sized oxygen-storage particles.

Embodiment 878

The vehicle of any one of embodiments 875-877, wherein a portion of the composite nanoparticles are covalently bound to the micron-sized oxygen-storage particles.

Embodiment 879

The vehicle of any one of embodiments 875-878, wherein a portion of the composite nanoparticles are not covalently bound to the micron-sized oxygen-storage particles.

Embodiment 880

The vehicle of any one of embodiments 875-879, wherein the oxygen-storage particles are porous.

Embodiment 881

The vehicle of any one of embodiments 875-880, wherein the oxygen-storage particles comprise a metal oxide.

Embodiment 882

The vehicle of any one of embodiments 875-881, wherein the oxygen-storage particles comprise cerium oxide, zirconium oxide, lanthanum oxide, or yttrium oxide.

Embodiment 883

The vehicle of any one of embodiments 875-882, wherein the oxygen-storage particles comprise cerium oxide.

Embodiment 884

The vehicle of any one of embodiments 875-883, wherein the oxygen-storage particles comprise zirconium oxide.

Embodiment 885

The vehicle of any one of embodiments 875-884, wherein the oxygen-storage particles comprise lanthanum oxide.

Embodiment 886

The vehicle of any one of embodiments 875-885, wherein the oxygen-storage particles comprise yttrium oxide.

Embodiment 887

The vehicle of any one of embodiments 875-886, wherein the oxygen-storage particles comprise cerium oxide and zirconium oxide.

Embodiment 888

The vehicle of any one of embodiments 875-887, wherein the oxygen-storage particles comprise cerium oxide, zirconium oxide, and lanthanum oxide.

Embodiment 889

The vehicle of any one of embodiments 875-888, wherein the oxygen-storage particles comprise cerium oxide, zirconium oxide, and yttrium oxide.

Embodiment 890

The vehicle of any one of embodiments 875-889, wherein the oxygen-storage particles comprise cerium oxide, zirconium oxide, lanthanum oxide, and yttrium oxide.

Embodiment 891

The vehicle of any one of embodiments 875-890, wherein the oxygen-storage particles comprise about 20% to about 100% cerium oxide.

Embodiment 892

The vehicle of any one of embodiments 875-891, wherein the oxygen-storage particles comprise about 30% to about 90% cerium oxide.

Embodiment 893

The vehicle of any one of embodiments 875-892, wherein the oxygen-storage particles comprise about 30% to about 50% cerium oxide.

Embodiment 894

The vehicle of any one of embodiments 875-893, wherein the oxygen-storage particles comprise about 70% to about 90% cerium oxide.

Embodiment 895

The vehicle of any one of embodiments 875-894, wherein the oxygen-storage particles comprise about 0% to about 80% zirconium oxide.

Embodiment 896

The vehicle of any one of embodiments 875-895, wherein the oxygen-storage particles comprise about 5% to about 15% zirconium oxide.

Embodiment 897

The vehicle of any one of embodiments 875-896, wherein the oxygen-storage particles comprise about 15% to about 35% zirconium oxide.

Embodiment 898

The vehicle of any one of embodiments 875-896, wherein the oxygen-storage particles comprise about 35% to about 55% zirconium oxide.

Embodiment 899

The vehicle of any one of embodiments 875-896, wherein the oxygen-storage particles comprise about 55% to about 65% zirconium oxide.

Embodiment 900

The vehicle of any one of embodiments 875-899, wherein the oxygen-storage particles comprise about 0% to about 15% lanthanum oxide.

Embodiment 901

The vehicle of any one of embodiments 875-900, wherein the oxygen-storage particles comprise about 2% to about 10% lanthanum oxide.

Embodiment 902

The vehicle of any one of embodiments 875-901, wherein the oxygen-storage particles comprise about 2% to about 8% lanthanum oxide.

Embodiment 903

The vehicle of any one of embodiments 875-902, wherein the oxygen-storage particles comprise about 3% to about 6% lanthanum oxide.

Embodiment 904

The vehicle of any one of embodiments 875-903, wherein the oxygen-storage particles comprise about 4% to about 5% lanthanum oxide.

Embodiment 905

The vehicle of any one of embodiments 875-904 wherein the oxygen-storage particles comprise about 0% to about 15% yttrium oxide.

Embodiment 906

The vehicle of any one of embodiments 875-905, wherein the oxygen-storage particles comprise about 2% to about 10% yttrium oxide.

Embodiment 907

The vehicle of any one of embodiments 875-906, wherein the oxygen-storage particles comprise about 2% to about 8% yttrium oxide.

Embodiment 908

The vehicle of any one of embodiments 875-907, wherein the oxygen-storage particles comprise about 3% to about 6% yttrium oxide.

Embodiment 909

The vehicle of any one of embodiments 875-908, wherein the oxygen-storage particles comprise about 4% to about 5% yttrium oxide.

Embodiment 910

The vehicle of any one of embodiments 875-909, wherein the oxygen-storage particles comprise about 80% to about 90% cerium oxide and about 10% to about 20% zirconium oxide.

Embodiment 911

The vehicle of any one of embodiments 875-910, wherein the oxygen-storage particles comprise about 80% to about 90% cerium oxide, about 5% to about 15% zirconium oxide, and about 3% to about 5% lanthanum oxide.

Embodiment 912

The vehicle of any one of embodiments 875-911, wherein the oxygen-storage particles comprise about 80% to about 90% cerium oxide, about 5% to about 15% zirconium oxide, and about 3% to about 5% yttrium oxide.

Embodiment 913

The vehicle of any one of embodiments 875-912, wherein the oxygen-storage particles comprise about 86% cerium oxide, about 10% zirconium oxide, and about 4% lanthanum oxide.

Embodiment 914

The vehicle of any one of embodiments 875-913, wherein the oxygen-storage particles comprise about 86% cerium oxide, about 10% zirconium oxide, and about 4% yttrium oxide.

Embodiment 915

The vehicle of any one of embodiments 875-914, wherein the composite nanoparticles are plasma generated.

Embodiment 916

The vehicle of any one of embodiments 875-915, wherein the catalytic nanoparticle comprises one or more platinum group metals.

Embodiment 917

The vehicle of any one of embodiments 875-916, wherein the catalytic nanoparticle comprises platinum or palladium.

Embodiment 918

The vehicle of any one of embodiments 875-917, wherein the catalytic nanoparticle comprises platinum and palladium.

Embodiment 919

The vehicle of any one of embodiments 875-918, wherein the catalytic nanoparticle comprises platinum and palladium of a ratio of about 1:2 platinum:palladium to about 25:1 platinum:palladium.

Embodiment 920

The vehicle of any one of embodiments 875-919, wherein the catalytic nanoparticle comprises platinum and palladium of a ratio of about 10:1 platinum:palladium.

Embodiment 921

The vehicle of any one of embodiments 875-920, wherein the support nanoparticle comprises a metal oxide.

Embodiment 922

The vehicle of any one of embodiments 875-921, wherein the support nanoparticle comprises cerium oxide.

Embodiment 923

The vehicle of any one of embodiments 875-922, wherein the composite nanoparticles comprise about 0.01 wt % to about 60 wt % platinum group metal and about 40 wt % to about 99.99 wt % metal oxide.

Embodiment 924

The vehicle of any one of embodiments 875-923, wherein the composite nanoparticles comprise about 0.5 wt % to about 2 wt % platinum group metal and about 98 wt % to about 99.5 wt % metal oxide.

Embodiment 925

The vehicle of any one of embodiments 875-924, wherein the alkaline earth metal oxide is barium oxide.

Embodiment 926

The vehicle of any one of embodiments 875-925, wherein the alkaline earth metal oxide is covalently bound to the oxygen-storage particles by depositing an alkaline earth metal salt from solution onto the oxygen-storage particles and allowing the alkaline earth metal salt to convert into an alkaline earth metal oxide.

Embodiment 927

The vehicle of embodiment 926, wherein the barium salt is barium acetate, barium bromide, barium carbonate, barium chloride, barium chromate, barium cyclohexanebutyrate, barium fluoride, barium hydroxide, barium iodide, barium manganite, or barium perchlorate.

Embodiment 928

The vehicle of embodiment 926 or 927, wherein the barium salt is barium acetate.

Embodiment 929

The vehicle of any one of embodiments 875-928, wherein the alkaline earth metal oxide is comprised in a plurality of alkaline earth metal oxide nanoparticles.

Embodiment 930

The vehicle of embodiment 929, wherein the plurality of alkaline earth metal oxide nanoparticles are plasma generated.

Embodiment 931

The vehicle of any one of embodiments 875-930, wherein the alkaline earth metal oxide is comprised in a plurality of nanoparticles bound to support nanoparticles, forming a plurality of alkaline earth metal oxide composite nanoparticles.

Embodiment 932

The vehicle of embodiment 931, wherein the plurality of alkaline earth metal oxide composite nanoparticles are plasma generated.

Embodiment 933

The vehicle of any one of embodiments 929-932, wherein the alkaline earth metal nanoparticles or alkaline earth metal oxide composite nanoparticles are bonded to the carrier.

Embodiment 934

The vehicle of any one of embodiments 929-933, wherein the alkaline earth metal oxide nanoparticles or alkaline earth metal oxide composite nanoparticles are embedded within the carrier.

Embodiment 935

The vehicle of any one of embodiments 875-934, wherein the washcoat layer is configured to adsorb $NO_x$ gases during a lean burn.

Embodiment 936

The vehicle of any one of embodiments 875-935, wherein the washcoat layer is configured to desorb $NO_x$ gases during a rich-purge cycle.

Embodiment 937

The vehicle of any one of embodiments 875-936, wherein the $NO_x$ storage washcoat layer comprises about 100 g/l to about 400 g/l micron-sized oxygen-storage particles.

Embodiment 938

The vehicle of any one of embodiments 875-937, wherein the $NO_x$ storage washcoat layer comprises about 200 g/l to about 300 g/l micron-sized oxygen-storage particles.

Embodiment 939

The vehicle of any one of embodiments 875-938, wherein the $NO_x$ storage washcoat layer comprises about 20 g/l to about 100 g/l composite nanoparticles.

Embodiment 940

The vehicle of any one of embodiments 875-939, wherein the $NO_x$ storage washcoat layer comprises about 40 g/l to about 80 g/l composite nanoparticles.

Embodiment 941

The vehicle of any one of embodiments 875-940, wherein the $NO_x$ storage washcoat layer comprises about 10 g/l to about 60 g/l alkaline earth metal oxide.

Embodiment 942

The vehicle of any one of embodiments 875-941, wherein the $NO_x$ storage washcoat layer comprises about 25 g/l to about 45 g/l alkaline earth metal oxide.

Embodiment 943

The vehicle of any one of embodiments 875-942, wherein the $NO_x$ storage washcoat layer comprises about 0.2 g/l to about 5 g/l platinum group metal.

Embodiment 944

The vehicle of any one of embodiments 875-943, wherein the $NO_x$ storage washcoat layer comprises about 0.4 g/l to about 3 g/l platinum group metal.

Embodiment 945

The vehicle of any one of embodiments 875-944, wherein the $NO_x$ storage washcoat layer comprises about 0.5 g/l to about 1 g/l platinum group metal.

Embodiment 946

The vehicle of any one of embodiments 875-945, wherein the $NO_x$ storage washcoat layer comprises aluminum oxide.

Embodiment 947

The vehicle of embodiment 946, wherein the aluminum oxide is derived from boehmite.

Embodiment 948

The vehicle of any one of embodiments 875-947, wherein the $NO_x$ storage washcoat layer comprises about 10 g/l to about 30 g/l aluminum oxide.

Embodiment 949

The vehicle of any one of embodiments 875-948, wherein the $NO_x$ storage washcoat layer comprises about 15 g/l to about 20 g/l aluminum oxide.

Embodiment 950

The vehicle of any one of embodiments 875-949, wherein the coated substrate further comprises a reducing washcoat layer.

Embodiment 951

The vehicle of embodiment 950, wherein the reducing washcoat layer comprises a plurality of reducing micron-sized catalytic particles, the reducing micron-sized catalytic particles comprising a plurality of reducing composite nanoparticles covalently bound to a reducing catalyst carrier particle.

Embodiment 952

The vehicle of embodiment 951, wherein the reducing composite nanoparticles are bonded to the reducing catalyst carrier particle.

Embodiment 953

The vehicle of embodiment 951, wherein the reducing composite nanoparticles are embedded within the reducing catalyst carrier particles.

Embodiment 954

The vehicle of any one of embodiments 951-953, wherein the reducing composite nanoparticles comprise a reducing catalytic nanoparticle and a support nanoparticle.

Embodiment 955

The vehicle of any one of embodiments 951-954, wherein the reducing composite nanoparticles are plasma-generated.

Embodiment 956

The vehicle of any one of embodiments 951-955, wherein the reducing composite nanoparticles comprise rhodium.

Embodiment 957

The vehicle of any one of embodiments 951-956, wherein the reducing catalytic nanoparticle comprises rhodium.

Embodiment 958

The vehicle of any one of embodiments 951-957, wherein the support nanoparticle comprises cerium oxide.

Embodiment 959

The vehicle of any one of embodiments 951-958, wherein the reducing catalyst carrier particle comprises a metal oxide.

Embodiment 960

The vehicle of any one of embodiments 951-959, wherein the reducing catalyst carrier particle comprises cerium oxide, zirconium oxide, lanthanum oxide, or yttrium oxide.

Embodiment 961

The vehicle of any one of embodiments 951-960, wherein the reducing catalyst carrier particle comprises cerium oxide.

Embodiment 962

The vehicle of any one of embodiments 951-961, wherein the reducing washcoat layer further comprises porous alumina particles.

Embodiment 963

The vehicle of any one of embodiments 951-962, wherein the reducing washcoat layer further comprises aluminum oxide derived from boehmite.

Embodiment 964

The vehicle of any one of embodiments 875-963, wherein the coated substrate further comprises an oxidizing washcoat layer.

Embodiment 965

The vehicle of embodiment 964, wherein the oxidizing washcoat layer comprises a plurality of micron-sized oxidizing catalytic particles, the micron-sized oxidizing catalytic particles comprising a plurality of oxidizing composite nanoparticles covalently bound to an oxidizing catalyst carrier particle.

Embodiment 966

The vehicle of embodiment 965, wherein the oxidizing composite nanoparticles are bonded to the oxidizing catalyst carrier particle.

Embodiment 967

The vehicle of embodiment 965, wherein the oxidizing composite nanoparticles are embedded within the oxidizing catalyst carrier particles.

Embodiment 968

The vehicle of any one of embodiments 965-967, wherein the oxidizing composite nanoparticles comprise an oxidizing catalytic nanoparticle and a support nanoparticle.

Embodiment 969

The vehicle of any one of embodiments 965-968, wherein the oxidizing composite nanoparticles are plasma-generated.

Embodiment 970

The vehicle of any one of embodiments 965-969, wherein the oxidizing composite nanoparticles comprise one or more platinum group metals.

Embodiment 971

The vehicle of any one of embodiments 965-970, wherein the oxidizing composite nanoparticles comprise platinum or palladium.

Embodiment 972

The vehicle of any one of embodiments 968-971, wherein the oxidizing catalytic nanoparticle comprises platinum or palladium.

Embodiment 973

The vehicle of any one of embodiments 968-972, wherein the support nanoparticle comprises a metal oxide.

Embodiment 974

The vehicle of any one of embodiments 968-973, wherein the support nanoparticle comprises aluminum oxide.

Embodiment 975

The vehicle of any one of embodiments 968-974, wherein the oxidizing catalyst carrier particle comprises aluminum oxide.

Embodiment 976

The vehicle of any one of embodiments 964-975, wherein the oxidizing washcoat layer further comprises porous alumina particles.

Embodiment 977

The vehicle of embodiment 976, wherein an alkaline earth metal oxide is covalently bound to the alumina particles.

Embodiment 978

The vehicle of embodiment 977, wherein the alkaline earth metal oxide is barium oxide.

Embodiment 979

The vehicle of any one of embodiments 964-978, wherein the oxidizing washcoat layer further comprises aluminum oxide derived from boehmite.

Embodiment 980

The vehicle of any one of embodiments 875-979, wherein the coated substrate demonstrates a $NO_x$ slip of 75 ppm or less when treated with exhaust gas comprising about 100 ppm $NO_x$ under lean-burn conditions for about 1000 seconds.

Embodiment 981

The vehicle of any one of embodiments 875-980, wherein the coated substrate demonstrates a $NO_x$ slip of 50 ppm or less when treated with exhaust gas comprising about 100 ppm $NO_x$ under lean-burn conditions for about 1000 seconds.

Embodiment 982

The vehicle of any one of embodiments 875-981, wherein the coated substrate demonstrates a $NO_x$ slip of 50 ppm or less when treated with exhaust gas comprising about 100 ppm $NO_x$ under lean-burn conditions for about 500 seconds.

Embodiment 983

The vehicle of any one of embodiments 875-982, wherein the coated substrate has a platinum group metal loading of about 2.0 g/l or less.

Embodiment 984

The vehicle of any one of embodiments 780, 872, and 875-983, wherein the vehicle complies with the Euro 6 emissions requirements.

Embodiment 985

The vehicle of any one of embodiments 780, 872, and 875-984, wherein the vehicle displays $NO_x$ emissions of 180 mg/km or less.

Embodiment 986

The vehicle of any one of embodiments 780, 872, and 875-985, wherein the vehicle displays $NO_x$ emissions of 80 mg/km or less.

Embodiment 987

The vehicle of any one of embodiments 780, 872, and 875-986, wherein the vehicle displays $NO_x$ emissions of 60 mg/km or less.

Embodiment 988

The vehicle of any one of embodiments 780, 872, and 875-987, wherein the vehicle displays $NO_x$ emissions of 40 mg/km or less.

Embodiment 989

The vehicle of any one of embodiments 780, 872, and 875-988, wherein the vehicle complies with the Euro 6 emissions requirements during a lean-burn engine cycle.

Embodiment 990

The vehicle of any one of embodiments 780, 872, and 875-989, wherein the vehicle displays $NO_x$ emissions of 180 mg/km or less during a lean-burn engine cycle.

Embodiment 991

The vehicle of any one of embodiments 780, 872, and 875-990, wherein the vehicle displays $NO_x$ emissions of 80 mg/km or less during a lean-burn engine cycle.

Embodiment 992

The vehicle of any one of embodiments 780, 872, and 875-991, wherein the vehicle displays $NO_x$ emissions of 60 mg/km or less during a lean-burn engine cycle.

Embodiment 993

The vehicle of any one of embodiments 780, 872, and 875-992, wherein the vehicle displays $NO_x$ emissions of 40 mg/km or less during a lean-burn engine cycle.

Embodiment 994

The vehicle of any one of embodiments 780, 872, and 875-993, wherein the vehicle comprises a gasoline engine.

Embodiment 995

The vehicle of any one of embodiments 780, 872, and 875-994, wherein the vehicle comprises a diesel engine.

Embodiment 996

A method of producing a washcoat composition, the method comprising:

combining a first component comprising a plurality of micron-sized oxygen-storage particles; a second component comprising a plurality of composite nanoparticles, the composite nanoparticle comprising a support nanoparticle and a catalytic nanoparticle, the catalytic nanoparticle comprising one or more platinum group metals; and a third component comprising an alkaline earth metal salt.

Embodiment 997

The method of embodiment 996, further comprising coating a substrate with the washcoat composition.

Embodiment 998

The method of embodiment 996 or 997, further comprising calcining the washcoat composition to produce a washcoat layer.

Embodiment 999

A method of producing a coated substrate, the method comprising:
  combing a first component comprising a plurality of micron-sized oxygen-storage particles; a second component comprising a plurality of composite nanoparticles, the composite nanoparticle comprising a support nanoparticle and a catalytic nanoparticle, the catalytic nanoparticle comprising one or more platinum group metals; and a third component comprising an alkaline earth metal salt to form a $NO_x$ storage washcoat composition;
  coating a substrate with the washcoat composition; and
  calcining the substrate, thereby forming a $NO_x$ storage washcoat layer coating the substrate.

Embodiment 1000

The method of embodiment 998 or 999, wherein calcining the coated substrate converts the alkaline earth metal salt into an alkaline earth metal oxide.

Embodiment 1001

The method of any one of embodiments 996-1000, wherein the alkaline earth metal salt is dissolved in a solution.

Embodiment 1002

The method of any one of embodiments 996-1001, wherein the combining step occurs in a solution.

Embodiment 1003

The method of any one of embodiments 996-1002, wherein a portion of the alkaline earth metal salt is deposited onto the micron-sized oxygen-storage particles.

Embodiment 1004

The method of any one of embodiments 996-1003, wherein a portion of the alkaline earth metal salt is not deposited onto the micron-sized oxygen-storage particles.

Embodiment 1005

The method of any one of embodiments 996-1004, wherein a portion of the composite nanoparticles are deposited onto the micron-sized oxygen-storage particles.

Embodiment 1006

The method of any one of embodiments 996-1005, wherein a portion of the composite nanoparticles are not deposited onto the micron-sized oxygen-storage particles.

Embodiment 1007

The method of any one of embodiments 996-1006, wherein the pH of the washcoat composition is adjusted to between about 3 and about 5.

Embodiment 1008

The method of any one of embodiments 996-1007, wherein the oxygen-storage particles are porous.

Embodiment 1009

The method of any one of embodiments 996-1008, wherein the oxygen-storage particles comprise a metal oxide.

Embodiment 1010

The method of any one of embodiments 996-1009, wherein the oxygen-storage particles comprise cerium oxide, zirconium oxide, lanthanum oxide, or yttrium oxide.

Embodiment 1011

The method of any one of embodiments 996-1010, wherein the oxygen-storage particles comprise cerium oxide.

Embodiment 1012

The method of any one of embodiments 996-1011, wherein the oxygen-storage particles comprise zirconium oxide.

Embodiment 1013

The method of any one of embodiments 996-1012, wherein the oxygen-storage particles comprise lanthanum oxide.

Embodiment 1014

The method of any one of embodiments 996-1013, wherein the oxygen-storage particles comprise yttrium oxide.

Embodiment 1015

The method of any one of embodiments 996-1014, wherein the oxygen-storage particles comprise cerium oxide and zirconium oxide.

Embodiment 1016

The method of any one of embodiments 996-1015, wherein the oxygen-storage particles comprise cerium oxide, zirconium oxide, and lanthanum oxide.

Embodiment 1017

The method of any one of embodiments 996-1016, wherein the oxygen-storage particles comprise cerium oxide, zirconium oxide, and yttrium oxide.

Embodiment 1018

The method of any one of embodiments 996-1017, wherein the oxygen-storage particles comprise cerium oxide, zirconium oxide, lanthanum oxide, and yttrium oxide.

Embodiment 1019

The method of any one of embodiments 996-1018, wherein the oxygen-storage particles comprise about 20% to about 100% cerium oxide.

Embodiment 1020

The method of any one of embodiments 996-1019, wherein the oxygen-storage particles comprise about 30% to about 90% cerium oxide.

Embodiment 1021

The method of any one of embodiments 996-1020, wherein the oxygen-storage particles comprise about 30% to about 50% cerium oxide.

Embodiment 1022

The method of any one of embodiments 996-1021, wherein the oxygen-storage particles comprise about 70% to about 90% cerium oxide.

Embodiment 1023

The method of any one of embodiments 996-1022, wherein the oxygen-storage particles comprise about 0% to about 80% zirconium oxide.

Embodiment 1024

The method of any one of embodiments 996-1023, wherein the oxygen-storage particles comprise about 5% to about 15% zirconium oxide.

Embodiment 1025

The method of any one of embodiments 996-1024, wherein the oxygen-storage particles comprise about 15% to about 35% zirconium oxide.

Embodiment 1026

The method of any one of embodiments 996-1025, wherein the oxygen-storage particles comprise about 35% to about 55% zirconium oxide.

Embodiment 1027

The method of any one of embodiments 996-1026, wherein the oxygen-storage particles comprise about 55% to about 65% zirconium oxide.

Embodiment 1028

The method of any one of embodiments 996-1027, wherein the oxygen-storage particles comprise about 0% to about 15% lanthanum oxide.

Embodiment 1029

The method of any one of embodiments 996-1028, wherein the oxygen-storage particles comprise about 2% to about 10% lanthanum oxide.

Embodiment 1030

The method of any one of embodiments 996-1029, wherein the oxygen-storage particles comprise about 2% to about 8% lanthanum oxide.

Embodiment 1031

The method of any one of embodiments 996-1030, wherein the oxygen-storage particles comprise about 3% to about 6% lanthanum oxide.

Embodiment 1032

The method of any one of embodiments 996-1031, wherein the oxygen-storage particles comprise about 4% to about 5% lanthanum oxide.

Embodiment 1033

The method of any one of embodiments 996-1032, wherein the oxygen-storage particles comprise about 0% to about 15% yttrium oxide.

Embodiment 1034

The method of any one of embodiments 996-1033, wherein the oxygen-storage particles comprise about 2% to about 10% yttrium oxide.

Embodiment 1035

The method of any one of embodiments 996-1034, wherein the oxygen-storage particles comprise about 2% to about 8% yttrium oxide.

Embodiment 1036

The method of any one of embodiments 996-1035, wherein the oxygen-storage particles comprise about 3% to about 6% yttrium oxide.

Embodiment 1037

The method of any one of embodiments 996-1036, wherein the oxygen-storage particles comprise about 4% to about 5% yttrium oxide.

Embodiment 1038

The method of any one of embodiments 996-1037, wherein the oxygen-storage particles comprise about 80% to about 90% cerium oxide and about 10% to about 20% zirconium oxide.

Embodiment 1039

The method of any one of embodiments 996-1038, wherein the oxygen-storage particles comprise about 80% to about 90% cerium oxide, about 5% to about 15% zirconium oxide, and about 3% to about 5% lanthanum oxide.

Embodiment 1040

The method of any one of embodiments 996-1039, wherein the oxygen-storage particles comprise about 80% to about 90% cerium oxide, about 5% to about 15% zirconium oxide, and about 3% to about 5% yttrium oxide.

Embodiment 1041

The method of any one of embodiments 996-1040, wherein the oxygen-storage particles comprise about 86% cerium oxide, about 10% zirconium oxide, and about 4% lanthanum oxide.

Embodiment 1042

The method of any one of embodiments 996-1041, wherein the oxygen-storage particles comprise about 86% cerium oxide, about 10% zirconium oxide, and about 4% yttrium oxide.

Embodiment 1043

The method of any one of embodiments 996-1042, wherein the composite nanoparticles are plasma generated.

Embodiment 1044

The method of any one of embodiments 996-1043, wherein the catalytic nanoparticle comprises one or more platinum group metals.

Embodiment 1045

The method of any one of embodiments 996-1044, wherein the catalytic nanoparticle comprises platinum or palladium.

Embodiment 1046

The method of any one of embodiments 996-1045, wherein the catalytic nanoparticle comprises platinum and palladium.

Embodiment 1047

The method of any one of embodiments 996-1046, wherein the catalytic nanoparticle comprises platinum and palladium of a ratio of about 1:2 platinum:palladium to about 25:1 platinum:palladium.

Embodiment 1048

The method of any one of embodiments 996-1047, wherein the catalytic nanoparticle comprises platinum and palladium of a ratio of about 10:1 platinum:palladium.

Embodiment 1049

The method of any one of embodiments 996-1048, wherein the support nanoparticle comprises a metal oxide.

Embodiment 1050

The method of any one of embodiments 996-1049, wherein the support nanoparticle comprises cerium oxide.

Embodiment 1051

The method of any one of embodiments 996-1050, wherein the composite nanoparticles comprise about 0.01 wt % to about 60 wt % platinum group metal and about 40 wt % to about 99.99 wt % metal oxide.

Embodiment 1052

The method of any one of embodiments 996-1051, wherein the composite nanoparticles comprise about 0.5 wt % to about 2 wt % platinum group metal and about 98 wt % to about 99.5 wt % metal oxide.

Embodiment 1053

The method of any one of embodiments 996-1052, wherein the alkaline earth metal salt is a barium salt.

Embodiment 1054

The method of embodiment 1053, wherein the barium salt is barium acetate, barium bromide, barium carbonate, barium chloride, barium chromate, barium cyclohexanebutyrate, barium fluoride, barium hydroxide, barium iodide, barium manganite, or barium perchlorate.

Embodiment 1055

The method of embodiment 1053 or 1054, wherein the barium salt is barium acetate.

Embodiment 1056

The method of any one of embodiments 996-1055, further comprising combining a thickening agent with the washcoat composition.

Embodiment 1057

The method of any one of embodiments 996-1056, wherein oxygen-storage particles are provided such that the oxygen-storage particles make up about 10% to about 90% of the washcoat composition solids.

Embodiment 1058

The method of any one of embodiments 996-1057, wherein oxygen-storage particles are provided such that the oxygen-storage particles make up about 40% to about 80% of the washcoat composition solids.

Embodiment 1059

The method of any one of embodiments 996-1058, wherein oxygen-storage particles are provided such that the oxygen-storage particles make up about 60% to about 70% of the washcoat composition solids.

Embodiment 1060

The method of any one of embodiments 996-1059, wherein composite nanoparticles are provided such that the composite nanoparticles make up about 5% to about 25% of the washcoat composition solids.

Embodiment 1061

The method of any one of embodiments 996-1060, wherein composite nanoparticles are provided such that the composite nanoparticles make up about 10% to about 20% of the washcoat composition solids.

Embodiment 1062

The method of any one of embodiments 996-1061, further comprising combining boehmite with the washcoat composition.

Embodiment 1063

The method of embodiment 1062, wherein boehmite is provided such that the washcoat composition comprises boehmite of about % to about 7% of the washcoat composition solids.

Embodiment 1064

The method of embodiment 1062 or 1063, wherein boehmite is provided such that the washcoat composition comprises boehmite of about 3% to about 6% of the washcoat composition solids.

Embodiment 1065

The method of any one of embodiments 1062-1064, wherein boehmite is provided such that the washcoat composition comprises boehmite of about 5% of the washcoat composition solids.

Embodiment 1066

The method of any one of embodiments 996-1065, wherein the alkaline earth metal salt is provided such that the alkaline earth metal salt makes up about 5% to about 25% of the washcoat composition solids.

Embodiment 1067

The method of any one of embodiments 996-1066, wherein the alkaline earth metal salt is provided such that the alkaline earth metal salt makes up about 10% to about 20% of the washcoat composition solids.

Embodiment 1068

The method of any one of embodiments 996-1067, wherein the alkaline earth metal salt is provided such that the alkaline earth metal salt makes up about 10% of the washcoat composition solids.

Embodiment 1069

The method of any one of embodiments 998-1068, wherein the micron-sized oxygen-storage particles are provided such that the washcoat layer comprises about 100 g/l to about 400 g/l oxygen-storage particles.

Embodiment 1070

The method of any one of embodiments 998-1069, wherein the micron-sized oxygen-storage particles are provided such the washcoat layer comprises about 200 g/l to about 300 g/l oxygen-storage particles.

Embodiment 1071

The method of any one of embodiments 998-1070, wherein the composite nanoparticles are provided such that the washcoat layer comprises about 20 g/l to about 100 g/l of the composite nanoparticles.

Embodiment 1072

The method of any one of embodiments 998-1071, wherein the composite nanoparticles are provided such that the washcoat layer comprises about 40 g/l to about 80 g/l of the composite nanoparticles.

Embodiment 1073

The method of any one of embodiments 998-1072, wherein the alkaline earth metal salt is provided such that the washcoat layer comprises about 10 g/l to about 60 g/l alkaline earth metal oxide.

Embodiment 1074

The method of any one of embodiments 998-1073, wherein the alkaline earth metal salt is provided such that the washcoat layer comprises about 25 g/l to about 45 g/l alkaline earth metal oxide.

Embodiment 1075

The method of any one of embodiments 998-1074, wherein the washcoat layer comprises about 0.2 g/l to about 5 g/l platinum group metal.

Embodiment 1076

The method of any one of embodiments 998-1075, wherein the washcoat layer comprises about 0.4 g/l to about 3 g/l platinum group metal.

Embodiment 1077

The method of any one of embodiments 998-1076, wherein the washcoat layer comprises about 0.5 g/l to about 1 g/l platinum group metal.

Embodiment 1078

The method of any one of embodiments 998-1077, further comprising:
coating the substrate with a reducing washcoat slurry; and
calcining the substrate, thereby producing a reducing washcoat layer.

Embodiment 1079

The method of embodiment 1078 wherein the reducing washcoat layer is produced prior to coating the substrate with the $NO_x$ storage washcoat composition.

Embodiment 1080

The method of embodiment 1078 or 1079, wherein the reducing washcoat slurry comprises reducing micron-sized catalytic particles, the reducing micron-sized catalytic particles comprising a plurality of reducing composite nanoparticles covalently bound to a reducing catalyst carrier particle.

Embodiment 1081

The method of embodiment 1080, wherein the reducing composite catalytic nanoparticles are bonded to the reducing catalyst carrier particle.

Embodiment 1082

The method of embodiment 1080, wherein the reducing composite nanoparticles are embedded within the reducing catalyst carrier particles.

Embodiment 1083

The method of any one of embodiments 1080-1082, wherein the reducing composite nanoparticles comprise a reducing catalytic nanoparticle and a support nanoparticle.

Embodiment 1084

The method of any one of embodiments 1080-1083, wherein the reducing composite nanoparticles are plasma-generated.

Embodiment 1085

The method of embodiment 1083 or 1084, wherein the reducing catalytic nanoparticle comprises rhodium.

Embodiment 1086

The method of any one of embodiment 1083-1085, wherein the support nanoparticle comprises cerium oxide.

Embodiment 1087

The method of any one of embodiments 1080-1086, wherein the reducing catalyst carrier particles comprise a metal oxide.

Embodiment 1088

The method of any one of embodiments 1080-1087, wherein the reducing catalyst carrier particles comprise cerium oxide.

Embodiment 1089

The method of any one of embodiments 1080-1088, wherein the reducing washcoat slurry further comprises porous alumina particles.

Embodiment 1090

The method of any one of embodiments 1080-1089, wherein the reducing washcoat further comprises boehmite.

Embodiment 1091

The method of any one of embodiments 998-1090, further comprising:
coating the substrate with an oxidizing washcoat slurry; and
calcining the substrate, thereby producing a oxidizing washcoat layer.

Embodiment 1092

The method of embodiment 1091, wherein the oxidizing washcoat layer is produced prior to coating the substrate with the $NO_x$ storage washcoat slurry.

Embodiment 1093

The method of embodiment 1091 or 1092, wherein the oxidizing washcoat comprises oxidizing micron-sized catalytic particles, the oxidizing micron-sized catalytic particles comprising a plurality of oxidizing composite nanoparticles covalently bound to an oxidizing catalyst carrier particle.

Embodiment 1094

The method of embodiment 1093, wherein the oxidizing composite nanoparticles are bonded to the oxidizing catalyst carrier particle.

Embodiment 1095

The method of embodiment 1093, wherein the oxidizing composite nanoparticles are embedded within the oxidizing catalyst carrier particles.

Embodiment 1096

The method of any one of embodiments 1093-1095, wherein the oxidizing composite nanoparticles comprise an oxidizing catalytic nanoparticle and a support nanoparticle.

Embodiment 1097

The method of any one of embodiments 1093-1096, wherein the oxidizing composite nanoparticles are plasma-generated.

Embodiment 1098

The method of any one of embodiments 1095-1097, wherein the oxidizing catalytic nanoparticles comprise one or more platinum group metals.

Embodiment 1099

The method of any one of embodiments 1095-1098, wherein the oxidizing catalytic nanoparticles comprise platinum or palladium.

Embodiment 1100

The method of any one of embodiments 1095-1099, wherein the support nanoparticles comprise aluminum oxide.

Embodiment 1101

The method of any one of embodiments 1093-1100, wherein the oxidizing catalyst carrier particles comprise aluminum oxide.

Embodiment 1102

The method of any one of embodiments 1093-1101, wherein the oxidizing washcoat slurry further comprises porous alumina particles.

Embodiment 1103

The method of any one of embodiments 1093-1102, wherein the oxidizing washcoat slurry further comprises boehmite.

Embodiment 1104

A coated substrate produced by the method according to any one of embodiments 998-1103.

Embodiment 1105

The coated substrate of embodiment 1104, wherein the coated substrate demonstrates a $NO_x$ slip of 75 ppm or less when treated with exhaust gas comprising about 100 ppm $NO_x$ under lean-burn conditions for about 1000 seconds.

Embodiment 1106

The coated substrate of embodiment 1104 or 1105, wherein the coated substrate demonstrates a $NO_x$ slip of 50 ppm or less when treated with exhaust gas comprising about 100 ppm $NO_x$ under lean-burn conditions for about 1000 seconds.

Embodiment 1107

The coated substrate of any one of embodiments 1104-1106, wherein the coated substrate demonstrates a $NO_x$ slip of 50 ppm or less when treated with exhaust gas comprising about 100 ppm $NO_x$ under lean-burn conditions for about 500 seconds.

Embodiment 1108

The coated substrate of any one of embodiments 1104-1107, wherein the coated substrate has a platinum group metal loading of about 2.0 g/l or less.

Embodiment 1109

A catalytic converter comprising a coated substrate according to any one of embodiments 1104-1108.

Embodiment 1110

An exhaust treatment system comprising a conduit for exhaust gas and a catalytic converter according to embodiment 1109.

Embodiment 1111

A vehicle comprising a catalytic converter according to embodiment 1109.

Embodiment 1112

The vehicle of embodiment 1111, wherein the vehicle complies with the Euro 6 emissions requirements.

Embodiment 1113

The vehicle of embodiment 1111 or 1112, wherein the vehicle displays $NO_x$ emissions of 180 mg/km or less.

Embodiment 1114

The vehicle of embodiment any one of embodiments 1111-1113, wherein the vehicle displays $NO_x$ emissions of 80 mg/km or less.

Embodiment 1115

The vehicle of embodiment any one of embodiments 1111-1114, wherein the vehicle displays $NO_x$ emissions of 60 mg/km or less.

Embodiment 1116

The vehicle of embodiment any one of embodiments 1111-1115, wherein the vehicle displays $NO_x$ emissions of 40 mg/km or less.

Embodiment 1117

The vehicle of embodiment any one of embodiments 1111-1116, wherein the vehicle complies with the Euro 6 emissions requirements during a lean-burn engine cycle.

Embodiment 1118

The vehicle of embodiment any one of embodiments 1111-1117, wherein the vehicle displays $NO_x$ emissions of 180 mg/km or less during a lean-burn engine cycle.

Embodiment 1119

The vehicle of embodiment any one of embodiments 1111-1118, wherein the vehicle displays $NO_x$ emissions of 80 mg/km or less during a lean-burn engine cycle.

Embodiment 1120

The vehicle of embodiment any one of embodiments 1111-1119, wherein the vehicle displays $NO_x$ emissions of 60 mg/km or less during a lean-burn engine cycle.

Embodiment 1121

The vehicle of embodiment any one of embodiments 1111-1120, wherein the vehicle displays $NO_x$ emissions of 40 mg/km or less during a lean-burn engine cycle.

Embodiment 1122

The vehicle of embodiment any one of embodiments 1111-1121, wherein the vehicle comprises a gasoline engine.

Embodiment 1123

The vehicle of embodiment any one of embodiments 1111-1122, wherein the vehicle comprises a diesel engine.

Embodiment 1124

A method of treating exhaust gas, comprising contacting the coated substrate of any one of embodiments 1104-1107 with the exhaust gas.

Embodiment 1125

The method according to embodiment 1125, wherein the coated substrate is housed within a catalytic converter configured to receive exhaust gas.

EXAMPLES

Example 1: NNm™ Particles Used in Lean $NO_x$ Trapping Materials

In one example of NNm™ particles that may be used in lean $NO_x$ trapping materials, composite catalytic nanoparticles with a platinum/palladium catalytic nanoparticle and a cerium oxide support nanoparticle can be made through plasma-based methods. Platinum and palladium at a 10:1 Pt:Pd ratio and cerium oxide can be fed into a plasma reactor and vaporized under reducing conditions. The platinum group metal to cerium oxide ratio is about 1:99. Upon cooling, the resulting composite catalytic nanoparticles will include a catalytic nanoparticle with a 10:1 Pt:Pd ratio bonded to a support nanoparticle of cerium oxide, at a weight ratio of 1:99 platinum group metal to cerium oxide.

The composite catalytic nanoparticles can be suspended in water, and the pH of the resulting colloid adjusted to about 4. Jeffsperse® X3202 surfactant can then be added to the colloid to about 2%, aiding the thorough dispersion of the colloid. The resulting colloid can then be slowly applied (such as by dripping or other methods) to micron-sized particles containing a mixture of 86% cerium oxide, 10% zirconium oxide, and 4% lanthanum oxide to the point of incipient wetness.

The resulting damp powder can then be dried and calcined, resulting in NNm™ particles with a catalytic composite component, which includes a platinum/palladium catalytic nanoparticle and a cerium oxide support nanoparticle, bonded to a micron-sized cerium oxide-zirconium oxide-lanthanum oxide carrier particle.

Example 2: $NO_x$ Storage Washcoat and Layer Composition Using NNm™ Particles NNm™ particles, for example those detailed in Example 1, can be used to formulate a $NO_x$ storage washcoat slurry or $NO_x$ storage washcoat layer with an approximate solids concentration of about 365 g/l after drying and calcination.

The $NO_x$ storage washcoat slurry (about 365 g/l solids including about 0.6 g/L PGM in final washcoat layer) can include solids of:
  (a) about 79.5 wt % (about 310 g/l or about 85 wt % in the final washcoat layer) NNm™ particles (catalytic composite nanoparticles (which includes platinum/palladium (10:1 Pt:Pd) nanoparticle bound to a cerium oxide support nanoparticle (1:99 catalyst:support)) bound to micron-sized cerium oxide-zirconium oxide-lanthanum oxide (86:10:4 cerium oxide:zirconium oxide:lanthanum oxide) particles);
  (b) about 4.3 wt % (about 17 g/l or about 4.7 wt % in the final washcoat layer) boehmite particles; and
  (c) about 16.2 wt % barium acetate (about 38 g/l or about 10.4 wt % barium oxide in the final washcoat layer).

The NNm™ particles, boehmite, and barium acetate can be suspended in water, and the pH can be adjusted to about 4 using acetic acid. During the mixing of the components, a portion of the barium acetate is deposited onto the NNm™ particles. Starch can then be added to adjust the viscosity of the washcoat slurry, as needed. The resulting washcoat slurry can then be coated onto a substrate, dried and calcined. Upon calcination, the barium acetate is converted into barium oxide.

Example 3: Nnm™ Lean $NO_x$ Trap Particle

In one example, NNm™ particles such as those described in Example 1 may be treated with a barium acetate solution and calcined to produce a NNm™ lean $NO_x$ trap particle. Barium acetate solution is added to the NNm™ particles to the point of incipient wetness. The particles can then be dried and calcined, resulting in the conversion of the barium salts to barium oxide and exhaustion of the acetate. The resulting NNm™ lean $NO_x$ trapping particles may then be used for any purpose, such as being included in a washcoat slurry. Alternatively, the particles may be applied as a washcoat composition to a substrate before drying and calcination. The coated substrate may then be dried and calcined, resulting in the conversion of the barium salts into barium oxide.

Example 4: $NO_x$ Storage Washcoat Composition Using Lean $NO_x$ Trap Particles NNm™ lean $NO_x$ trap particles, for example those detailed in Example 3, can be used to formulate a $NO_x$ storage washcoat slurry or $NO_x$ storage washcoat layer with an approximate solids concentration of about 365 g/l after drying and calcination.

The $NO_x$ storage washcoat composition (about 365 g/l solids including about 0.6 g/L PGM in final washcoat layer) can include solids of:

(a) about 95 wt % (about 347 g/l in the final washcoat layer) NNm™ lean $NO_x$ trap particles (catalytic composite nanoparticles (which includes platinum/palladium (10:1 Pt:Pd) nanoparticle bound to a cerium oxide support nanoparticle (1:99 catalyst:support)) bound to micron-sized cerium oxide-zirconium oxide-lanthanum oxide (86:10:4 cerium oxide:zirconium oxide:lanthanum oxide) particles, with the particles impregnated with about 10% barium oxide); and (b) about 5 wt % (about 18 g/l in the final washcoat layer) boehmite particles.

The NNm™ lean $NO_x$ trap particles and boehmite can be suspended in water and the pH can be adjusted to about 4 using acetic acid. Starch can then be added to adjust the viscosity of the washcoat slurry, as needed. The resulting washcoat slurry can then be coated onto a substrate, dried and calcined.

Example 5: Three-Layer Washcoat Configurations with Separate Oxidation, Reduction, and $NO_x$ Storage Layers A reducing washcoat composition, an oxidizing washcoat composition, and a $NO_x$ washcoat composition can be applied to a substrate to produce a three-layer coated substrate with a total platinum group metal loading of about 1.8 g/l.

A reducing washcoat composition (about 75 g/l solids including about 0.15 g/l PGM in final reducing washcoat layer) can include solids of:

(a) about 5 wt % (about 4 g/l in final washcoat layer) boehmite;
(b) about 15 wt % (about 11 g/l in final washcoat layer) micron-sized porous alumina (MI-386, or the like); and
(c) about 80 wt % (about 60 g/l in final washcoat layer) reducing catalytic NNm™ particles (reducing catalytic composite nanoparticles, which includes a rhodium catalytic nanoparticle and a cerium oxide support nanoparticle (6:94 catalyst:support), bonded to a micron-sized ceria-zirconia-lanthana (86:10:4) particle with a total rhodium content of about 0.25 wt %).

An oxidizing washcoat composition (about 108 g/l solids including about 1.0 g/l PGM in final washcoat layer) can include solids of:

(a) about 5 wt % (about 5.4 g/l in final washcoat layer) boehmite,
(b) about 55.6 wt % (about 60 g/l in final washcoat layer) micron-sized porous alumina (MI-386, or the like); and
(c) about 39.4 wt % (about 42.5 g/l in final washcoat layer) oxidizing catalytic NNm™ particles (oxidizing catalytic composite nanoparticles, which includes a platinum/palladium (10:1 platinum:palladium) catalytic nanoparticle and an aluminum oxide support nanoparticle (40:60 catalyst:support), bonded to a micron-sized aluminum oxide particle with a total platinum group metal content of about 2.4 wt %).

The $NO_x$ storage washcoat composition (about 365 g/l solids including about 0.6 g/L PGM in final washcoat layer) can include solids of:

(a) about 79.5 wt % (about 310 g/l or about 85 wt % in the final washcoat layer) NNm™ particles (catalytic composite nanoparticles (which includes platinum/palladium (10:1 Pt:Pd) nanoparticle bound to a cerium oxide support nanoparticle (1:99 catalyst:support)) bound to micron-sized cerium oxide-zirconium oxide-lanthanum oxide (86:10:4 cerium oxide:zirconium oxide:lanthanum oxide) particles);

(b) about 4.3 wt % (about 17 g/l or about 4.7 wt % in the final washcoat layer) boehmite particles; and
(c) about 16.2 wt % barium acetate (about 38 g/l or about 10.4 wt % barium oxide in the final washcoat layer).

The solids from the reducing washcoat composition can be mixed with water, and the pH adjusted to about 4 using acetic acid. After adjusting the viscosity of the resulting washcoat slurry, it can be coated onto the substrate with an approximate layer thickness of about 75 g/l. Excess washcoat is blown off and recycled. This first coating is then dried and calcined to form the reducing layer. Following this first washcoating step, an oxidizing washcoating step can be performed. The solids from the oxidizing washcoat composition can be mixed with water, and the pH of the resulting slurry adjusted to about 4 using acetic acid. After adjusting the viscosity of the washcoat, it can be coated onto the substrate with an approximate layer thickness of about 85 g/l. Excess washcoat is blown off and recycled. This second coating is then dried and calcined to form the oxidizing layer. Following this second washcoating step, a third washcoating step can be performed. The solids from the $NO_x$ washcoat can be mixed with water, and the pH of the resulting slurry adjusted to about 4 using acetic acid. After adjusting the viscosity of the washcoat, it can be coated onto the substrate with an approximate layer thickness of about 365 g/l. Excess washcoat is blown off and recycled. This final coating is then dried and calcined to form the $NO_x$ storage washcoat layer.

Figure 8:
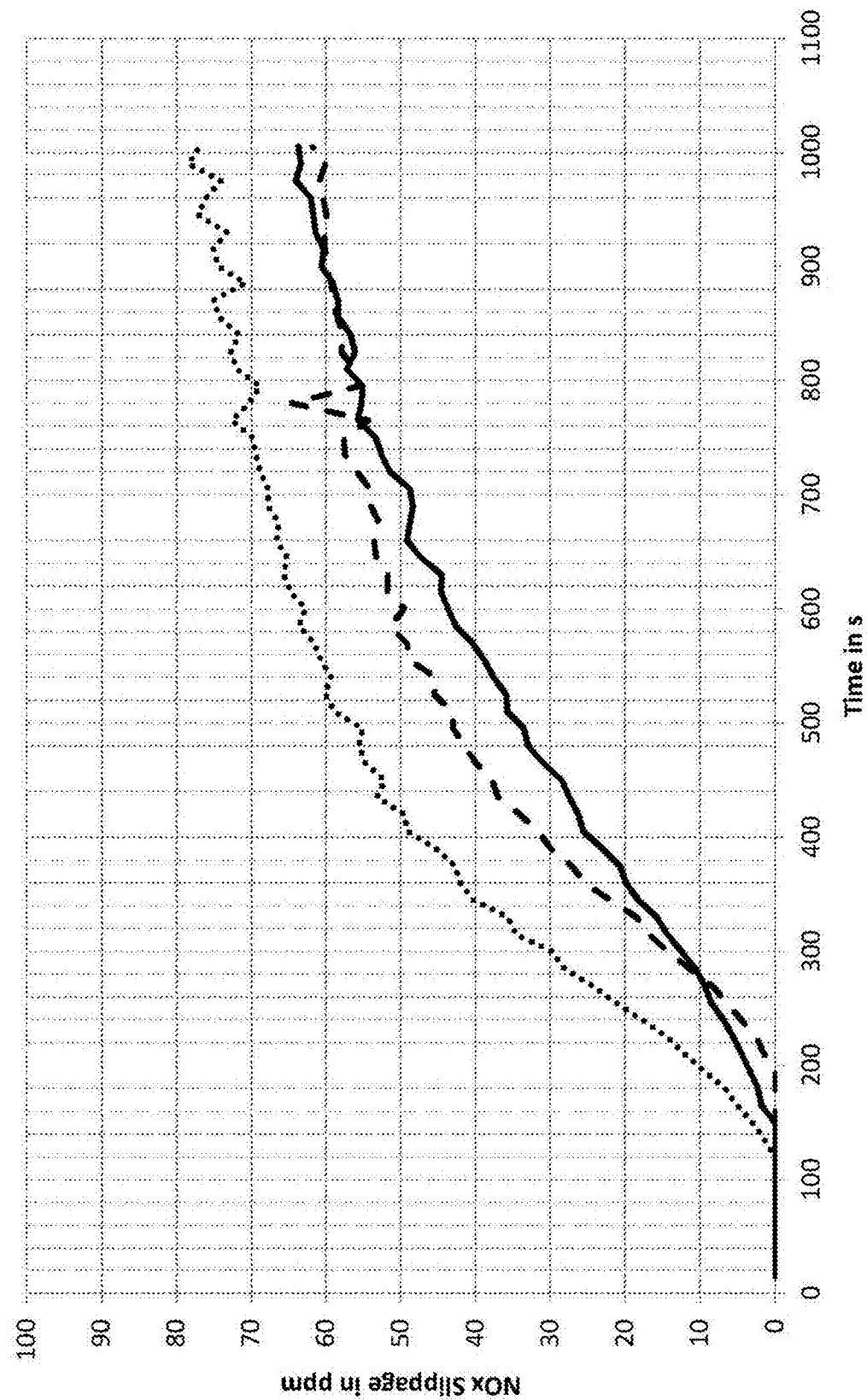
FIG. 8 is a performance comparison of a catalytic converter employing micron-sized particles with attached catalytic composite nanoparticles and $NO_x$ adsorption components as described herein (dashed line) to a commercially available catalytic converter produced using wet chemistry methods (dotted line) and a catalytic converter employing a prior LNT system (solid line).
Figure 9:
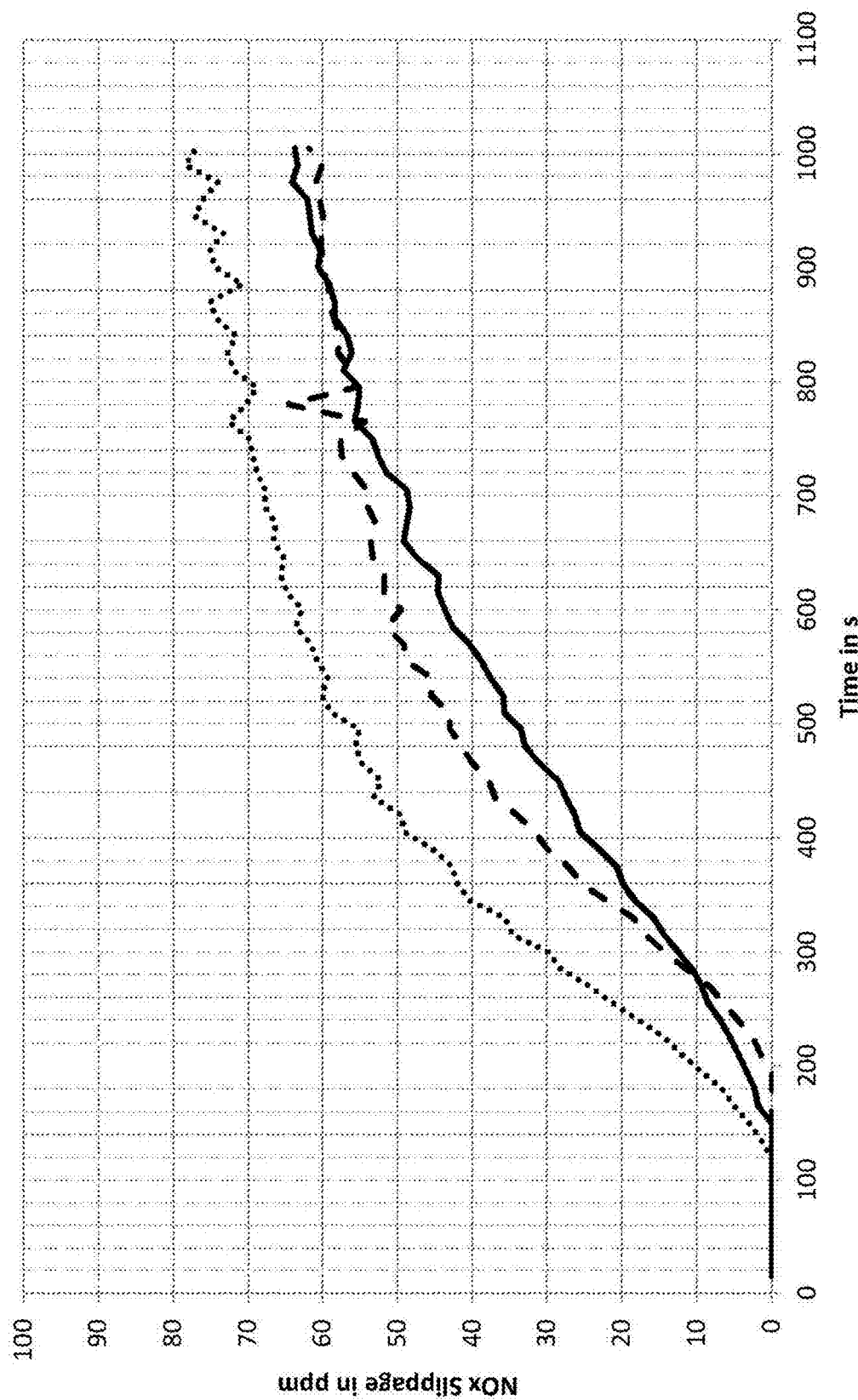
FIG. 9 is a performance comparison of a catalytic converter employing "loose ingredient" lean $NO_x$ trapping material described herein (solid line) to a commercially available catalytic converter produced using wet chemistry methods (dashed line) and a catalytic converter employing a prior LNT system (dotted line).

Example 6: Comparison of a Catalytic Converter Employing Lean $NO_x$ Trapping Materials Described Herein and Commercially Available Catalytic Converters Formed by Wet Chemistry Methods FIG. 8 illustrates a comparison of the performance of one embodiment of a catalytic converter employing lean $NO_x$ trapping material as described herein with a platinum group metal loading of about 1.8 g/l (catalytic converter A, dashed line) to the performance of a catalytic converter employing an alternate LNT system with a platinum group metal loading of about 2.6 g/l (catalytic converter B, solid line) and a commercially available catalytic converter (catalytic converter C, dotted line) with a platinum group metal loading of about 4.2 g/l.

Catalytic converter A (employing lean $NO_x$ trapping material as described herein) was formed by generating a $NO_x$ storage washcoat slurry including NNm™ particles (10:1 Pt:Pd catalytic nanoparticles bound to cerium oxide support nanoparticles, attached to micron-sized carrier nanoparticle (86% cerium oxide, 10% zirconium oxide, and 4% lanthanum oxide), barium acetate, and boehmite. The $NO_x$ storage washcoat slurry was coated onto a substrate (which had been coated with a reducing layer and oxidizing layer) and the substrate was dried and calcined.

Catalytic converter B (employing the alternate LNT system) includes an oxidative layer and a reducing layer similar to the catalytic converter A. In the $NO_x$ storage layer of catalytic converter B, a catalytic component included micron-sized aluminum oxide particles bound by composite nanoparticles (nano-sized platinum/palladium catalyst particles bound to nano-sized aluminum oxide particles), separate cerium micron-sized particles impregnated with barium oxide, and boehmite.

Catalytic converter C is a commercially available catalytic converter.

An exhaust gas that included about 100 ppm NO gas flowed through each catalytic converter at a constant rate for more than about 1000 seconds. As can be seen in FIG. 8, $NO_x$ slip for catalytic converter A with a platinum group metal loading of about 1.8 g/l is approximately similar to $NO_x$ slip for catalytic converter B (platinum group metal loading of about 2.6 g/l) and the commercially available catalytic converter C (platinum group metal loading of about 4.2 g/l).

Example 7: $NO_x$ Storage Washcoat Composition

A $NO_x$ storage washcoat composition containing composite nanoparticles and $NO_x$ adsorption materials can be used to form a $NO_x$ storage washcoat layer with an approximate solids concentration of about 365 g/l after drying and calcination.

The $NO_x$ storage washcoat slurry (about 365 g/l solids, including about 0.6 g/L PGM, in final washcoat layer) can include solids of:
- (d) about 64.1 wt % (about 250 g/l or about 68 wt % in the final washcoat layer) micron-sized cerium oxide-zirconium oxide-lanthanum oxide (86:10:4 cerium oxide:zirconium oxide:lanthanum oxide) particles;
- (e) about 15.4 wt % (about 60 g/l or about 16.4 wt % in the final washcoat layer) catalytic composite nanoparticles (which includes platinum/palladium (10:1 Pt:Pd) nanoparticle bound to a cerium oxide support particle (1:99 catalyst:support));
- (f) about 4.3 wt % (about 17 g/l or about 4.7 wt % in the final washcoat layer) boehmite particles; and
- (g) about 16.2 wt % barium acetate (about 38 g/l or about 10.4 wt % barium oxide in the final washcoat layer).

The micron-sized particles, catalytic composite nanoparticles, boehmite nanoparticles, and aqueous barium acetate can be suspended in water to form a $NO_x$ storage washcoat slurry, and the pH of the resulting slurry can be adjusted to about 4 using acetic acid. Starch can then be added to adjust the viscosity of the washcoat slurry, as needed. The washcoat slurry can then be coated onto a substrate, dried and calcined to produce a $NO_x$ storage washcoat layer. During the calcination, the barium acetate can be converted into barium oxide, with carbon atoms being exhausted from the system.

Example 8: Three-Layer Washcoat Configurations with Separate Oxidation, Reduction, and $NO_x$ Storage Layers A reducing washcoat slurry, an oxidizing washcoat slurry, and a $NO_x$ washcoat slurry can be applied to a substrate to produce a three-layer coated substrate with a total platinum group metal loading of about 1.8 g/l.

A reducing washcoat slurry (about 75 g/l solids, including about 0.15 g/l PGM, in final reducing washcoat layer) can include solids of:
- (d) about 5 wt % (about 4 g/l in final washcoat layer) boehmite;
- (e) about 15 wt % (about 11 g/l in final washcoat layer) micron-sized porous alumina (MI-386, or the like); and
- (f) about 80 wt % (about 60 g/l in final washcoat layer) reducing catalytic NNm™ particles (reducing catalytic composite nanoparticles, which includes a rhodium catalytic nanoparticle and a cerium oxide support particle (6:94 catalyst:support), bonded to a micron-sized ceria-zirconia-lanthana (86:10:4) particle with a total rhodium content of about 0.25 wt %).

An oxidizing washcoat slurry (about 108 g/l solids, including about 1.0 g/l PGM, in final washcoat layer) can include solids of:
- (d) about 5 wt % (about 5.4 g/l in final washcoat layer) boehmite,
- (e) about 55.6 wt % (about 60 g/l in final washcoat layer) micron-sized porous alumina (MI-386, or the like); and
- (f) about 39.4 wt % (about 42.5 g/l in final washcoat layer) oxidizing catalytic NNm™ particles (oxidizing catalytic composite nanoparticles, which includes a platinum/palladium (10:1 platinum:palladium) catalytic nanoparticle and an aluminum oxide support particle (40:60 catalyst:support), bonded to a micron-sized aluminum oxide particle with a total platinum group metal content of about 2.4 wt %).

The $NO_x$ storage washcoat slurry (about 365 g/l solids including about 0.6 g/L PGM in final washcoat layer) can include solids of:
- (a) about 64.1 wt % (about 250 g/l or about 68 wt % in the final washcoat layer) micron-sized cerium oxide-zirconium oxide-lanthanum oxide (86:10:4 cerium oxide:zirconium oxide:lanthanum oxide) particles;
- (b) about 15.4 wt % (about 60 g/l or about 16.4 wt % in the final washcoat layer) catalytic composite nanoparticles (which includes platinum/palladium (10:1 Pt:Pd) nanoparticle bound to a cerium oxide support particle (1:99 catalyst:support));
- (c) about 4.3 wt % (about 17 g/l or about 4.7 wt % in the final washcoat layer) boehmite particles; and
- (d) about 16.2 wt % barium acetate (about 38 g/l or about 10.4 wt % barium oxide in the final washcoat layer).

The solids from the reducing washcoat composition can be mixed with water to form a reducing washcoat slurry, and the pH of the slurry adjusted to about 4 using acetic acid. After adjusting the viscosity of the washcoat slurry, it can be coated onto the substrate with an approximate layer thickness of about 75 g/l. Excess washcoat is blown off and recycled. This first coating is then dried and calcined to form the reducing washcoat layer. Following this first washcoating step, an oxidizing washcoating step can be performed. The solids from the oxidizing washcoat composition can be mixed with water to form an oxidizing washcoat slurry, and the pH of the slurry adjusted to about 4 using acetic acid. After adjusting the viscosity of the washcoat slurry, it can be coated onto the substrate with an approximate layer thickness of about 85 g/l. Excess washcoat is blown off and recycled. This second coating is then dried and calcined to form the oxidizing layer. Following this second washcoating step, a third washcoating step can be performed. The solids from the $NO_x$ storage washcoat composition can be mixed with water to form a $NO_x$ storage washcoat slurry, and the pH adjusted to about 4 using acetic acid. After adjusting the viscosity of the washcoat, it can be coated onto the substrate with an approximate layer thickness of about 365 g/l. Excess washcoat is blown off and recycled. This final coating is then dried and calcined to form the $NO_x$ storage washcoat layer. During the calcination, the barium acetate can be converted into barium oxide, with carbon atoms being exhausted from the system.

Example 9: Comparison of A Catalytic Converter Employing Single-Particle $NO_x$ Traps and Commercially Available Catalytic Converters Formed by Wet Chemistry Methods FIG. 10 illustrates a comparison of the performance of one embodiments of a catalytic converter employing "loose ingredient" lean $NO_x$ trapping material as described herein with a platinum group metal loading of about 1.8 g/l (catalytic converter A, solid line) to the performance of a catalytic converter employing an alternate LNT system with a platinum group metal loading of about 2.6 g/l (catalytic convert B, dotted line) and a commercially available catalytic converter with a platinum group metal loading of about 4.2 g/l (catalytic converter C, dashed line).

Catalytic converter A (employing "loose ingredient" lean $NO_x$ trapping materials as described herein) was formed by generating a $NO_x$ storage washcoat slurry including separately provided composite nanoparticles (10:1 Pt:Pd catalytic nanoparticles bound to cerium oxide support nanoparticles), micron-sized oxygen-storage particles (86% cerium oxide, 10% zirconium oxide, and 4% lanthanum oxide), barium acetate, and boehmite. The $NO_x$ storage washcoat slurry was coated onto a substrate (which had been coated with a reducing layer and an oxidizing layer) and the substrate was dried and calcined.

Catalytic converter B (employing the alternate LNT system) includes an oxidative layer and a reducing layer similar to the catalytic converter A. In the $NO_x$ storage layer of catalytic converter B, a catalytic component included micron-sized aluminum oxide particles bound by composite nanoparticles (nano-sized platinum/palladium catalyst particles bound to nano-sized aluminum oxide particles), separate cerium micron-sized particles impregnated with barium oxide, and boehmite.

Catalytic converter C is a commercially available catalytic converter.

An exhaust gas that included about 100 ppm NO gas flowed through each catalytic converter at a constant rate for more than about 1000 seconds. As can be seen in FIG. 3. $NO_x$ slip for catalytic converter A with a platinum group metal loading of about 1.8 g/l is lower than the $NO_x$ slip for catalytic converter A (platinum group metal loading of about 2.6 g/l) and the commercially available catalytic converter C (platinum group metal loading of about 4.2 g/l).

We claim:

1. A NOx storage washcoat composition comprising:
   micron-sized oxygen-storage particles;
   composite nanoparticles, the composite nanoparticle comprising a support nanoparticle and a catalytic nanoparticle, the catalytic nanoparticle comprising one or more platinum group metals, wherein the composite nanoparticles are not pre-attached to a micron-sized particle when added to the washcoat composition; and
   an alkaline earth metal salt or alkaline earth metal oxide.

2. The NOx storage washcoat composition according to claim 1, wherein a portion of the composite nanoparticles are not covalently bound to the micron-sized oxygen-storage particles.

3. The NOx storage washcoat composition according to claim 1, wherein a portion of the composite nanoparticles are covalently bound to the micron-sized oxygen-storage particles.

4. The NOx storage washcoat composition according to claim 1, wherein a portion of the alkaline earth metal oxide is not covalently bound to the micron-sized oxygen-storage particles.

5. The NOx storage washcoat composition according to claim 1, wherein a portion of the alkaline earth metal oxide is covalently bound to the micron-sized oxygen-storage particles.

6. The NOx storage washcoat composition according to claim 1, wherein the alkaline earth metal oxide is barium oxide.

7. The NOx storage washcoat composition according to claim 1, wherein the alkaline earth metal salt is a barium salt.

8. The NOx storage washcoat composition according to claim 1, wherein the alkaline earth metal salt is barium acetate.

9. A vehicle comprising the NOx storage washcoat composition according to claim 1.

10. The NOx storage washcoat composition according to claim 1, wherein the micron-sized oxygen-storage particles comprise cerium oxide; zirconium oxide; lanthanum oxide; yttrium oxide, cerium oxide and zirconium oxide; cerium oxide, zirconium oxide, and lanthanum oxide; cerium oxide, zirconium oxide, and yttrium oxide; or cerium oxide, zirconium oxide, lanthanum oxide, and yttrium oxide.

11. The NOx storage washcoat composition according to claim 1, wherein the composite nanoparticles are plasma generated.

12. The NOx storage washcoat composition of claim 1, wherein the catalytic nanoparticle comprises platinum, palladium, or platinum and palladium.

13. The NOx storage washcoat composition according to claim 1, wherein the support nanoparticle comprises a metal oxide.

14. A coated substrate comprising a substrate coated with the NOx storage washcoat composition according to claim 1.

15. The coated substrate of claim 14, wherein the coated substrate further comprises a reducing washcoat layer.

16. A catalytic converter comprising the coated substrate of claim 14.

17. An exhaust treatment system comprising a conduit for exhaust gas and a catalytic converter according to claim 16.

18. A vehicle comprising a catalytic converter according to claim 16.

19. A method of treating exhaust gas, comprising contacting the coated substrate of claim 14 with the exhaust gas.

20. The coated substrate of claim 14, wherein the washcoat layer is formed by:
    combining a first component comprising the oxygen-storage particles, a second component comprising the composite nanoparticles, and a third component comprising the alkaline earth metal salt to form a washcoat slurry, wherein the composite nanoparticles are not pre-attached to a micron-sized particle when added to the washcoat slurry;
    coating the washcoat slurry onto the substrate; and
    calcining the substrate, thereby:
        converting the alkaline earth metal salt into the alkaline earth metal oxide; and
        forming the washcoat layer.

21. A method of producing a washcoat composition, the method comprising:
    combining a first component comprising a plurality of micron-sized oxygen-storage particles; a second component comprising a plurality of composite nanoparticles, the composite nanoparticle comprising a support nanoparticle and a catalytic nanoparticle, the catalytic nanoparticle comprising one or more platinum group metals, wherein the composite nanoparticles are not pre-attached to a micron-sized particle when added to the washcoat composition; and a third component comprising an alkaline earth metal salt to form the washcoat composition.

22. A method of producing a coated substrate, the method comprising:
    coating a substrate with the washcoat composition of claim 21; and calcining the substrate, thereby forming a NOx storage washcoat layer coating the substrate.

* * * * *